United States Patent
James et al.

(10) Patent No.: US 12,433,937 B2
(45) Date of Patent: *Oct. 7, 2025

(54) APTAMER ASSEMBLIES FOR PROTEIN CROSSLINKING

(71) Applicant: University of Florida Research Foundation, Inc., Gainesville, FL (US)

(72) Inventors: Bryan D. James, Gainesville, FL (US); Josephine Allen, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 650 days.

This patent is subject to a terminal disclaimer.

(21) Appl. No.: 17/636,715

(22) PCT Filed: Aug. 28, 2020

(86) PCT No.: PCT/US2020/048488
§ 371 (c)(1),
(2) Date: Feb. 18, 2022

(87) PCT Pub. No.: WO2021/041870
PCT Pub. Date: Mar. 4, 2021

(65) Prior Publication Data
US 2022/0331405 A1    Oct. 20, 2022

Related U.S. Application Data

(60) Provisional application No. 62/968,129, filed on Jan. 30, 2020, provisional application No. 62/968,130, filed on Jan. 30, 2020, provisional application No. 62/937,316, filed on Nov. 19, 2019, provisional application No. 62/894,215, filed on Aug. 30, 2019.

(51) Int. Cl.
*A61K 38/39*    (2006.01)
*C12N 15/115*   (2010.01)

(52) U.S. Cl.
CPC ............ *A61K 38/39* (2013.01); *C12N 15/115* (2013.01); *C12N 2310/16* (2013.01); *C12N 2310/3519* (2013.01)

(58) Field of Classification Search
CPC .. A61K 38/39; C12N 15/115; C12N 2310/16; C12N 2310/3519; C12N 2310/51
See application file for complete search history.

(56) References Cited

U.S. PATENT DOCUMENTS

| 2004/0266004 | A1 | 12/2004 | Terada et al. |
| 2015/0376620 | A1 | 12/2015 | Ikebukuro et al. |
| 2018/0066263 | A1* | 3/2018 | Yoshimoto ......... G01N 33/5308 |

FOREIGN PATENT DOCUMENTS

| WO | 2009/146147 A2 | 12/2009 | |
| WO | WO-2017139417 A1 * | 8/2017 | ......... A61K 31/7088 |

OTHER PUBLICATIONS

Yanlu Zhang, Systemic administration of cell-free exosomes generated by human bone marrow derived mesenchymal stem cells cultured under 2D and 3D conditions improves functional recovery in rats after traumatic brain injury, Neurochem Int. Dec. 2017 ; 111: 69-81.*
Anna Stejskalová, Biologically Inspired, Cell-Selective Release of Aptamer-Trapped Growth Factors by Traction Forces, Advanced Materials, published Jan. 2019, pp. 1-8.*
Aptagen (Aptamers, Platelet Derived Growth Factor (PDGF) B-chain, accessed on Oct. 16, 2024).*
International Search Report and Written Opinion for PCT/US2020/048488 mailed on Dec. 2, 2021.
Ramaswamy et al. "DNA Aptamer Assembly as a Vascular Endothelial Growth Factor Receptor Agonist" Nucleic Acid Ther. Oct. 1, 2015, vol. 25, No. 5, pp. 227-234.

* cited by examiner

*Primary Examiner* — Julie Ha
*Assistant Examiner* — Erinne R Dabkowski
(74) *Attorney, Agent, or Firm* — THOMAS|HORSTEMEYER, LLP

(57) ABSTRACT

Disclosed herein is the use of DNA aptamer assemblies of varying DNA length, structure, and sequence to both bind to collagen and other proteins, to then act as a biocompatible, degradable, reversible, or permanent 3D crosslinkers between proteins, and to service as a biologically functional material when using the appropriate aptamer sequence. Therefore, disclosed herein are compositions comprising collagen fibers crosslinked with DNA aptamers. Also disclosed are devices and implants made from or coated with collagen fibers crosslinked with DNA aptamers. Also disclosed are methods of making collagen fibers. Also disclosed are kits for producing collagen fibers. Also disclosed herein are compositions DNA aptamers in a collagen fiber matrix that stabilizes the DNA aptamer.

10 Claims, 75 Drawing Sheets
Specification includes a Sequence Listing.

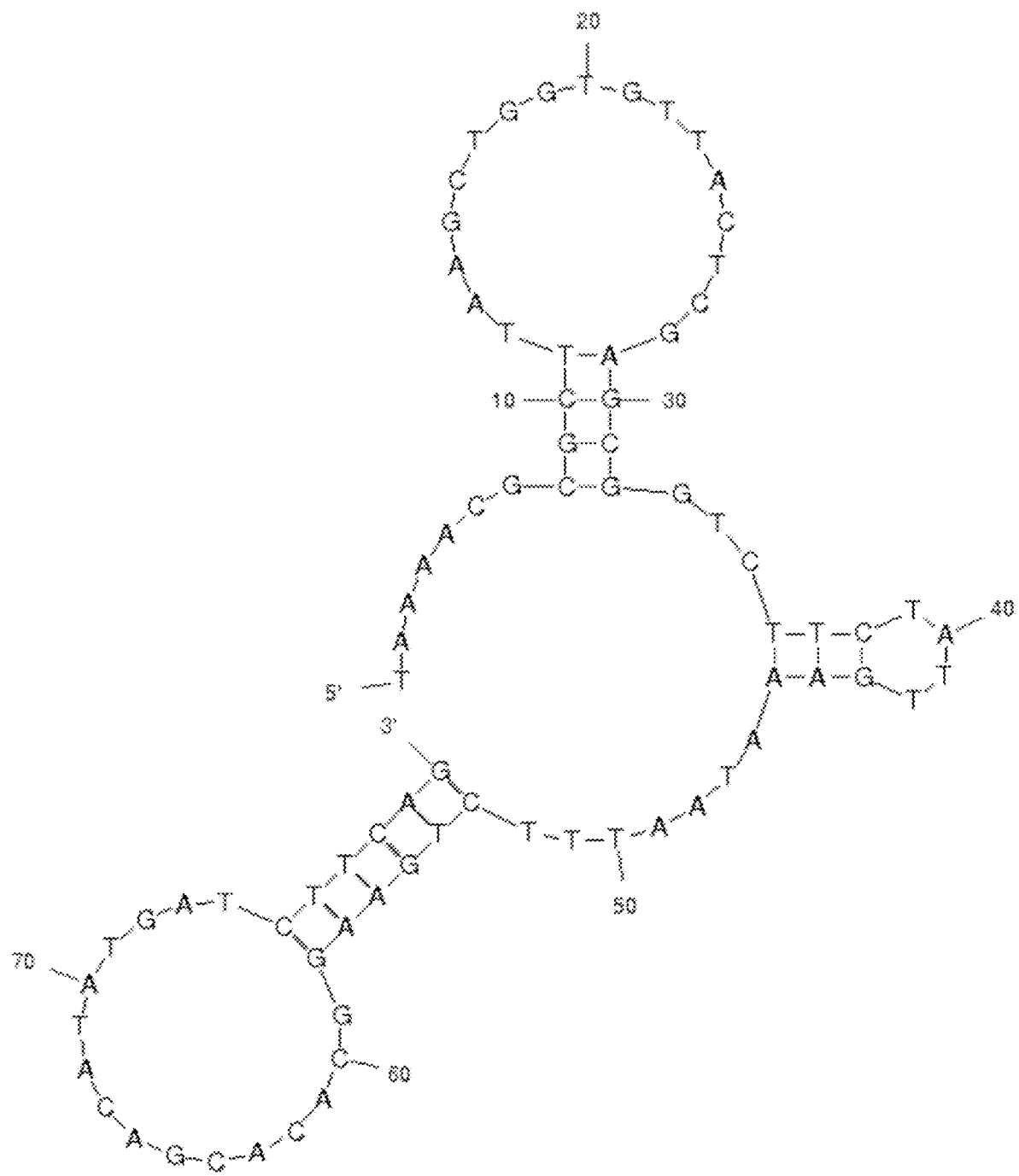
FIG. 6, continued

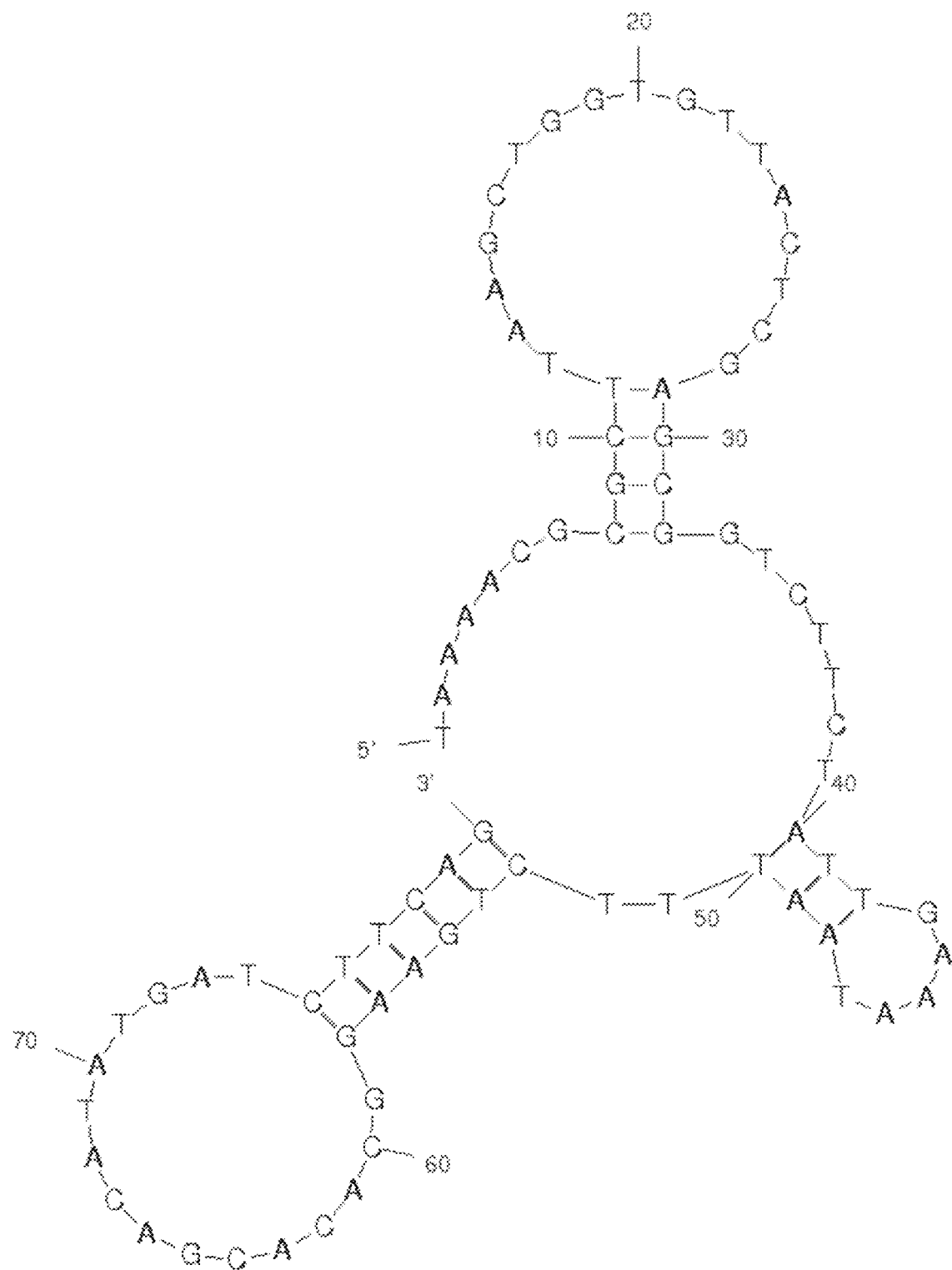
FIG. 6, continued 15 nt  5'- GGA GCT GTT GGC GTA -3'

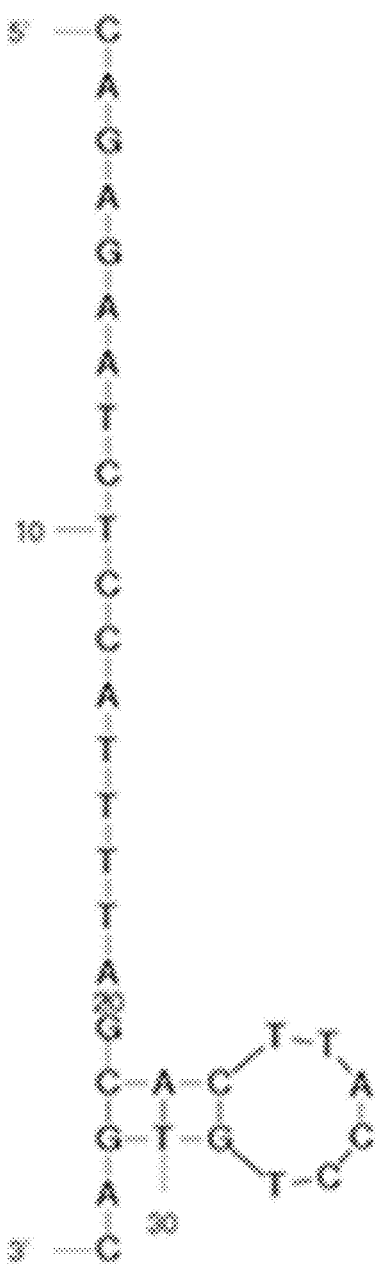
33 nt
33 nt  5'- CAG AGA ATC TCC ATT TTA GCA CTT ACC TGT GAC -3'
FIG. 7, continued

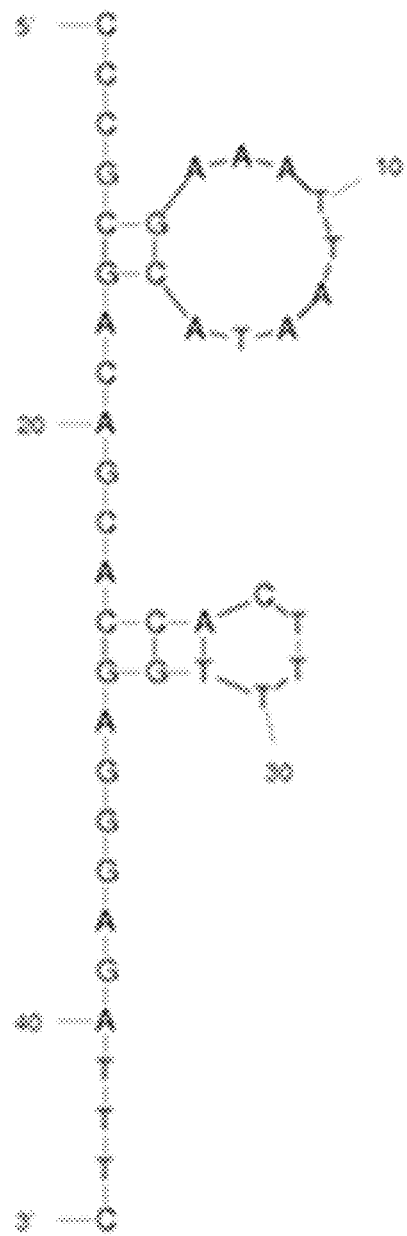
45 nt
45 nt  5'- TCC CGC GAA ATT AAT
ACG ACA GCA CCA CTT
TTG GAG GGA GAT TTC -3'
FIG. 7, continued

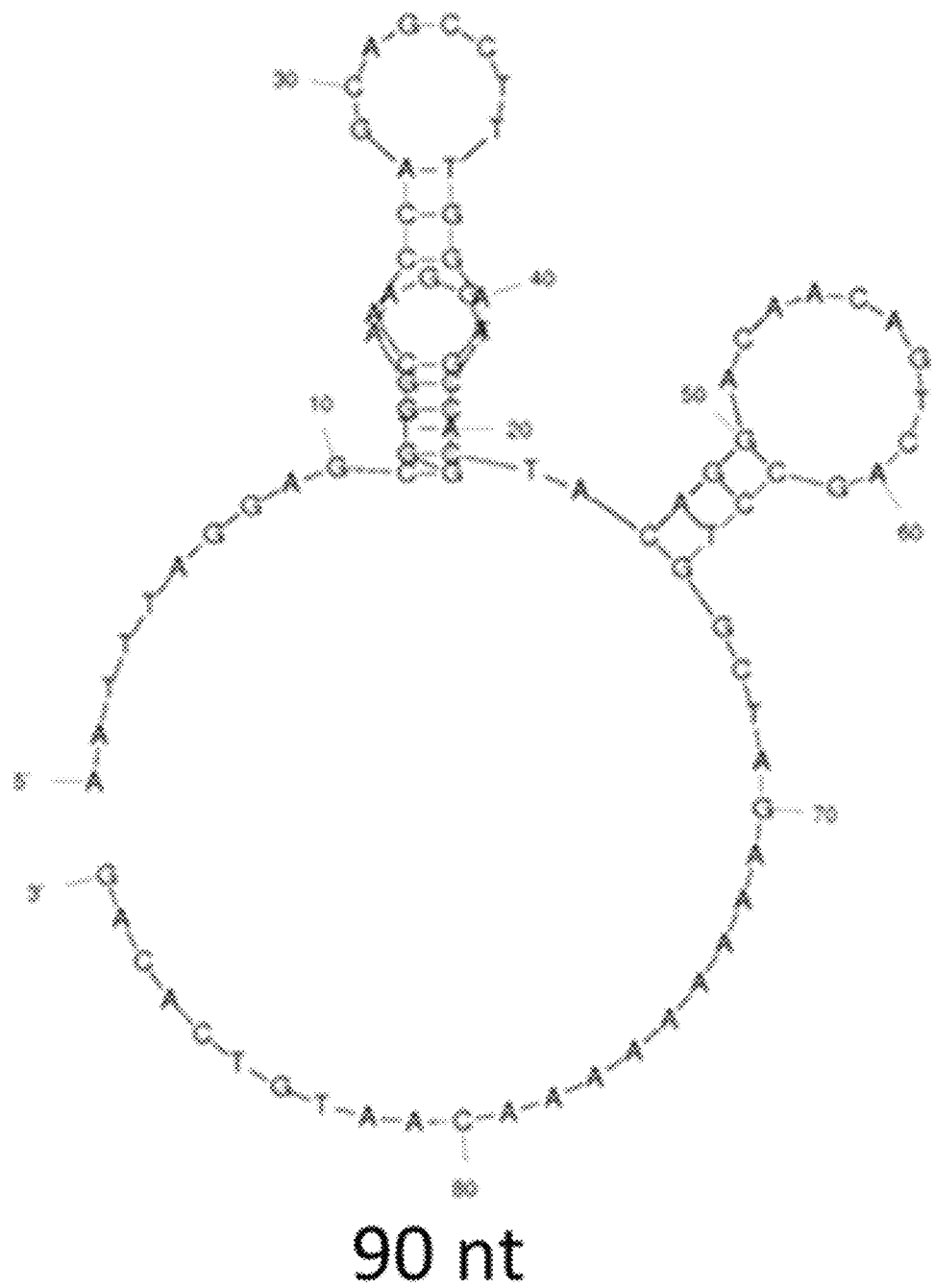
90 nt
90 nt  5'- AAT TTA GGA GCT GAA GGT CAG GGC ACC AGC AGC CTT TGG AAG CCT ACA GGA CAA CAG TCA GCC TGG CTA GAA AAA AAA ACA ATG TCA CAG -3'
FIG. 7, continued

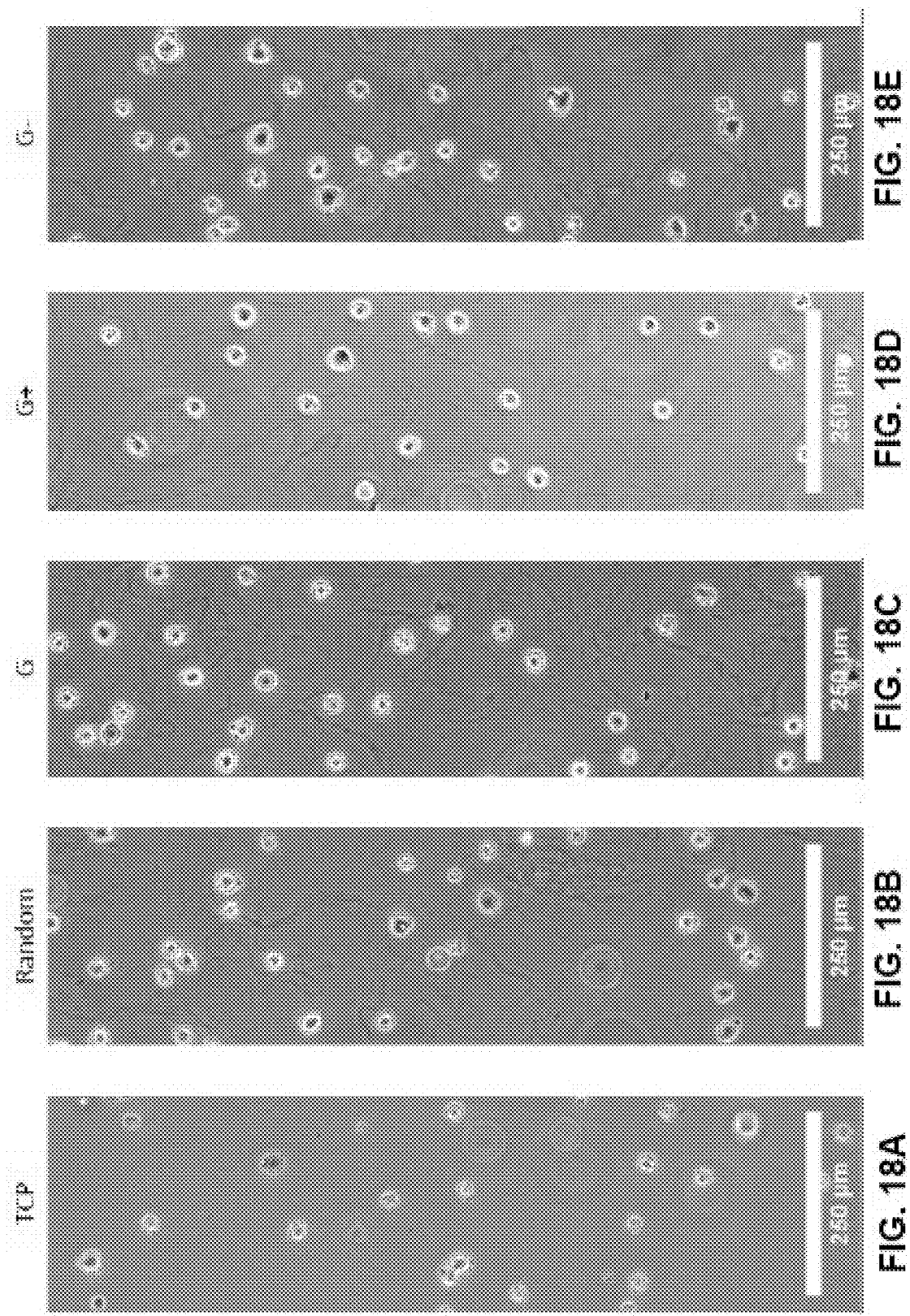

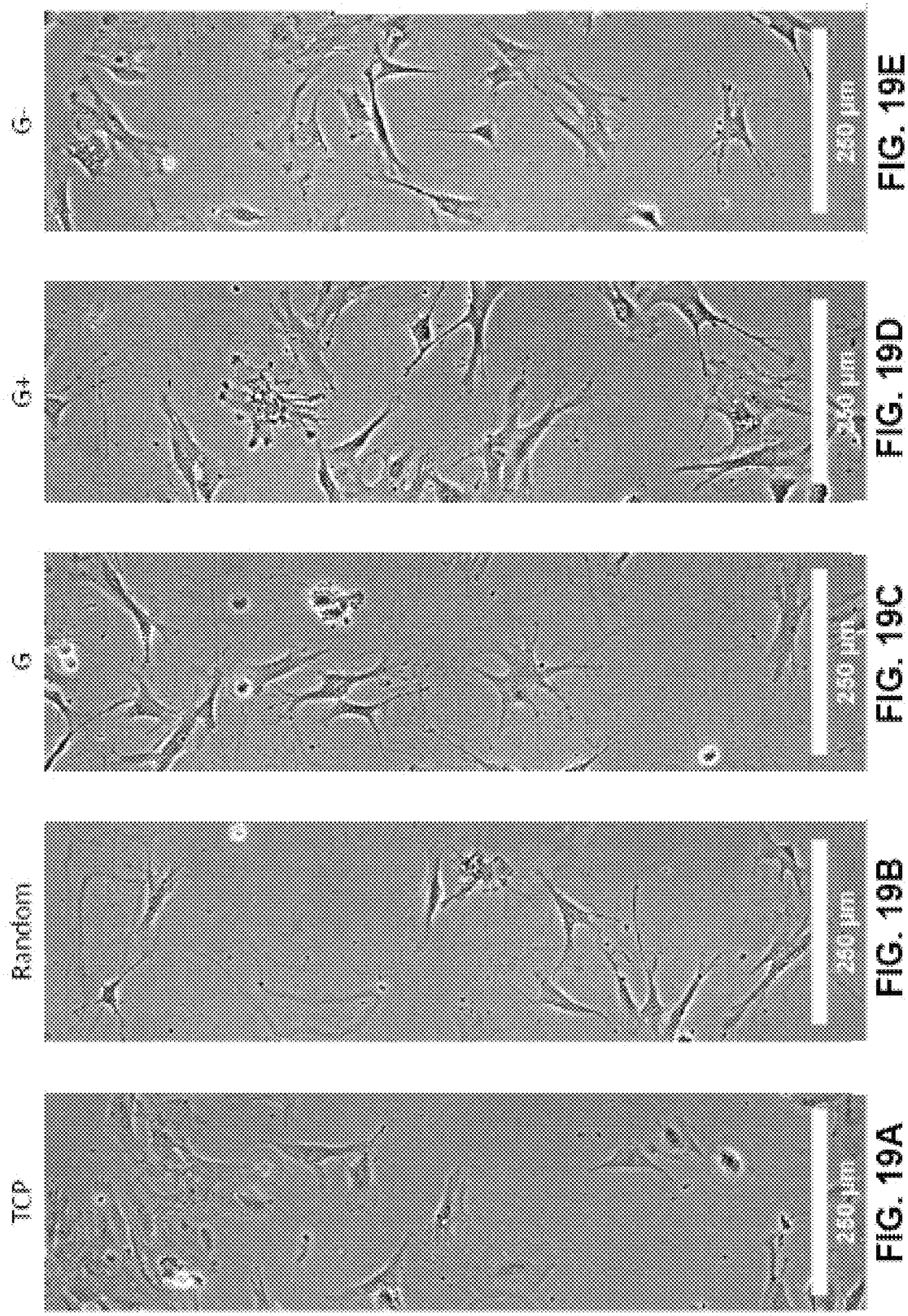

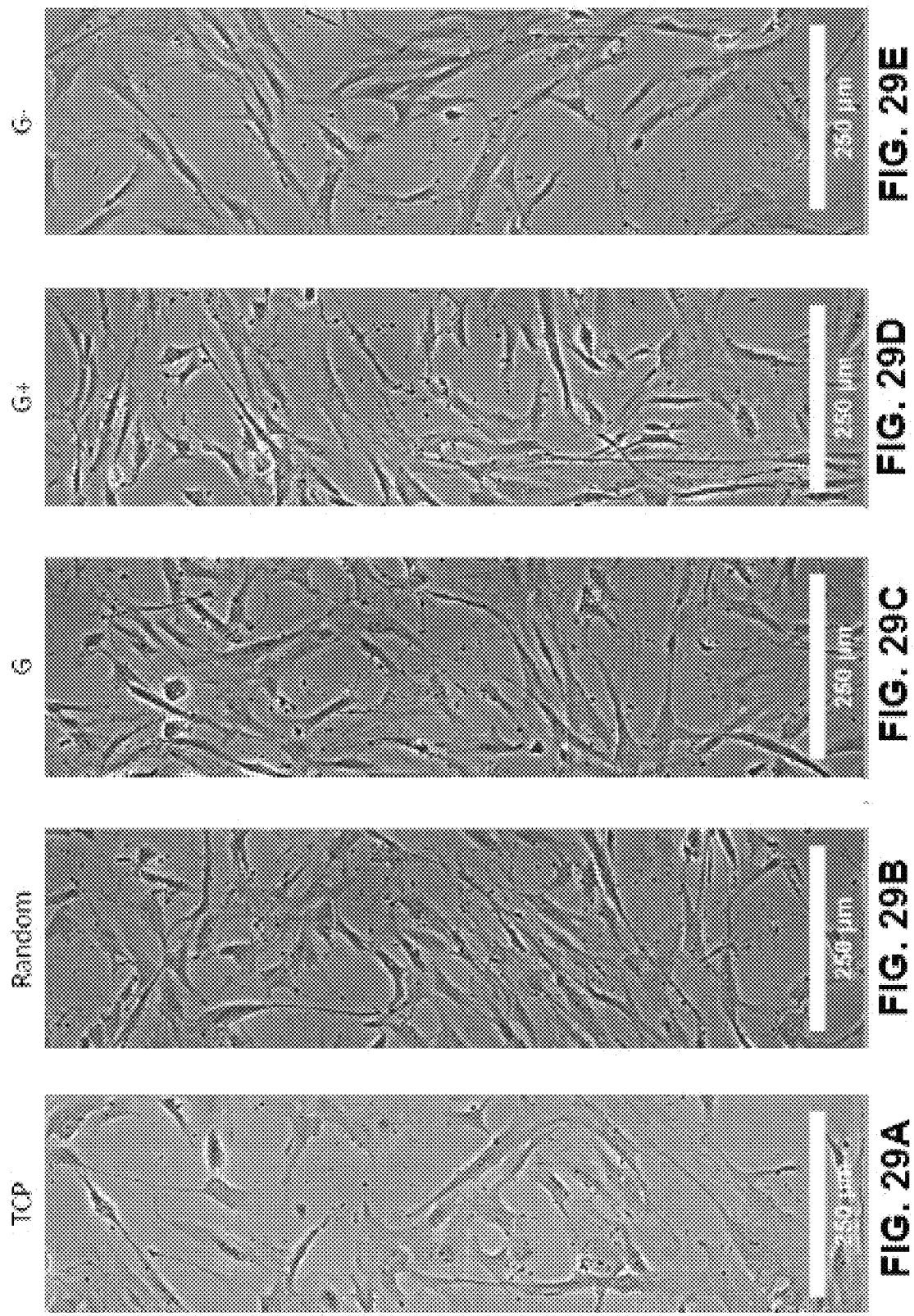

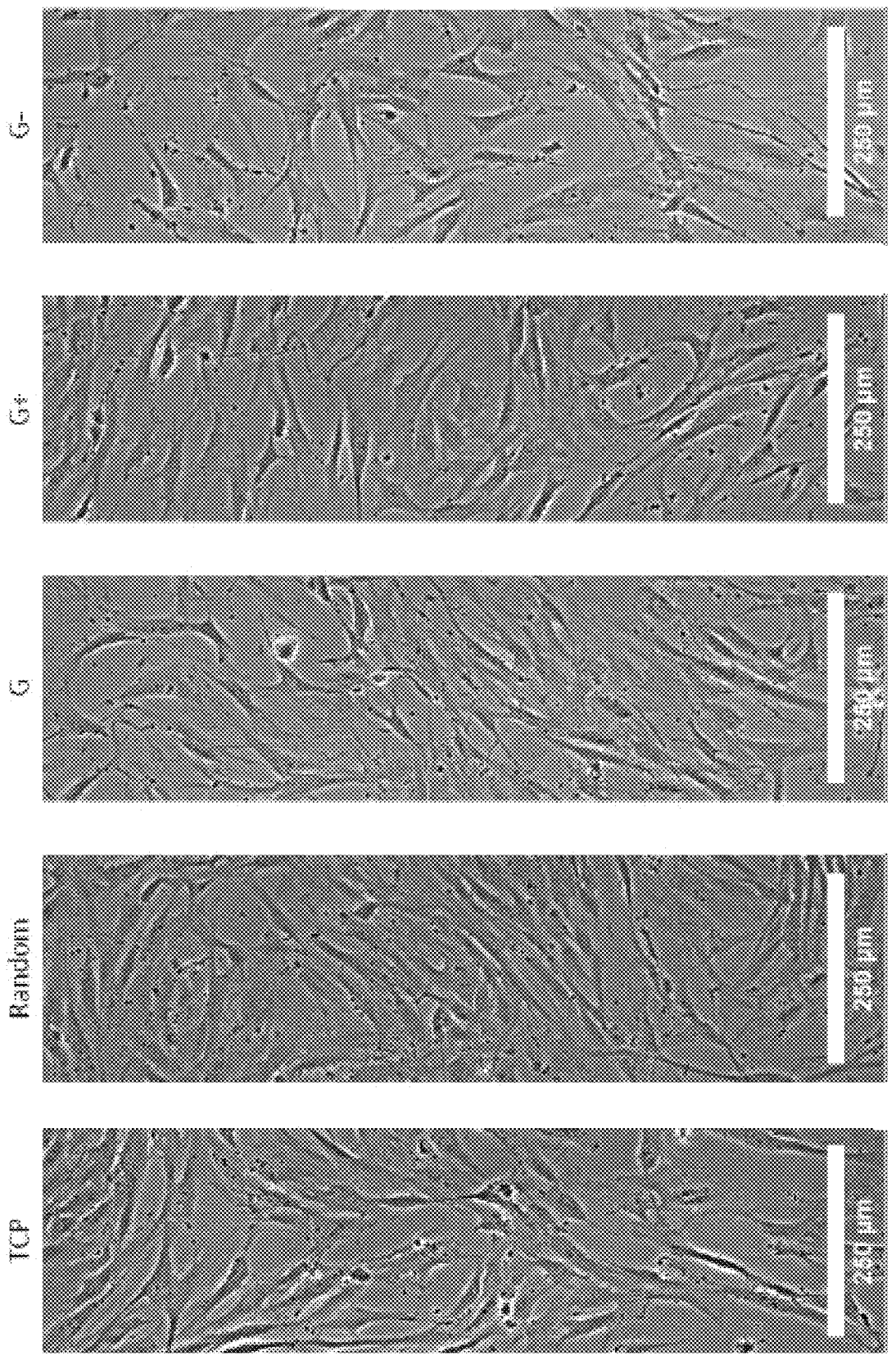

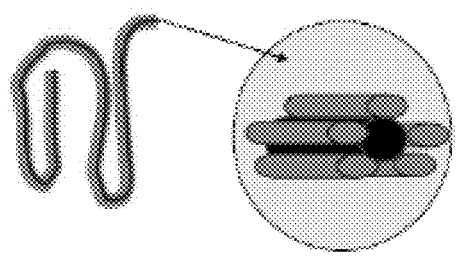
Due to their helical structures, collagen and DNA form fibers from the interaction shown.
DNA-Collagen Fiber Formation
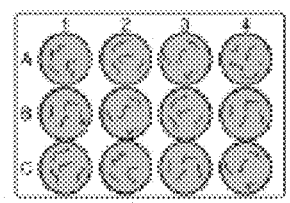
Collagen and DNA aptamer solutions were combined and incubated, chemically fixed, and stained.
FIG. 33A

DNA-Collagen Fiber Mineralization
Mineralization Procedure
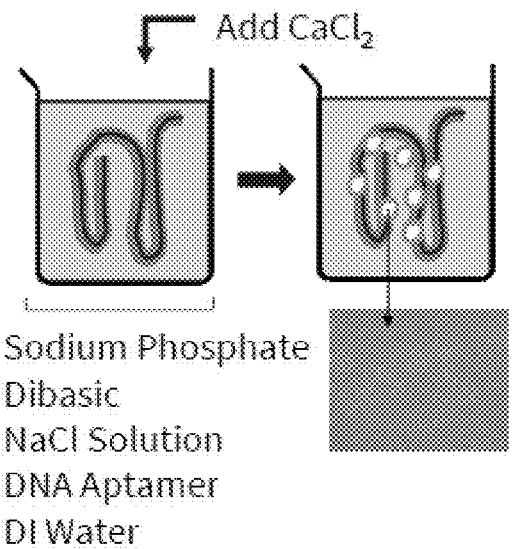
Sodium Phosphate
Dibasic
NaCl Solution
DNA Aptamer
DI Water
Heterogeneous Mineralization
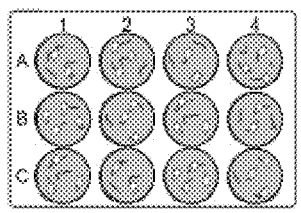
Sodium chloride, sodium phosphate dibasic, and calcium chloride solutions were added to initiate mineralization reaction. 301 hour after mineralization, the fibers were rinsed 3 times with DI water.
FIG. 33B

Qualitative and Quantitative Analysis
Qualitative Analysis:
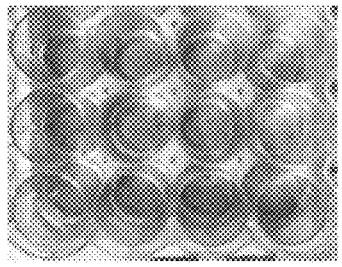
Image of stained mineralized fibers
Mineralization was stained with Alizarin Red. Qualitative observation of red regions was used to determine mineralization rich regions.
Quantification Procedure:
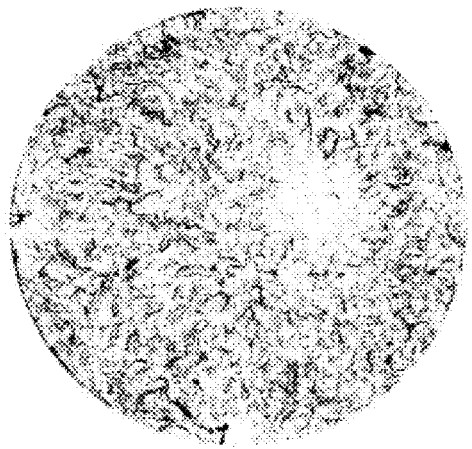
$$\text{Normalized Mineralization} = \frac{\text{Stained area}}{\text{Well plate area}}$$
FIG. 33C

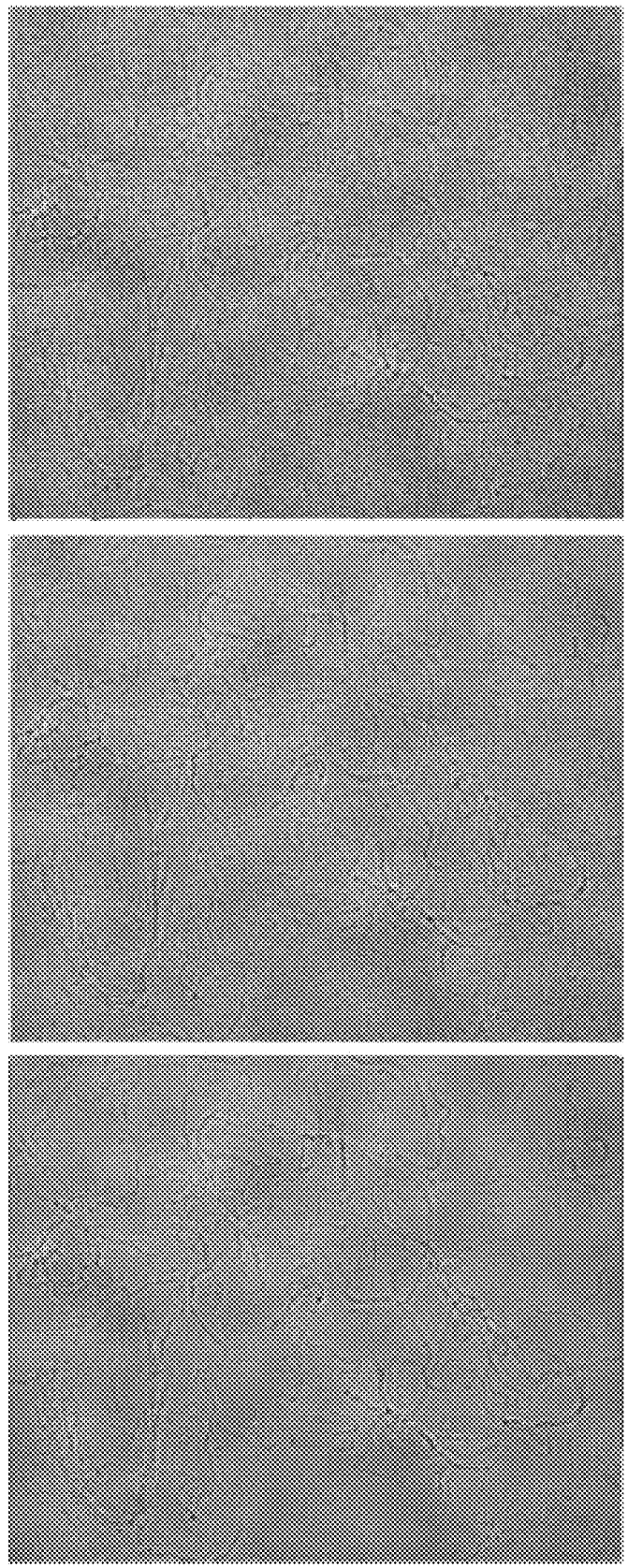

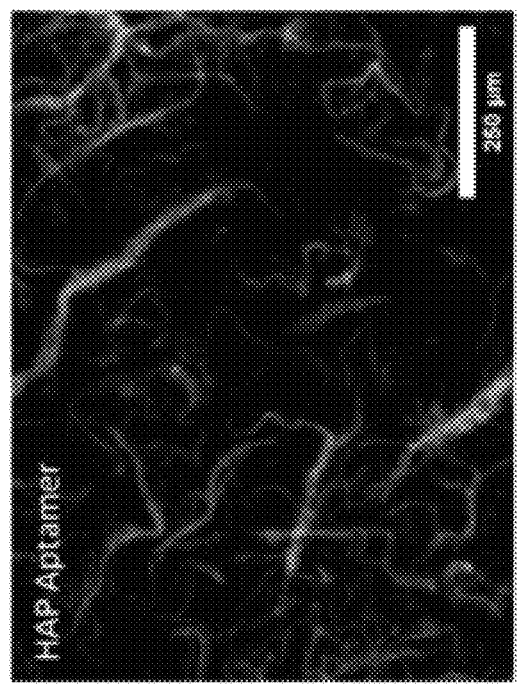
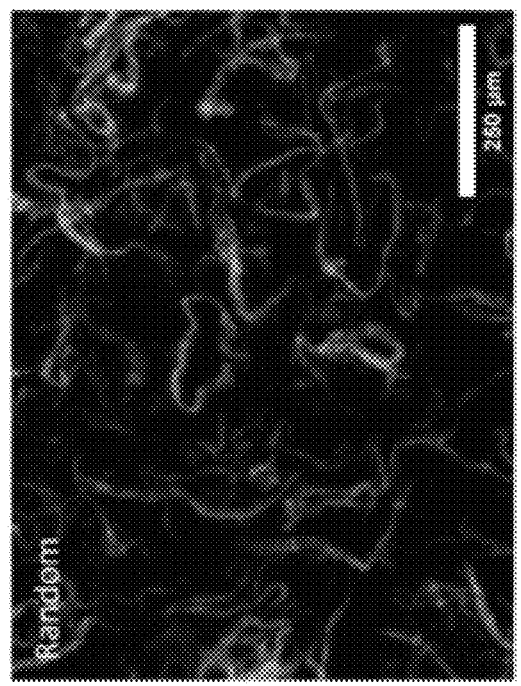
FIG. 35A

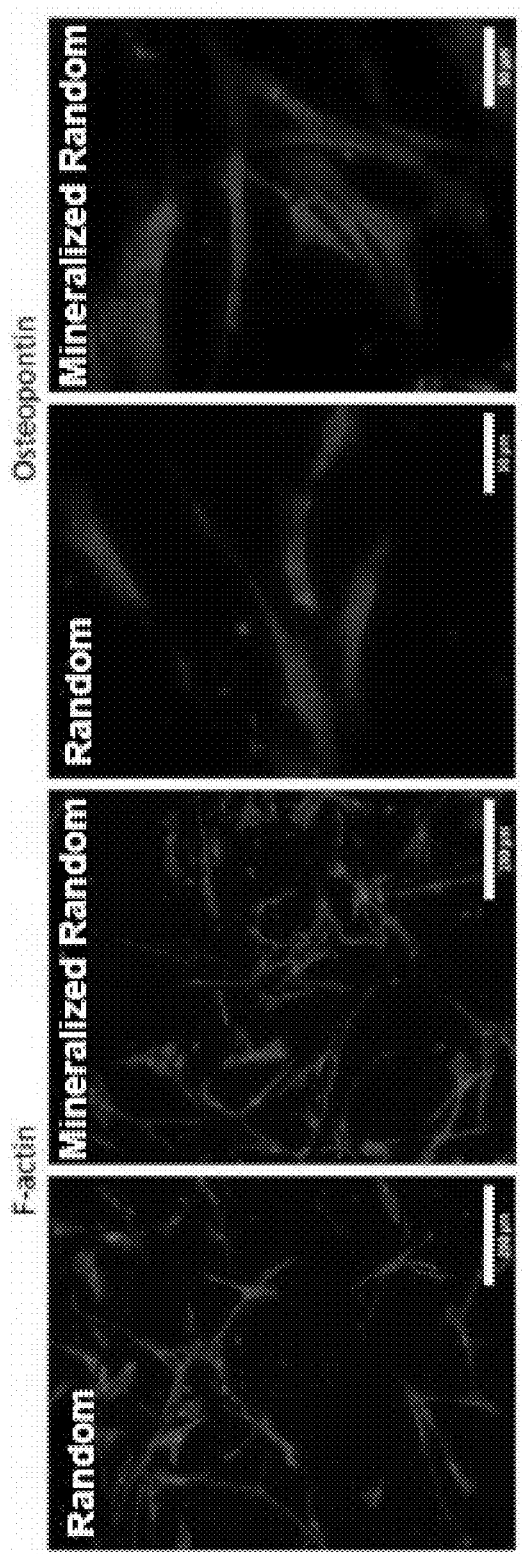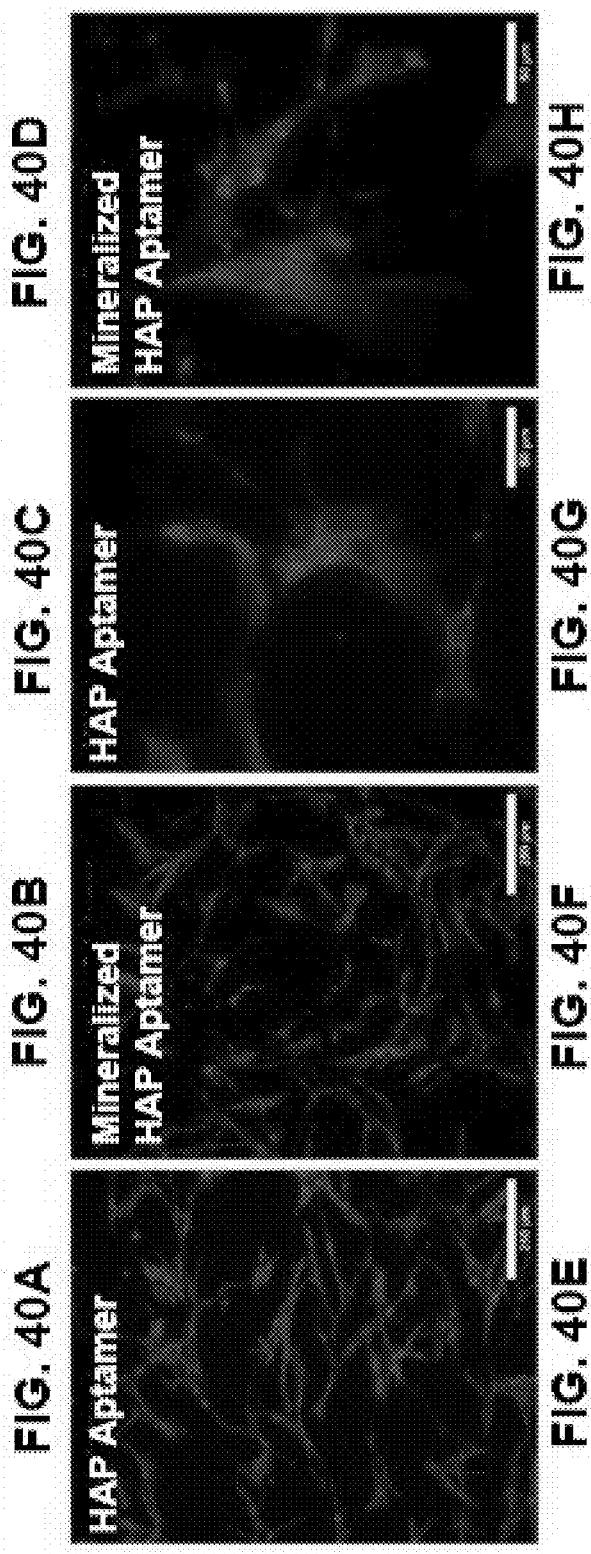

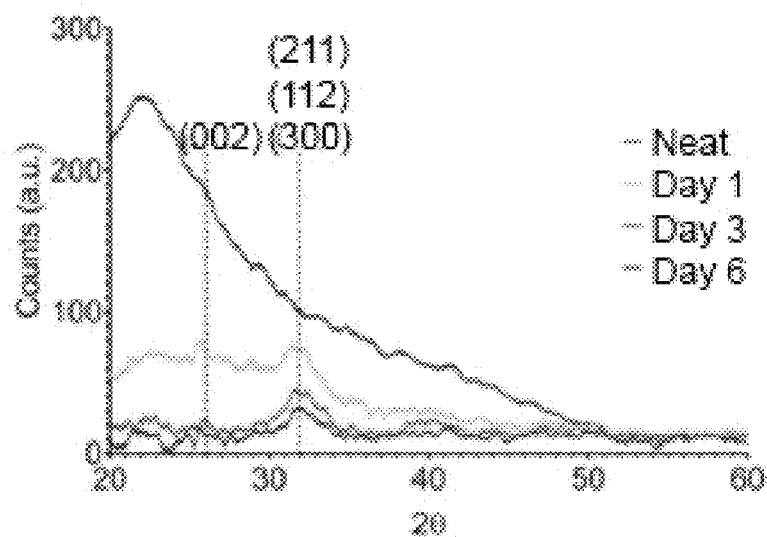
FIG. 44A
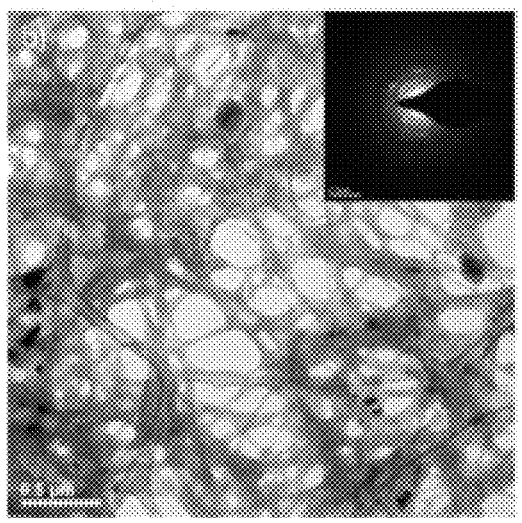 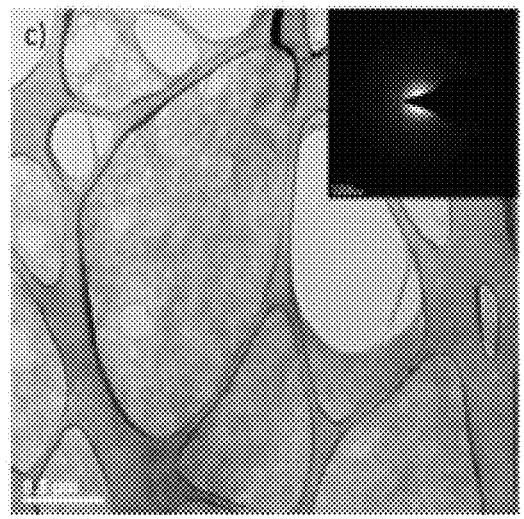
FIG. 44B          FIG. 44C

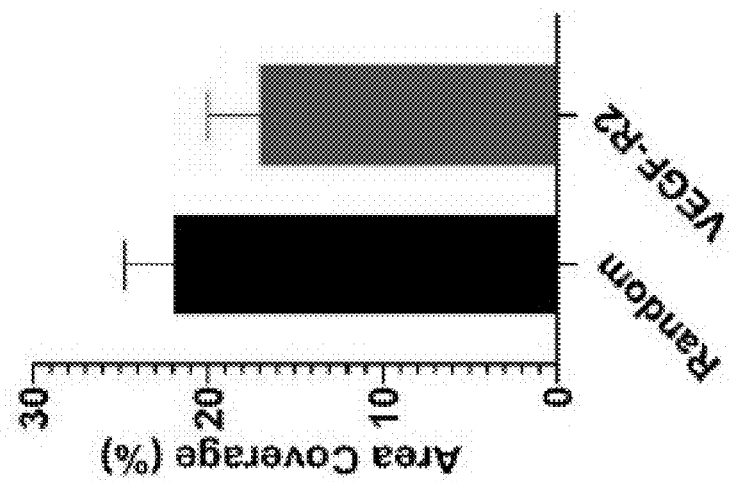
FIG. 49D
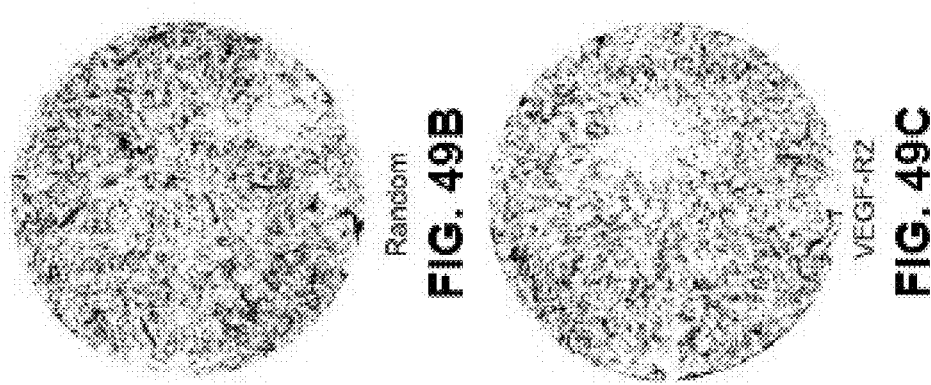
FIG. 49B
FIG. 49C
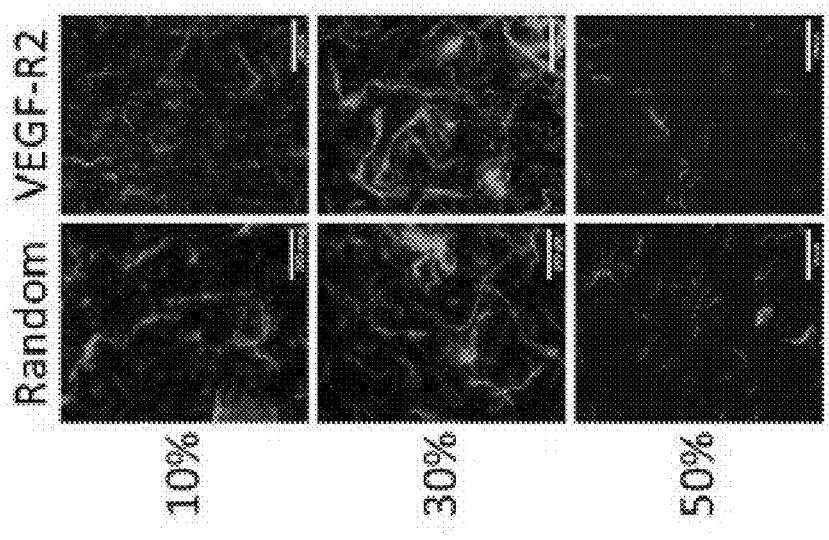
FIG. 49A

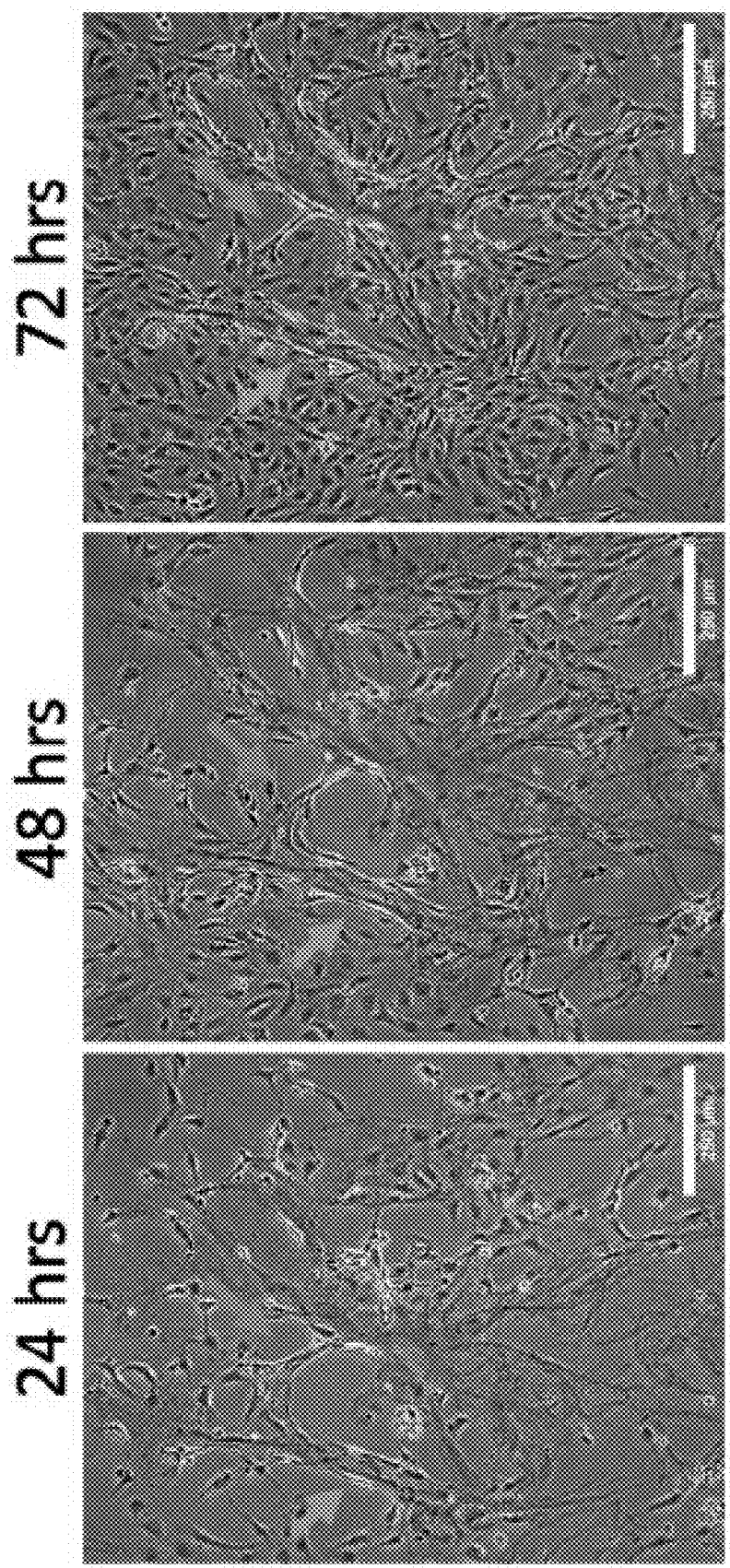

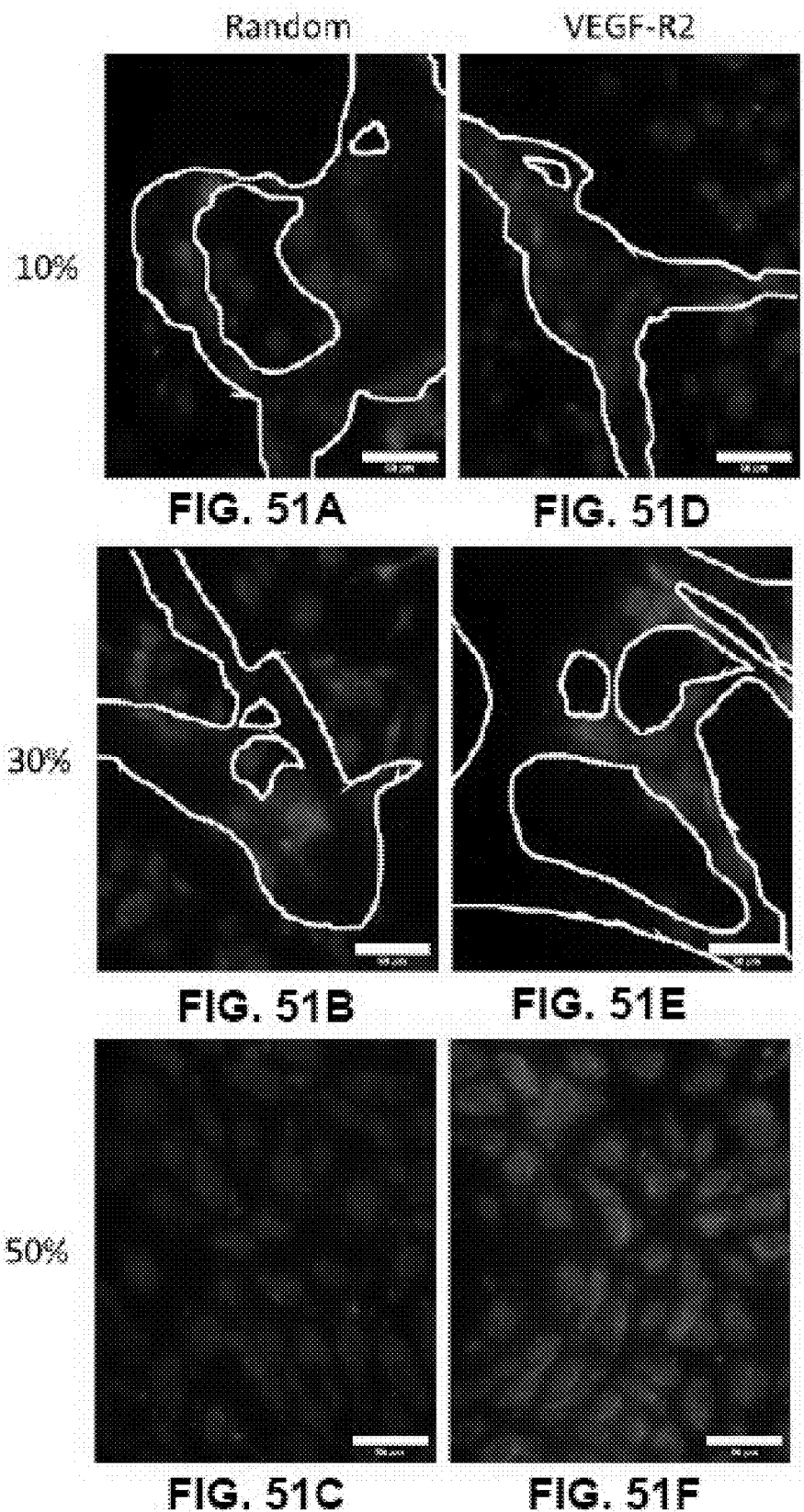

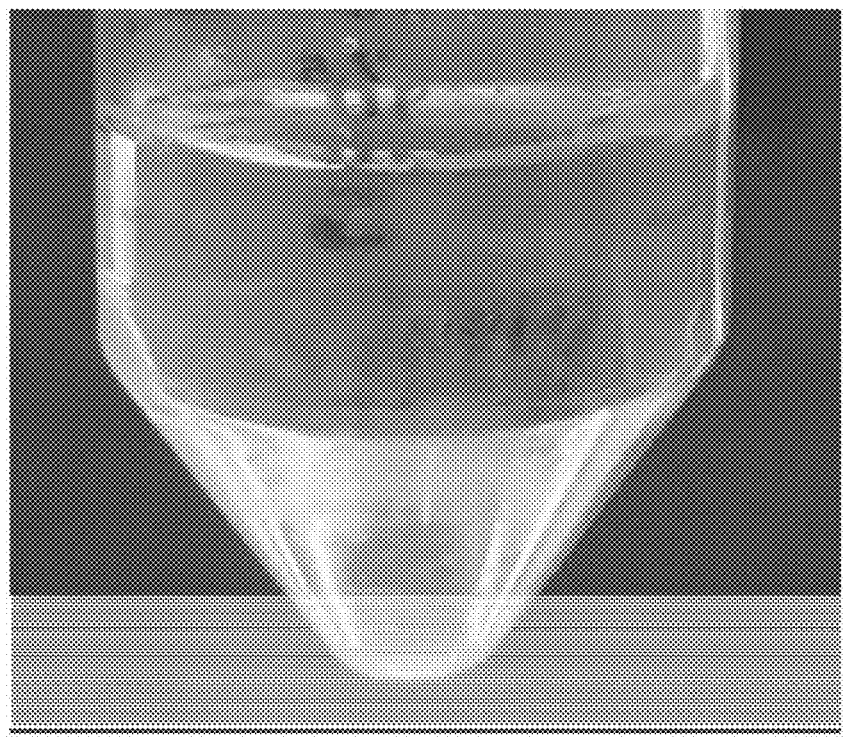
FIG. 52
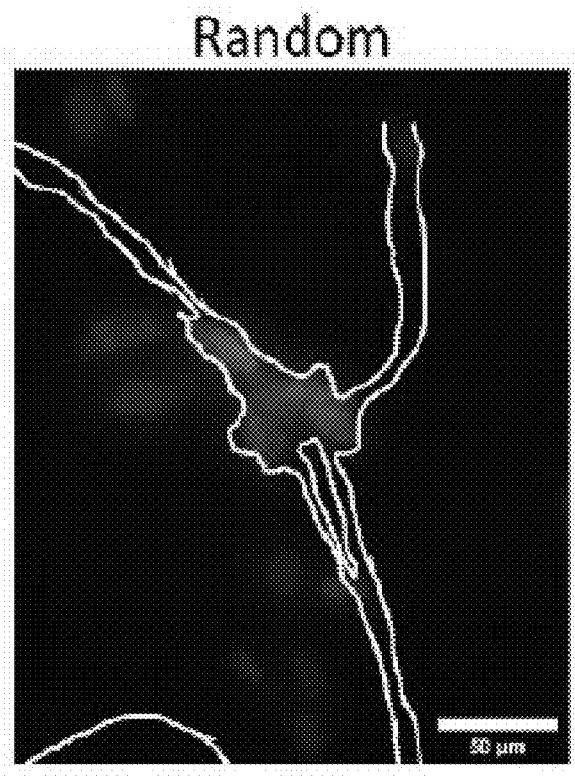 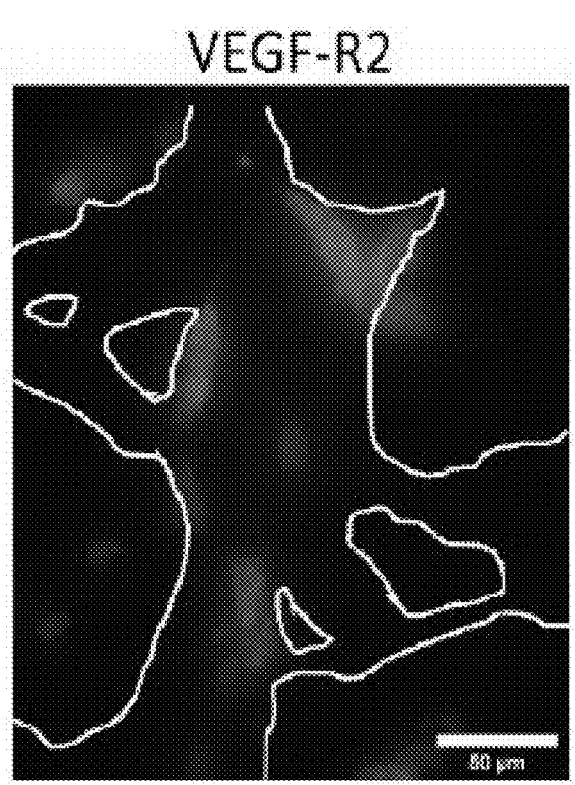
FIG. 53A           FIG. 53B

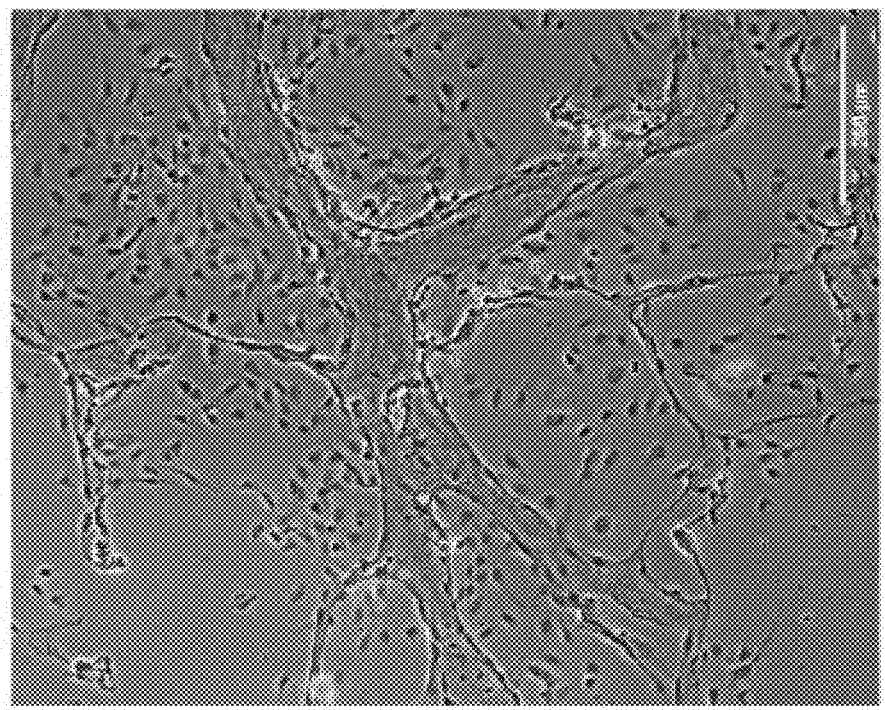
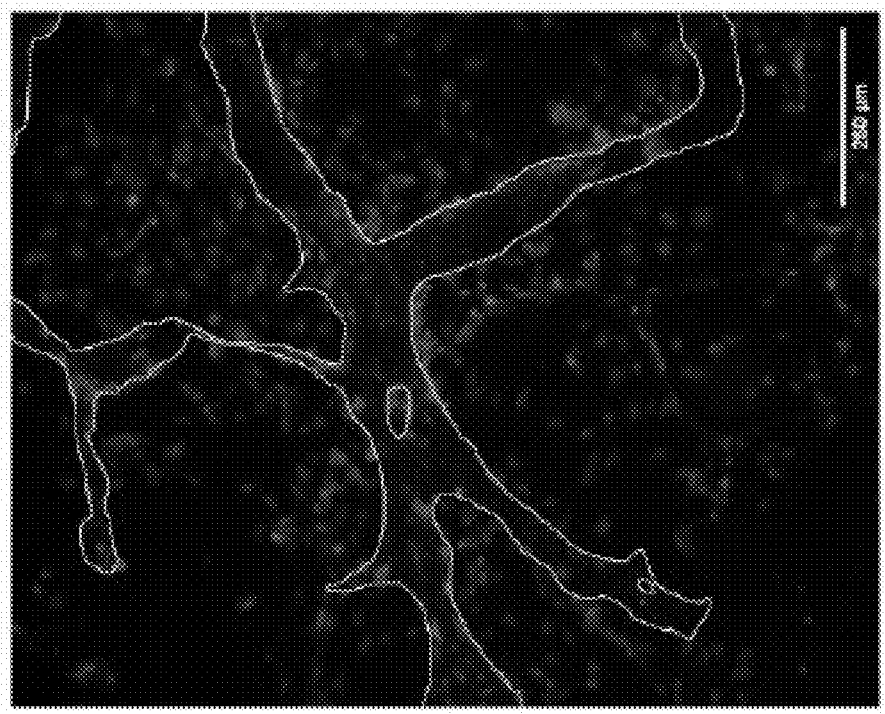
FIG. 58B
FIG. 58A

SEQUENCE LISTING

```
<160> NUMBER OF SEQ ID NOS: 15

<210> SEQ ID NO 1
<211> LENGTH: 80
<212> TYPE: DNA
<213> ORGANISM: Artificial Sequence
<220> FEATURE:
<223> OTHER INFORMATION: DNA Aptamer

<400> SEQUENCE: 1
taaaacgcgc ttaagctggt gttactcgag cggtcttcta ttgaaataat ttctgaaggc      60
acacgacata tgatcttcag                                                 80

<210> SEQ ID NO 2
<211> LENGTH: 15
<212> TYPE: DNA
<213> ORGANISM: Artificial Sequence
<220> FEATURE:
<223> OTHER INFORMATION: 15 NT DNA Aptamer

<400> SEQUENCE: 2
ggagctgttg gcgta                                                      15

<210> SEQ ID NO 3
<211> LENGTH: 33
<212> TYPE: DNA
<213> ORGANISM: Artificial Sequence
<220> FEATURE:
<223> OTHER INFORMATION: 30 NT DNA Aptamer

<400> SEQUENCE: 3
cagagaatct ccattttagc acttacctgt gac                                  33

<210> SEQ ID NO 4
<211> LENGTH: 45
<212> TYPE: DNA
<213> ORGANISM: Artificial Sequence
<220> FEATURE:
<223> OTHER INFORMATION: 45 NT DNA Aptamer

<400> SEQUENCE: 4
```
tcccgcgaaa ttaatacgac agcaccactt ttggagggag atttc                    45

<210> SEQ ID NO 5
<211> LENGTH: 90
<212> TYPE: DNA
<213> ORGANISM: Artificial Sequence
<220> FEATURE:
<223> OTHER INFORMATION: 90 NT DNA Aptamer

<400> SEQUENCE: 5
aatttaggag ctgaaggtca gggcaccagc agcctttgga agcctacagg acaacagtca    60
gcctggctag aaaaaaaaac aatgtcacag                                     90

<210> SEQ ID NO 6
<211> LENGTH: 1356
<212> TYPE: PRT
<213> ORGANISM: Homo sapiens

<400> SEQUENCE: 6

Met Gln Ser Lys Val Leu Leu Ala Val Ala Leu Trp Leu Cys Val Glu
1               5                   10                  15

Thr Arg Ala Ala Ser Val Gly Leu Pro Ser Val Ser Leu Asp Leu Pro
            20                  25                  30

Arg Leu Ser Ile Gln Lys Asp Ile Leu Thr Ile Lys Ala Asn Thr Thr
        35                  40                  45

Leu Gln Ile Thr Cys Arg Gly Gln Arg Asp Leu Asp Trp Leu Trp Pro
    50                  55                  60

Asn Asn Gln Ser Gly Ser Glu Gln Arg Val Glu Val Thr Glu Cys Ser
65                  70                  75                  80

Asp Gly Leu Phe Cys Lys Thr Leu Thr Ile Pro Lys Val Ile Gly Asn
                85                  90                  95

Asp Thr Gly Ala Tyr Lys Cys Phe Tyr Arg Glu Thr Asp Leu Ala Ser
            100                 105                 110

Val Ile Tyr Val Tyr Val Gln Asp Tyr Arg Ser Pro Phe Ile Ala Ser
        115                 120                 125

Val Ser Asp Gln His Gly Val Val Tyr Ile Thr Glu Asn Lys Asn Lys
    130                 135                 140

Thr Val Val Ile Pro Cys Leu Gly Ser Ile Ser Asn Leu Asn Val Ser
145                 150                 155                 160

Leu Cys Ala Arg Tyr Pro Glu Lys Arg Phe Val Pro Asp Gly Asn Arg
                165                 170                 175

Ile Ser Trp Asp Ser Lys Lys Gly Phe Thr Ile Pro Ser Tyr Met Ile
            180                 185                 190

Ser Tyr Ala Gly Met Val Phe Cys Glu Ala Lys Ile Asn Asp Glu Ser
        195                 200                 205

Tyr Gln Ser Ile Met Tyr Ile Val Val Val Gly Tyr Arg Ile Tyr
    210                 215                 220

Asp Val Val Leu Ser Pro Ser His Gly Ile Glu Leu Ser Val Gly Glu
225                 230                 235                 240

Lys Leu Val Leu Asn Cys Thr Ala Arg Thr Glu Leu Asn Val Gly Ile
                245                 250                 255

Asp Phe Asn Trp Glu Tyr Pro Ser Ser Lys His Gln His Lys Lys Leu
            260                 265                 270

Val Asn Arg Asp Leu Lys Thr Gln Ser Gly Ser Glu Met Lys Lys Phe
        275                 280                 285

-continued

```
Leu Ser Thr Leu Thr Ile Asp Gly Val Thr Arg Ser Asp Gln Gly Leu
290                 295                 300

Tyr Thr Cys Ala Ala Ser Ser Gly Leu Met Thr Lys Lys Asn Ser Thr
305                 310                 315                 320

Phe Val Arg Val His Glu Lys Pro Phe Val Ala Phe Gly Ser Gly Met
                325                 330                 335

Glu Ser Leu Val Glu Ala Thr Val Gly Glu Arg Val Arg Ile Pro Ala
                340                 345                 350

Lys Tyr Leu Gly Tyr Pro Pro Glu Ile Lys Trp Tyr Lys Asn Gly
            355                 360                 365

Ile Pro Leu Glu Ser Asn His Thr Ile Lys Ala Gly His Val Leu Thr
370                 375                 380

Ile Met Glu Val Ser Glu Arg Asp Thr Gly Asn Tyr Thr Val Ile Leu
385                 390                 395                 400

Thr Asn Pro Ile Ser Lys Glu Lys Gln Ser His Val Val Ser Leu Val
                405                 410                 415

Val Tyr Val Pro Pro Gln Ile Gly Glu Lys Ser Leu Ile Ser Pro Val
                420                 425                 430

Asp Ser Tyr Gln Tyr Gly Thr Thr Gln Thr Leu Thr Cys Thr Val Tyr
            435                 440                 445

Ala Ile Pro Pro Pro His His Ile His Trp Tyr Trp Gln Leu Glu Glu
450                 455                 460

Glu Cys Ala Asn Glu Pro Ser Gln Ala Val Ser Val Thr Asn Pro Tyr
465                 470                 475                 480

Pro Cys Glu Glu Trp Arg Ser Val Glu Asp Phe Gln Gly Gly Asn Lys
                485                 490                 495

Ile Glu Val Asn Lys Asn Gln Phe Ala Leu Ile Glu Gly Lys Asn Lys
                500                 505                 510

Thr Val Ser Thr Leu Val Ile Gln Ala Ala Asn Val Ser Ala Leu Tyr
            515                 520                 525

Lys Cys Glu Ala Val Asn Lys Val Gly Arg Gly Glu Arg Val Ile Ser
530                 535                 540

Phe His Val Thr Arg Gly Pro Glu Ile Thr Leu Gln Pro Asp Met Gln
545                 550                 555                 560

Pro Thr Glu Gln Glu Ser Val Ser Leu Trp Cys Thr Ala Asp Arg Ser
                565                 570                 575

Thr Phe Glu Asn Leu Thr Trp Tyr Lys Leu Gly Pro Gln Pro Leu Pro
                580                 585                 590

Ile His Val Gly Glu Leu Pro Thr Pro Val Cys Lys Asn Leu Asp Thr
            595                 600                 605

Leu Trp Lys Leu Asn Ala Thr Met Phe Ser Asn Ser Thr Asn Asp Ile
610                 615                 620

Leu Ile Met Glu Leu Lys Asn Ala Ser Leu Gln Asp Gln Gly Asp Tyr
625                 630                 635                 640

Val Cys Leu Ala Gln Asp Arg Lys Thr Lys Lys Arg His Cys Val Val
                645                 650                 655

Arg Gln Leu Thr Val Leu Glu Arg Val Ala Pro Thr Ile Thr Gly Asn
                660                 665                 670

Leu Glu Asn Gln Thr Thr Ser Ile Gly Glu Ser Ile Glu Val Ser Cys
            675                 680                 685

Thr Ala Ser Gly Asn Pro Pro Pro Gln Ile Met Trp Phe Lys Asp Asn
690                 695                 700

Glu Thr Leu Val Glu Asp Ser Gly Ile Val Leu Lys Asp Gly Asn Arg
```

```
            705                 710                 715                 720
Asn Leu Thr Ile Arg Arg Val Arg Lys Glu Asp Glu Gly Leu Tyr Thr
                    725                 730                 735
Cys Gln Ala Cys Ser Val Leu Gly Cys Ala Lys Val Glu Ala Phe Phe
                    740                 745                 750
Ile Ile Glu Gly Ala Gln Lys Thr Asn Leu Glu Ile Ile Leu
            755                 760                 765
Val Gly Thr Ala Val Ile Ala Met Phe Phe Trp Leu Leu Val Ile
        770                 775                 780
Ile Leu Arg Thr Val Lys Arg Ala Asn Gly Gly Glu Leu Lys Thr Gly
785                 790                 795                 800
Tyr Leu Ser Ile Val Met Asp Pro Asp Glu Leu Pro Leu Asp Glu His
                    805                 810                 815
Cys Glu Arg Leu Pro Tyr Asp Ala Ser Lys Trp Glu Phe Pro Arg Asp
                    820                 825                 830
Arg Leu Lys Leu Gly Lys Pro Leu Gly Arg Gly Ala Phe Gly Gln Val
                    835                 840                 845
Ile Glu Ala Asp Ala Phe Gly Ile Asp Lys Thr Ala Thr Cys Arg Thr
        850                 855                 860
Val Ala Val Lys Met Leu Lys Glu Gly Ala Thr His Ser Glu His Arg
865                 870                 875                 880
Ala Leu Met Ser Glu Leu Lys Ile Leu Ile His Ile Gly His His Leu
                    885                 890                 895
Asn Val Val Asn Leu Leu Gly Ala Cys Thr Lys Pro Gly Gly Pro Leu
                    900                 905                 910
Met Val Ile Val Glu Phe Cys Lys Phe Gly Asn Leu Ser Thr Tyr Leu
        915                 920                 925
Arg Ser Lys Arg Asn Glu Phe Val Pro Tyr Lys Thr Lys Gly Ala Arg
        930                 935                 940
Phe Arg Gln Gly Lys Asp Tyr Val Gly Ala Ile Pro Val Asp Leu Lys
945                 950                 955                 960
Arg Arg Leu Asp Ser Ile Thr Ser Ser Gln Ser Ser Ala Ser Ser Gly
            965                 970                 975
Phe Val Glu Glu Lys Ser Leu Ser Asp Val Glu Glu Glu Ala Pro
                    980                 985                 990
Glu Asp Leu Tyr Lys Asp Phe Leu Thr Leu Glu His Leu Ile Cys Tyr
            995                 1000                1005
Ser Phe Gln Val Ala Lys Gly Met Glu Phe Leu Ala Ser Arg Lys
        1010                1015                1020
Cys Ile His Arg Asp Leu Ala Ala Arg Asn Ile Leu Leu Ser Glu
        1025                1030                1035
Lys Asn Val Val Lys Ile Cys Asp Phe Gly Leu Ala Arg Asp Ile
        1040                1045                1050
Tyr Lys Asp Pro Asp Tyr Val Arg Lys Gly Asp Ala Arg Leu Pro
        1055                1060                1065
Leu Lys Trp Met Ala Pro Glu Thr Ile Phe Asp Arg Val Tyr Thr
        1070                1075                1080
Ile Gln Ser Asp Val Trp Ser Phe Gly Val Leu Leu Trp Glu Ile
        1085                1090                1095
Phe Ser Leu Gly Ala Ser Pro Tyr Pro Gly Val Lys Ile Asp Glu
        1100                1105                1110
Glu Phe Cys Arg Arg Leu Lys Glu Gly Thr Arg Met Arg Ala Pro
        1115                1120                1125
```

```
Asp Tyr Thr Thr Pro Glu Met Tyr Gln Thr Met Leu Asp Cys Trp
        1130                1135                1140

His Gly Glu Pro Ser Gln Arg Pro Thr Phe Ser Glu Leu Val Glu
    1145                1150                1155

His Leu Gly Asn Leu Leu Gln Ala Asn Ala Gln Gln Asp Gly Lys
    1160                1165                1170

Asp Tyr Ile Val Leu Pro Ile Ser Glu Thr Leu Ser Met Glu Glu
    1175                1180                1185

Asp Ser Gly Leu Ser Leu Pro Thr Ser Pro Val Ser Cys Met Glu
    1190                1195                1200

Glu Glu Glu Val Cys Asp Pro Lys Phe His Tyr Asp Asn Thr Ala
    1205                1210                1215

Gly Ile Ser Gln Tyr Leu Gln Asn Ser Lys Arg Lys Ser Arg Pro
    1220                1225                1230

Val Ser Val Lys Thr Phe Glu Asp Ile Pro Leu Glu Glu Pro Glu
    1235                1240                1245

Val Lys Val Ile Pro Asp Asp Asn Gln Thr Asp Ser Gly Met Val
    1250                1255                1260

Leu Ala Ser Glu Glu Leu Lys Thr Leu Glu Asp Arg Thr Lys Leu
    1265                1270                1275

Ser Pro Ser Phe Gly Gly Met Val Pro Ser Lys Ser Arg Glu Ser
    1280                1285                1290

Val Ala Ser Glu Gly Ser Asn Gln Thr Ser Gly Tyr Gln Ser Gly
    1295                1300                1305

Tyr His Ser Asp Asp Thr Asp Thr Thr Val Tyr Ser Ser Glu Glu
    1310                1315                1320

Ala Glu Leu Leu Lys Leu Ile Glu Ile Gly Val Gln Thr Gly Ser
    1325                1330                1335

Thr Ala Gln Ile Leu Gln Pro Asp Ser Gly Thr Thr Leu Ser Ser
    1340                1345                1350

Pro Pro Val
    1355

<210> SEQ ID NO 7
<211> LENGTH: 1338
<212> TYPE: PRT
<213> ORGANISM: Homo sapiens

<400> SEQUENCE: 7

Met Val Ser Tyr Trp Asp Thr Gly Val Leu Leu Cys Ala Leu Leu
1               5                   10                  15

Cys Leu Leu Leu Thr Gly Ser Ser Ser Gly Ser Lys Leu Lys Asp Pro
            20                  25                  30

Glu Leu Ser Leu Lys Gly Thr Gln His Ile Met Gln Ala Gly Gln Thr
        35                  40                  45

Leu His Leu Gln Cys Arg Gly Glu Ala Ala His Lys Trp Ser Leu Pro
    50                  55                  60

Glu Met Val Ser Lys Glu Ser Glu Arg Leu Ser Ile Thr Lys Ser Ala
65                  70                  75                  80

Cys Gly Arg Asn Gly Lys Gln Phe Cys Ser Thr Leu Thr Leu Asn Thr
                85                  90                  95

Ala Gln Ala Asn His Thr Gly Phe Tyr Ser Cys Lys Tyr Leu Ala Val
            100                 105                 110

Pro Thr Ser Lys Lys Lys Glu Thr Glu Ser Ala Ile Tyr Ile Phe Ile
```

-continued

```
            115                 120                 125
Ser Asp Thr Gly Arg Pro Phe Val Glu Met Tyr Ser Glu Ile Pro Glu
            130                 135                 140
Ile Ile His Met Thr Glu Gly Arg Glu Leu Val Ile Pro Cys Arg Val
145                 150                 155                 160
Thr Ser Pro Asn Ile Thr Val Thr Leu Lys Lys Phe Pro Leu Asp Thr
                    165                 170                 175
Leu Ile Pro Asp Gly Lys Arg Ile Ile Trp Asp Ser Arg Lys Gly Phe
                    180                 185                 190
Ile Ile Ser Asn Ala Thr Tyr Lys Glu Ile Gly Leu Leu Thr Cys Glu
                    195                 200                 205
Ala Thr Val Asn Gly His Leu Tyr Lys Thr Asn Tyr Leu Thr His Arg
            210                 215                 220
Gln Thr Asn Thr Ile Ile Asp Val Gln Ile Ser Thr Pro Arg Pro Val
225                 230                 235                 240
Lys Leu Leu Arg Gly His Thr Leu Val Leu Asn Cys Thr Ala Thr Thr
                    245                 250                 255
Pro Leu Asn Thr Arg Val Gln Met Thr Trp Ser Tyr Pro Asp Glu Lys
                    260                 265                 270
Asn Lys Arg Ala Ser Val Arg Arg Ile Asp Gln Ser Asn Ser His
                    275                 280                 285
Ala Asn Ile Phe Tyr Ser Val Leu Thr Ile Asp Lys Met Gln Asn Lys
            290                 295                 300
Asp Lys Gly Leu Tyr Thr Cys Arg Val Arg Ser Gly Pro Ser Phe Lys
305                 310                 315                 320
Ser Val Asn Thr Ser Val His Ile Tyr Asp Lys Ala Phe Ile Thr Val
                    325                 330                 335
Lys His Arg Lys Gln Gln Val Leu Glu Thr Val Ala Gly Lys Arg Ser
                    340                 345                 350
Tyr Arg Leu Ser Met Lys Val Lys Ala Phe Pro Ser Pro Glu Val Val
                    355                 360                 365
Trp Leu Lys Asp Gly Leu Pro Ala Thr Glu Lys Ser Ala Arg Tyr Leu
            370                 375                 380
Thr Arg Gly Tyr Ser Leu Ile Ile Lys Asp Val Thr Glu Glu Asp Ala
385                 390                 395                 400
Gly Asn Tyr Thr Ile Leu Leu Ser Ile Lys Gln Ser Asn Val Phe Lys
                    405                 410                 415
Asn Leu Thr Ala Thr Leu Ile Val Asn Val Lys Pro Gln Ile Tyr Glu
                    420                 425                 430
Lys Ala Val Ser Ser Phe Pro Asp Pro Ala Leu Tyr Pro Leu Gly Ser
                    435                 440                 445
Arg Gln Ile Leu Thr Cys Thr Ala Tyr Gly Ile Pro Gln Pro Thr Ile
            450                 455                 460
Lys Trp Phe Trp His Pro Cys Asn His Asn His Ser Glu Ala Arg Cys
465                 470                 475                 480
Asp Phe Cys Ser Asn Asn Glu Glu Ser Phe Ile Leu Asp Ala Asp Ser
                    485                 490                 495
Asn Met Gly Asn Arg Ile Glu Ser Ile Thr Gln Arg Met Ala Ile Ile
                    500                 505                 510
Glu Gly Lys Asn Lys Met Ala Ser Thr Leu Val Val Ala Asp Ser Arg
                    515                 520                 525
Ile Ser Gly Ile Tyr Ile Cys Ile Ala Ser Asn Lys Val Gly Thr Val
                    530                 535                 540
```

-continued

```
Gly Arg Asn Ile Ser Phe Tyr Ile Thr Asp Val Pro Asn Gly Phe His
545                 550                 555                 560

Val Asn Leu Glu Lys Met Pro Thr Glu Gly Glu Asp Leu Lys Leu Ser
            565                 570                 575

Cys Thr Val Asn Lys Phe Leu Tyr Arg Asp Val Thr Trp Ile Leu Leu
                580                 585                 590

Arg Thr Val Asn Asn Arg Thr Met His Tyr Ser Ile Ser Lys Gln Lys
            595                 600                 605

Met Ala Ile Thr Lys Glu His Ser Ile Thr Leu Asn Leu Thr Ile Met
610                 615                 620

Asn Val Ser Leu Gln Asp Ser Gly Thr Tyr Ala Cys Arg Ala Arg Asn
625                 630                 635                 640

Val Tyr Thr Gly Glu Glu Ile Leu Gln Lys Lys Glu Ile Thr Ile Arg
                645                 650                 655

Asp Gln Glu Ala Pro Tyr Leu Leu Arg Asn Leu Ser Asp His Thr Val
            660                 665                 670

Ala Ile Ser Ser Ser Thr Thr Leu Asp Cys His Ala Asn Gly Val Pro
                675                 680                 685

Glu Pro Gln Ile Thr Trp Phe Lys Asn Asn His Lys Ile Gln Gln Glu
690                 695                 700

Pro Gly Ile Ile Leu Gly Pro Gly Ser Ser Thr Leu Phe Ile Glu Arg
705                 710                 715                 720

Val Thr Glu Glu Asp Glu Gly Val Tyr His Cys Lys Ala Thr Asn Gln
            725                 730                 735

Lys Gly Ser Val Glu Ser Ser Ala Tyr Leu Thr Val Gln Gly Thr Ser
                740                 745                 750

Asp Lys Ser Asn Leu Glu Leu Ile Thr Leu Thr Cys Thr Cys Val Ala
            755                 760                 765

Ala Thr Leu Phe Trp Leu Leu Leu Thr Leu Phe Ile Arg Lys Met Lys
770                 775                 780

Arg Ser Ser Ser Glu Ile Lys Thr Asp Tyr Leu Ser Ile Ile Met Asp
785                 790                 795                 800

Pro Asp Glu Val Pro Leu Asp Glu Gln Cys Glu Arg Leu Pro Tyr Asp
                805                 810                 815

Ala Ser Lys Trp Glu Phe Ala Arg Glu Arg Leu Lys Leu Gly Lys Ser
            820                 825                 830

Leu Gly Arg Gly Ala Phe Gly Lys Val Val Gln Ala Ser Ala Phe Gly
        835                 840                 845

Ile Lys Lys Ser Pro Thr Cys Arg Thr Val Ala Val Lys Met Leu Lys
    850                 855                 860

Glu Gly Ala Thr Ala Ser Glu Tyr Lys Ala Leu Met Thr Glu Leu Lys
865                 870                 875                 880

Ile Leu Thr His Ile Gly His His Leu Asn Val Val Asn Leu Leu Gly
            885                 890                 895

Ala Cys Thr Lys Gln Gly Gly Pro Leu Met Val Ile Val Glu Tyr Cys
                900                 905                 910

Lys Tyr Gly Asn Leu Ser Asn Tyr Leu Lys Ser Lys Arg Asp Leu Phe
            915                 920                 925

Phe Leu Asn Lys Asp Ala Ala Leu His Met Glu Pro Lys Lys Glu Lys
        930                 935                 940

Met Glu Pro Gly Leu Glu Gln Gly Lys Lys Pro Arg Leu Asp Ser Val
945                 950                 955                 960
```

Thr Ser Ser Glu Ser Phe Ala Ser Ser Gly Phe Gln Glu Asp Lys Ser
            965                 970                 975

Leu Ser Asp Val Glu Glu Glu Asp Ser Asp Gly Phe Tyr Lys Glu
        980                 985                 990

Pro Ile Thr Met Glu Asp Leu Ile Ser Tyr Ser Phe Gln Val Ala Arg
        995                 1000                1005

Gly Met Glu Phe Leu Ser Ser Arg Lys Cys Ile His Arg Asp Leu
    1010                1015                1020

Ala Ala Arg Asn Ile Leu Leu Ser Glu Asn Asn Val Val Lys Ile
    1025                1030                1035

Cys Asp Phe Gly Leu Ala Arg Asp Ile Tyr Lys Asn Pro Asp Tyr
    1040                1045                1050

Val Arg Lys Gly Asp Thr Arg Leu Pro Leu Lys Trp Met Ala Pro
    1055                1060                1065

Glu Ser Ile Phe Asp Lys Ile Tyr Ser Thr Lys Ser Asp Val Trp
    1070                1075                1080

Ser Tyr Gly Val Leu Leu Trp Glu Ile Phe Ser Leu Gly Gly Ser
    1085                1090                1095

Pro Tyr Pro Gly Val Gln Met Asp Glu Asp Phe Cys Ser Arg Leu
    1100                1105                1110

Arg Glu Gly Met Arg Met Arg Ala Pro Glu Tyr Ser Thr Pro Glu
    1115                1120                1125

Ile Tyr Gln Ile Met Leu Asp Cys Trp His Arg Asp Pro Lys Glu
    1130                1135                1140

Arg Pro Arg Phe Ala Glu Leu Val Glu Lys Leu Gly Asp Leu Leu
    1145                1150                1155

Gln Ala Asn Val Gln Gln Asp Gly Lys Asp Tyr Ile Pro Ile Asn
    1160                1165                1170

Ala Ile Leu Thr Gly Asn Ser Gly Phe Thr Tyr Ser Thr Pro Ala
    1175                1180                1185

Phe Ser Glu Asp Phe Phe Lys Glu Ser Ile Ser Ala Pro Lys Phe
    1190                1195                1200

Asn Ser Gly Ser Ser Asp Asp Val Arg Tyr Val Asn Ala Phe Lys
    1205                1210                1215

Phe Met Ser Leu Glu Arg Ile Lys Thr Phe Glu Glu Leu Leu Pro
    1220                1225                1230

Asn Ala Thr Ser Met Phe Asp Asp Tyr Gln Gly Asp Ser Ser Thr
    1235                1240                1245

Leu Leu Ala Ser Pro Met Leu Lys Arg Phe Thr Trp Thr Asp Ser
    1250                1255                1260

Lys Pro Lys Ala Ser Leu Lys Ile Asp Leu Arg Val Thr Ser Lys
    1265                1270                1275

Ser Lys Glu Ser Gly Leu Ser Asp Val Ser Arg Pro Ser Phe Cys
    1280                1285                1290

His Ser Ser Cys Gly His Val Ser Glu Gly Lys Arg Arg Phe Thr
    1295                1300                1305

Tyr Asp His Ala Glu Leu Glu Arg Lys Ile Ala Cys Cys Ser Pro
    1310                1315                1320

Pro Pro Asp Tyr Asn Ser Val Val Leu Tyr Ser Thr Pro Pro Ile
    1325                1330                1335

<210> SEQ ID NO 8
<211> LENGTH: 1363
<212> TYPE: PRT

```
<213> ORGANISM: Homo sapiens

<400> SEQUENCE: 8

Met Gln Arg Gly Ala Ala Leu Cys Leu Arg Leu Trp Leu Cys Leu Gly
1               5                   10                  15

Leu Leu Asp Gly Leu Val Ser Gly Tyr Ser Met Thr Pro Pro Thr Leu
            20                  25                  30

Asn Ile Thr Glu Glu Ser His Val Ile Asp Thr Gly Asp Ser Leu Ser
        35                  40                  45

Ile Ser Cys Arg Gly Gln His Pro Leu Glu Trp Ala Trp Pro Gly Ala
    50                  55                  60

Gln Glu Ala Pro Ala Thr Gly Asp Lys Asp Ser Glu Asp Thr Gly Val
65                  70                  75                  80

Val Arg Asp Cys Glu Gly Thr Asp Ala Arg Pro Tyr Cys Lys Val Leu
                85                  90                  95

Leu Leu His Glu Val His Ala Asn Asp Thr Gly Ser Tyr Val Cys Tyr
            100                 105                 110

Tyr Lys Tyr Ile Lys Ala Arg Ile Glu Gly Thr Thr Ala Ala Ser Ser
        115                 120                 125

Tyr Val Phe Val Arg Asp Phe Glu Gln Pro Phe Ile Asn Lys Pro Asp
    130                 135                 140

Thr Leu Leu Val Asn Arg Lys Asp Ala Met Trp Val Pro Cys Leu Val
145                 150                 155                 160

Ser Ile Pro Gly Leu Asn Val Thr Leu Arg Ser Gln Ser Ser Val Leu
                165                 170                 175

Trp Pro Asp Gly Gln Glu Val Val Trp Asp Asp Arg Arg Gly Met Leu
            180                 185                 190

Val Ser Thr Pro Leu Leu His Asp Ala Leu Tyr Leu Gln Cys Glu Thr
        195                 200                 205

Thr Trp Gly Asp Gln Asp Phe Leu Ser Asn Pro Phe Leu Val His Ile
    210                 215                 220

Thr Gly Asn Glu Leu Tyr Asp Ile Gln Leu Leu Pro Arg Lys Ser Leu
225                 230                 235                 240

Glu Leu Leu Val Gly Glu Lys Leu Val Leu Asn Cys Thr Val Trp Ala
                245                 250                 255

Glu Phe Asn Ser Gly Val Thr Phe Asp Trp Asp Tyr Pro Gly Lys Gln
            260                 265                 270

Ala Glu Arg Gly Lys Trp Val Pro Glu Arg Arg Ser Gln Gln Thr His
        275                 280                 285

Thr Glu Leu Ser Ser Ile Leu Thr Ile His Asn Val Ser Gln His Asp
    290                 295                 300

Leu Gly Ser Tyr Val Cys Lys Ala Asn Asn Gly Ile Gln Arg Phe Arg
305                 310                 315                 320

Glu Ser Thr Glu Val Ile Val His Glu Asn Pro Phe Ile Ser Val Glu
                325                 330                 335

Trp Leu Lys Gly Pro Ile Leu Glu Ala Thr Ala Gly Asp Glu Leu Val
            340                 345                 350

Lys Leu Pro Val Lys Leu Ala Ala Tyr Pro Pro Pro Glu Phe Gln Trp
        355                 360                 365

Tyr Lys Asp Gly Lys Ala Leu Ser Gly Arg His Ser Pro His Ala Leu
    370                 375                 380

Val Leu Lys Glu Val Thr Glu Ala Ser Thr Gly Thr Tyr Thr Leu Ala
385                 390                 395                 400
```

```
Leu Trp Asn Ser Ala Gly Leu Arg Arg Asn Ile Ser Leu Glu Leu
            405                 410                 415

Val Val Asn Val Pro Pro Gln Ile His Glu Lys Glu Ala Ser Ser Pro
            420                 425                 430

Ser Ile Tyr Ser Arg His Ser Arg Gln Ala Leu Thr Cys Thr Ala Tyr
            435                 440                 445

Gly Val Pro Leu Pro Leu Ser Ile Gln Trp His Trp Arg Pro Trp Thr
450                 455                 460

Pro Cys Lys Met Phe Ala Gln Arg Ser Leu Arg Arg Gln Gln Gln
465                 470                 475                 480

Asp Leu Met Pro Gln Cys Arg Asp Trp Arg Ala Val Thr Thr Gln Asp
            485                 490                 495

Ala Val Asn Pro Ile Glu Ser Leu Asp Thr Trp Thr Glu Phe Val Glu
            500                 505                 510

Gly Lys Asn Lys Thr Val Ser Lys Leu Val Ile Gln Asn Ala Asn Val
            515                 520                 525

Ser Ala Met Tyr Lys Cys Val Val Ser Asn Lys Val Gly Gln Asp Glu
            530                 535                 540

Arg Leu Ile Tyr Phe Tyr Val Thr Thr Ile Pro Asp Gly Phe Thr Ile
545                 550                 555                 560

Glu Ser Lys Pro Ser Glu Glu Leu Leu Glu Gly Gln Pro Val Leu Leu
            565                 570                 575

Ser Cys Gln Ala Asp Ser Tyr Lys Tyr Glu His Leu Arg Trp Tyr Arg
            580                 585                 590

Leu Asn Leu Ser Thr Leu His Asp Ala His Gly Asn Pro Leu Leu Leu
            595                 600                 605

Asp Cys Lys Asn Val His Leu Phe Ala Thr Pro Leu Ala Ala Ser Leu
            610                 615                 620

Glu Glu Val Ala Pro Gly Ala Arg His Ala Thr Leu Ser Leu Ser Ile
625                 630                 635                 640

Pro Arg Val Ala Pro Glu His Glu Gly His Tyr Val Cys Glu Val Gln
            645                 650                 655

Asp Arg Arg Ser His Asp Lys His Cys His Lys Lys Tyr Leu Ser Val
            660                 665                 670

Gln Ala Leu Glu Ala Pro Arg Leu Thr Gln Asn Leu Thr Asp Leu Leu
            675                 680                 685

Val Asn Val Ser Asp Ser Leu Glu Met Gln Cys Leu Val Ala Gly Ala
            690                 695                 700

His Ala Pro Ser Ile Val Trp Tyr Lys Asp Glu Arg Leu Leu Glu Glu
705                 710                 715                 720

Lys Ser Gly Val Asp Leu Ala Asp Ser Asn Gln Lys Leu Ser Ile Gln
            725                 730                 735

Arg Val Arg Glu Glu Asp Ala Gly Arg Tyr Leu Cys Ser Val Cys Asn
            740                 745                 750

Ala Lys Gly Cys Val Asn Ser Ser Ala Ser Val Ala Val Glu Gly Ser
            755                 760                 765

Glu Asp Lys Gly Ser Met Glu Ile Val Ile Leu Val Gly Thr Gly Val
            770                 775                 780

Ile Ala Val Phe Phe Trp Val Leu Leu Leu Leu Ile Phe Cys Asn Met
785                 790                 795                 800

Arg Arg Pro Ala His Ala Asp Ile Lys Thr Gly Tyr Leu Ser Ile Ile
            805                 810                 815

Met Asp Pro Gly Glu Val Pro Leu Glu Glu Gln Cys Glu Tyr Leu Ser
```

```
              820                 825                 830
Tyr Asp Ala Ser Gln Trp Glu Phe Pro Arg Glu Arg Leu His Leu Gly
                835                 840                 845
Arg Val Leu Gly Tyr Gly Ala Phe Gly Lys Val Val Glu Ala Ser Ala
                850                 855                 860
Phe Gly Ile His Lys Gly Ser Ser Cys Asp Thr Val Ala Val Lys Met
865                 870                 875                 880
Leu Lys Glu Gly Ala Thr Ala Ser Glu His Arg Ala Leu Met Ser Glu
                885                 890                 895
Leu Lys Ile Leu Ile His Ile Gly Asn His Leu Asn Val Val Asn Leu
                900                 905                 910
Leu Gly Ala Cys Thr Lys Pro Gln Gly Pro Leu Met Val Ile Val Glu
                915                 920                 925
Phe Cys Lys Tyr Gly Asn Leu Ser Asn Phe Leu Arg Ala Lys Arg Asp
                930                 935                 940
Ala Phe Ser Pro Cys Ala Glu Lys Ser Pro Glu Gln Arg Gly Arg Phe
945                 950                 955                 960
Arg Ala Met Val Glu Leu Ala Arg Leu Asp Arg Arg Arg Pro Gly Ser
                965                 970                 975
Ser Asp Arg Val Leu Phe Ala Arg Phe Ser Lys Thr Glu Gly Gly Ala
                980                 985                 990
Arg Arg Ala Ser Pro Asp Gln Glu Ala Glu Asp Leu Trp Leu Ser Pro
                995                1000                1005
Leu Thr Met Glu Asp Leu Val Cys Tyr Ser Phe Gln Val Ala Arg
                1010                1015                1020
Gly Met Glu Phe Leu Ala Ser Arg Lys Cys Ile His Arg Asp Leu
                1025                1030                1035
Ala Ala Arg Asn Ile Leu Leu Ser Glu Ser Asp Val Val Lys Ile
                1040                1045                1050
Cys Asp Phe Gly Leu Ala Arg Asp Ile Tyr Lys Asp Pro Asp Tyr
                1055                1060                1065
Val Arg Lys Gly Ser Ala Arg Leu Pro Leu Lys Trp Met Ala Pro
                1070                1075                1080
Glu Ser Ile Phe Asp Lys Val Tyr Thr Thr Gln Ser Asp Val Trp
                1085                1090                1095
Ser Phe Gly Val Leu Leu Trp Glu Ile Phe Ser Leu Gly Ala Ser
                1100                1105                1110
Pro Tyr Pro Gly Val Gln Ile Asn Glu Glu Phe Cys Gln Arg Leu
                1115                1120                1125
Arg Asp Gly Thr Arg Met Arg Ala Pro Glu Leu Ala Thr Pro Ala
                1130                1135                1140
Ile Arg Arg Ile Met Leu Asn Cys Trp Ser Gly Asp Pro Lys Ala
                1145                1150                1155
Arg Pro Ala Phe Ser Glu Leu Val Glu Ile Leu Gly Asp Leu Leu
                1160                1165                1170
Gln Gly Arg Gly Leu Gln Glu Glu Glu Val Cys Met Ala Pro
                1175                1180                1185
Arg Ser Ser Gln Ser Ser Glu Glu Gly Ser Phe Ser Gln Val Ser
                1190                1195                1200
Thr Met Ala Leu His Ile Ala Gln Ala Asp Ala Glu Asp Ser Pro
                1205                1210                1215
Pro Ser Leu Gln Arg His Ser Leu Ala Ala Arg Tyr Tyr Asn Trp
                1220                1225                1230
```

Val Ser Phe Pro Gly Cys Leu Ala Arg Gly Ala Glu Thr Arg Gly
    1235                1240                1245

Ser Ser Arg Met Lys Thr Phe Glu Glu Phe Pro Met Thr Pro Thr
    1250                1255                1260

Thr Tyr Lys Gly Ser Val Asp Asn Gln Thr Asp Ser Gly Met Val
    1265                1270                1275

Leu Ala Ser Glu Glu Phe Glu Gln Ile Glu Ser Arg His Arg Gln
    1280                1285                1290

Glu Ser Gly Phe Ser Cys Lys Gly Pro Gly Gln Asn Val Ala Val
    1295                1300                1305

Thr Arg Ala His Pro Asp Ser Gln Gly Arg Arg Arg Pro Glu
    1310                1315                1320

Arg Gly Ala Arg Gly Gly Gln Val Phe Tyr Asn Ser Glu Tyr Gly
    1325                1330                1335

Glu Leu Ser Glu Pro Ser Glu Glu Asp His Cys Ser Pro Ser Ala
    1340                1345                1350

Arg Val Thr Phe Phe Thr Asp Asn Ser Tyr
    1355                1360

<210> SEQ ID NO 9
<211> LENGTH: 40
<212> TYPE: DNA
<213> ORGANISM: Artificial Sequence
<220> FEATURE:
<223> OTHER INFORMATION: DNA Aptamer G

<400> SEQUENCE: 9
caggtgggcg cgctgtcgtg ggtgctcggg tgcggttggg                 40

<210> SEQ ID NO 10
<211> LENGTH: 40
<212> TYPE: DNA
<213> ORGANISM: Artificial Sequence
<220> FEATURE:
<223> OTHER INFORMATION: Aptamer G-

<400> SEQUENCE: 10
caggtgcgcg cgctgtcgtg cgtgctcgcg tgcggttgcg                 40

<210> SEQ ID NO 11
<211> LENGTH: 40
<212> TYPE: DNA
<213> ORGANISM: Artificial Sequence
<220> FEATURE:
<223> OTHER INFORMATION: Aptamer G+

<400> SEQUENCE: 11
caggtggggg cgctgtcgtg ggggctcggg ggcggtgggg                 40

<210> SEQ ID NO 12
<211> LENGTH: 40
<212> TYPE: DNA
<213> ORGANISM: Artificial Sequence
<220> FEATURE:
<223> OTHER INFORMATION: Aptamer R

<400> SEQUENCE: 12
taaaacgcgc ttaagctggt gttactcgag cggtcttcta                 40

<210> SEQ ID NO 13
<211> LENGTH: 40

```
<212> TYPE: DNA
<213> ORGANISM: Artificial Sequence
<220> FEATURE:
<223> OTHER INFORMATION: HAP Aptamer

<400> SEQUENCE: 13
caggtgggcg cgctgtcgtg ggtgctcggg tgcggttggg                40

<210> SEQ ID NO 14
<211> LENGTH: 80
<212> TYPE: DNA
<213> ORGANISM: Artificial Sequence
<220> FEATURE:
<223> OTHER INFORMATION: VEGF-R2 Aptamer

<400> SEQUENCE: 14
gatgtgagtg tgtgacgagc tacgacgtct ggtgtaattt ataaagacac tgtgtatatc    60
aacaacagaa caaggaaagg                                                80

<210> SEQ ID NO 15
<211> LENGTH: 80
<212> TYPE: DNA
<213> ORGANISM: Artificial Sequence
<220> FEATURE:
<223> OTHER INFORMATION: Random ssDNA oligomer

<400> SEQUENCE: 15
taatgagaag tatgtgtaga gtcaatgaga tacgcaattg ggaagacaag agtattgact    60
cggactgagt acaatcgtcc                                                80
```

APTAMER ASSEMBLIES FOR PROTEIN CROSSLINKING

CROSS-REFERENCE TO RELATED APPLICATIONS

This application is the 35 U.S.C. § 371 national stage entry of PCT Application No. PCT/US2020/048488, filed Aug. 28, 2020, where the PCT claims priority to, and the benefit of, U.S. Provisional Applications entitled "APTAMER ASSEMBLIES FOR PROTEIN CROSSLINKING," having Ser. No. 62/894,215, filed Aug. 30, 2019, having Ser. No. 62/937,316, filed Nov. 19, 2019, having Ser. No. 62/968,130 filed on Jan. 30, 2020, having Ser. No. 62/968,129 filed on Jan. 30, 2020, all of which are incorporated herein by reference in their entireties.

STATEMENT REGARDING FEDERALLY SPONSORED RESEARCH OR DEVELOPMENT

This invention was made with government support under Grant No. 1453098, awarded the National Science Foundation. The government has certain rights in the invention.

SEQUENCE LISTING

This application contains a sequence listing filed in electronic form as an ASCII.txt file entitled "(1065222111-1280) Sequence Listing patent in_ST25.txt", created on Aug. 27, 2020. The content of the sequence listing is incorporated herein in its entirety.

BACKGROUND

Crosslinking of collagen is an effective method to modify the stability of collagen compositions and materials and to optimize their mechanical and structural properties. Crosslinked collagen materials are used extensively in various medical and industrial applications. For example, crosslinked collagen materials are used to replace or augment hard or soft connective tissue, such as skin, tendons, cartilage, bone, and interstitium. Crosslinked collagen materials have been implanted surgically, and numerous injectable crosslinked collagen formulations are currently available for various cosmetic applications. Toxic chemicals typically are used for crosslinking collagen and additives (growth factors, small molecules, drugs) are incorporated to achieve biological responses. However, these can lead to detrimental off-target effects. However, there remains a need in the art for improved methods of producing crosslinked collagen materials and endowing them with greater functionality at the same time.

Existing systems and devices aimed at modeling tissue barriers utilize plastic membranes to separate types of cells in culture. The use of a barrier material can preclude the use of a truely physiologically relevant and viable system. For example, semi-permeable membranes (such as plastic membranes) can block the tissue interface, and prevent the interaction of cells and other elements introduced into the systems, for example antagonists or agonists (small molecules, peptides, nucleic acids, etc). Accordingly, there is a need to address the aforementioned deficiencies and inadequacies and a need for more physiologically-relevant model systems.

SUMMARY

Oligonucleotides are capable of binding protein. A specific type of oligonucleotide structure is DNA aptamer. These are single stranded oligonucleotide sequences, which are capable of forming tertiary structures. This enables them to upon targeting and purification have extremely high specificity for a specific biological structure. Moreover, our group has shown that DNA aptamers can activate cell signaling receptors, rather than simply passively attaching to the receptor. Specifically, relevant are extracellular matrix proteins, notably collagen. This protein forms fibers in solution, which are typically crosslinked to form a 3D network by chemical means such as with cytotoxic glutaraldehyde. DNA is capable of forming a complex with collagen, which initiates and promotes collagen fiber formation. These fibers are then DNA-collagen complexes. We have found that DNA aptamers are capable of forming these complexes and the fiber properties are dependent on both the aptamer sequence, geometry, and relative concentration. These fibers begin to form spontaneously upon combining DNA and collagen solutions. DNA aptamers are also capable of being conjugated together to form 3D assemblies.

Disclosed herein is the use of DNA aptamer assemblies of varying DNA length, structure, and sequence to both bind to collagen and other proteins, to then act as a biocompatible, degradable, reversible, or permanent 3D crosslinkers between proteins, and to service as a biologically functional material when using the appropriate aptamer sequence.

Therefore, disclosed herein are compositions comprising collagen fibers crosslinked with a plurality of one or more DNA aptamers. Also disclosed are devices and implants made from or coated with collagen fibers crosslinked with a plurality of one or more DNA aptamers. Also disclosed are methods of making collagen fibers. Also disclosed are kits for producing collagen fibers. Also disclosed herein are compositions comprising a plurality of one or more DNA aptamers in a collagen fiber matrix that stabilizes the DNA aptamers.

In some embodiments, at least one of the one or more DNA aptamers selectively binds a growth factor or cytokine. In some embodiments, at least one of the one or more DNA aptamers selectively binds a cell receptor, such as a stem cell receptor. In some embodiments, at least one of the one or more DNA aptamers selectively binds an extracellular matrix protein.

In some embodiments, the DNA aptamers comprise from 15 to 100 nucleotides, including 15, 16, 17, 18, 19, 20, 25, 30, 35, 40, 45, 50, 60, 70, 80, 90, 100 nucleotides.

In some embodiments, the DNA aptamers comprise from 1 to 20 stem loops, including 1, 2, 3, 4, 5, 6, 7, 8, 9, 10, 11, 12, 13, 14, 15, 16, 17, 18, 19, or 20 stem loops, such as 1 to 10 stem loops, or 1 to 5 stem loops.

In embodiments, an aptamer comprises one or more of SEQ ID NO:1-5 or SEQ ID NO:9-15. In some embodiments, the plurality of one or more DNA aptamers comprises 2 or more DNA aptamer sequences, including 2 to 4 DNA aptamer sequences, connected by a linker molecule to form an aptamer assembly. In embodiments, aptamers or complexes thereof can be sulfo-SANPAH functionalized prior to or during use.

In some embodiments, the collagen comprises type I collagen, type II collagen, type III collagen, type V collagen, type XI collagen, or any combination thereof.

Other aspects of aptamer complexes, methods of use, and kits comprising the same are also disclosed herein.

The details of one or more embodiments of the invention are set forth in the accompanying drawings and the description below. Other features, objects, and advantages of the invention will be apparent from the description and drawings, and from the claims.

In certain aspects, described herein are compositions comprising collagen fibers crosslinked with a plurality of one or more DNA aptamers. In embodiments, at least one of the one or more DNA aptamers can selectively binds a growth factor or cytokine. In embodiments, at least one of the one or more DNA aptamers selectively binds a cell receptor. In embodiments, the cell receptor is a stem cell receptor. In embodiments, at least one of the one or more DNA aptamer selectively binds an extracellular matrix protein. In embodiments, the DNA aptamers can be 15 to 100 nucleotides. In embodiments, DNA aptamers comprise from 1 to 5 stem loops. In embodiments, a plurality of one or more DNA aptamers comprises 2 to 4 DNA aptamer sequences connected by a linker molecule to form an aptamer assembly. In embodiments collagen comprises type I collagen, type II collagen, type III collagen, type V collagen, type XI collagen, or any combination thereof.

Described herein are methods of crosslinking collagen. In embodiments, methods for crosslinking collagen, comprise mixing collagen monomers with a plurality of one or more DNA aptamers under conditions suitable for a crosslinking reaction. In embodiments, collagen monomers and DNA aptamers can be mixed at a ratio of from about 8% to about 30%. In embodiments, at least one of the one or more DNA aptamers selectively binds a growth factor or cytokine. In embodiments, at least one of the one or more DNA aptamers selectively binds a cell receptor, which can be cell receptor is a stem cell receptor. In embodiments, at least one of the one or more DNA aptamers selectively binds an extracellular matrix protein. In embodiments, DNA aptamers comprise from 15 to 100 nucleotides. In embodiments, DNA aptamers comprise from 1 to 5 stem loops. In embodiments, the plurality of one or more DNA aptamers comprises 2 to 4 DNA aptamer sequences connected by a linker molecule to form an aptamer assembly. In embodiments, collagen comprises type I collagen, type II collagen, type III collagen, type V collagen, type XI collagen, or any combination thereof.

Described herein are kits for crosslinking collagen. In embodiments, kits comprise collagen monomers and one or more DNA aptamers. In embodiments, at least one of the DNA aptamers selectively binds a growth factor or cytokine. In embodiments, at least one of the DNA aptamers selectively binds a cell receptor. In embodiments, the cell receptor is a stem cell receptor. In embodiments, at least one of the DNA aptamers selectively binds an extracellular matrix protein. In embodiments, DNA aptamers comprise from 15 to 100 nucleotides. In embodiments, DNA aptamers comprise from 1 to 5 stem loops. In embodiments, a plurality of one or more DNA aptamers comprises 2 to 4 DNA aptamer sequences connected by a linker molecule to form an aptamer assembly. In embodiments, collagen comprises type I collagen, type II collagen, type III collagen, type V collagen, type XI collagen, or any combination thereof.

Described herein are methods of differentiating osteoblasts. In embodiments, methods comprise contacting a composition as described herein with one or more osteoblasts. In embodiments, the osteoblasts are human primary osteoblast. In embodiments, the osteoblasts are mammalian osteoblast. In embodiments, the aptamer selectively binds to or otherwise stimulates a VEGF receptor. In embodiments, the VEGF receptor is VEGF-R2. In embodiments, the aptamer comprises a nucleotide sequence configured to specifically bind to VEGF-R2.

Described herein are methods of transfection. Methods of transfection can comprise contacting a cell in need thereof with a composition as described herein in the presence of one or more nucleotides, wherein the one or more nucleotides are structurally distinct from the DNA aptamer. In embodiments, the contacting is in the further in the presence of calcium phosphate.

DESCRIPTION OF DRAWINGS

FIGS. 16B and 16C are transmission electron micrographs showing different morphologies of the "G" and "R" fibers, respectively.

FIG. 17A is a plot quantifying Alizarin Red-stained R, G, G+, and G− fibers with 10 and 20% volume fraction of collagen. FIGS. 17 and 17C FIGS. 18A-18E are brightfield micrographs of surface-functionalized (with 20 µM sulfo-SANPAH) aptamers (TCP, R, G, G+, G− and collagen (20% volume fraction) 0 hr after plating.

FIGS. 19A-19E are brightfield micrographs of surface-functionalized (with 20 µM sulfo-SANPAH) aptamers (TCP, R, G, G+, G− and collagen (20% volume fraction) 2.5 hr after plating.

FIGS. 29A-29E are brightfield micrographs of surface-functionalized (with 20 µM sulfo-SANPAH) aptamers (TCP, R, G, G+, G− and collagen 10% volume fraction) 52 hr after plating.

FIGS. 30A-30E are brightfield micrographs of surface-functionalized (with 20 µM sulfo-SANPAH) aptamers (TCP, R, G, G+, G− and collagen 10% volume fraction) 70 hr after plating.

FIGS. 33A-33C show aspects of methods of present disclosure.

FIGS. 34A-34C are brightfield micrographs showing mineralization progression (30 seconds, FIG. 34A; 4 minutes 30 seconds, FIG. 34B; and 10 minutes, FIG. 34C).

FIGS. 35A-35F Representative images of random ssDNA and HAP aptamer containing fibers formed at ~14% mass fraction DNA in solution stained for DNA (FIG. 35A). ssDNA-collagen bindings on a mass per mass basis (FIG. 35B) and a mole per mass basis (FIG. 35C) as a function of mass fraction DNA in solution. Representative images of mineralized immobilized random ssDNA and HAP aptamer fibers formed at ~14% mass fraction DNA in solution stained with alizarin red (FIG. 35D). Quantified alizarin red stain bound to the mineralized immobilized fibers as a function of mass fraction DNA (FIG. 35E) and bound ssDNA/collagen on a mole per mass basis (FIG. 35F). Each data point in b, c, e, and f was measured in triplicate and error bars represent one standard deviation.

FIGS. 40A-40H HObs stained for F-actin (FIGS. 40A-40D) and immunostained for osteopontin (FIGS. 40E-40H) after 3 days of culture on immobilized unmineralized and mineralized DNA aptamer-collagen complex fibers.

FIGS. 44A-44C X-ray diffraction pattern of one-step mineralized random ssDNA-collagen complex gel (FIG. 44A). Transmission electron micrograph of one-step mineralized (FIG. 44B) and unmineralized (FIG. 44C) random ssDNA-collagen complex fibers with their associated small area electron diffraction patterns (FIGS. 44B-44C insets).

FIGS. 49A-49D: Fiber morphology and surface coverage. Representative fluorescence microscopy images of labelled DNA-collagen fibers formed using a random ssDNA sequence (left column) or VEGF-R2 targeting DNA aptamer (right column) for 10%, 30%, and 50% volume fraction of collagen formulations. Scale bar=250 μm (FIG. 49A). Representative images of wells of a 24 well-plate functionalized with 30% volume fraction collagen fibers formed using the random ssDNA sequence (FIG. 49B) and the VEGF-R2 targeting DNA aptamer (FIG. 49C). Well area 2.84 cm$^2$. Quantification of surface coverage from full well images (FIG. 49D). Data is mean±SD, n=3.

FIGS. 50A-50C: Representative time-lapse phase contrast images of GFP-HUVEC remodeling fibrillar DNA-collagen complexes composed of the monomeric form of the VEGF-R2 targeting DNA aptamer. Fibers were made using a 10% collagen volume fraction mixture. Orange arrows track the remodeling of a specific fiber bundle and blue arrows monitor a point of cellular bridging over 72 hours. Scale bar 32 250 μm.

FIGS. 51A-51F: Representative fluorescent images of vWF expression by GFP-HUVECs cultured on DNA-collagen fibers formed using monovalent forms of the random sequence (FIGS. 51A-51C) and the VEGF-R2 targeting aptamer (FIGS. 51D-51F) with 10%, 30% and 50% volume fraction of collagen. For visual clarity, fiber bundles are outlined in white, vWF staining is red and cell nuclei are blue. Scale bar is 50 μm.

FIG. 52: Visible aggregates appeared as opaque fibrous precipitates in solution of divalent aptamer assembly collagen complexes. Aggregates shown for a 30% volume fraction collagen formulation in a 50 mL centrifuge tube.

FIGS. 53A-53C: Representative images of HUVECs cultured on random sequence divalent assembly (FIG. 53A) and VEGF-R2 targeting aptamer divalent assembly (FIG. 53B) In both images, vWF staining is red and nuclei are blue. Fibers were formed using a 30% volume fraction collagen formulation. Cells were cultured in the absence of exogenous VEGF. For visual clarity, fiber bundles are outlined in white. Scale bar=50 μm. Quantification of vWF secreted by HUVEC cultured on fibers formed using the random sequence divalent assembly and the VEGF-R2 targeting aptamer divalent assembly (FIG. 53C). * denotes statistical difference with p<0.05. Data are mean±SD n=3.

FIGS. 58A-58B: Phase (left) and immunofluorescence (right) microscopy of GFP-HUVECs cultured on ssDNA-collagen fibers (outlined in white) for three days. Cell nucleus in blue and von Willebrand factor (vWF) in red. vWF intensity is observed to be greater for cells on ssDNA-collagen fibers as compared to the flat culture surface. Fibers were formed originally using the random 80 nt ssDNA oligomer and a 30% volume fraction collagen in the fiber forming solution diluted in deionized water.

DETAILED DESCRIPTION

Figure 1:
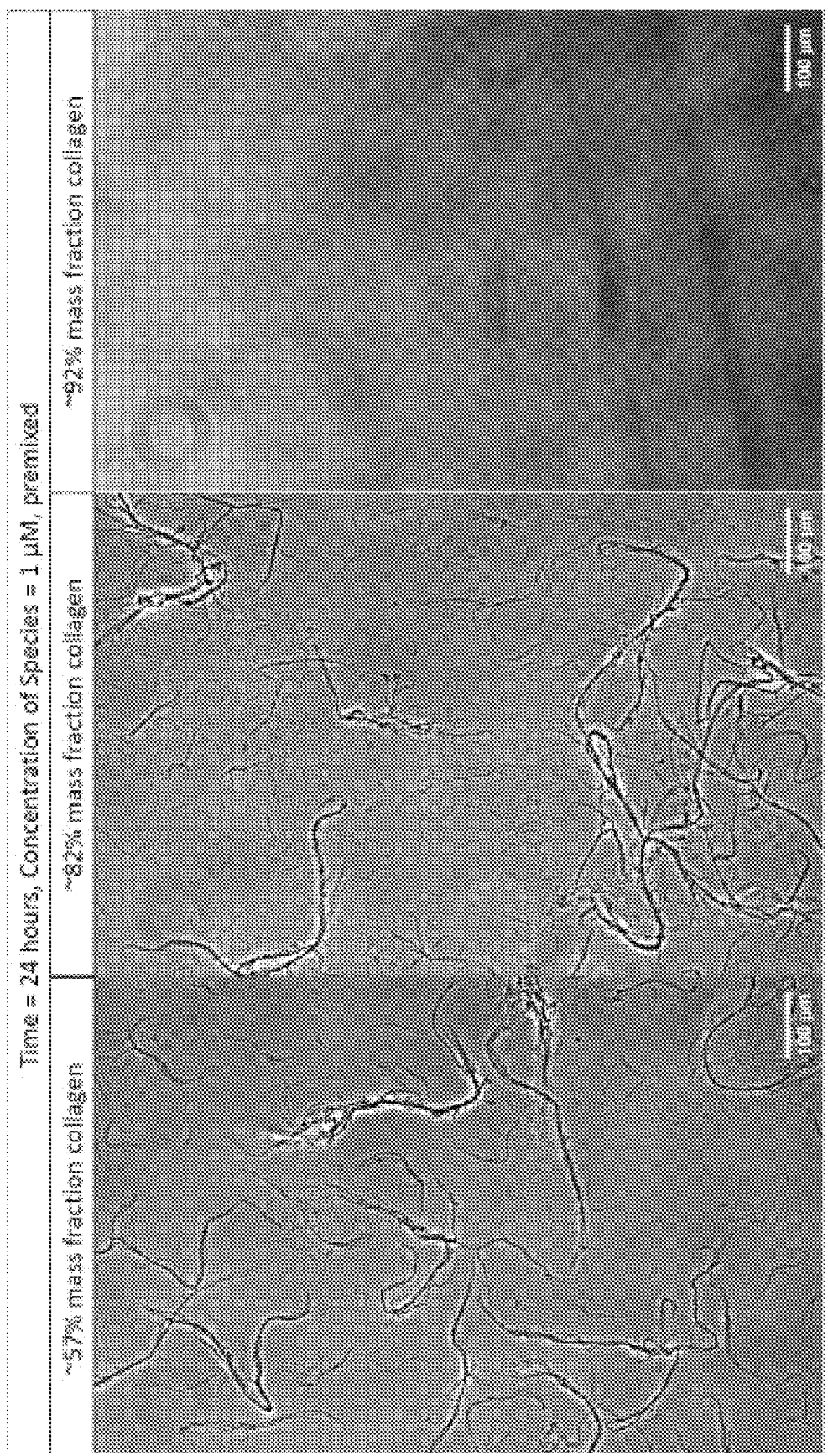
FIG. 1 shows a panel of images comparing ssDNA-collagen fibers formed using various relative amounts of ssDNA and collagen. Fibers formed for solutions of 57 and 82% mass fraction collagen but not for the 92% mass fraction collagen solution.
Figure 2A:
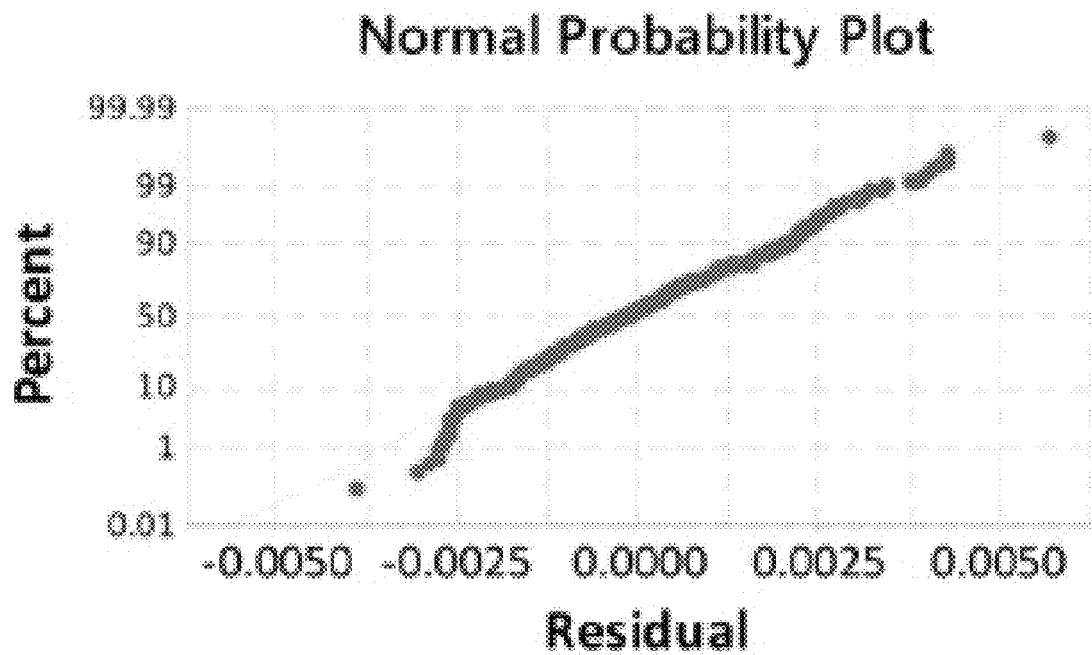
FIGS. 2A to 2D show a normality plot (FIG. 2A), a residual versus fitted value plot (FIG. 2B), a histogram of fit residuals (FIG. 2C), and a residual order plot (FIG. 2D) all of which indicate that the $3^{rd}$ order polynomial regression was an appropriate fit.
Figure 2B:
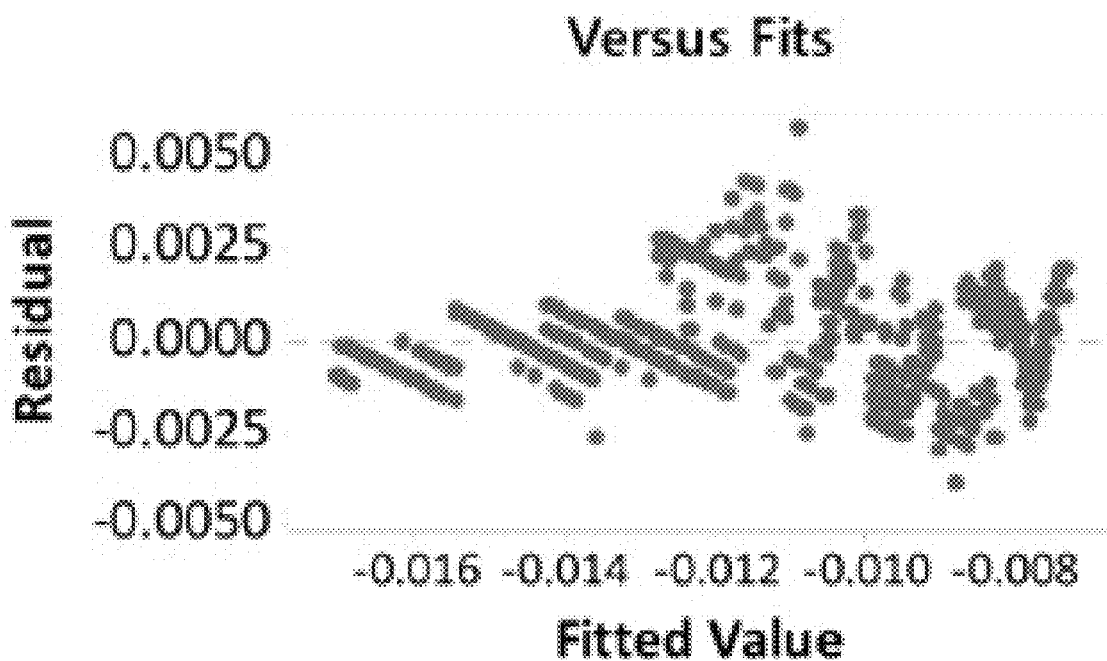
Figure 2C:
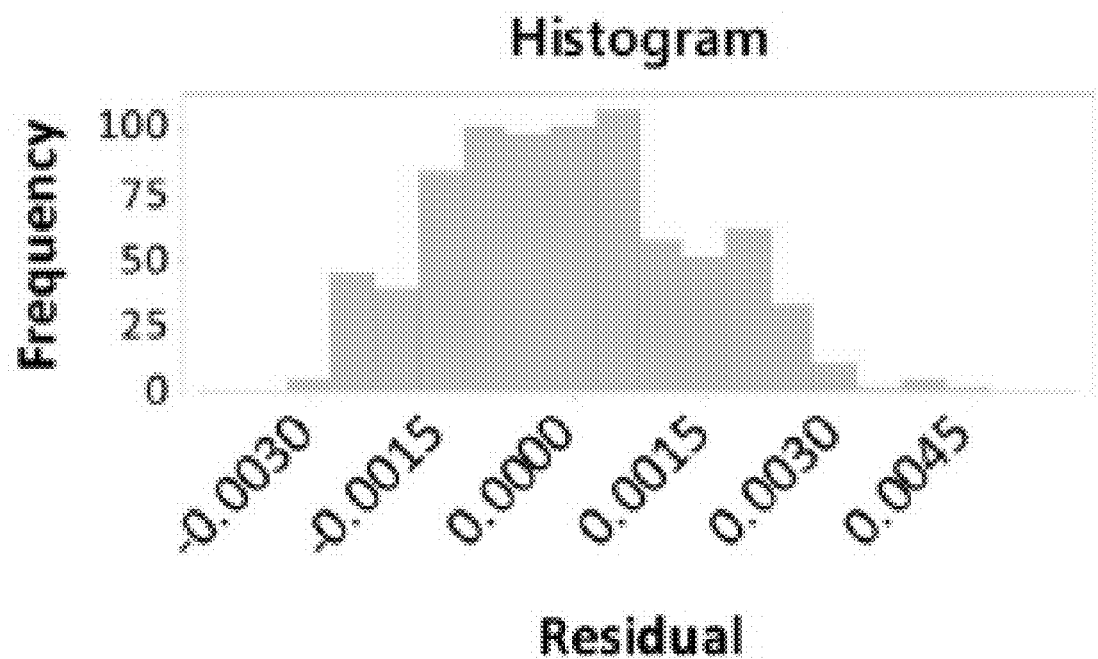
Figure 2D:
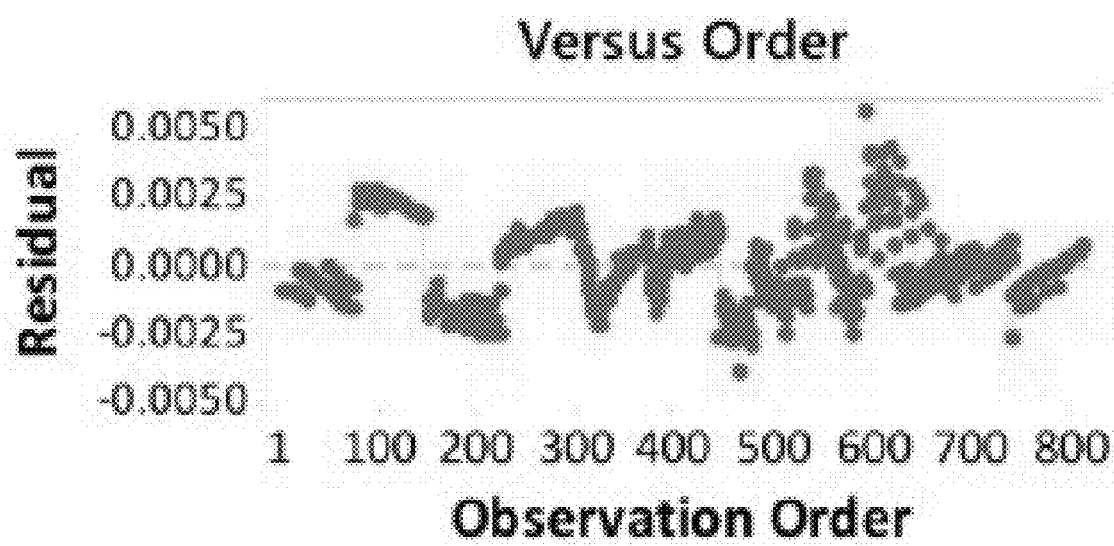

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, biology, and the like, which are within the skill of the art.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

The term "subject" refers to any individual who is the target of administration or treatment. The subject can be a vertebrate, for example, a mammal. Thus, the subject can be a human or veterinary patient. The term "patient" refers to a subject under the treatment of a clinician, e.g., physician.

The term "therapeutically effective" refers to the amount of the composition used is of sufficient quantity to ameliorate one or more causes or symptoms of a disease or disorder. Such amelioration only requires a reduction or alteration, not necessarily elimination.

The term "pharmaceutically acceptable" refers to those compounds, materials, compositions, and/or dosage forms which are, within the scope of sound medical judgment, suitable for use in contact with the tissues of human beings and animals without excessive toxicity, irritation, allergic response, or other problems or complications commensurate with a reasonable benefit/risk ratio.

The term "treatment" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder.

As used herein, the term "DNA aptamer" refers to a single stranded deoxyribonucleic acid (DNA) whose distinct nucleotide sequence determines the folding of the molecule into a unique three dimensional structure. Aptamers comprising 15 to 120 nucleotides can be selected in vitro from a randomized pool of oligonucleotides ($10^{14}$-$10^{15}$ molecules). The "DNA aptamer" comprises a degenerate sequence, and can further comprise fixed sequences flanking the degenerate sequence. The term "DNA aptamer" as used herein further contemplates the use of both native and modified DNA bases, e.g. beta-D-Glucosyl-Hydroxymethyluracil.

As used herein, the term "DNA aptamer" refers to an oligonucleotide molecule that binds to a target protein. In some embodiment, the DNA aptamer binds to a specific region or amino acid sequence of the target protein.

As used herein, the term "bind," the term "binding" or the term "bound" refers to any type of chemical or physical binding, which includes but is not limited to covalent binding, hydrogen binding, electrostatic binding, biological tethers, transmembrane attachment, cell surface attachment and expression.

For purposes of the present invention, the term "oligonucleotide," the term "polynucleotide," the term "nucleotide," and the term "nucleic acid" refer to a molecule comprised of two or more deoxyribonucleotides or ribonucleotides, and usually more than ten. The exact size of an oligonucleotide will depend on many factors, which in turn depends on the ultimate function or use of the oligonucleotide. The oligonucleotide may be generated in any manner, including chemical synthesis, DNA replication, reverse transcription, or a combination thereof. When present in a DNA form, the oligonucleotide may be single-stranded (i.e., the sense strand) or double-stranded.

For purposes of the disclosed invention, the term "polynucleotide" includes reference to a deoxyribopolynucleotide, ribopolynucleotide, or analogs thereof that have the essential nature of a natural ribonucleotide in that they hybridize, under stringent hybridization conditions, to substantially the same nucleotide sequence as naturally occurring nucleotides and/or allow translation into the same amino acid(s) as the naturally occurring nucleotide(s). A polynucleotide can be full-length or a subsequence of a native or heterologous structural or regulatory gene. Unless otherwise indicated, the term includes reference to the specified sequence as well as the complementary sequence thereof. Thus, DNAs or RNAs with backbones modified for stability or for other reasons are "polynucleotides" as that term is intended herein. Moreover, DNAs or RNAs comprising unusual bases, such as inosine, or modified bases, such as tritylated bases, to name just two examples, are polynucleotides as the term is used herein. It will be appreciated that a great variety of modifications have been made to DNA and RNA that serve many useful purposes known to those of skill in the art. The term polynucleotide as it is employed herein embraces such chemically, enzymatically or metabolically modified forms of polynucleotides, as well as the chemical forms of DNA and RNA characteristic of viruses and cells, including inter alia, simple and complex cells.

For purposes of the disclosed invention, the term "residue," the term "amino acid residue," or the term "amino acid" are used interchangeably herein to refer to an amino acid that is incorporated into a protein, polypeptide, or peptide (collectively "protein"). The amino acid may be a naturally occurring amino acid and, unless otherwise limited, may encompass known analogs of natural amino acids that can function in a similar manner as naturally occurring amino acids.

DNA Aptamers

Disclosed herein are DNA aptamers that can be used to crosslink collagen into fibers. The DNA sequence used to produce the aptamer can be selected using routine methods based on desired characteristics, such as protein binding.

DNA aptamers are short, single-stranded DNA oligonucleotides capable of specific binding to defined targets. The advent and success of SELEX technology in 1990s may be attributed to the feasibility to chemically synthesize pools of random oligonucleotides, the availability of the polymerases for nucleic acid amplification, as well as the improvement in sequencing techniques. The molecular recognition between aptamers and their corresponding targets relies on the three-dimensional conformations of the aptamers, hence the specific nucleic acid sequences. By substituting just a few nucleotides, the conformation of an oligonucleotide may change. Consequently, the structural diversity of a DNA or RNA pool containing combinatorial sequences may be infinitely expanded, thereby creating panels of aptamers for a wide variety of binding targets. The evolution process for selecting DNA aptamers typically covers the following steps: 1) chemical synthesis of a combinatorial oligonucleotide library having $10^{13}$-$10^{16}$ single stranded nucleic acid molecules, 2) exposure of the library to the targets to differentiate binding strands from spectators, 3) extraction and amplification of eluted survivors, 4) enrichment of the stronger survivors by iterative binding to targets and by involving counter selection if necessary, and, finally, 5) sequencing to identify individual candidates.

Figure 8A:
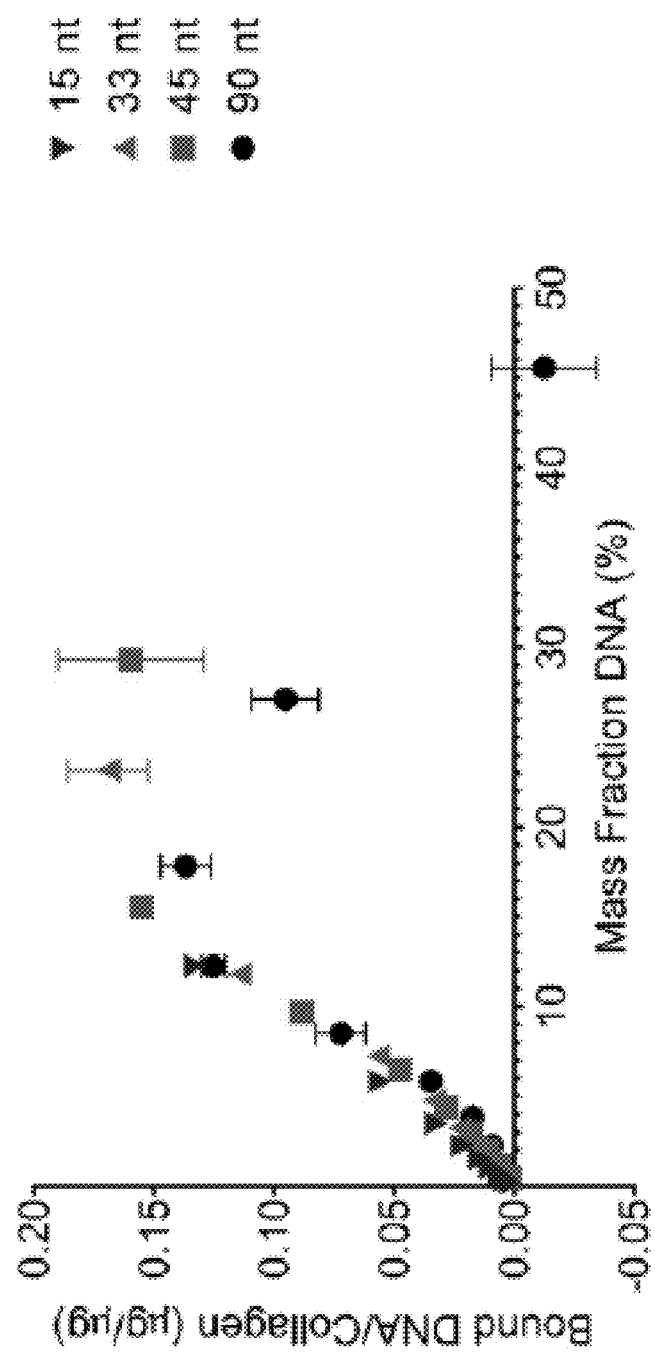
FIGS. 8A to 8C show ssDNA oligomers with 15 (5'-GGA GCT GTT GGC GTA-3', SEQ ID NO:2), 33 (5'-CAG AGA ATC TCC ATT TTA GCA CTT ACC TGT GAC -3', SEQ ID NO:3), 45 (5'-TCC CGC GAA ATT AAT ACG ACA GCA CCA CTT TTG GAG GGA GAT TTC-3', SEQ ID NO:4), and 90 (5'-AAT TTA GGA GCT GAA GGT CAG GGC ACC AGC AGC CTT TGG AAG CCT ACA GGA CAA CAG TCA GCC TGG CTA GAA AAA AAA ACA ATG TCA CAG-3', SEQ ID NO:5) nucleotides (nt) and their binding to type I collagen. ssDNA binding to collagen measured as the mass of bound DNA per mass of collagen as a function of mass fraction of DNA in solution (FIG. 8A). ssDNA binding to collagen measured as the moles of bound DNA per mass of collagen as a function of mass fraction of DNA in solution (FIG. 8B). The horizontal bars in (FIG. 8B) represent the range of DNA mass fraction where fiber formation was observed, from the top oligomers were 15, 33, 45 and 90 nt, respectively. When value for maximum binding from (FIG. 8B) of each oligomer was plotted against the inverse of the oligomer molecular weight, the data followed a linear relationship with $R^2>0.95$ (FIG. 8C). ssDNA binding was measured in triplicate. Data is presented as mean±standard deviation.
Figure 8B:
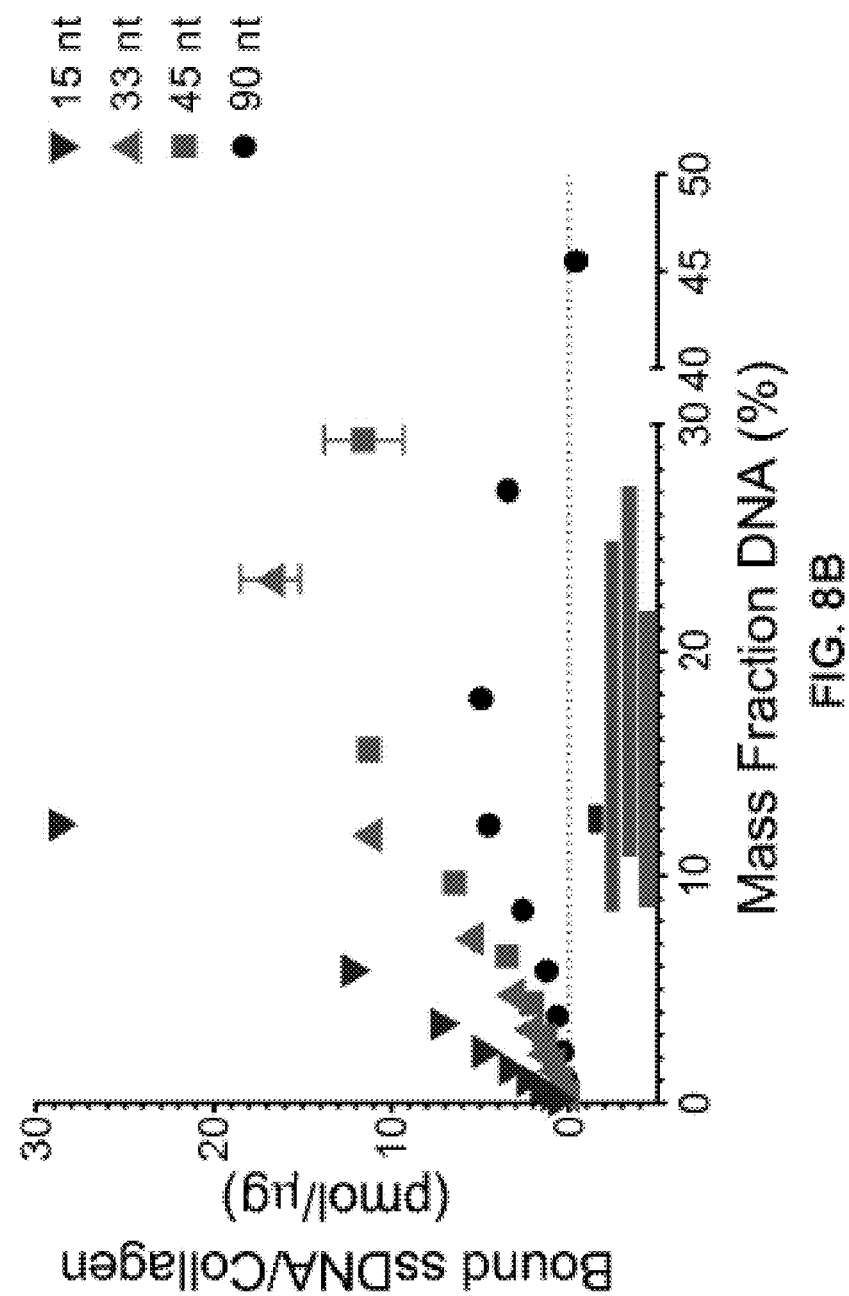
Figure 8C:
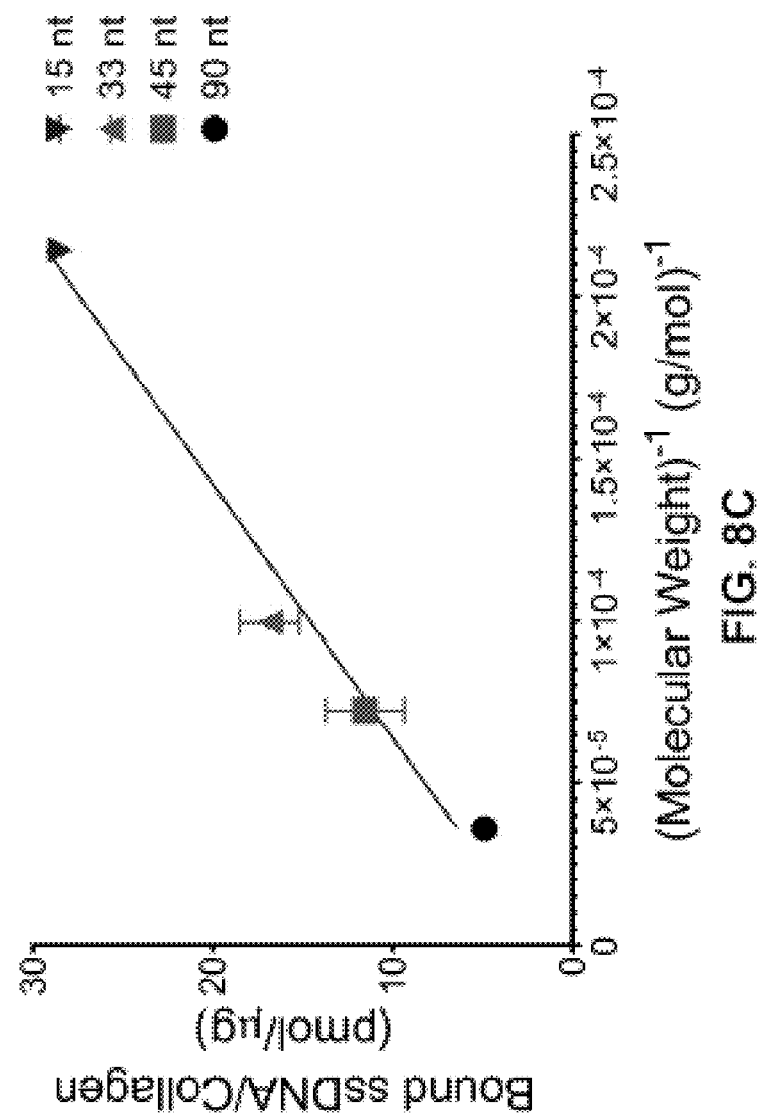

The SELEX process (systematic evolution of ligands by exponential enrichment) for engineering DNA aptamer sequences generates several potential candidates of varying length. As the disclosed data shows, fiber formation is dependent on both ssDNA length and the relative amounts of ssDNA and collagen in solution. Thus, the choice of sequence from the SELEX process is important as the ideal recipe for fiber formation will be different for each candidate sequence. Fibers form above a threshold binding value of 0.05 µg ssDNA/µg collagen, but also required the appropriate amount of ssDNA and collagen in solution (8-30% mass fraction DNA in solution) (FIG. 8B). Too much of either ssDNA or collagen in solution compared to the other inhibits fiber formation due to self-aggregation. More molecules of ssDNA bind with collagen as the sequence length decreases (FIG. 8C). This implies that more individual oligomers of ssDNA are present in the fibers for shorter sequences. Therefore, when fibers are formed using a DNA aptamer, the number of moles of aptamer oligomer per mass of collagen is greater for shorter sequences. Thus, fibers formed using a shorter DNA aptamer have a greater capacity for binding to the DNA aptamer target. This enables DNA aptamer targeting by the fibers to be tuned by varying the DNA aptamer sequence length. In addition, fiber formation requires the ssDNA and collagen to be mobile i.e. in solution. Fibers do not form when either component is immobilized to a surface and exposed to the other in solution. Thus, the fibers must first be synthesized and then immobilized for surface modification applications.

The length of the DNA aptamer comprising the sequence (i) or (ii) or the sequence (I) or (II) (hereafter, simply referred to as the "DNA aptamer according to the present invention") is, for example, 150 mer or shorter, 140 mer or shorter, 130 mer or shorter, 120 mer or shorter, or 110 mer or shorter, and preferably 100 mer or shorter, 90 mer or shorter, 80 mer or shorter, 70 mer or shorter, 60 mer or shorter, or 50 mer or shorter.

The DNA aptamer according to the present invention may arbitrarily comprise a base analog, another artificial base, another modified base, or the like, in addition to Ds.

The DNA aptamer according to the present invention may be modified with the addition of other substances, such as polyethylene glycol (PEG) (e.g., a PEG polymer of about 20 to 60 kDa), an amino acid, a peptide, inverted dT, a lipid, a dye, a fluorescent substance, an enzyme, a radioactive substance, and biotin. Such substance may be linked via a known linker, if needed. Examples of linkers that can be used herein include a nucleotide linker, a peptide linker, and a linker containing a disulfide bond. It is generally known that a half-life of the DNA aptamer is extended by conjugating PEG to the DNA aptamer. In certain aspects, two or more aptamers as described herein can be linked with a linker, for example a PEG linker or polymer of PEG moieties.

A method for producing the DNA aptamer according to the present invention is not particularly limited. A method known in the art may be employed. For example, the DNA aptamer according to the present invention can be chemically synthesized based on the sequences indicated above in accordance with a known solid-phase synthesis method. Regarding a method of chemical synthesis of nucleic acids, see, for example, Current Protocols in NucleicAcid Chemistry, Volume 1, Section 3. Many life science manufacturers (e.g., Takara Bio Inc. and Sigma-Aldrich Corporation) provide contract manufacturing services concerning such chemical synthesis, and such services may be used. A DNA aptamer may be prepared by synthesizing several fragments based on the DNA aptamer sequence and then ligating the fragments via, for example, intramolecular annealing or ligation by a ligase.

The DNA aptamer according to the present invention prepared via chemical synthesis is preferably purified by a method known in the art before use. Examples of methods of purification include gel purification, affinity column purification, and HPLC.

In certain aspects, aptamers as described herein can have two ends that are configured to bind separate targets. In an embodiment, an aptamer as described herein has an end configured to bind collagen, and another end configured to bind another target (for example VEGF-R2 or other VEGF-R's).

Protein Targets

The disclosed aptamers are in some embodiments able to bind a protein of interest. Examples protein targets include growth factors, cytokines, cell receptors, and extracellular matrix proteins.

Examples of pathogen proteins for which DNA aptamers have been developed include Anthrax Protective Antigen, bipd (type iii secretion protein), bope (type iii secretion protein), Botulinum neurotoxin type A, bpsI2748 (putative oxidoreductase), clostridium difficil toxin a, clostridium difficil toxin b, ETEC K88 fimbriae protein, Francisella tularensis subspecies (subsp) japonica bacterial antigen, Iron-regulated surface determinant a, Iron-regulated surface determinant b, Iron-regulated surface determinant c, Iron-regulated surface determinant h, Leishmania infantum H2A antigen, Leishmania infantum KMP-11, mannose-capped lipoarabinomannan, microcystin-LA, microcystin-LR, microcystin-YR, and -LA, Mycobacterium avium sp. Paratuberculosis Major Antigens, mycobacterium tuberculosis cfp10, mycobacterium tuberculosis esat6, mycobacterium tuberculosis esxg, Mycobacterium tuberculosis methionyl-tRNA synthetase (MRS), mycobacterium tuberculosis mpt64 protein, Mycobacterium tuberculosis polyphosphate kinase, Plasmodium falciparum erythrocyte membrane protein 1, Plasmodium lactate dehydrogenase, Protein A, salmonella typhimurium ompc, *Staphylococcus aureus* clumping factor a, *Staphylococcus aureus* clumping factor b, *Staphylococcus aureus* Enterotoxin B, *staphylococcus aureus* enterotoxin c1, *Staphylococcus aureus* Protein A (SpA), *Staphylococcus aureus* α Toxin, T. cruzi excreted secreted antigens, Type IVB Pili, and Ustilago maydis RNA-binding protein Rrm4.

In embodiments of the present disclosure, a protein target is a vascular endothelial growth factor receptor (VEGF-R). In an embodiment, a protein target is VEGF-R2.

Embodiments of VEGF-R protein targets according to the present disclosure include (or variants there of having greater than 70% sequence identity to the sequences listed; greater than 80% sequence identity; greater than 90% sequence identity; greater than 95% sequence identity):

VEGF-R2 (NCBI NP 002244.1; SEQ ID NO: 6)
MQSKVLLAVALWLCVETRAASVGLPSVSLDLPRLSIQKDILTIKANTTL

QITCRGQRDLDWLWPNNQSGSEQRVEVTECSDGLFCKTLTIPKVIGNDT

GAYKCFYRETDLASVIYVYVQDYRSPFIASVSDQHGVVYITENKNKTVV

IPCLGSISNLNVSLCARYPEKRFVPDGNRISWDSKKGFTIPSYMISYAG

MVFCEAKINDESYQSIMYIVVVVGYRIYDVVLSPSHGIELSVGEKLVLN

CTARTELNVGIDFNWEYPSSKHQHKKLVNRDLKTQSGSEMKKFLSTLTI

DGVTRSDQGLYTCAASSGLMTKKNSTFVRVHEKPFVAFGSGMESLVEAT

VGERVRIPAKYLGYPPPEIKWYKNGIPLESNHTIKAGHVLTIMEVSERD

TGNYTVILTNPISKEKQSHVVSLVVYVPPQIGEKSLISPVDSYQYGTTQ

TLTCTVYAIPPPHHIHWYWQLEEECANEPSQAVSVTNPYPCEEWRSVED

FQGGNKIEVNKNQFALIEGKNKTVSTLVIQAANVSALYKCEAVNKVGRG

ERVISFHVTRGPEITLQPDMQPTEQESVSLWCTADRSTFENLTWYKLGP

QPLPIHVGELPTPVCKNLDTLWKLNATMFSNSTNDILIMELKNASLQDQ

GDYVCLAQDRKTKKRHCVVRQLTVLERVAPTITGNLENQTTSIGESIEV

SCTASGNPPPQIMWFKDNETLVEDSGIVLKDGNRNLTIRRVRKEDEGLY

TCQACSVLGCAKVEAFFIIEGAQEKTNLEIIILVGTAVIAMFFWLLLVI

ILRTVKRANGGELKTGYLSIVMDPDELPLDEHCERLPYDASKWEFPRDR

LKLGKPLGRGAFGQVIEADAFGIDKTATCRTVAVKMLKEGATHSEHRAL

MSELKILIHIGHHLNVVNLLGACTKPGGPLMVIVEFCKFGNLSTYLRSK

RNEFVPYKTKGARFRQGKDYVGAIPVDLKRRLDSITSSQSSASSGFVEE

KSLSDVEEEEAPEDLYKDFLTLEHLICYSFQVAKGMEFLASRKCIHRDL

AARNILLSEKNVVKICDFGLARDIYKDPDYVRKGDARLPLKWMAPETIF

DRVYTIQSDVWSFGVLLWEIFSLGASPYPGVKIDEEFCRRLKEGTRMRA

PDYTTPEMYQTMLDCWHGEPSQRPTFSELVEHLGNLLQANAQQDGKDYI

VLPISETLSMEEDSGLSLPTSPVSCMEEEEVCDPKFHYDNTAGISQYLQ

NSKRKSRPVSVKTFEDIPLEEPEVKVIPDDNQTDSGMVLASEELKTLED

RTKLSPSFGGMVPSKSRESVASEGSNQTSGYQSGYHSDDTDTTVYSSEE

AELLKLIEIGVQTGSTAQILQPDSGTTLSSPPV

VEGF-R1 (NCBI NP 002244.1; SEQ ID NO: 7)
MVSYWDTGVLLCALLSCLLLTGSSSGSKLKDPELSLKGTQHIMQAGQTL

HLQCRGEAAHKWSLPEMVSKESERLSITKSACGRNGKQFCSTLTLNTAQ

ANHTGFYSCKYLAVPTSKKKETESAIYIFISDTGRPFVEMYSEIPEIIH

MTEGRELVIPCRVTSPNITVTLKKFPLDTLIPDGKRIIWDSRKGFIISN

ATYKEIGLLTCEATVNGHLYKTNYLTHRQTNTIIDVQISTPRPVKLLRG

HTLVLNCTATTPLNTRVQMTWSYPDEKNKRASVRRRIDQSNSHANIFYS

VLTIDKMQNKDKGLYTCRVRSGPSFKSVNTSVHIYDKAFITVKHRKQQV

LETVAGKRSYRLSMKVKAFPSPEVVWLKDGLPATEKSARYLTRGYSLII

-continued

KDVTEEDAGNYTILLSIKQSNVFKNLTATLIVNVKPQIYEKAVSSFPDP

ALYPLGSRQILTCTAYGIPQPTIKWFWHPCNHNHSEARCDFCSNNEESF

ILDADSNMGNRIESITQRMAIIEGKNKMASTLVVADSRISGIYICIASN

KVGTVGRNISFYITDVPNGFHVNLEKMPTEGEDLKLSCTVNKFLYRDVT

WILLRTVNNRTMHYSISKQKMAITKEHSITLNLTIMNVSLQDSGTYACR

ARNVYTGEEILQKKEITIRDQEAPYLLRNLSDHTVAISSSTTLDCHANG

VPEPQITWFKNNHKIQQEPGIILGPGSSTLFIERVTEEDEGVYHCKATN

QKGSVESSAYLTVQGTSDKSNLELITLTCTCVAATLFWLLLTLFIRKMK

RSSSEIKTDYLSIIMDPDEVPLDEQCERLPYDASKWEFARERLKLGKSL

GRGAFGKVVQASAFGIKKSPTCRTVAVKMLKEGATASEYKALMTELKIL

THIGHHLNVVNLLGACTKQGGPLMVIVEYCKYGNLSNYLKSKRDLFFLN

KDAALHMEPKKEKMEPGLEQGKKPRLDSVTSSESFASSGFQEDKSLSDV

EEEEDSDGFYKEPITMEDLISYSFQVARGMEFLSSRKCIHRDLAARNIL

LSENNVVKICDFGLARDIYKNPDYVRKGDTRLPLKWMAPESIFDKIYST

KSDVWSYGVLLWEIFSLGGSPYPGVQMDEDFCSRLREGMRMRAPEYSTP

EIYQIMLDCWHRDPKERPRFAELVEKLGDLLQANVQQDGKDYIPINAIL

TGNSGFTYSTPAFSEDFFKESISAPKFNSGSSDDVRYVNAFKFMSLERI

KTFEELLPNATSMFDDYQGDSSTLLASPMLKRFTWTDSKPKASLKIDLR

VTSKSKESGLSDVSRPSFCHSSCGHVSEGKRRFTYDHAELERKIACCSP

PPDYNSVVLYSTPPI

VEGF-R3 (NCBI NP 002244.1; SEQ ID NO: 8)
MQRGAALCLRLWLCLGLLDGLVSGYSMTPPTLNITEESHVIDTGDSLSI

SCRGQHPLEWAWPGAQEAPATGDKDSEDTGVVRDCEGTDARPYCKVLLL

HEVHANDTGSYVCYYKYIKARIEGTTAASSYVFVRDFEQPFINKPDTLL

VNRKDAMWVPCLVSIPGLNVTLRSQSSVLWPDGQEVVWDDRRGMLVSTP

LLHDALYLQCETTWGDQDFLSNPFLVHITGNELYDIQLLPRKSLELLVG

EKLVLNCTVWAEFNSGVTFDWDYPGKQAERGKWVPERRSQQTHTELSSI

LTIHNVSQHDLGSYVCKANNGIQRFRESTEVIVHENPFISVEWLKGPIL

EATAGDELVKLPVKLAAYPPPEFQWYKDGKALSGRHSPHALVLKEVTEA

STGTYTLALWNSAAGLRRNISLELVVNVPPQIHEKEASSPSIYSRHSRQ

ALTCTAYGVPLPLSIQWHWRPWTPCKMFAQRSLRRRQQQDLMPQCRDWR

AVTTQDAVNPIESLDTWTEFVEGKNKTVSKLVIQNANVSAMYKCVVSNK

VGQDERLIYFYVTTIPDGFTIESKPSEELLEGQPVLLSCQADSYKYEHL

RWYRLNLSTLHDAHGNPLLLDCKNVHLFATPLAASLEEVAPGARHATLS

LSIPRVAPEHEGHYVCEVQDRRSHDKHCHKKYLSVQALEAPRLTQNLTD

LLVNVSDSLEMQCLVAGAHAPSIVWYKDERLLEEKSGVDLADSNQKLSI

QRVREEDAGRYLCSVCNAKGCVNSSASVAVEGSEDKGSMEIVILVGTGV

IAVFFWVLLLLIFCNMRRPAHADIKTGYLSIIMDPGEVPLEEQCEYLSY

DASQWEFPRERLHLGRVLGYGAFGKVVEASAFGIHKGSSCDTVAVKMLK

EGATASEHRALMSELKILIHIGNHLNVVNLLGACTKPQGPLMVIVEFCK

-continued

YGNLSNFLRAKRDAFSPCAEKSPEQRGRFRAMVELARLDRRRPGSSDRV

LFARFSKTEGGARRASPDQEAEDLWLSPLTMEDLVCYSFQVARGMEFLA

SRKCIHRDLAARNILLSESDVVKICDFGLARDIYKDPDYVRKGSARLPL

KWMAPESIFDKVYTTQSDVWSFGVLLWEIFSLGASPYPGVQINEEFCQR

LRDGTRMRAPELATPAIRRIMLNCWSGDPKARPAFSELVEILGDLLQGR

GLQEEEEVCMAPRSSQSSEEGSFSQVSTMALHIAQADAEDSPPSLQRHS

LAARYYNWVSFPGCLARGAETRGSSRMKTFEEFPMTPTTYKGSVDNQTD

SGMVLASEEFEQIESRHRQESGFSCKGPGQNVAVTRAHPDSQGRRRRPE

RGARGGQVFYNSEYGELSEPSEEDHCSPSARVTFFTDNSY

Examples of viral proteins for which DNA aptamers have been developed include Alfalfa Mosaic virus RNA-coat protein complex, bacteriophage ff gene 5, dengue-2 virus envelope protein domain iii, Ebola Virus VP35 interferon inhibitory domain, Foot-and-mouth disease virus RNA-dependent RNA polymerase, gp130, HBV capsid, HBV core protein, HBV recombinant truncated P protein, HBV surface antigen, HCV core antigen, HCV Envelope Glycoprotein E2, HCV nonstructural protein 3 protease, HCV NS2 protein, HCV NS5A, HCV ns5b replicase, HCV RNA-Dependent RNA Polymerase, HES 1 protein icp27, HIV gp120, HIV integrase, HIV LTR, HIV Nucleocapsid Protein, HIV Tat, HIV-1 gag, HIV-1 Reverse transcriptase, HIV-1 Tar RNA, HPV-16 E7 Oncoprotein, HSV gd protein, HSV US11, HTLV-I tax, Human norovirus (Gii.4) capsid P domain, Human norovirus capsid protein vp1, Influenza A Hemagglutinin, Influenza A NS1 protein, influenza A polymerase PA subunit, influenza protein e, MS2 coat protein, papillomavirus 16 e7 oncoprotein, RABV glycoprotein, rex, Rift Valley fever virus N protein Pool, sars-cov, sars-cov nucleocapsid protein, severe acute respiratory syndrome (sars) coronavirus ntpase/helicase, SP6 RNA polymerase, and Venezuelan equine encephalitis virus capsid protein.

Examples of toxins for which DNA aptamers have been developed include Colicin E3, gliadin peptide, Ricin A-chain, shiga toxin, t-2 toxin, tetanus toxoid, type a botulinum neurotoxin, α-bungarotoxin snake venom, and β-bungarotoxin.

Examples of prions for which DNA aptamers have been developed include bovine prion protein, cellular prion protein, mouse prion, recombinant human (rhu) cellular prion protein (PrPC) 23-231, and Syrian golden hamster prion protein rPrP23-231.

Examples of mammalian proteins for which DNA aptamers have been developed include 4-1BB, Acetohydroxyacid synthase, activated protein c, AGE-human serum albumin, AlkB, Alzheimer's Disease Amyloid Peptide, AML1 Runt domain, AMPA receptor, amyloid-like fibrils, angiogenin, angiopoietin 1, angiopoietin 2, anti-MPT64 antibodies, anti-NF-kB p65, antivesicular stomatitis virus polyclonal antibodies, ApoE, arginine-rich motif (ARM) model peptide, ATR/TEM8 Von Willebrand factor type A (VWA), B-cell-activating factor-receptor, B52 (SR protein RNA splicing), b7, basic fibroblast growth factor, Bcs1, bovine catalase, bovine factor ix, bovine follicle-stimulating hormone α subunit, bovine serum albumin, bovine thrombin, brain natriuretic peptide (bnp), C-C chemokine receptor type 5, c-Met, C-reactive protein, c-telopeptide (ctx) of human type i bone collagen, c4, c7, calsenilin, cardiac troponin i (ctni), cathepsin E, cd133, CD16, cd18, CD28, CD30, cd31, CD40, cd44, Cdc42, CGRP peptide, CHK2, cholesterol esterase, cJun/cJun, complement factor c5a, Connective tissue growth factor, crdl1, CTAP III/NAP2, ctla-4, CYT-18, cytochrome c, cytochrome P450 51A1, cytoplasmic tail of BACE, DC-SIGN protein, DNA binding domain of TCF-1, DNA polymerase b, E-Selectin, e6 oncogene protein, endostatin, epidermal growth factor receptor, epithelial cell adhesion molecule, Erk2, Estrogen receptor a, Eukaryotic translation initiation factor 4G, factor d, Factor IX, factor ixa, factor viia, factor x, factor xa, fibrinogen, fibronectin, fibronectin binding protein a, fibronectin binding protein b, fractalkine, G-protein-coupled receptor kinase 2, G6-9 anti-DNA autoantibody, ga733-1, ghrelin, glyceraldehyde-derived pyridinium, glycine receptor (glyr), Glycoprotein VI, gonadotropin, gonadotropin-releasing hormone I, gper neurotensin, HA Binding Domain of Human CD44, HbA1c, heat shock factor, hemoglobin, heptaocyte growth factor, histone H4, hmg-1, hnspA2 human nonpancreatic secretory phospholipase A2, hsp90-binding immunophilin, human acetylcholinesterase, Human Cardiac Troponin I, human CD73, human complement 5, human dicer, human epidermal growth factor receptor 2, Human epidermal growth factor receptor-3 (HER3), human erythropoietin-a (rHuEPO-a), human gp73, human growth hormone, human heat shock factors 1, human heat shock factors 2, Human Hepatocyte Growth Factor, human interleukin-8, human matrix metalloprotease 9 (hMMP-human neutrophil elastase, human periostin, human plasma, human Platelet-Derived Growth Factor chain B, Human Pro-Urokinase, human Rad51, human rad51, human RNase H1, human thyroid stimulating hormone, Human tPA, human transferrin receptor, human β2-microglobulin, immunoglobulin e, immunoglobulin g, insulin, insulin receptor, integrin α4, integrin αVβ3, interferon γ, interferon γ induced protein 10, interferon-inducible t-cell α chemoattractant, interleukin-10ra, interleukin-12, interleukin-16, Interleukin-17, interleukin-23, interleukin-6, interleukin-6 receptor, interleukin-8, k ras-derived farnesylated peptide, kallikrein-related peptidase 6 (klk6), keratinocyte growth factor, L-selectin, L7Ae protein, leptin, leptin r, lipocalin-2, Lysozyme, mAb198, macrophage migration inhibitory factor, MAGE-A3111-125, matn2, Mek1, metastatic enzyme heparanase (HPSE1), MetJ (methionine repressor), migraine-associated calcitonin gene-related peptide, mitochondrial GTPase NOA1, mitogen-activated kinase, monoclonal antibody 83-7, mouse CCL1, mouse glycoprotein 2, mouse monoclonal antibody ma20, mouse vcam-1, MRCKα-KD, MUC1, MUC16 ca125 ovarian cancer cell marker, murine c-type receptor dec205, murine Interleukin-10 (IL-10), murine myelin, mutant KRAS (G12V), MutS, myelin basic protein, N-methyl D-aspartate (NMDA) class of ionotropic glutamate receptors, negative elongation factor e, neuropeptide Y, Neurotrophin Receptor, neutrophil elastase, NF-IL6, nogo-66 receptor, nts-1, nuclear factor of activated T cells, nuclear factor κβ, nucleolin, nucleophosmin, oncogene tiam1, Oncogenic Protein Shp2, osteopontin, osteoprotegrin, ovarian cancer biomarker HE4, OX40, p-cadherin, P-selectin, P2×2 receptors, p43, p50, p53R175H, PAI-1, PAK1, pancreatic adenocarcinoma up-regulated factor, PDGF-BB, Pepocin, Peroxisome proliferator-activated receptor δ, phospholamban, Plasminogen Activator Inhibitor-1, plg, prostate specific antigen, prostatic acid phosphatase, protein kinase C-d, PTFase, Pulmonary Surfactant Protein A, quinoprotein glucose dehydrogenase (PQQGDH), Ras, Ras-binding domain of Raf1, recombinant human apc, recombinant human growth hormone (rhgh), rela (p65), Retinol binding protein 4 (RBP4), rev nuclear export signal, Rho, RIG-I, RNA binding domain, ma polymerase σ, RNase, RUNX1, schlerostin, se-selectin, Sec7 domain of cytohesin 1, SelB (elongation factor for selenocystein incorporation), serine protease urokinase-type plasminogen activator, sphingomyelinase, SRP19, substance P, t-cell 4-1bb, tenascin C, TFIIIA, TGF-b Receptor II, thrombin, Thrombospondin 2, thyroid transcription factor 1, toll-like receptor 2, transferrin, transforming growth factor receptor b2, transforming growth factor-b1, transforming growth factor-β type III receptor, TrkB, trypsin, tumor necrosis factor receptor super family member 9, tyrosine kinase RETC634Y, tyrosine phosphatase Ib, Tyrosine phosphatase SHP2, UBLCP1, unglycosylated epidermal growth factor receptor viii ectodomain, urokinase plasminogen activator, vascular endothelial growth factor, vascular endothelial growth factor 165, vasopressin, vimentin, von willebrand factor, von willebrand factor al-domain, ZAP, Zinc Finger Proteins, α-fetoprotein, α-synuclein, β-arrestin 2, β-catenin, β-Conglutin, and β-site amyloid precursor protein cleaving enzymel (bace1).

Additional examples of proteins for which DNA aptamers have been developed include ara h 1 allergen, asp f 1 allergen, bacterial RNA polymerase, caenorhabditis elegans bcl-2 homolog ced-9, CFP, Concanavalin A, cry j 2 allergen, *E. coli* core RNA polymerase, electric eel acetylcholinesterase, eotaxin, erf1, *escherichia coli* methionine repressor, *Escherichia coli* release factor 1, f(ab')2 fragments of saxitoxin (stx) antibodies, GFP, heterogenous ribonucleoprotein I (hnrnp I), horse radish peroxidase, i-scei endonuclease, initiation factor 4a, innexin 2, inosine monophosphate dehydrogenase, lup an 1, mitochondrial processing peptidase, okadaic acid monoclonal antibody, peptidoglycan, sA from Thermus aquaticus, streptavidin, subtilisin (protease), systemin, T4 DNA pol, t7 ma polymerase, taq dna pot, tbp (tata box protein), Tet Repressor, tfiib, TIMP1, tobacco protoplast protein, yeast RNA polymerase II (Pol yeast TATA-binding protein, yeast TFIIB, and YFP.

In some embodiments, the DNA aptamer binds a cell target. Examples of non-cancerous mammalian cells for which DNA aptamers have been developed include 3T3-L1 adipocytes, Adult mesenchymal stem cells, BJAB cells expressing c-kit, C666-1, CD81 T-cells, Cell internalization, Differentiated PC12 cells, cho-k1 cells expressing human endothelin type b receptor (etbr), HEK-293, Transformed tonsillar epithelial cells, Human jaw periosteal cells, Human platelets, Inflamed endothelial cells, Malaria-infected RBCs, Mature white adipocytes, MCF-10AT1, MiaPaCa-2 secretome, Mitochondria, NP69, Osteoblasts, PC-3, PC:cholesterol liposomes, Rabies virus-infected live cells, RSV transformed SHE cells, and Transformed tonsillar epithelial cells. A cell target can be a protein receptor or cell-surface receptor, for example a VEGF-R.

Examples of pathogenic microorganisms for which DNA aptamers have been developed include African Trypanosomes, Alicyclobacillus spores, Anthrax spores, *Bacillus* spores, *Bacillus thuringiensis, Campylobacter jejuni, Cryptosporidium parvum, Escherichia coli* DH5α, *Escherichia coli* K12, *Escherichia coli* NSM59, *Escherichia coli* O111: B4, *Escherichia coli* O157:H7, *Francisella tularensis, Lactobacillus acidophilus, Leishmania major promastigotes, Listeria monocytogenes, Mycobacterium tuberculosis, Porphyromonas gingivalis, Proteus mirabilis, Pseudomonas aeruginosa, Salmonella choleraesuis, Salmonella enteritidis, Salmonella O8, Salmonella paratyphi A, Salmonella typhimurium, Shigella dysenteriae, Staphylococcus aureus, Streptococcus mutans, Streptococcus oralis, Streptococcus*

*pyogenes, Streptococcus sanguis, Treponema denticola, Trypanosoma cruzi, Tuberculosis, Vibrio alginolyticus,* and *Vibrio parahemolyticus.*

Examples of cancer cells for which DNA aptamers have been developed include Acute myeloid leukemia (AML) cells, Adenocarcinoma, BG-1 ovarian cancer cells, Brain Tumor—Initiating Cells, Breast cancer, Burkitt lymphoma cells, Cancer stem cells, Colon cancer cell SW620, Colorectal cancer cell line DLD-1, CT26 intrahepatic tumor, Epithelial cancer cells, Gastric cancer cell-line HGC-27, Gefitinib-resistant H1975 lung cancer cells, Glioblastoma multiforme, Hepatocellular carcinoma, HER2 positive cell line, HPV-transformed cervical cancer cells, Human breast cancer MDA-MB-231, Human cholangiocarcinoma QBC-939 cells, Human gastric carcinoma AGS, Human glioblastoma multiforme cells overexpressing epidermal growth factor receptor variant III, Human hepatocarcinoma, Human pancreatic ductal adenocarcinoma, Human U87MG glioma cells, Leukemia cells, Liver cancer, MCF-10AT1, MDA-MB-231 breast cancer, Metastatic colorectal cancer, Metastatic hepatocellular carcinoma cells, MS03 cancer line, Ovarian cancer cell TOV-21G, Ovarian serous adenocarcinoma cell CAOV-3, Pancreatic cancer cells, Primary Cultured Tumor Endothelial Cells, Primary human chronic lymphocytic leukemia, Ramos cells, Rat brain tumor microvessels, Small-cell lung cancer cells, SMMC-7721 liver carcinoma cells, and Vaccinia virus—infected lung cancer A549 cells.

Examples of nucleic acid targets for which DNA aptamers have been developed include *Bacillus subtilis* RNase P P5.1 stem-loop element, DNA/RNA motifs, HCV IRES, HIV-1 TAR element, PCA3 RNA, Target A-site 16S rRNA, and Yeast phenylalanine tRNA.

Examples of viral targets for which DNA aptamers have been developed include apple stem pitting virus, Arbovirus, Bovine viral diarrhea virus type 1, Fish Pathogen Viral Hemorrhagic Septicemia Virus, Herpes simplex virus type 2, Hirame rhabdovirus, HIV-1 subtype C envelope pseudovirus, Human cytomegalovirus, Human Norovirus, Influenza A/H1N1, Influenza A/H3N2, Influenza A/H5N1, Influenza B/Tokio/53/99, Influenza B/05/99, Singapore grouper iridovirus, Soft-shelled turtle iridovirus, Tobacco Necrosis Virus, Vaccinia virus, and Vesicular stomatitis virus (VSV).

In some embodiments, the DNA aptamer binds a small molecule target. Examples of fluorophores for which DNA aptamers have been developed include aniline-based quencher, Cibacron Blue 3GA, Cy3, DFHBI, Dihydropyrene photo-switch compound, Dimethylindole Red, DMABI, DMHBI, Fluoroscein, Hoechst derivative 7, Reactive Blue 4, Reactive Brown 10, Reactive Green 19, Reactive Red 120, Reactive Yellow 86, Sulforhodamine, Tetramethylrhodamine, and Thiazole orange.

Examples of pharmaceuticals for which DNA aptamers have been developed include (1-3)-b-D-glucans, 2-anilinophenylacetic acid, Acetamiprid, Aminoglycoside antibiotic, Chloramphenicol, Citrulline, Codeine, Cyclosporin A, Danofloxacin, Daunomycin, Diclofenac, Digoxin, Gentamicin, Globo H, Glutathione, Hematoporphyrin, Heteroaryldihydropyrimidine, Ibuprofen, Kanamycin, Lividomycin, Lysergamine, Metergoline, Moenomycin A, Neomycin, Paromomycin, Poly-y-D-glutamic acid (g-PDGA), R-Thalidomide, Small Ergot Alkaloids, Spectinomycin, Streptomycin, Sulfadimethoxine, Tetracycline, Theophylline, and Tobramycin.

Examples of toxins and environmental hazard small molecules for which DNA aptamers have been developed include 2,4,6-trichloroaniline (TCA), Abrin toxin, Acetamiprid, Aflatoxin B1, Aflatoxin M1, Bisphenol A, Brevetoxin, Carcinogenic aromatic amines, Chinese Horseshoe Crab endotoxin, cylindrospermopsin, Digoxin, Dinitroaniline, Ethanolamine, Fumonisin B1, Isocarbophos, Lipopolysaccharide, Neurotoxin anatoxin-a, Ochratoxin A, Okadaic acid, Omethoate, P-aminophenylpinacolylmethylphosphonate, Pentachlorophenol, Phorate, Polychlorinated biphenyls, Profenofos, *Staphylococcus aureus* enterotoxin A, Trinitrotoluene, and zearalenone.

Examples of amino acids and peptides for which DNA aptamers have been developed include Arginine, Citrulline, Glutamic acid, Glutathione, Histidine, His Tag 6x, Isoleucine, L-arginine, L-tryptophan, P-amino phenylalanine, P-amino phenylalanine, Peptide: Asp-Gly-Ile, Peptide: Gly-Glu-Leu, Peptide: His-Phe, Peptide: Leu-Ala-Ser, Peptide: Lys-Ala-Ile, Phenylalanine, S-adenosyl methionine, S-Adenosylhomocysteine, Tachykinin substance P, Tryptophan, Tyrosine, and Valine.

Examples of metals for which DNA aptamers have been developed include Cadmium, Nickel, Palladium ion, Uranyl ion, and Zinc.

Examples of biologics and signaling molecules for which DNA aptamers have been developed include Acetylcholine, Biotin, cAMP, Cellulose, Cholic acid, CoA, Cortisol, Cyanocobalin (vitamin B12), Dehydroisoandro sterone-3-sulfate, Deoxy-corticosterone-21 glucoside, Deoxycholic acid sodium salt, Dopamine, Flavin, Fructose, Galactose, Glucagon, Glucose, Hemin, Hormone Abscisic Acid, N-acetylneuraminic acid, n-glycolylneuraminic acid (neu5gc), Nicotinamide, R-Thalidomide, Sialyl Lewis X, Sialyllactose, Sphingolipid S1 P, Sphingosylphosphorylcholine, Steroid, Thiamine pyrophosphate, Thyroxine hormone, thyroxine hormone, Urea, Vasopressin, Vitamin D, Zeatin, and β-estradiol.

Examples of nucleosides and nucleotides for which DNA aptamers have been developed include 8-hydroxy-2'-deoxyguanosine, Adenosine, ADP, AMP, ATP, GMP, GTP, Guanine, and Xanthine.

Examples of synthetic small molecules for which DNA aptamers have been developed include 4-chloroaniline (4-CA), Biotin pyridocarboxamide derivative, Bis-boronic acid receptor, L-tyrosinamide, Methylphosphoic acid, N-methyl mesoporphyrin IX, P-nitrobenzene sulfonyl, and Tartrate.

Collagen Crosslinking

The crosslinking reaction may be carried out by combining collagen and a DNA aptamer as disclosed herein at relative amounts effective to produce collagen fibers. 8 to 30% mass fraction of ssDNA in solution.

The crosslinking reaction may be carried out at a temperature according to the judgment of those of skill in the art. In certain embodiments, the crosslinking reaction is carried out at about 0-50° C., about 20-50° C., about 20-45° C., about 20-40° C., about 20-35° C., or about 20-30° C. In other embodiments, the crosslinking reaction is carried out at about 0° C., about 5° C., about 10° C., about 15° C., about 20° C., about 25° C., about 30° C., about 35° C., about 40° C., about 45° C., or about 50° C. In particular embodiments, the crosslinking reaction is carried out at about 20-40° C.

The crosslinking reaction may be carried out at a pH according to the judgment of those of skill in the art. For example, it is well-known in the art that crosslinking agents are effective at crosslinking at a particular pH or ranges of pH. In certain embodiments, the crosslinking reaction is carried out at a pH of about 6-12, about 7-12, about 7-11, about 7-10, or about 7.2-10. In other embodiments, the crosslinking reaction is carried out at a pH of about 6, about 7, about 7.2, about 9, about 10, about 11, or about 12.

The crosslinking reaction may be carried out for a period of time according to the judgment of those of skill in the art. In certain embodiments, the crosslinking reaction is carried out for about 1 minute, about 30 minutes, about 1 hour, about 2 hours, about 3 hours, about 4 hours, about 5 hours, about 10 hours, about 16 hours, about 20 hours, about 24 hours, about 40 hours, about 48 hours, or about 72 hours.

The concentration of DNA aptamer used in the crosslinking reaction may be a concentration according to the judgment of those of skill in the art. In certain embodiments, the concentration of the DNA aptamer is about 0.00005-0.0005%, about 0.0001-0.001%, or about 0.00025-0.0025%.

Additional Aspects of DNA Aptamers and Protein Targets

Additional aspects and embodiments of DNA aptamers and protein targets described herein can be found in the art using ordinary skill and routine experimentation. For example, additional aptamers, aptamers configured to bind other targets, and protein targets can be found by searching publicly-available databases such as the Apta-Index™, which is freely and publicly available on the World Wide Web at https://www.aptagen.com/apta-index/. Searches can be performed, for example, by aptamer chemistry, target category, length, and other restrictions. Aptamers can then be found and tested using routine skill in the art.

Collagens

The collagen starting material used for producing crosslinked collagen material of the present invention can be a collagen or collagens of any type. In certain embodiments, the crosslinked collagen material of the present invention is produced from a collagen starting material comprising a fibril forming collagen. Fibril forming collagens include type I, type II, type III, type V, and type XI collagens. In other embodiments, the crosslinked of the present invention is produced from a collagen starting material comprising a fibril associated collagen. Fibril associated collagens include type IX, type XII, type XIV, type XVI, type XIX, and type XXI collagens. In other embodiments, the crosslinked collagen material of the present invention is produced from a collagen starting material comprising a sheet forming collagen. Sheet forming collagens include type IV, type VIII, and type X collagens. In yet other embodiments, the crosslinked collagen material of the present invention is produced from a collagen starting material comprising a beaded filament collagen or an anchoring fibril collagen. Beaded filament collagens and anchoring filament collagens include type VI collagen and type VII collagen, respectively. Other collagen types useful in the present methods include type XIII, type XV, type XVII, type XVIII, type XX, type XXII, type XXIII, type XXIV, type XXV, type XXVI, type XXVII, and type XXVIII collagen. (See Haralson and Hassell, Extracellular Matrix, A Practical Approach, 8-11, Oxford University Press, 1995, the contents of which is hereby incorporated by reference in its entirety.) In a particular embodiment, a fibril forming collagen (i.e., type I, type II, type III, type V, or type XI collagen) is the collagen starting material used to produce crosslinked collagen according to the methods of the present invention.

In one embodiment, the collagen starting material useful for producing crosslinked collagen material is recombinant collagen. In another embodiment, the collagen starting material useful for producing crosslinked collagen material is recombinant human collagen. The use of any single type of recombinant collagen (e.g., recombinant type I collagen, recombinant type II collagen, recombinant type III collagen, etc.) or any mixture of more than one type of recombinant collagen (e.g., a mixture of recombinant type I collagen and recombinant type III collagen) as the collagen starting material for producing a crosslinked collagen material is specifically contemplated by the present invention. Recombinant collagens and methods of their production have been described in, e.g., International Publication Nos. WO 2006/052451 and WO 1993/007889, each of which is hereby incorporated by reference in its entirety.

Production of other collagens suitable for use in the present compositions and methods can be specifically engineered using molecular biology techniques known to one of skill in the art. Such collagens can be modified by, e.g., an alteration in the polypeptide coding sequence, including deletion, substitutions, insertions, etc., to increase resistance to degradation. For example, recombinant collagens with alterations in the amino acid sequence at specific protease cleavage sites can be produced. Accordingly, in one embodiment, the present invention provides novel compositions comprising collagen, wherein the collagen is a recombinant Type III collagen.

The methods of the present invention are useful for producing crosslinked collagen materials using recombinant collagen (e.g., recombinant human collagen) as the collagen starting material. Unlike naturally-derived collagens, recombinant collagens lack intermolecular and intramolecular crosslinks that, if present, help stabilize the collagen material (including collagen fibrils) under conditions suitable for various crosslinking reactions, including, for example, basic pH conditions (e.g., pH≥8) or increased temperature (e.g., temperature≥40° C.). Under such conditions, recombinant collagens and, in particular, recombinant collagen fibrils made from recombinant collagens, are unstable, resulting in fibril dissolution and triple helix melting.

Crosslinked Collagen Materials

The present invention provides crosslinked collagen materials. In some embodiments, the invention provides crosslinked recombinant collagen suitable for implantation into a human or animal body. Such a crosslinked recombinant collagen implant is suitable for medical or cosmetic use. Typically, crosslinked recombinant collagen according to the invention is implanted or injected into various regions of the skin or dermis, depending on the particular application or cosmetic procedure, including dermal, intradermal, and subcutaneous injection or implantation. The crosslinked collagen materials of the present invention can also be injected or implanted superficially, such as, for example, within the papillary layer of the dermis, or can be injected or implanted within the reticular layer of the dermis. Materials for injection or implantation into the skin, in particular for cosmetic benefit, are often referred to in the art as "dermal fillers". Accordingly, in one embodiment, a dermal filler, typically a cosmetic dermal filler, comprising crosslinked recombinant collagen according to the invention is provided.

The crosslinked collagen materials of the present invention may be used to produce implantable collagen compositions. Production of implantable collagen compositions has been described in, e.g., International Publication No. WO 2006/052451, the contents of which is hereby incorporated by reference herein in its entirety. In certain embodiments, the present invention provides implantable collagen compositions, comprising at least one crosslinked collagen material. The crosslinked collagen material can be any crosslinked collagen of the invention, for instance crosslinked "fibril forming" collagen materials prepared by one of the methods described herein. In one aspect, the implantable collagen composition comprises crosslinked recombinant type III collagen material.

The crosslinked collagen materials of the present invention can be formulated or used at any concentration useful to those of skill in the art. In certain embodiments, the formulations of the materials of the invention comprise 0.03-0.3 mg/ml, 1-10 mg/ml.

It is understood that the compositions of the present invention can include additional components suitable to the particular formulation. For example, in certain embodiments, the implantable compositions of the present invention are intended for injection and are formulated in aqueous solutions. The compositions can be formulated to include pharmaceutically acceptable carriers and excipients. Such carriers and excipients are well-known in the art and can include, e.g., water, phosphate buffered saline (PBS) solutions, various solvents, and salts, etc., for example, physiologically compatible buffers including physiological saline buffers such as Hanks solution and Ringer's solution.

The amount of crosslinked collagen material appropriately included in a particular formulation is determined as standard in the art for such formulations, and is dictated by the intended use. In certain embodiments, the present invention provides implantable compositions comprising crosslinked collagen material wherein the collagen material is in aqueous solution at a concentration between about 0.03 to about 10 mg/ml.

Methods of Using Crosslinked Collagen Materials

The crosslinked collagen materials provided herein can be used in any method known or contemplated by those skilled in the art. In particular, the present crosslinked collagen materials can be used in any of the numerous medical and cosmetic applications, including tissue augmentation procedures, in which collagen is currently used. The present crosslinked collagen materials are suitable for use in tissue augmentation procedures. Use of the present crosslinked collagen materials in cosmetic as well as in medical procedures is specifically provided.

In one aspect, the present invention provides implantable compositions containing crosslinked collagen materials suitable for use in soft tissue augmentation procedures. The present compositions can be implanted or injected into various regions of the skin or dermis, depending on the particular application or cosmetic procedure, including dermal, intradermal, and subcutaneous injection or implantation. The crosslinked collagen materials of the present invention can also be injected or implanted superficially, such as, for example, within the papillary layer of the dermis, or can be injected or implanted within the reticular layer of the dermis.

In addition to soft tissue augmentation, use of the crosslinked collagen materials for hard tissue augmentation is provided by the present invention. The present crosslinked collagen materials are useful in various hard tissue augmentation applications, including, for example, as a bone-void filler, dental implant, etc.

Cosmetic uses of the crosslinked collagen materials of the present invention include treatment of fine lines, such as fine superficial facial lines, wrinkles, and scars, as well as treatment of pronounced lines, wrinkles, and scars. In some aspects, the crosslinked collagen materials of the present invention are used for other cosmetic uses, including treatment for or reducing transverse forehead lines, glabellar frown lines, nasolabial fold, vermilion border, periorbital lines, vertical lip lines, oral commissure, etc., as well as defining the lip border. The crosslinked collagen materials of the present invention are also useful for correcting contour deformities and distensible acne scars, or for treating other tissue defects, such as, for example, atrophy from disease or trauma or surgically-induced irregularities.

In certain embodiments, the crosslinked collagen materials of the present invention are used for surgical procedures involving tissue augmentation, tissue repair, or drug delivery. In some aspects, the crosslinked collagen materials are used for tissue augmentation in conditions such as urinary incontinence, vasicoureteral reflux, and gastroesophageal reflux. For example, crosslinked collagen materials of the present invention may be used to add tissue bulk to sphincters, such as a gastric or urinary sphincter, to provide proper closure and control. In instances of urinary incontinence, such as stress incontinence in women or incontinence following a prostatectomy in men, the crosslinked collagen materials of the invention may be provided to further compress the urethra to assist the sphincter muscle in closing, thus avoiding leakage of urine from the bladder.

Similarly, gastroesophageal reflux disease (GERD, also known as peptic esophagitis and reflux esophagitis) is a disorder that affects the lower esophageal sphincter, the muscle connecting the esophagus with the stomach. GERD occurs when the lower esophageal sphincter is incompetent, weak, or relaxes inappropriately, allowing stomach contents to flow up into the esophagus (i.e., reflux). Malfunction of the lower esophageal sphincter muscles, such as that resulting from muscle tonal loss, can lead to incomplete closure of the lower esophageal sphincter, causing back up of acid and other contents from the stomach into the esophagus. Poor response to dietary modification or medical treatment may require surgery to correct the dysfunction. In one embodiment, crosslinked collagen materials of the present invention are used in such procedures and, for example, are injected into the area of the esophageal sphincter to provide bulk to the lower esophageal sphincter.

In other embodiments, the crosslinked collagen materials of the invention are used to fill or block voids and lumens within the body. Such voids may include, but are not limited to, various lesions, fissures, diverticulae, cysts, fistulae, aneurysms, or other undesirable voids that may exist within the body; and lumens may include, but are not limited to, arteries, veins, intestines, Fallopian tubes, and trachea. For example, an effective amount of the present material may be administered into the lumen or void to provide partial or complete closure, or to facilitate repair of damaged tissue.

In other aspects, tissue repair is achieved by providing the crosslinked collagen material of the present invention to an area of tissue that has been diseased, wounded, or removed. In some embodiments, crosslinked collagen materials of the invention are used to fill in and/or smooth out soft tissue defects such as pockmarks or scars. In such cases, a formulation of the present invention is injected beneath the imperfection. The improved persistence of the present crosslinked collagen materials would be beneficial, e.g., by reducing the number and frequency of treatments required to obtain a satisfactorily result. In certain embodiments, the crosslinked collagen materials are used for intracordal injections of the larynx, thus changing the shape of this soft tissue mass and facilitating vocal function. Such use is specifically provided for the treatment of unilateral vocal cord paralysis. Further, the present invention provides use of the crosslinked collagen materials in mammary implants, or to correct congenital anomalies, acquired defects, or cosmetic defects.

The present crosslinked collagen materials can also be used in various surgical or other procedures for remodeling or restructuring of various external or internal features, e.g., plastic surgery for corrective or cosmetic means, etc.

In any of the embodiments described above, the present crosslinked collagen materials may be used for drug delivery, for example, to deliver drugs to an injection site. The drugs can be delivered in a sustained manner from an in vivo depot formed by the crosslinked collagen upon injection of an implantable composition of the present invention. Drugs delivered in this manner may thus enhance tissue repair, and could provide additional therapeutic benefit.

In additional embodiments, the invention further contemplates incorporation of cells into the crosslinked collagen materials to provide a means for delivering cells to repopulate a damaged or diseased tissue or to provide products synthesized by the cells to the tissues surrounding the injection site.

In any of the embodiments described above, the crosslinked collagen materials of the present invention may be delivered or administered by any suitable method known or contemplated by those of skill in the art. The invention specifically contemplates delivery by injection, e.g., using a syringe. In some embodiments, the crosslinked collagen materials may additionally contain a biocompatible fluid that functions as a lubricant to improve the injectability of the formulation. The crosslinked collagen materials of the invention can be introduced into the tissue site by injection, including, e.g., intradermal, subdermal, or subcutaneous injection.

Methods of Transfection Using Crosslinked Collagen Materials

Collagen loaded with plasmid DNA (pDNA) vectors has been shown to facilitate cellular uptake of the vector. At the same time, calcium phosphate nanoparticles coated with pDNA vectors are a classical strategy for non-viral transfection. As described herein, a DNA-collagen complex material made with a pDNA vector that has then been subsequently mineralized with nanoparticles of calcium phosphate may impart greater or comparable transfection efficiency to each separate strategy.

Methods of transfection using crosslinked collagen materials as described herein can be utilized to introduce exogenous agents (for example nucleic acids, plasmid vectors, viral vectors, and the like) into cells in need thereof. Cells in need thereof can be mammalian cells, for example osteoblasts.

In an embodiment, the calcium phosphate has been precipitated by mixing aqueous solutions of sodium chloride, sodium phosphate dibasic, and calcium chloride with up to these final concentrations after mixing. 36 mm NaCl, 8 mm $Na_2HPO_4$, 15 mm $CaCl_2$ Kits Comprising Crosslinked Collagen Materials One embodiment of the present invention provides kits comprising the crosslinked collagen materials of the invention. For example, the present invention provides kits for augmenting or replacing tissue of a mammal. The kits comprise one or more crosslinked collagen materials of the present invention in a package for distribution to a practitioner of skill in the art. The kits can comprise a label or labeling with instructions on using the crosslinked collagen material for augmenting or replacing tissue of a mammal according to the methods of the invention. In certain embodiments, the kits can comprise components useful for carrying out the methods such as means for administering a crosslinked collagen material such as one or more syringes, canulas, catheters, needles, etc. In certain embodiments, the kits can comprise components useful for the safe disposal of means for administering the crosslinked collagen material (e.g. a 'sharps' container for used syringes). In certain embodiments, the kits can comprise crosslinked collagen material in pre-filled syringes, unit-dose or unit-of-use packages.

The practice of the present invention will employ, unless otherwise indicated, conventional methods of chemistry, biochemistry, molecular biology, cell biology, genetics, immunology and pharmacology, within the skill of the art. Such techniques are explained fully in the literature. See, e.g., Gennaro, A. R., ed. (1990) Remington's Pharmaceutical Sciences, 18th ed., Mack Publishing Co.; Hardman, J. G., Limbird, L. E., and Gilman, A. G., eds. (2001) The Pharmacological Basis of Therapeutics, 10th ed., McGraw-Hill CO.; Colowick, S. et al., eds., Methods In Enzymology, Academic Press, Inc.; Weir, D. M., and Blackwell, C. C., eds. (1986) Handbook of Experimental Immunology, Vols. I-IV, Blackwell Scientific Publications; Maniatis, T. et al., eds. (1989) Molecular Cloning: A Laboratory Manual, 2nd edition, Vols. I-III, Cold Spring Harbor Laboratory Press; Ausubel, F. M. et al., eds. (1999) Short Protocols in Molecular Biology, 4th edition, John Wiley & Sons; Ream et al., eds. (1998) Molecular Biology Techniques: An Intensive Laboratory Course, Academic Press; Newton, C. R., and Graham, A., eds. (1997) PCR (Introduction to Biotechniques Series), 2nd ed., Springer Verlag.

Additional Uses of Crosslinked Collagen Materials

In embodiments according to the present disclosure, applications of the present disclosure include but are not limited to:

Bone tissue engineering (calcium phosphate, DNA, Collagen Type I);
Cartilage tissue engineering (DNA, Collagen Type II);
Vascular tissue engineering (DNA, Collagen Type I, Ill, IV);
Neural tissue engineering (DNA, Collagen I, IV);
Gene delivery (calcium phosphate, pDNA, Collagen);
siRNA delivery (calcium phosphate, siRNA, Collagen);
Biomaterial surface coating (example dental/orthopedic implant coating);
Injectable 3D gel—cartilage, bone, heart patch;
Cell embeddable;
3D bioprintable (2 solutions that come together: 1) calcium chloride and DNA and 2) cells-collagen-sodium phosphate)
Biomimetic, Biocompatible, Instantaneous; and the nucleic acids can be ds/ssDNA, plasmid DNA, DNA aptamer, DNA origami, and RNA variants.
Models of drug discovery or other in vitro assays for bone and/or calcification/mineralization.
Aspects of the present disclosure also have dental aspects as teeth are mineralized tissue, and DNA of complexes are described herein can bind to a mineral (for example calcium phosphate or hydroxyapatite) to create more of a bone mimetic material.

A number of embodiments of the invention have been described. Nevertheless, it will be understood that various modifications may be made without departing from the spirit and scope of the invention. Accordingly, other embodiments are within the scope of the following claims.

EXAMPLES

Example 1

Effect of Premixing Aptamer and Collagen Versus Pre-Conjugation of Aptamer Followed by Addition of Collagen The effect of premixing aptamer and collagen versus pre-conjugate of aptamer followed by addition of collagen was examined.

Materials and Methods
Aptamer Sequences
 scrambled=5AmMC6/TAA AAC GCG CTT AAG CTG GTG TTA CTC GAG CGG TCT TCT ATT GAA ATA ATT TCT GAA GGC ACA CGA CAT ATG ATC TTC AG (SEQ ID NO:1). 5AmMC6 specifies a terminal amino group with 6 carbon spacer was conjugated to the 5' end of the oligonucleotide sequence.
Experimental Conditions
 Mixtures of scrambled aptamer (1 µM) were mixed with rat tail type I collagen (0.3 mg/mL). Mixtures were at 10, 30, 50% volume fraction collagen. Mixtures were incubated at room temperature for 24 hours prior to surface conjugation. Solutions were used to conjugate to surface with 20 µM sulfo-SANPAH and incubated at room temperature for 24 hours. Surfaces were also conjugated with 1 and 2 µM solutions of scrambled aptamer and 20 µM sulfo-SANPAH and then incubated with 0.3 mg/mL and 0.6 mg/mL solutions of rat tail type I collagen.
Results
 As show in FIG. 1, with premixed solutions, large fibers formed at 10 and 30% volume fraction collagen. At 30% volume fraction collagen surfaces and fibers appeared fuzzy for all aptamers. At 50% volume fraction there were no fibers.
 With pre-conjugation with aptamer, there was no discernable fiber formation at all treatments. Surface wetting character observed to be changed from that of only an aptamer conjugated surface, which indicates collagen has adsorbed to the surface. The aptamer needs to have free mobility for fiber formation.

Example 2

Aptamer-Collagen Complex Kinetics Measured by Turbidity

Figure 3A:
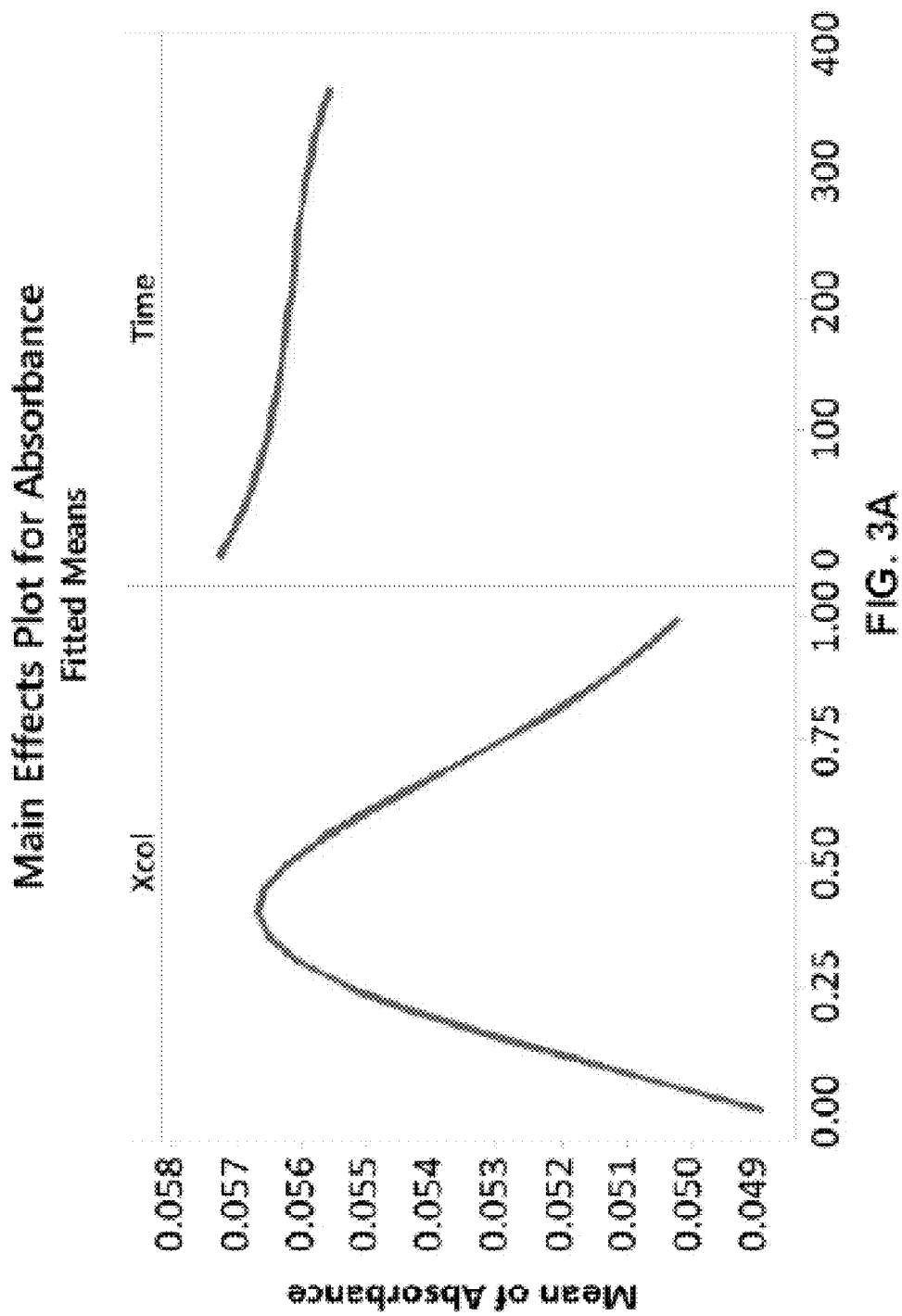
FIGS. 3A and 3B show regression model effects. The main effects plot shows that fiber formation is dependent on the volume fraction of collagen in solution with a maximum around 0.2-0.4. In addition, there is little change in turbidity over time indicating that fibers formed very rapidly upon ssDNA and collagen mixing (FIG. 3A). These trends are independent as shown by the interaction plot (FIG. 3B).
Figure 3B:
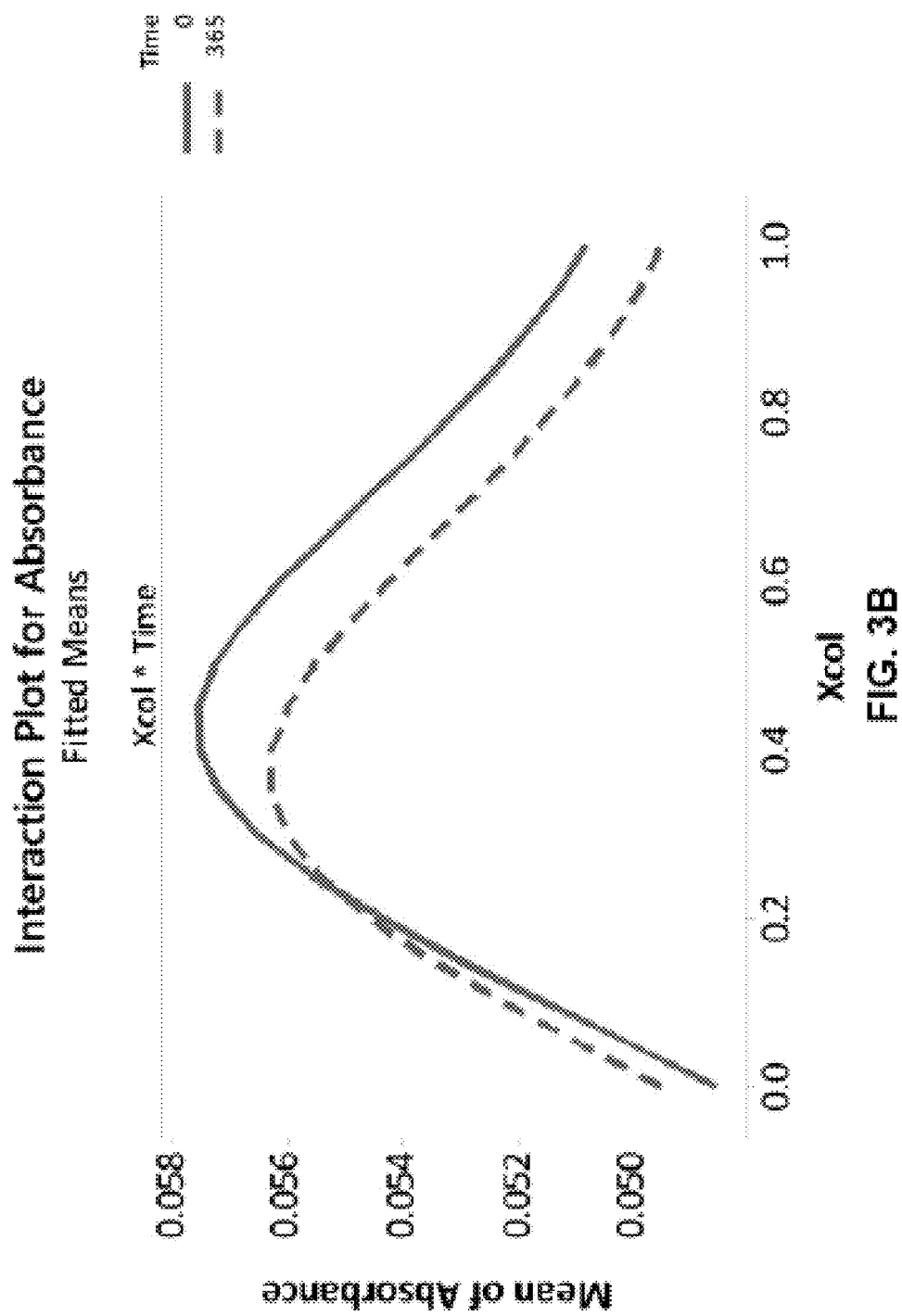

Materials and Methods
Experimental Conditions
 In 96 well plate, mixtures of scrambled aptamer (1 µM) were mixed with rat tail type I collagen (0.3 mg/mL). Mixtures were at 10% increments from 0% to 100% volume fraction collagen with 2 replicates. Turbidity measured over time immediately following mixing for six hours at 5 minute increments at 400 nm using a BioTek plate reader in absorbance mode. Data was fit with $3^{rd}$ order interactive regression model with factors of time, collagen fraction, and aptamer type (FIGS. 2A to 2D).
Results
 Turbidity showed little change with time (FIG. 3A). Turbidity showed maximum at 20-40% volume fraction collagen (FIG. 3B).

Example 3

Confirmation of DNA Present in Self-Assembled Collagen Fibers

Figures 4A, 4B:
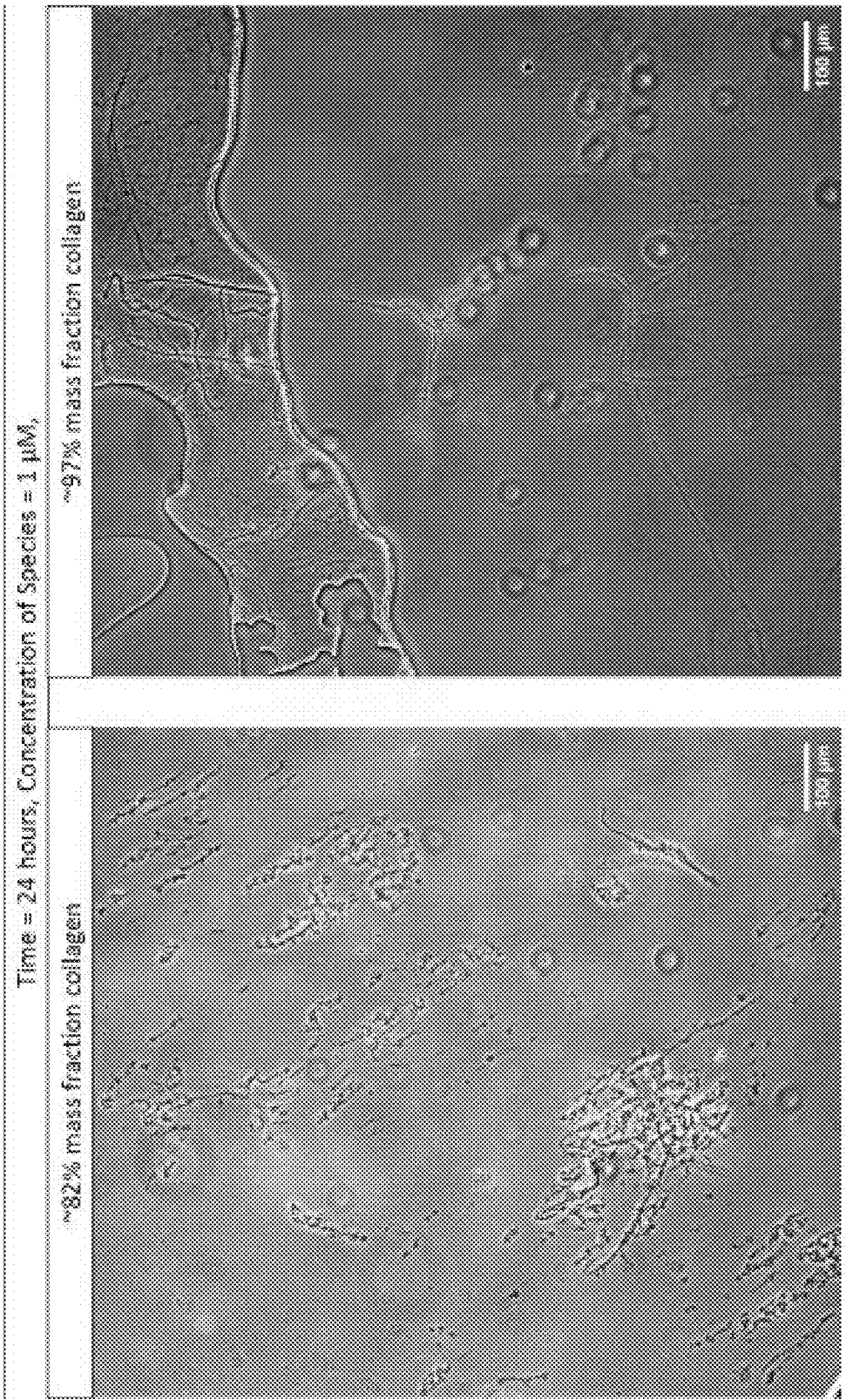
FIGS. 4A and 4B show ssDNA localizes and is present in the fibers as indicated by red fluorescence from ethidium bromide homodimer staining.

Materials and Methods
Experimental Conditions
 In 96 well plate, mixtures of scrambled aptamer (1 µM) were mixed with rat tail type I collagen (0.3 mg/mL). Mixtures were at 10% increments from 0% to 100% volume fraction collagen with 2 replicates. Mixtures were incubated at room temperature for 24 hours. 10 µL aliquots of 30 and 70% volume fraction collagen were taken and placed on slides. They were then stained with ethidium bromide homodimer.
Results
 Fibers were stained for DNA at high and low concentrations of collagen. Structurally fibers looked fuzzy at 30% collagen and more whispy/defined at 70% collagen (FIGS. 4A and 4B).

Example 4

Aptamer-Collagen Binding Measurement

Figure 5A:
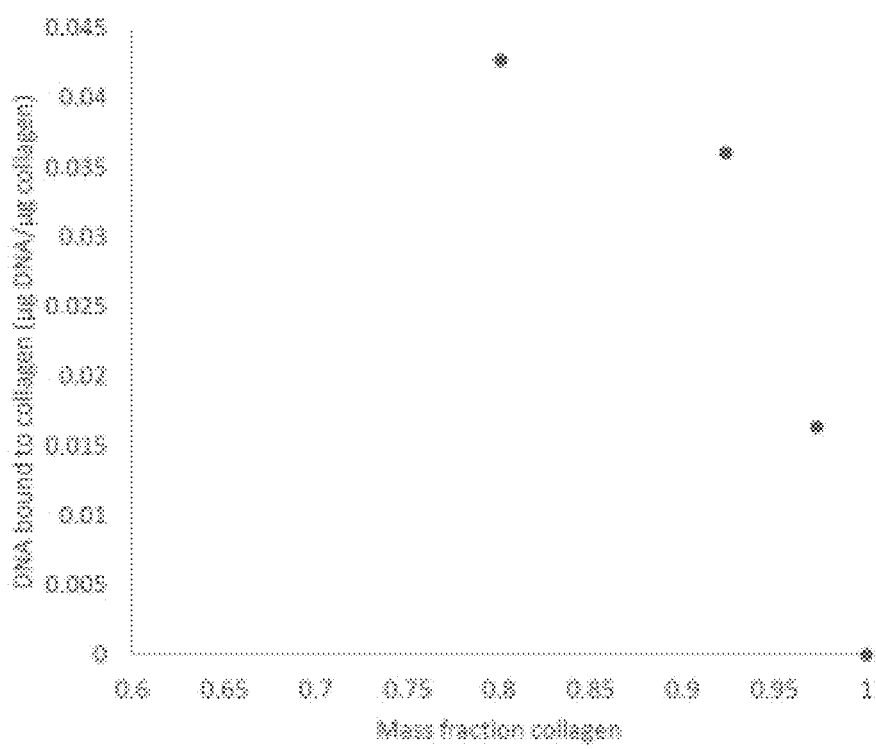
FIGS. 5A and 5B show ssDNA binding to collagen increases with decreasing amount of collagen in solution relative to the amount of ssDNA in solution (FIG. 5A). In addition, the amount of ssDNA binding increases as more collagen is available in solution (FIG. 5B).
Figure 5B:
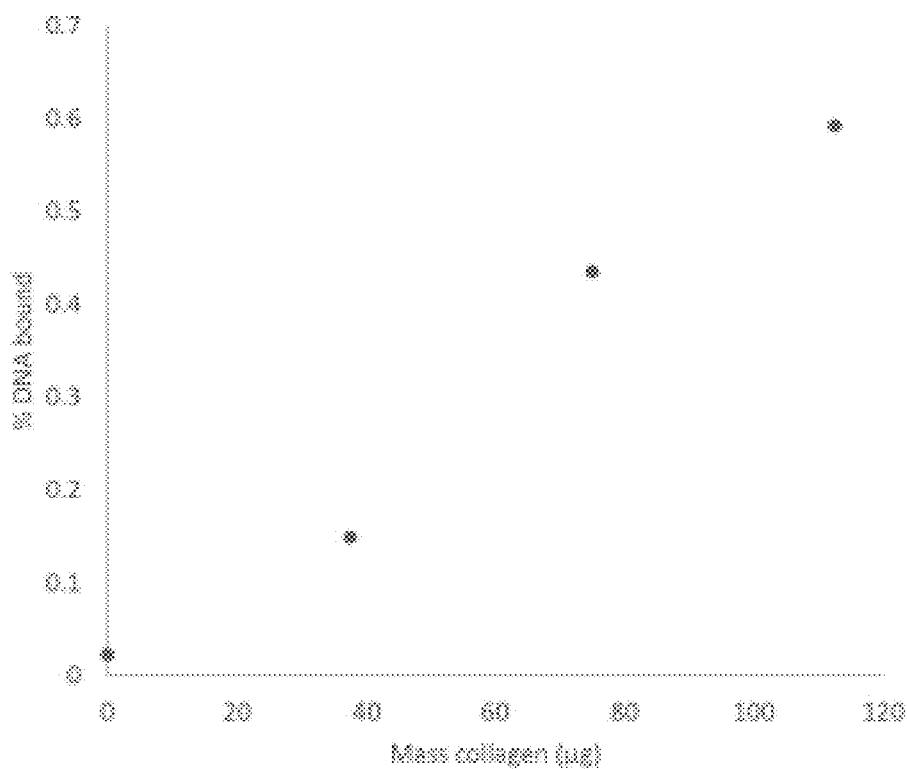

Materials and Methods
Experimental Conditions
 In 96 well plate, mixtures of scrambled aptamer (1 µM) were mixed with rat tail type I collagen (0.3 mg/mL). Mixtures were at 25% increments from 0% to 100% volume fraction collagen with 1 replicate. Solutions were incubated at room temperature for 2 hours and then SYBR Safe DNA stain was added in a 2:1 ratio to the aptamer-collagen solutions and incubated for 30 minutes in the dark at room temperature. The solutions were centrifuged at 2000 g for 5 minutes and the supernatant was added to a 96 well plate giving 2 repeats per solution. Fluorescent intensity was measured by exciting at 488 nm and reading emission at 520 nm.
Results
 Standard curves were linear. The percent DNA bound increased with increased amount of collagen in solution (FIG. 5B). The amount of DNA bound to a given amount of collagen decreased with increased fraction of collagen in solution (FIG. 5A), which indicates that the DNA is distributed amongst the collagen.

Example 5

Aptamer Predicted Structures

Figure 6:
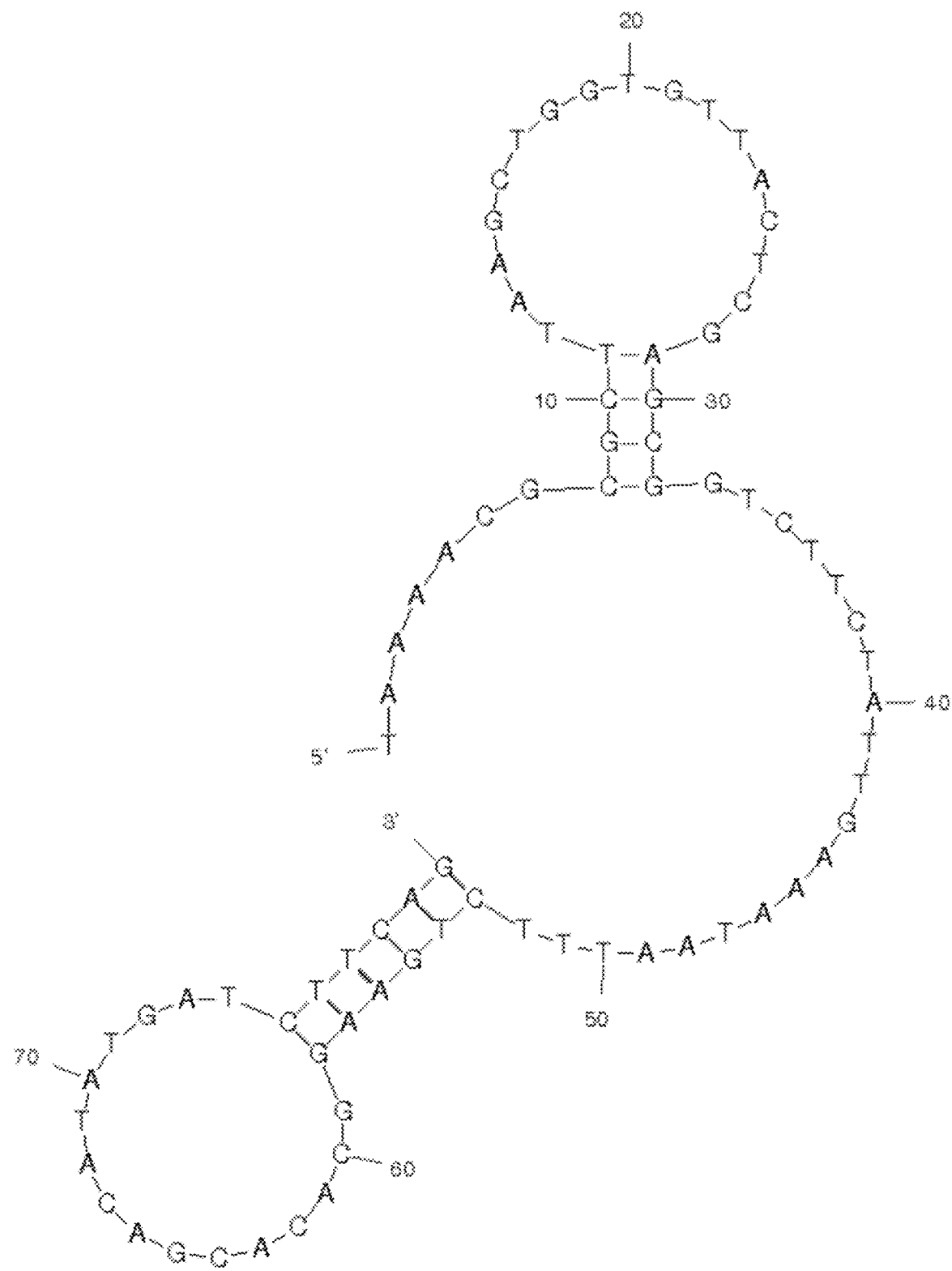
FIG. 6 is an illustration of example aptamers disclosed herein.

Materials and Methods
Experimental Conditions
 Calculated using mFold hosted by The RNA Institute at the University of Albany SUNY. Conditions for calculations were 25° C., 10 mM [Na+], oligomer corrected.
Results
 Three thermodynamically stable configurations were found. Two had hairpins, and 1 had 2 hairpins (FIG. 6).

Example 6

Figure 7:
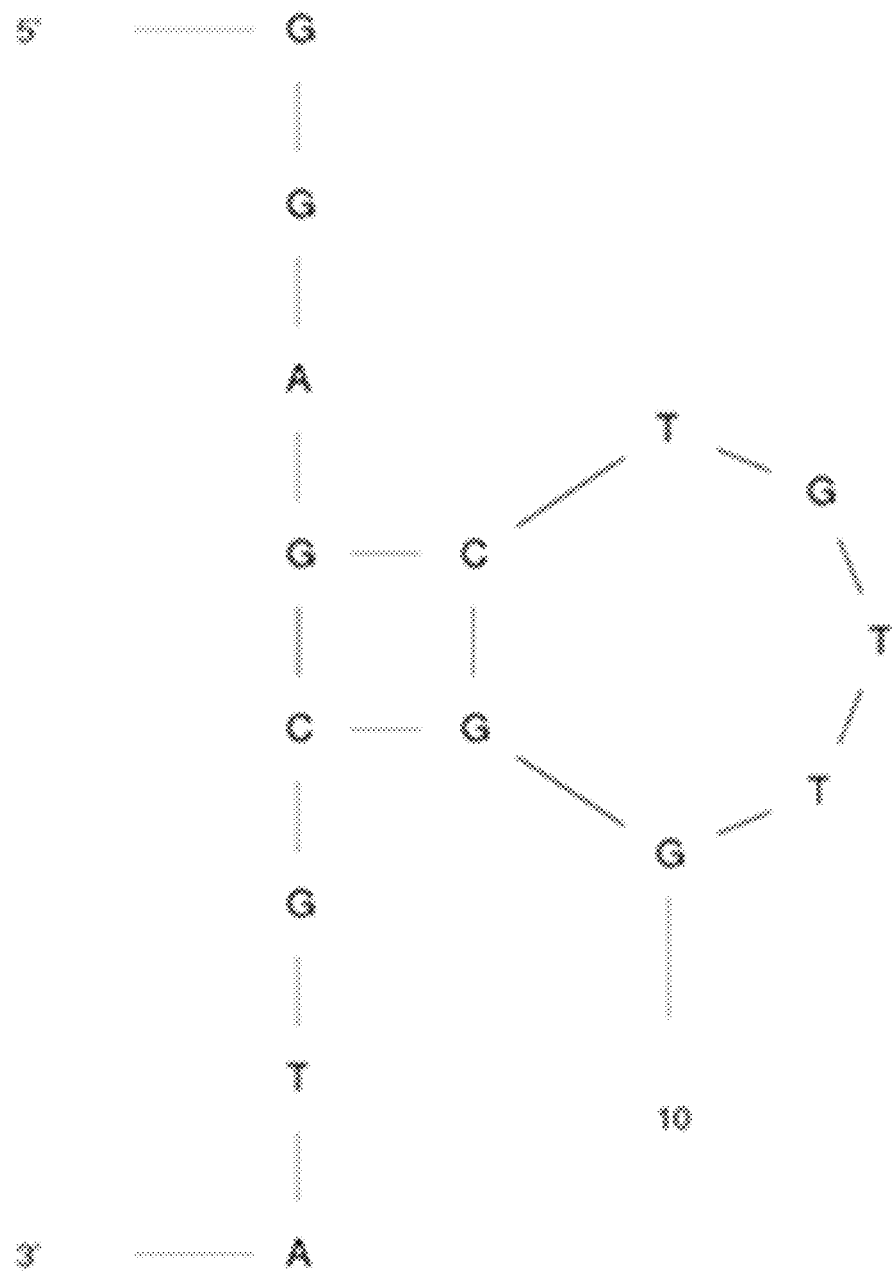
FIG. 7 shows sequences and predicted structures of random 15, 33, 45, and 90 nucleotide (nt) ssDNA oligomers. Predicted structures were calculated using the mFold web server.

FIG. 7 shows sequences and predicted structures of random 15, 33, 45, and 90 nucleotide (nt) ssDNA oligomers (SEQ ID NO:2, SEQ ID NO:3, SEQ ID NO:4, SEQ ID NO:5). Lowest energy predicted structures were calculated using the mFold web server.
 FIGS. 8A to 8C ssDNA oligomers with 15, 33, 45, and 90 nucleotides (nt) and their binding to type I collagen. ssDNA binding to collagen measured as the mass of bound DNA per mass of collagen as a function of mass fraction of DNA in solution (FIG. 8A). ssDNA binding to collagen measured as the moles of bound DNA per mass of collagen as a function of mass fraction of DNA in solution (FIG. 8B). The horizontal bars in (FIG. 8B) represent the range of DNA mass fraction where fiber formation was observed, from the top oligomers were 15, 33, 45 and 90 nt, respectively. When value for maximum binding from (FIG. 8B) of each oligomer was plotted against the inverse of the oligomer molecular weight, the data followed a linear relationship with $R^2>0.95$ (FIG. 8C). ssDNA binding was measured in triplicate. Data is presented as mean±standard deviation.

At first, ssDNA oligomer length appeared to have no effect when measured as the amount of bound DNA per available collagen on a mass per mass basis (FIG. 8A). ssDNA oligomer binding peaked at ~0.15 μg ssDNA/μg collagen which occurred between 12-18% mass fraction of DNA in solution. Interestingly, the 90 nucleotide ssDNA oligomer displayed reduced binding with increasing mass fraction of DNA in solution after its maximum binding. However, when measured as the amount of bound DNA per available collagen on a mole per mass basis the effect of length was revealed (FIG. 8B). The shorter the ssDNA oligomer, the more molecules of ssDNA would complex with a given mass of collagen. We evaluated the trend using the maximum amount of bound ssDNA per amount of collagen. (FIG. 8B). The maximum binding followed an inverse relationship with ssDNA oligomer molecular weight (length), reinforcing that shorter ssDNA has an avidity for binding with collagen (FIG. 8C).

Figure 9:
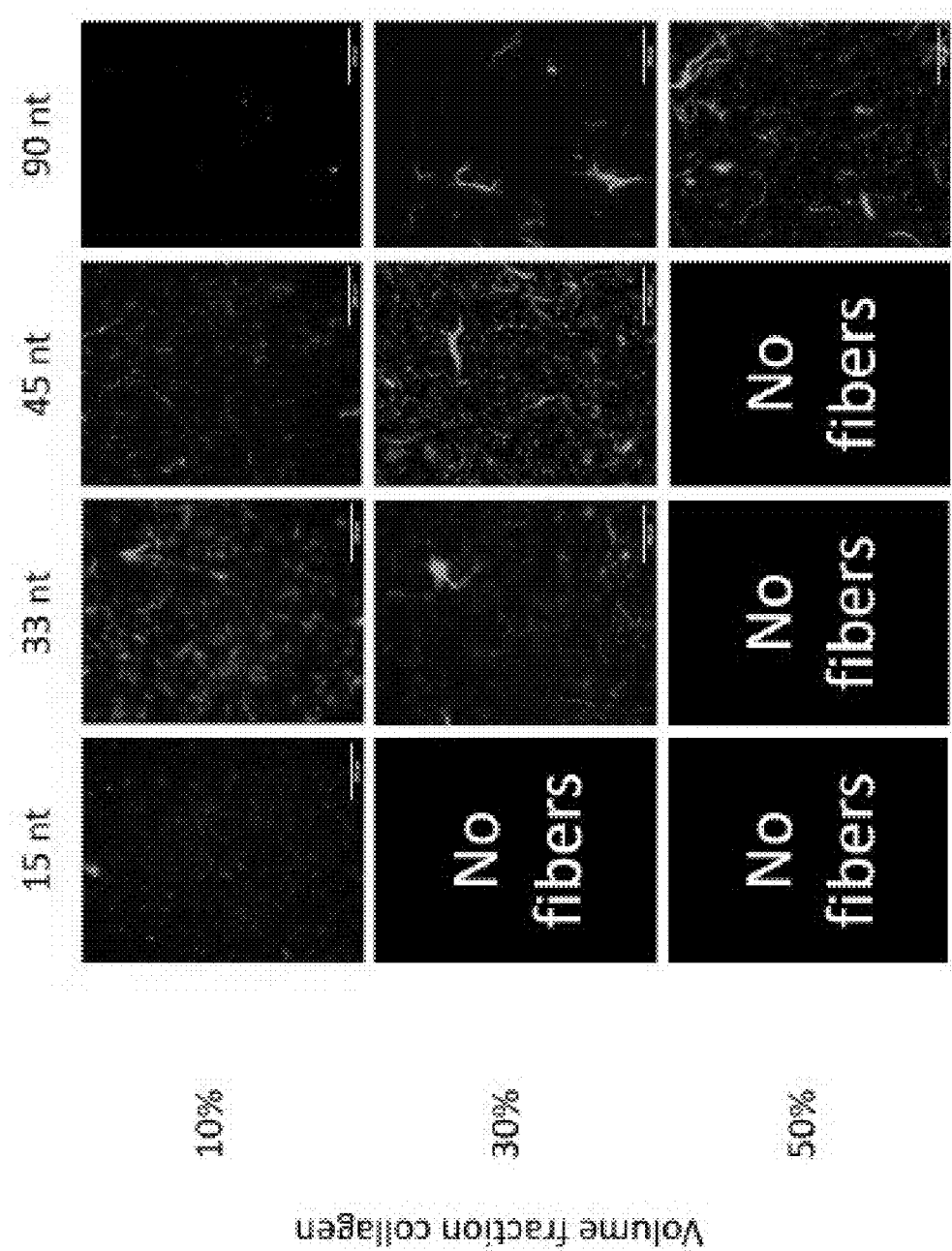
FIG. 9 shows representative fluorescence microscopy images of immobilized ssDNA-collagen fibers formed ssDNA with lengths of 15, 33, 45, and 90 nucleotides (nt) and different volume fractions of collagen. ssDNA in the fibers was fluorescently labeled using SYBR Safe DNA stain.

FIG. 9 shows representative fluorescence microscopy images of immobilized ssDNA-collagen fibers formed ssDNA with lengths of 15, 33, 45, and 90 nucleotides (nt) and different volume fractions of collagen. ssDNA in the fibers was fluorescently labeled using SYBR Safe DNA stain.

Fibers formed with varying density and size distribution for different volume fractions of collagen, favoring volume fractions of collagen that equated to mass fractions of DNA in solution in the range of 8-30%. This corresponded to DNA-collagen binding greater than 0.05 μg bound ssDNA/μg collagen. However, as shown by the 90 nucleotide ssDNA, there is an optimal range for fiber formation. For a mass fraction of DNA in solution of ~45%, no fibers were observed; instead, a few faint ssDNA rich globs were present potentially the result of ssDNA self-aggregation and/or a lack of sufficient collagen in solution.

Example 7

Figure 10A:
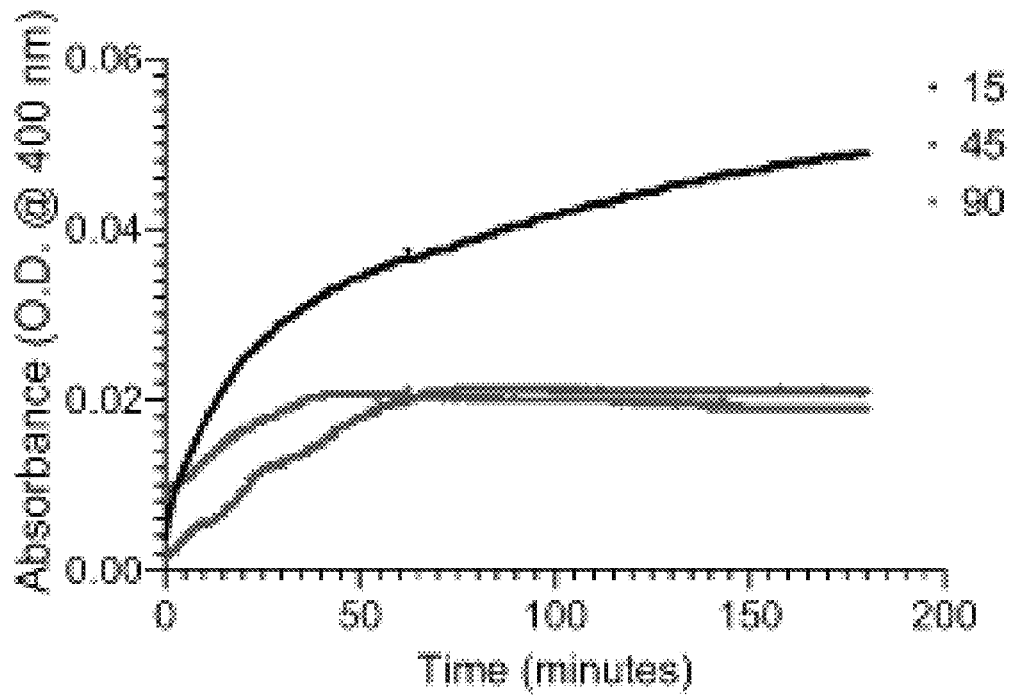
FIGS. 10A-10B are plots showing complexation kinetics of complex formation.
Figure 10B:
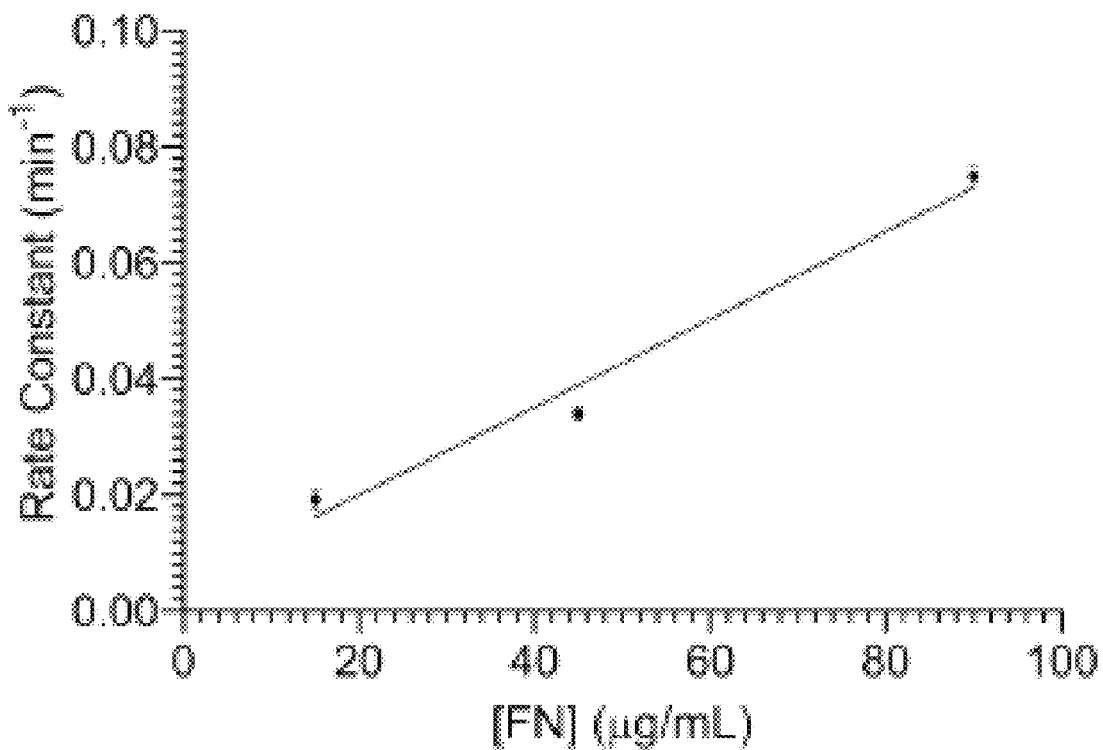
Figure 11B:
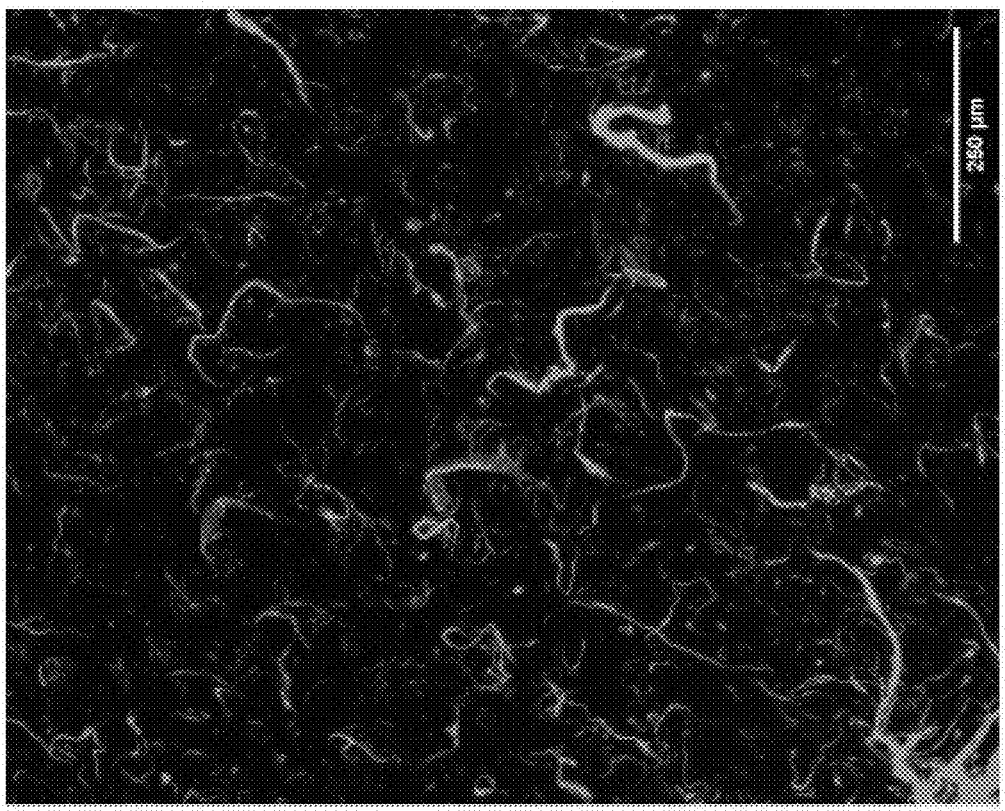
FIGS. 11A-11B are fluorescent micrographs of fibers formed without (FIG. 11A) and with (FIG. 11B) fibronectic.
Figure 11A:
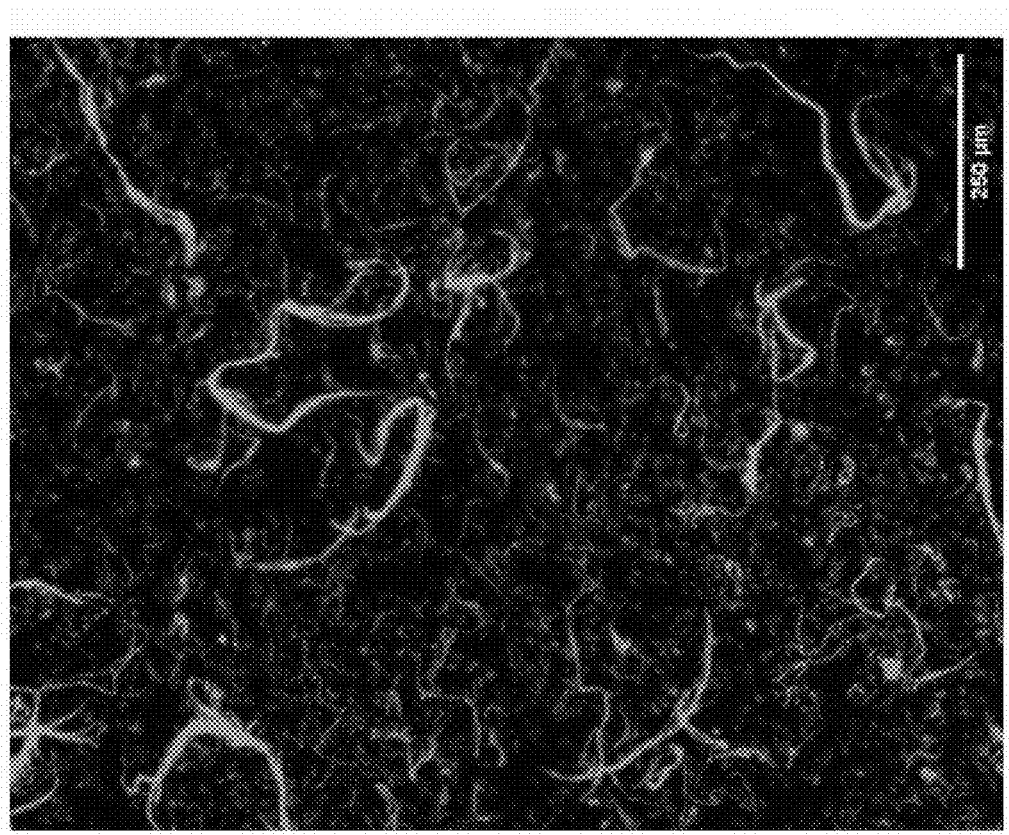

Effect of ECM Components—Fibronectin
Experimental Conditions
  Fibers formed with a random 80 nucleotide ssDNA sequence at 10 μM and collagen at 0.3 mg/mL using a 30% volume fraction collagen mixing ratio
  Mixture is known to give fibers
  Final concentrations 0.7 μM DNA (17.4 μg/mL) and 90 μg/mL collagen and 15,45,90 μg/mL fibronectin
  5-8 replicates
  SYBR Safe DNA stain diluted in deionized water and deionized water used to dilute to final concentrations
  Plated as 200 μL in a clear bottom black walled 96 well plate
  Immediately absorbance at 400 nm was measured every 15 seconds for 3 hours following addition of collagen to wells in the plate reader
  Data then averaged, baseline-corrected, and fit with an exponential plateau model
As shown in FIGS. 10A-10B, increasing concentrations of FN increases the time for complex formation. Fibronectin (FN) is another extracellular matrix protein that signals cells. Furthermore, as demonstrated in FIGS. 11A-11B, there is no large qualitative difference is apparent between fibers formed in the presence of FN at the concentration used (5 μg/mL)

Example 8

Figure 12A:
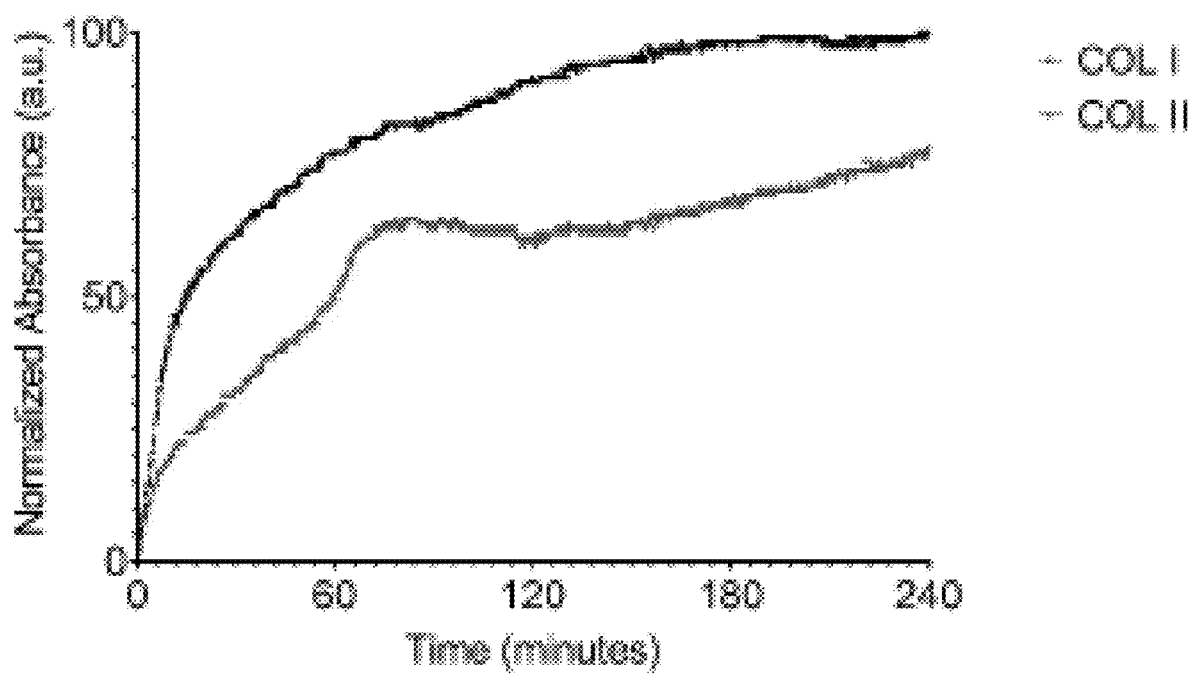
FIGS. 12A-12B are plots showing formation kinetics of fibers formed with collagen I and collagen II.
Figure 12B:
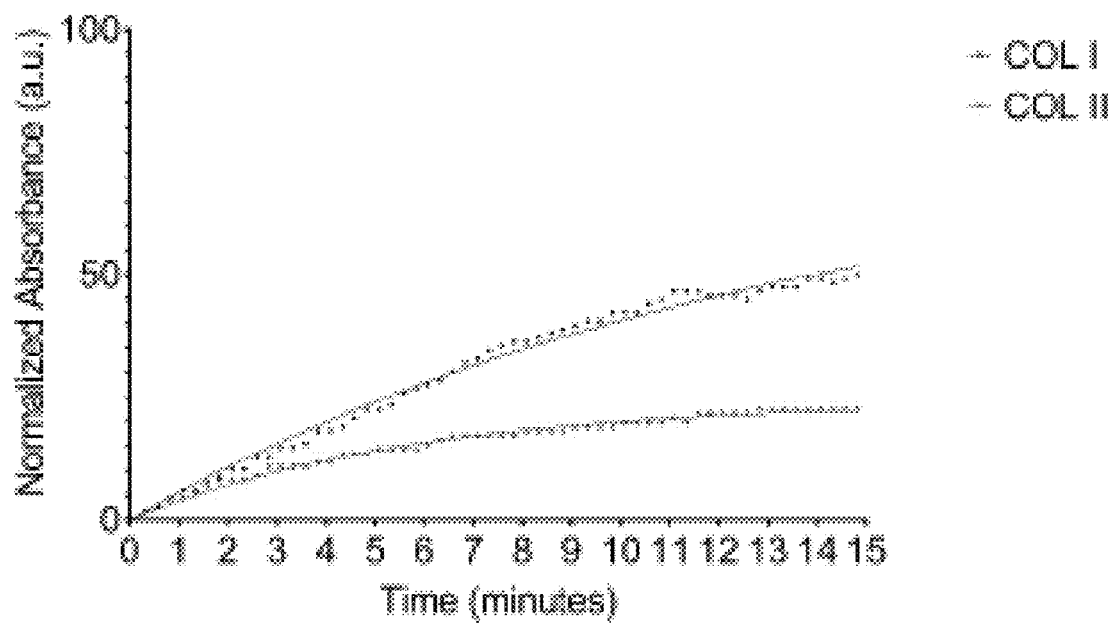
Figures 13A, 13B:
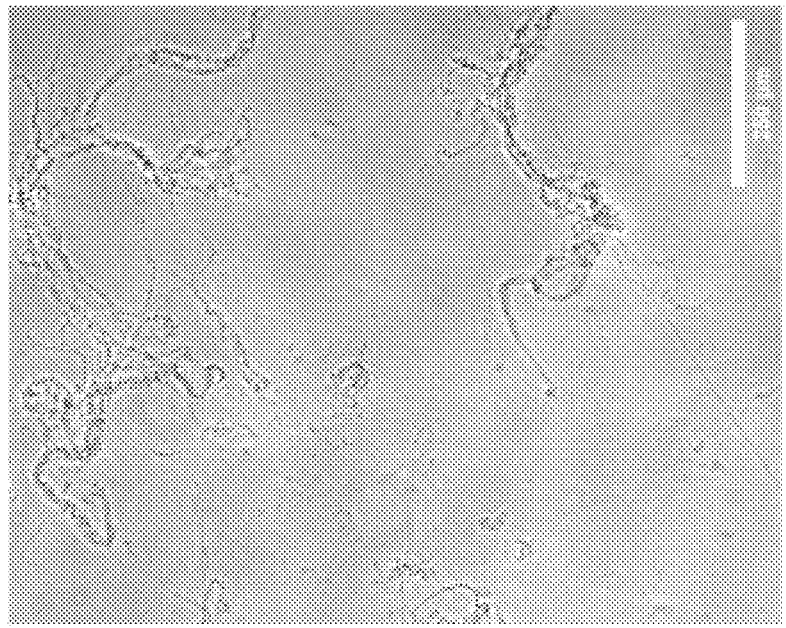
FIGS. 13A-13B are bright field micrographs showing differences in fibers made with collagen I (FIG. 13A) and collagen II (FIG. 13B).

Effect of Collagen Type—Collagen Type II (COLII)
Experimental Conditions
  Fibers formed with VEGFR2 aptamer monovalent at 10 μM and collagen at 0.3 mg/mL using a 30% volume fraction collagen mixing ratio
  Known to give fibers
  Final concentrations 0.7 μM DNA and 90 μg/mL collagen
  Type I and Type II collagens used
  3 replicates
  SYBR Safe DNA stain diluted in deionized water and deionized water used to dilute to final concentrations
  Plated as 200 μL in a clear bottom black walled 96 well plate
  Immediately absorbance at 400 nm was measured every 15 seconds for 4 hours following addition of collagen to wells in the plate reader
  Data then averaged, baseline-corrected, and fit with an exponential plateau model
  Fibers formed with VEGF-R2 aptamer sequence at 1 μM and collagen at 0.3 mg/mL using a 30% volume fraction collagen mixing ratio
  Final concentrations 0.7 μM DNA and 90 μg/mL collagen
  Type I and Type II collagens used
As shown in FIGS. 12A-12B, collagen Type II (COL II) formed fibers slower than collagen Type I (COL I). As shown in FIGS. 13A-13B, there is no apparent difference in fiber morphology between collagen I and collagen II.

Example 9

Experimental Conditions
  Mineralizing aptamer sequences from DOI:10.1021/acsbiomaterials.9b00308

```
Aptamer G (SEQ ID NO: 9):
5'-CAG GTG GGC GCG CTG TCG TGG GTG CTC GGG TGC

GGT TGG G-3';

Aptamer G- (SEQ ID NO: 10):
5'-CAG GTG CGC GCG CTG TCG TGC GTG CTC GCG TGC

GGT TGC G-3';

Aptamer G+ (SEQ ID NO: 11):
5'-CAG GTG GGG GCG CTG TCG TGG GGG CTC GGG GGC

GGT GGG G-3';

Sequence R (SEQ ID NO: 12):
5'-TAA AAC GCG CTT AAG CTG GTG TTA CTC GAG CGG

TCT TCT A-3'.
```

Diluted to 1 μM in deionized water and mixed with 0.3 mg/mL rat tail type I collagen at a 10, 20, 30, 40, 50% volume fraction collagen
  Surface functionalized using 20 μM sulfo-SANPAH
  Incubated with 8 mM NaH2PO4, 25 mM NaCl, 15 mM CaCl2 for 1 hour
  Imaged
  Stained with 38.89 mM Alizarin Red Stain for 30 minutes
  Rinsed thrice and imaged
Results
  Fibers mineralized in about 15 minutes
  Calcium is bound to fibers as shown by Alizarin Red stain
  Fixing not necessary After repeated rinsing mineral remains on fibers
Fibers required for mineralization
No fibers (>30% VFC and pure collagen)
Data suggests possible difference in mineralization with sequence and with fiber composition (10% vs 20% VFC)

Figure 14:
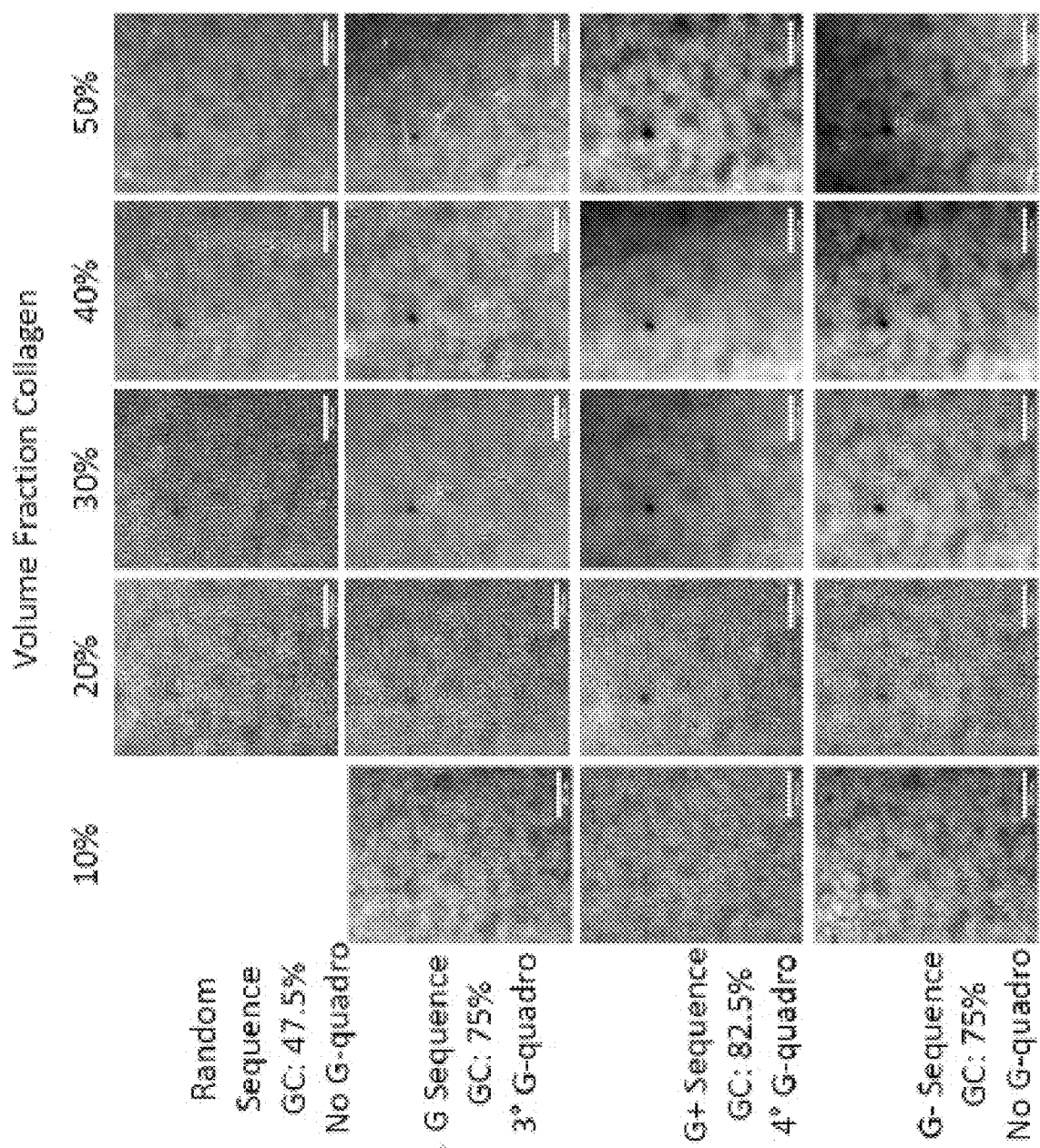
FIG. 14 shows bright field micrographs using aptamers of random sequence, aptamers with a G sequence, aptamers with a G+ sequence, aptamers with a G− with 10%, 20%, 30%, 40%, and 50% volume fraction of collagen.

FIG. 14 shows bright field micrographs using aptamers of random sequence, aptamers with a G sequence, aptamers with a G+ sequence, aptamers with a G− with 10%, 20%, 30%, 40%, and 50% volume fraction of collagen.

Figure 15A:
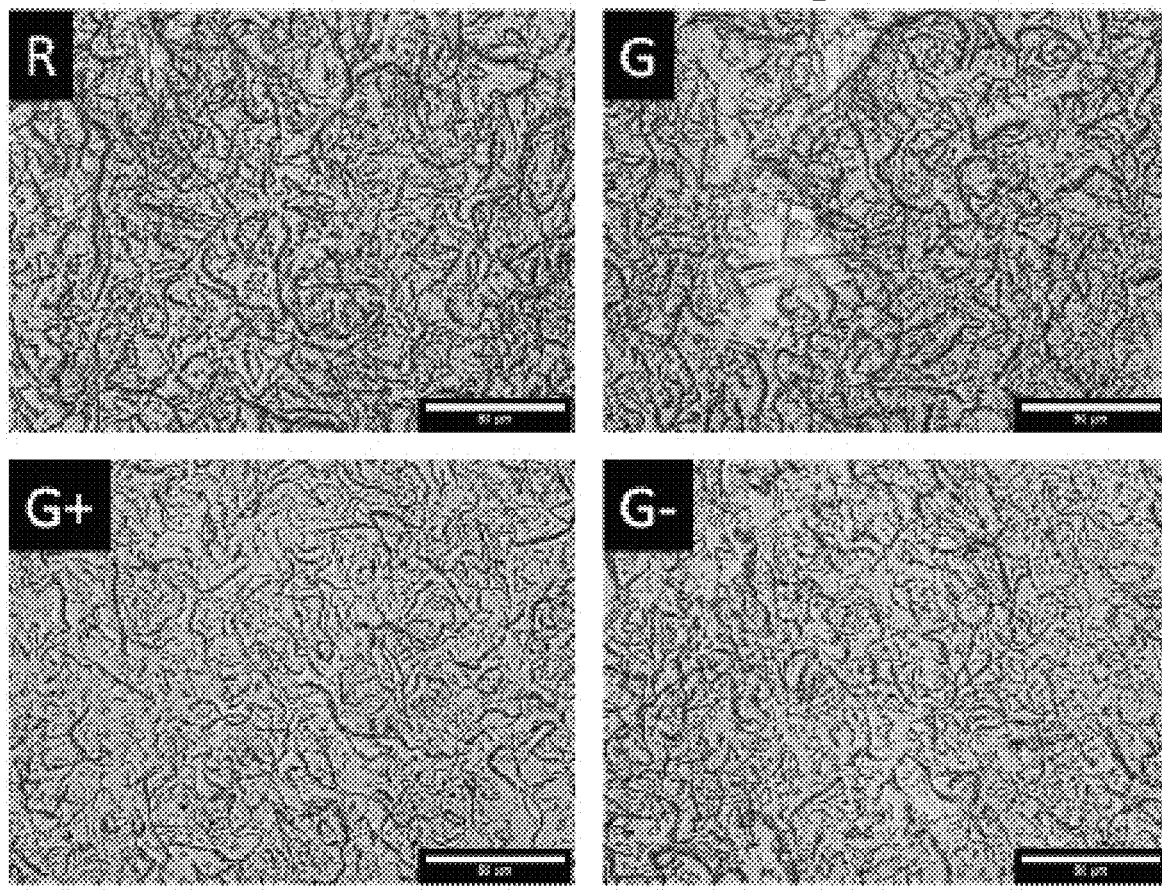
FIGS. 15A-15B are photographs of Alizarin Red stained mineralized fibers of the experiment of FIG. 14.
Figure 15B:
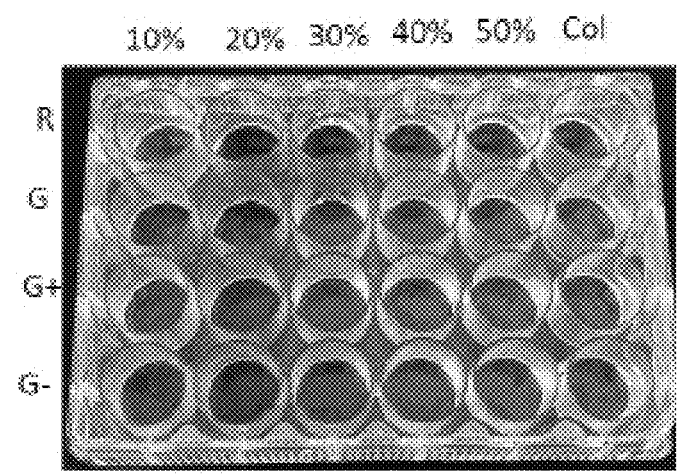

FIGS. 15A-15B are photographs of Alizarin Red stained mineralized fibers of the experiment of FIG. 14.

Example 10

Figure 16A:
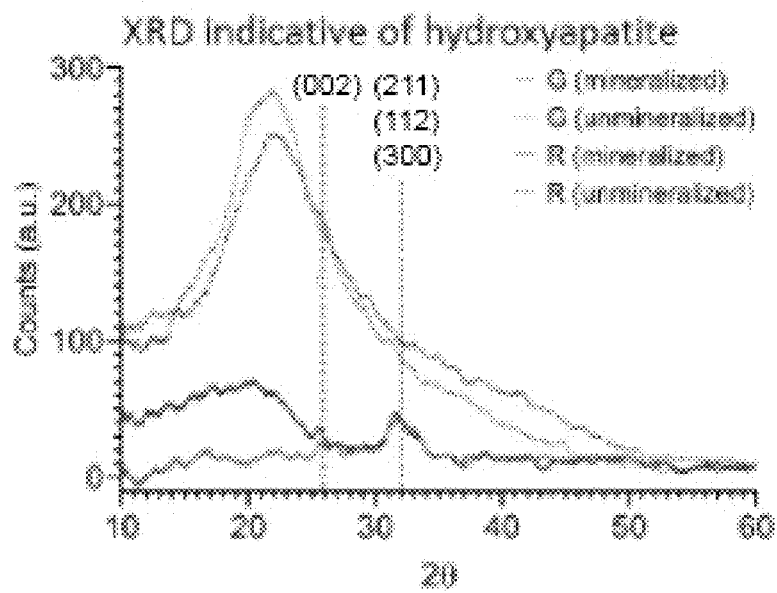
FIGS. 16A-16C are an x-ray diffraction plot of mineralized and unmineralized fibers showing indicia of hydroxyapatite (FIG. 16A).
Figure 16B:
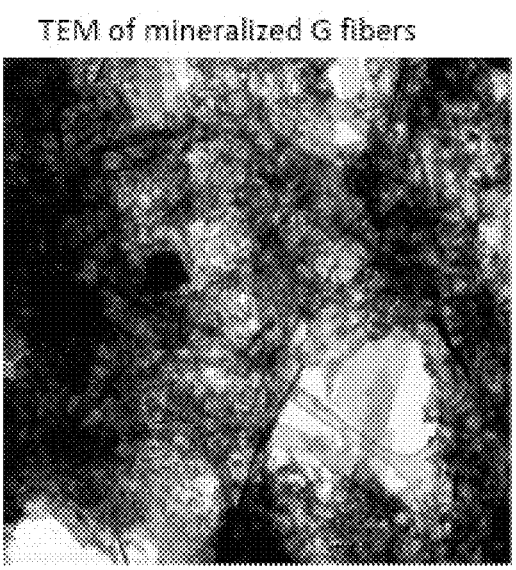
Figure 16C:
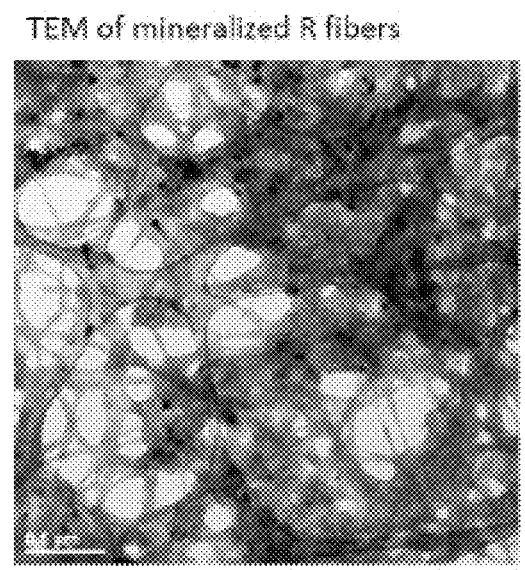

Experimental Conditions
Mineralizing aptamer sequences from Example 9 above.
Diluted to 1 µM in deionized water and mixed with 0.3 mg/mL rat tail type I collagen at a 10, 20% volume fraction collagen
Surface functionalized using 20 µM sulfo-SANPAH
Incubated with 8 mM NaH2PO4, 25 mM NaCl, 15 mM CaCl2 for 1 hour
Imaged
Stained with 38.89 mM Alizarin Red Stain for 30 minutes
Rinsed thrice, imaged, and bound calcium removed with cetylpyridinium chloride and quantified by absorbance at 550 nm
Results
3 replicates
Error bars are tight
By 2-way ANOVA: volume fraction collagen, aptamer sequence, and their interaction are all significant
Bars show no significant pairs by Tukey's multiple comparisons test FIGS. 16A-16C are an x-ray diffraction plot of mineralized and unmineralized fibers showing indicia of hydroxyapatite (FIG. 16A). FIGS. 16B and 16C are transmission electron micrographs showing different morphologies of the "G" and "R" fibers, respectively.

Figure 17A:
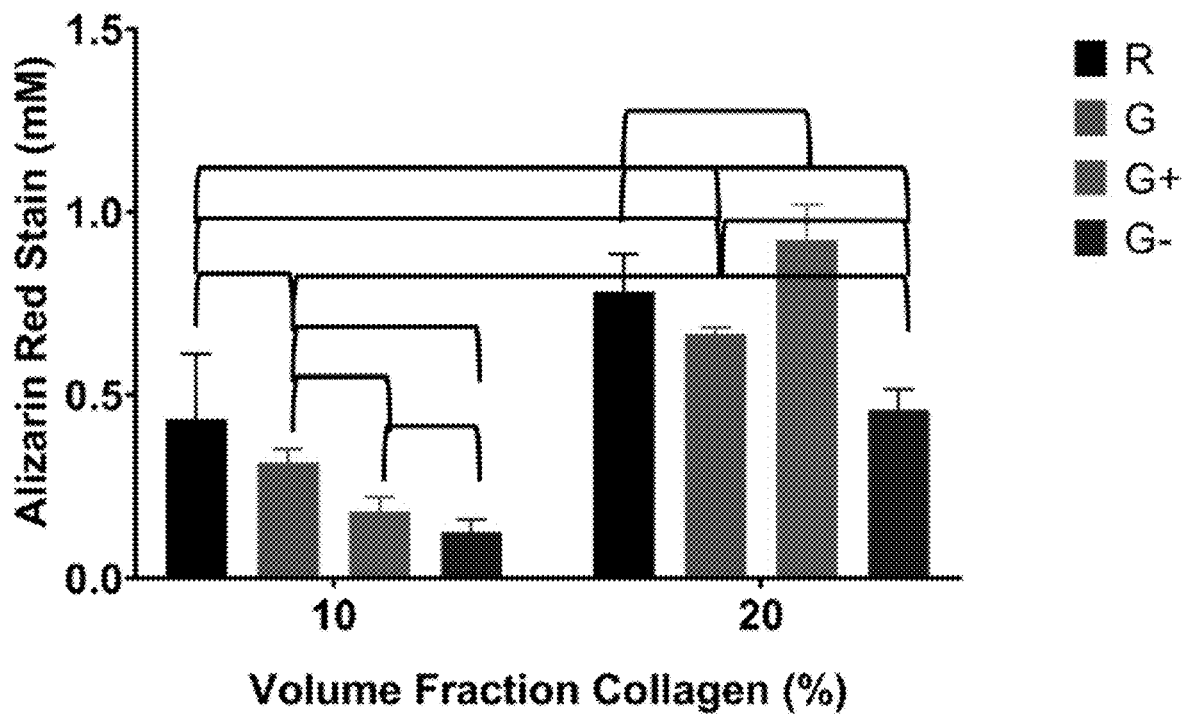
FIGS. 17A-17C.
Figure 17B:
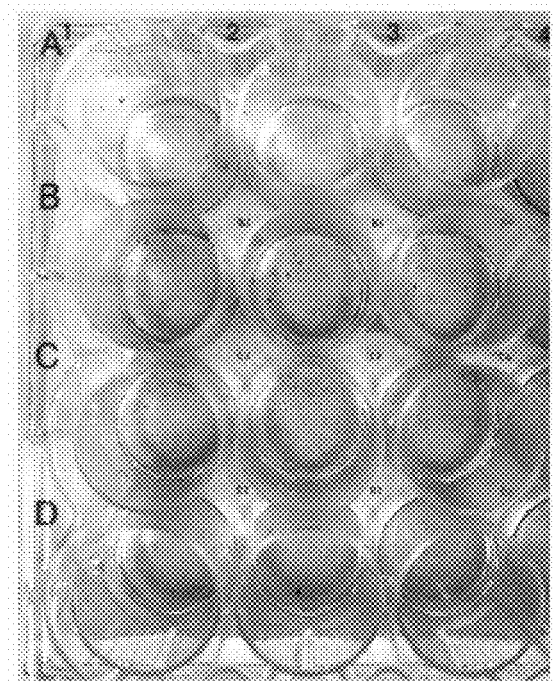
Figure 17C:
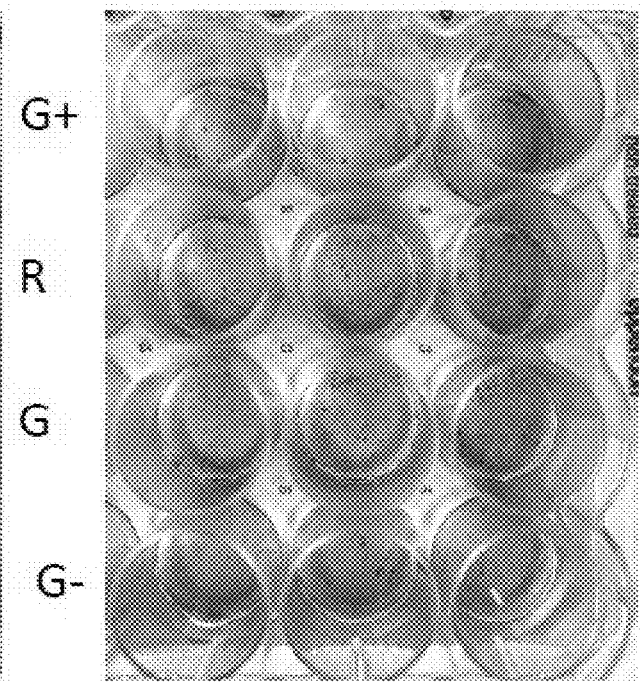
Figure 20A:
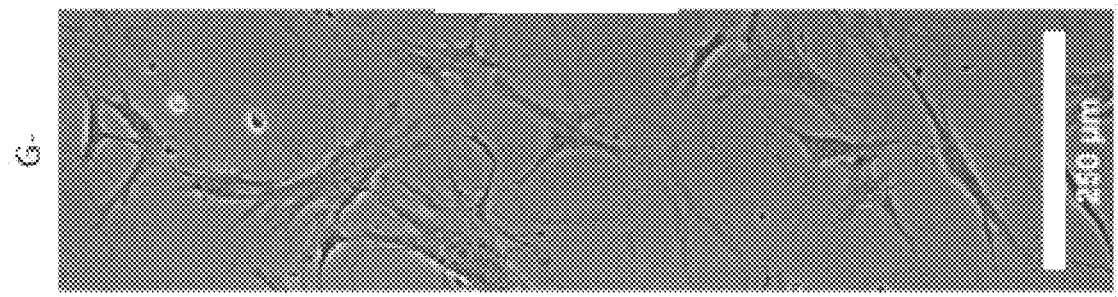
FIGS. 20A-20E are brightfield micrographs of surface-functionalized (with 20 µM sulfo-SANPAH) aptamers (TCP, R, G, G+, G− and collagen (20% volume fraction) 7 hr after plating.
Figure 20B:
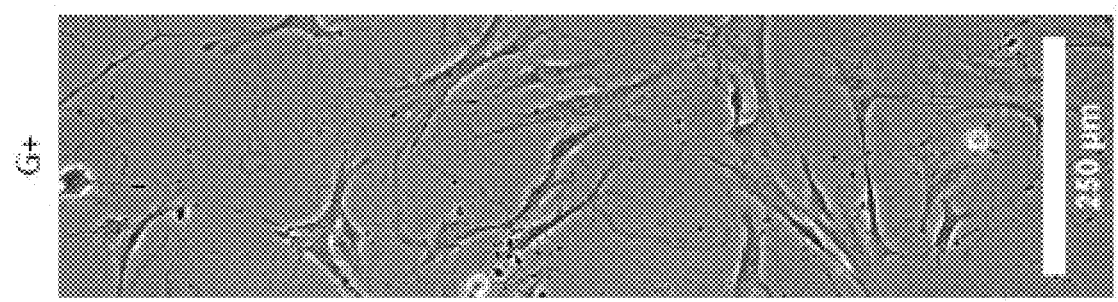
Figure 20C:
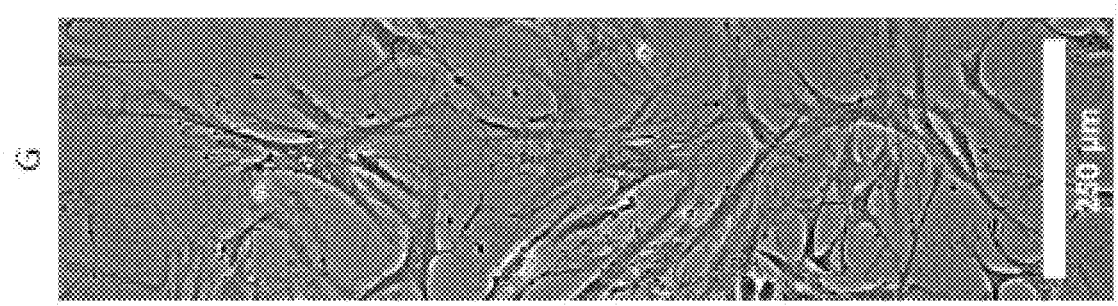
Figure 20D:
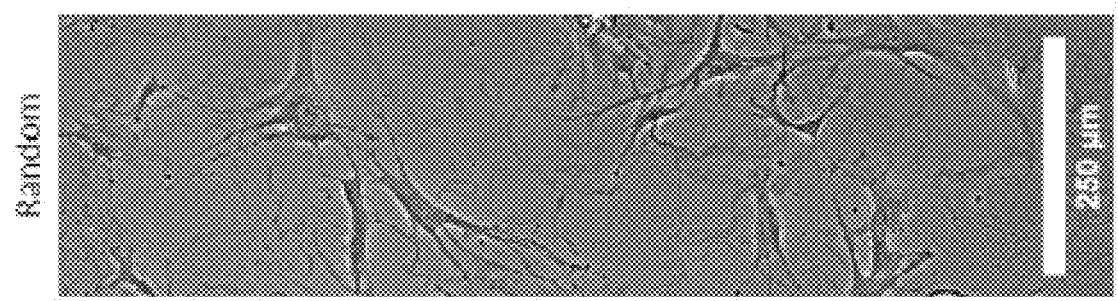
Figure 20E:
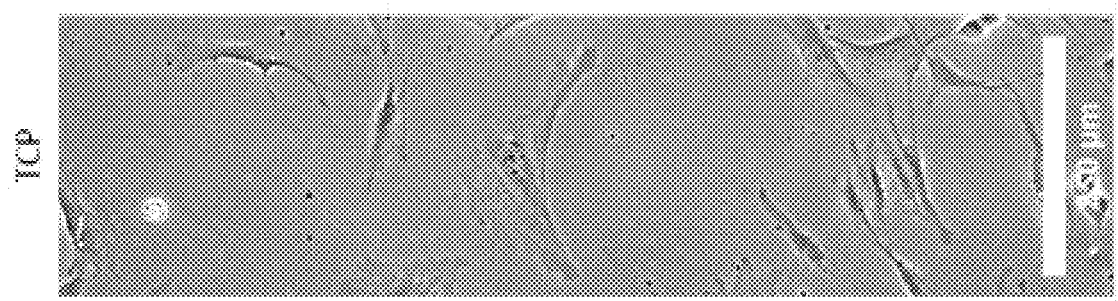
Figure 21E:
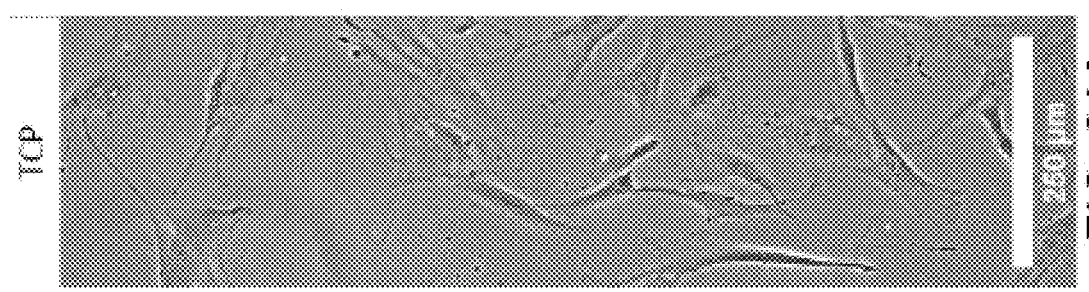
FIGS. 21A-21E are brightfield micrographs of surface-functionalized (with 20 µM sulfo-SANPAH) aptamers (TCP, R, G, G+, G− and collagen (20% volume fraction) 21 hr after plating.
Figure 21D:
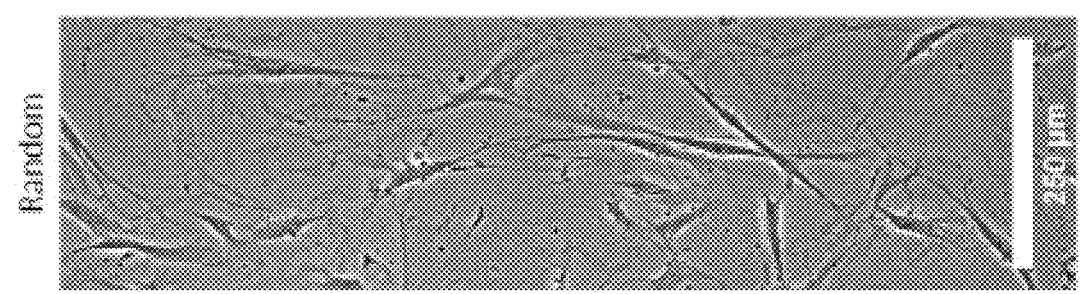
Figure 21C:
Figure 21B:
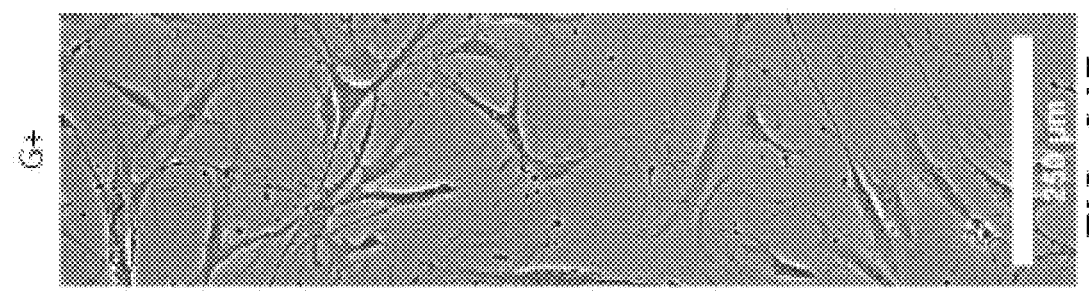
Figure 21A:
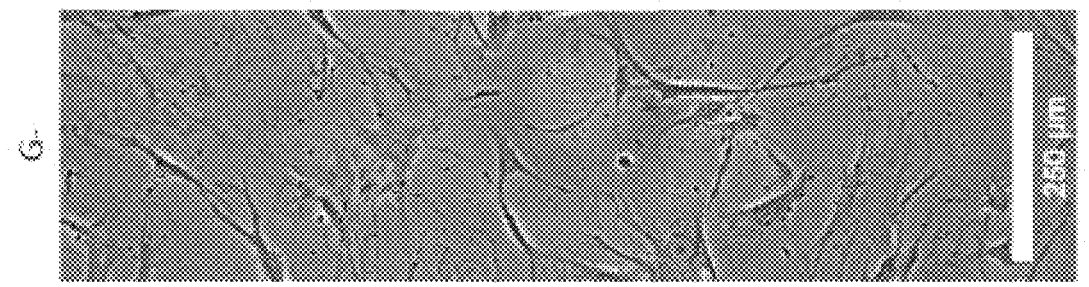
Figure 22A:
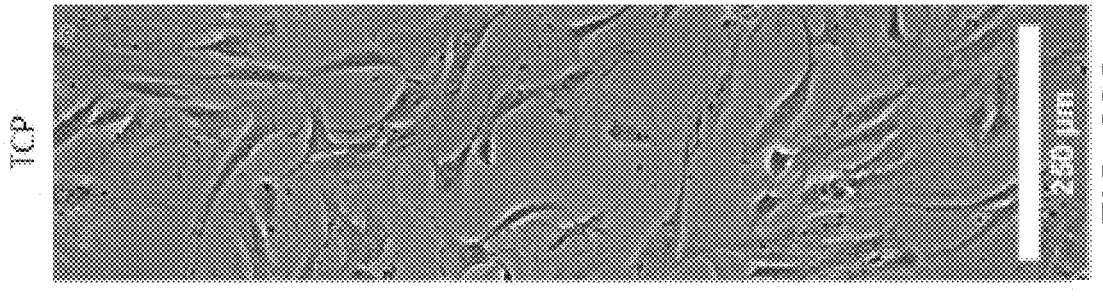
FIGS. 22A-22E are brightfield micrographs of surface-functionalized (with 20 µM sulfo-SANPAH) aptamers (TCP, R, G, G+, G− and collagen (20% volume fraction) 52 hr after plating.
Figure 22B:
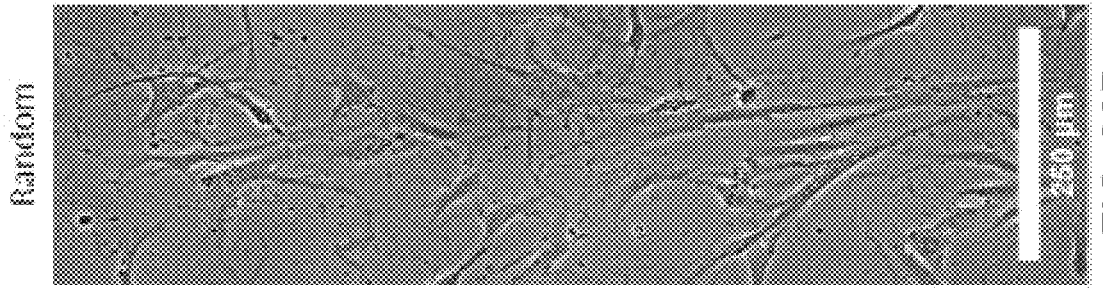
Figure 22C:
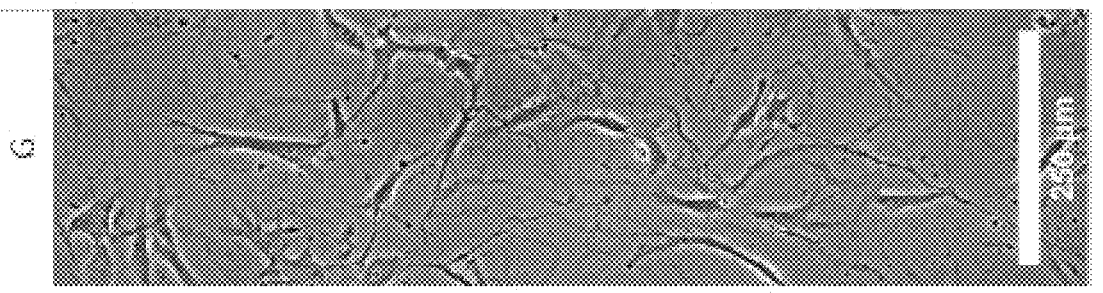
Figure 22D:
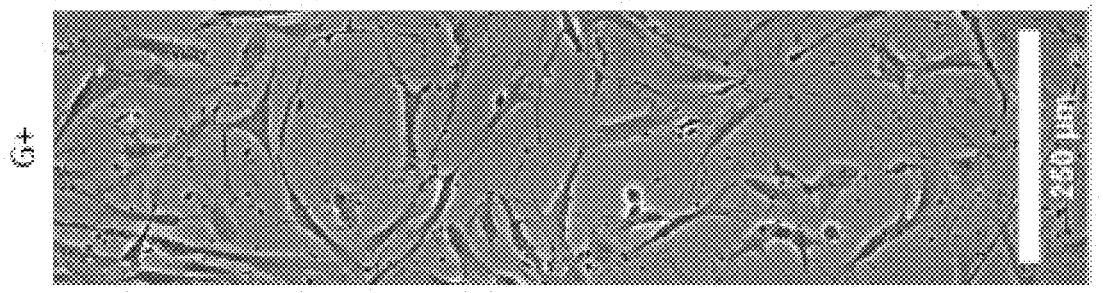
Figure 22E:
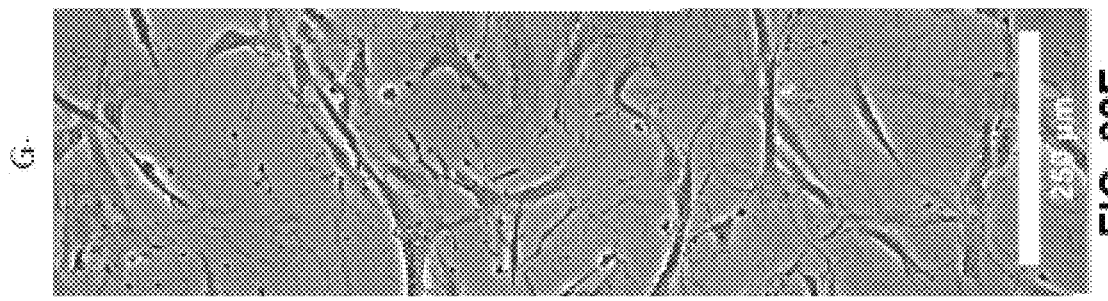
Figure 23A:
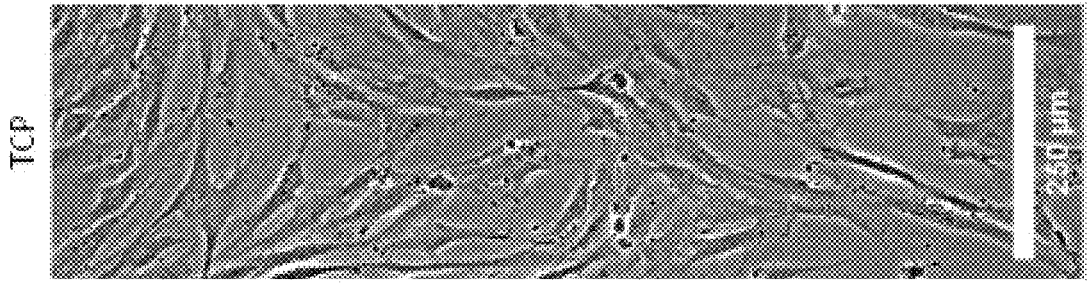
FIGS. 23A-23E are brightfield micrographs of surface-functionalized (with 20 µM sulfo-SANPAH) aptamers (TCP, R, G, G+, G− and collagen (20% volume fraction) 70 hr after plating.
Figure 23B:
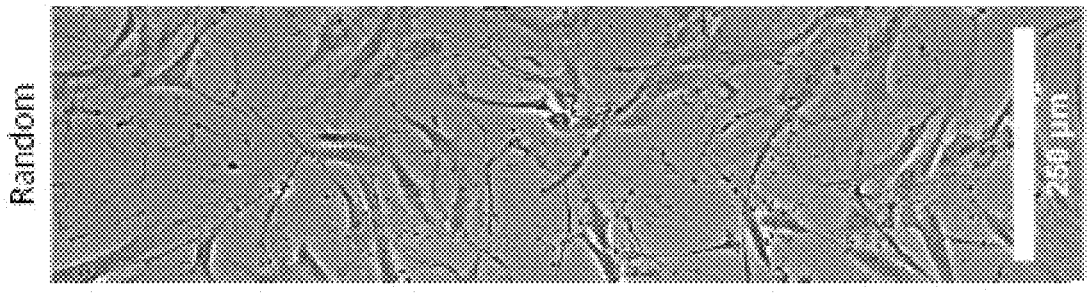
Figure 23C:
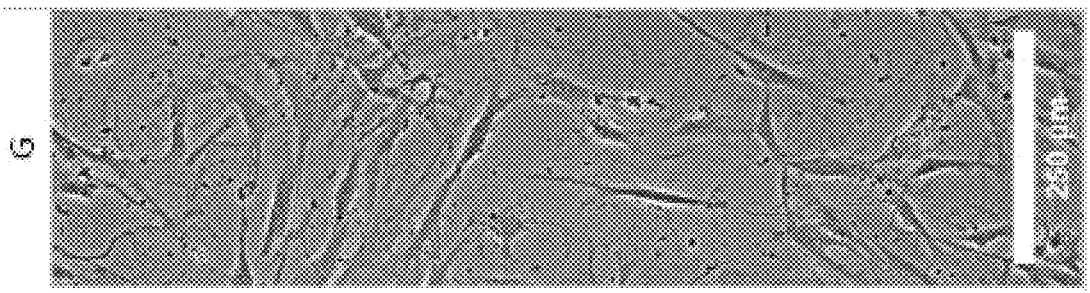
Figure 23D:
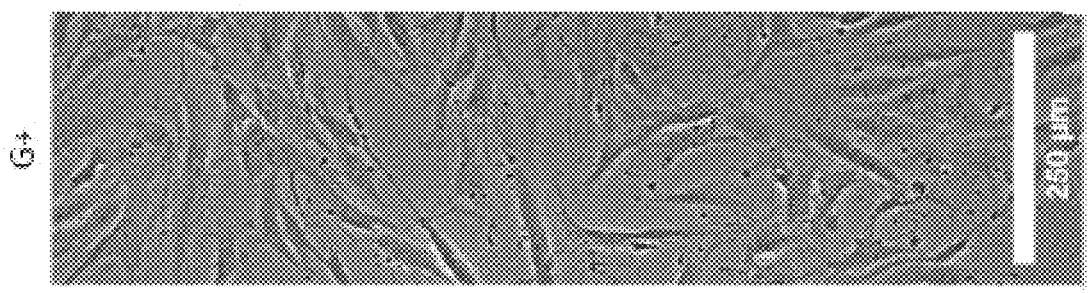
Figure 23E:
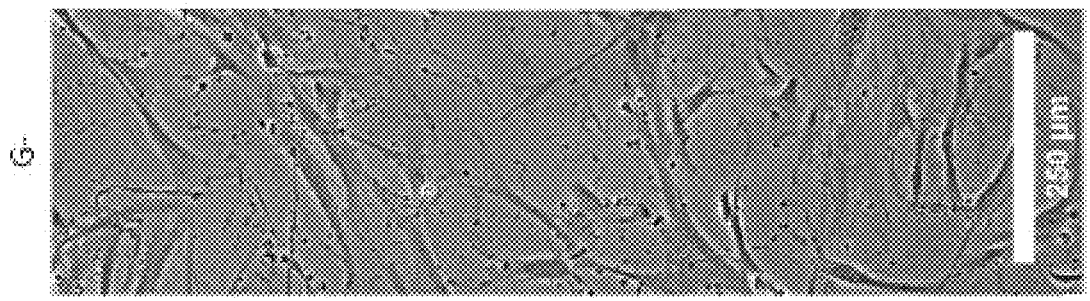
Figure 24E:
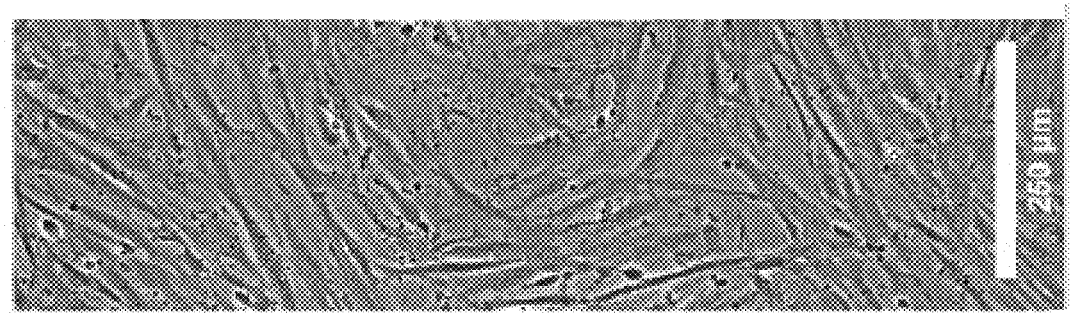
FIGS. 24A-24E are brightfield micrographs of surface-functionalized (with 20 µM sulfo-SANPAH) aptamers (TCP, R, G, G+, G− and collagen (20% volume fraction) 120 hr after plating.
Figure 24D:
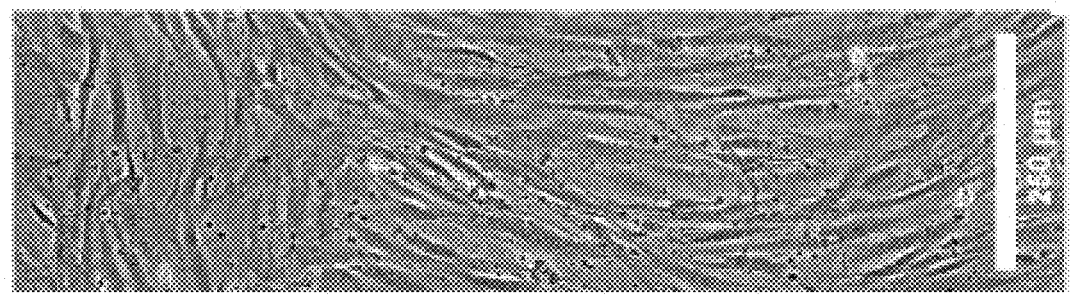
Figure 24C:
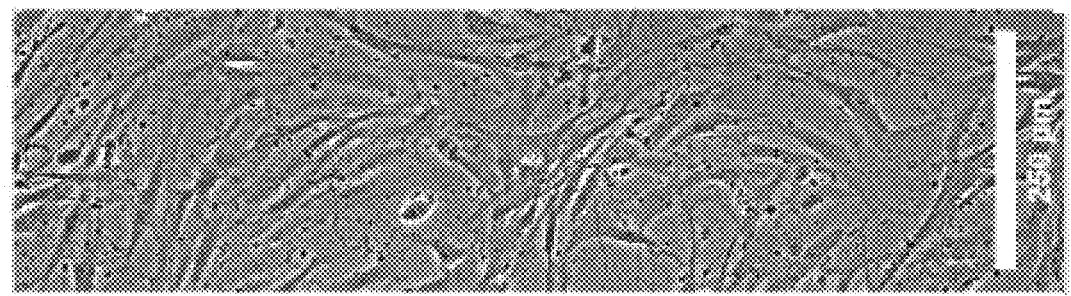
Figure 24B:
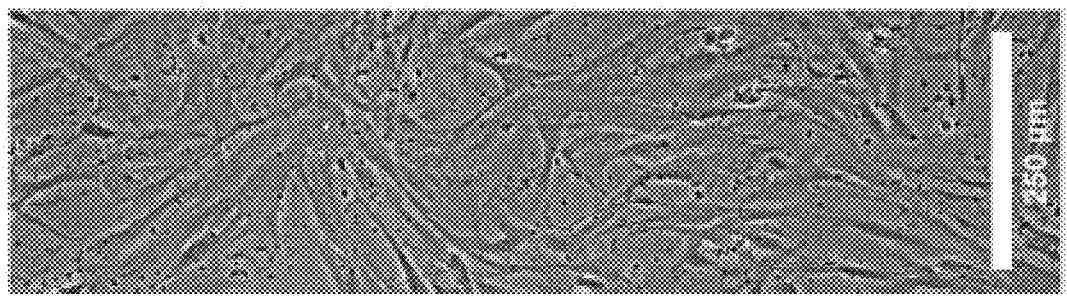
Figure 24A:
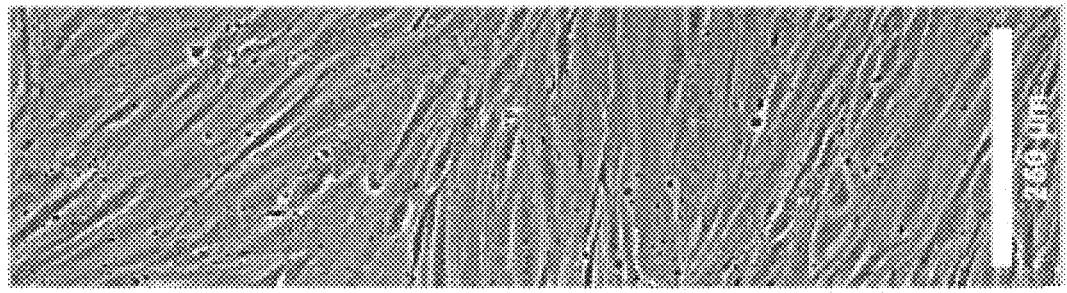
Figure 25E:
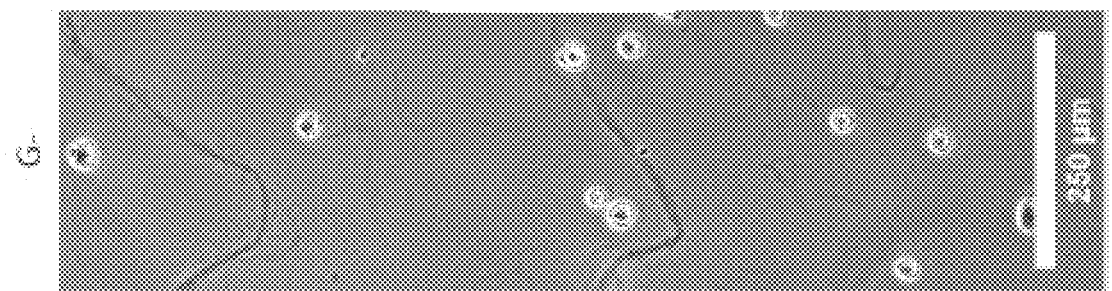
FIGS. 25A-25E are brightfield micrographs of surface-functionalized (with 20 µM sulfo-SANPAH) aptamers (TCP, R, G, G+, G− and collagen (10% volume fraction) 0 hr after plating.
Figure 25D:
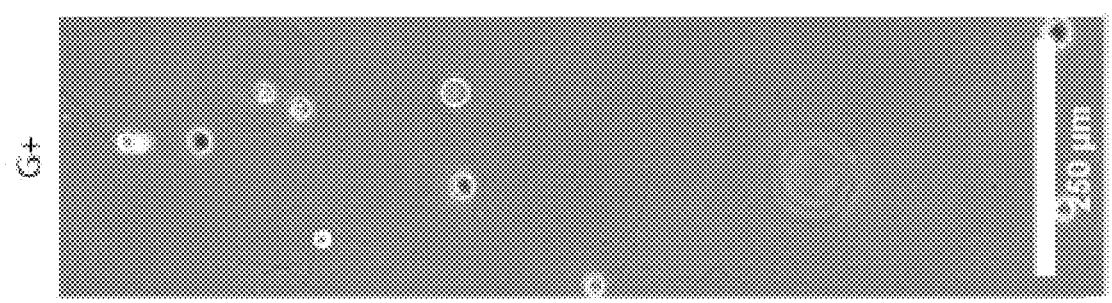
Figure 25C:
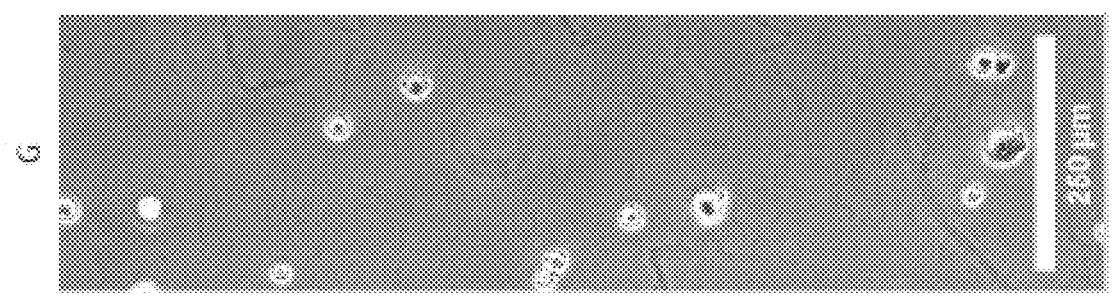
Figure 25B:
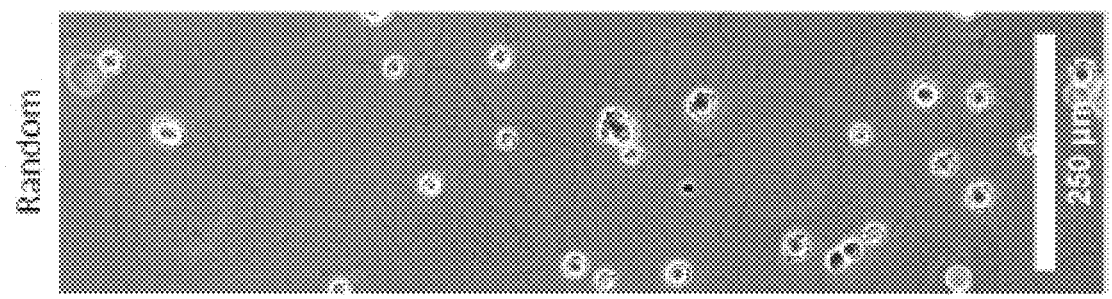
Figure 25A:
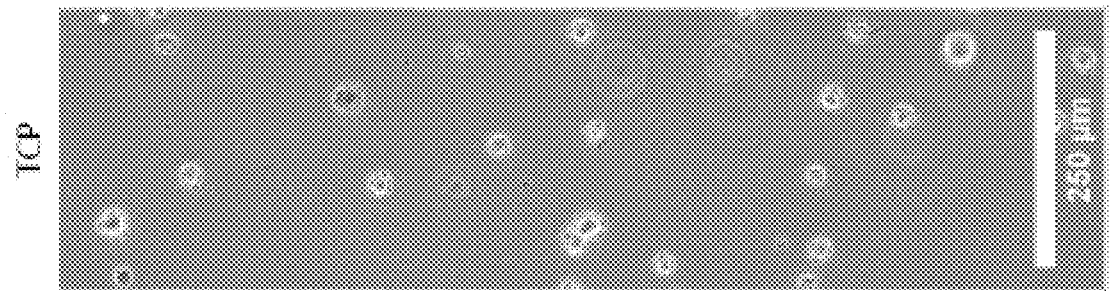
Figure 26E:
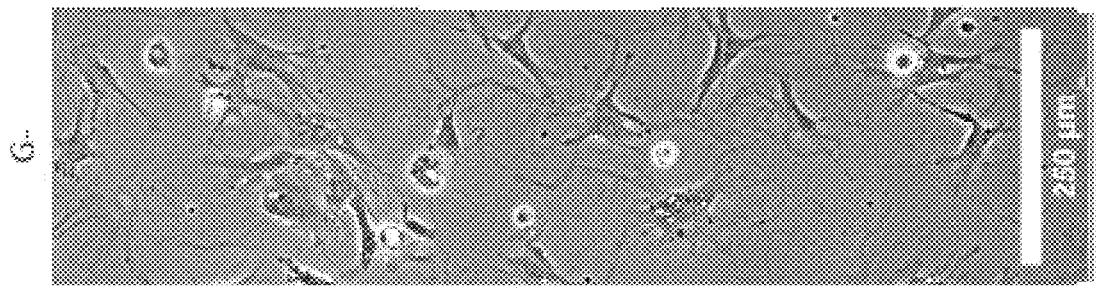
FIGS. 26A-26E are brightfield micrographs of surface-functionalized (with 20 µM sulfo-SANPAH) aptamers (TCP, R, G, G+, G− and collagen (10% volume fraction) 2.5 hr after plating.
Figure 26D:
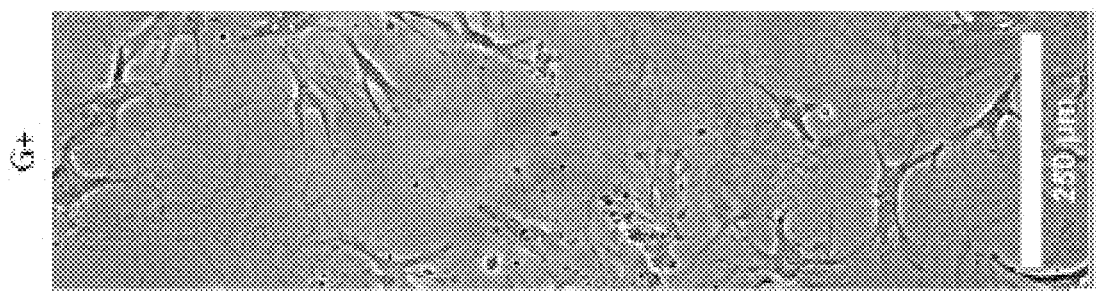
Figure 26C:
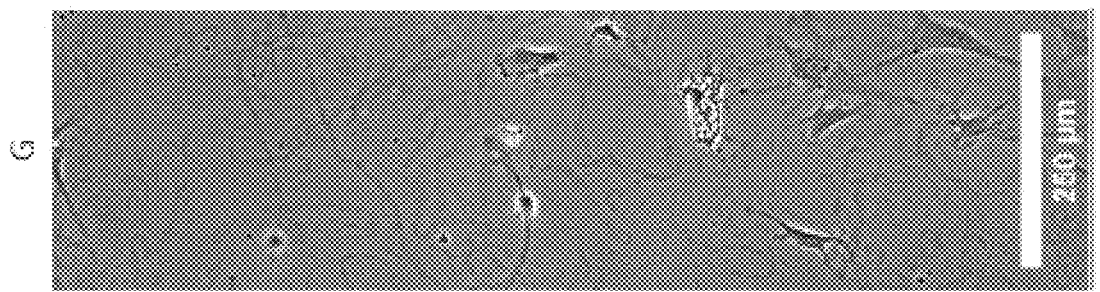
Figure 26B:
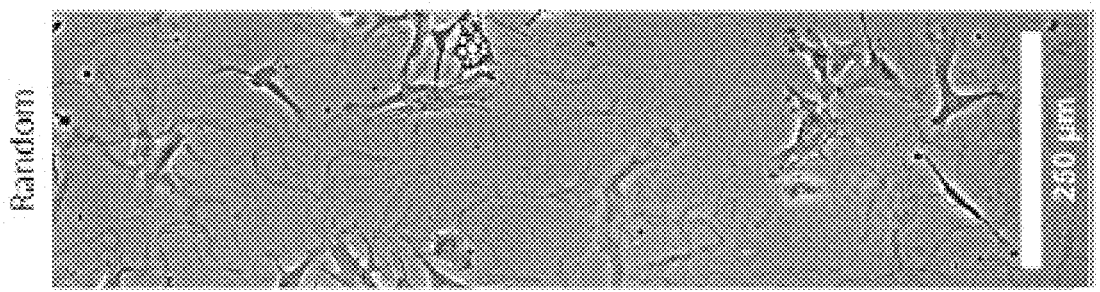
Figure 26A:
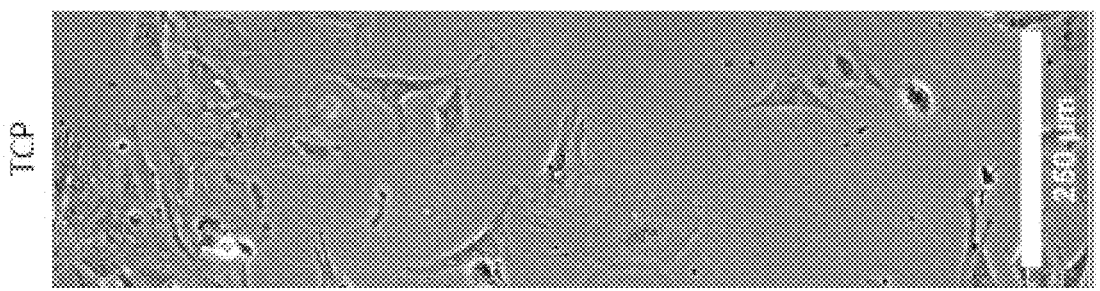
Figure 27E:
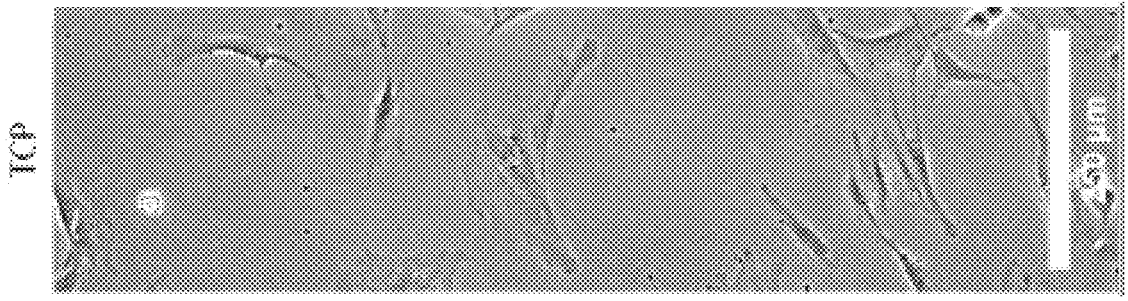
FIGS. 27A-27E are brightfield micrographs of surface-functionalized (with 20 µM sulfo-SANPAH) aptamers (TCP, R, G, G+, G− and collagen (10% volume fraction) 7 hr after plating.
Figure 27D:
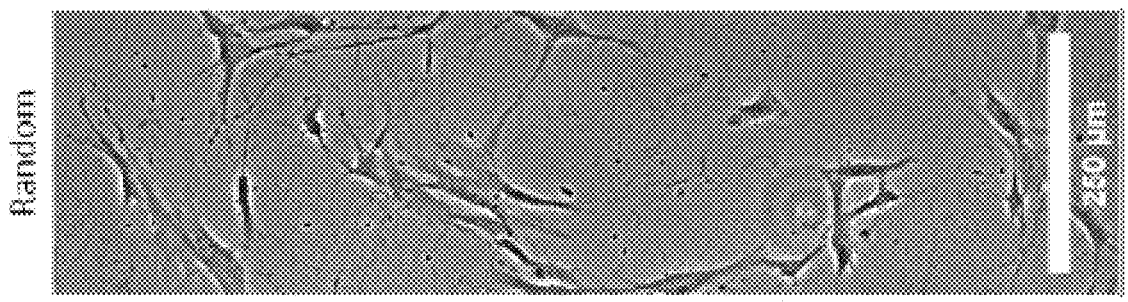
Figure 27C:
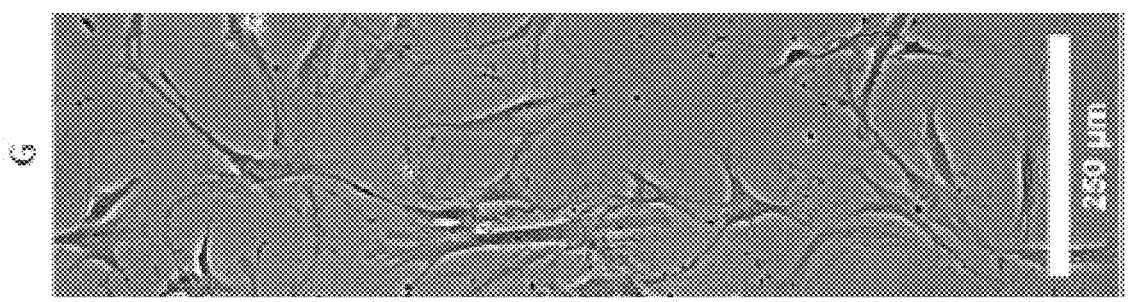
Figure 27B:
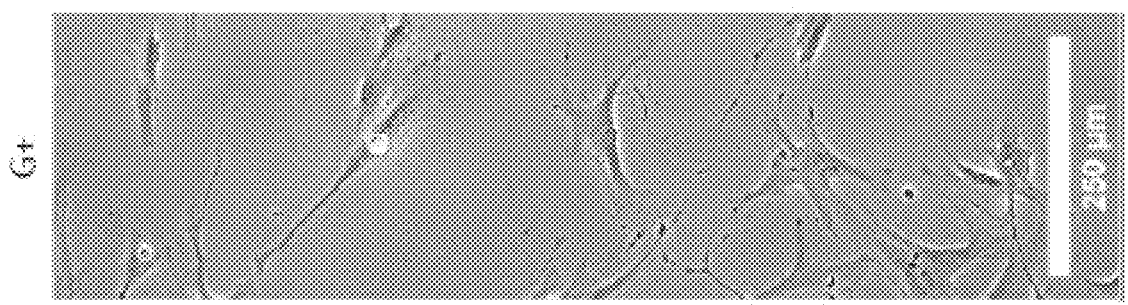
Figure 27A:
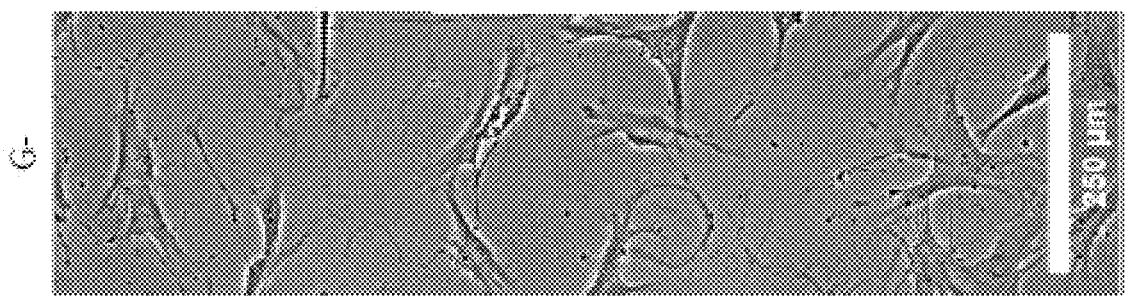
Figure 28E:
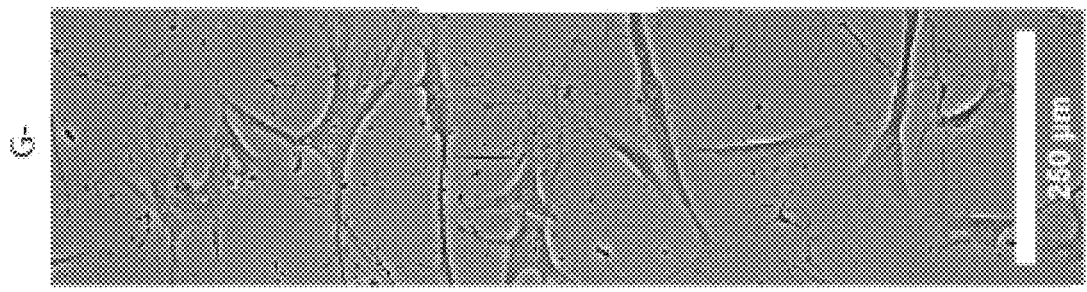
FIGS. 28A-28E are brightfield micrographs of surface-functionalized (with 20 µM sulfo-SANPAH) aptamers (TCP, R, G, G+, G− and collagen 10% volume fraction) 21 hr after plating.
Figure 28D:
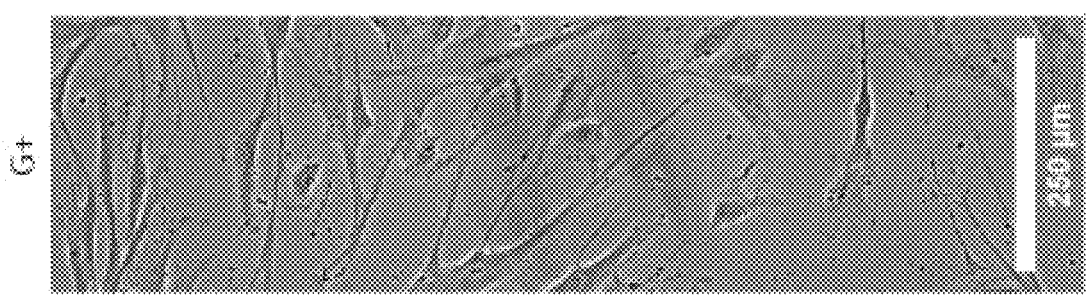
Figure 28C:
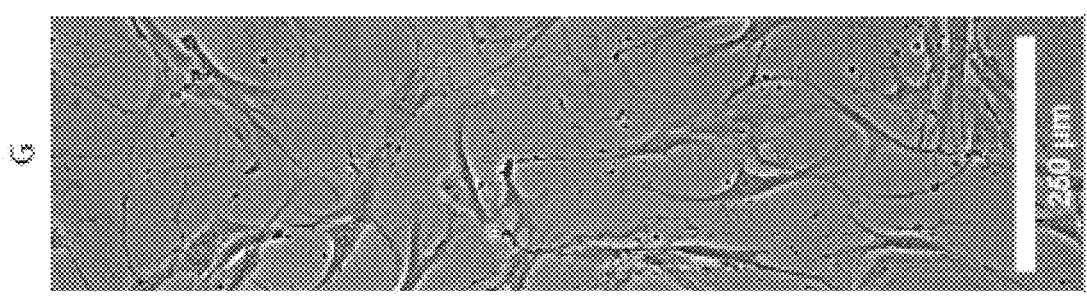
Figure 28B:
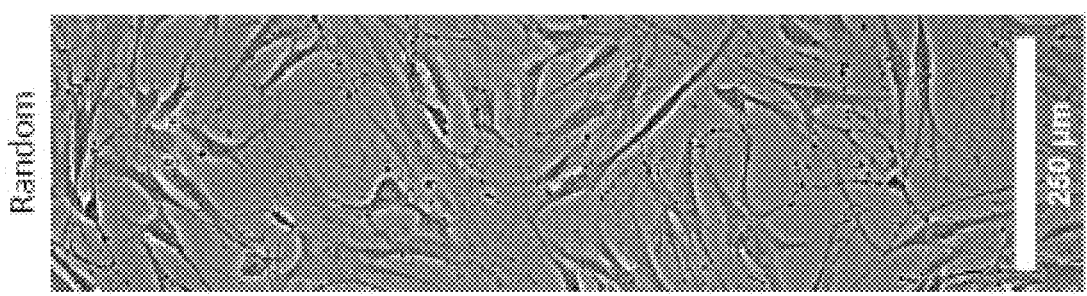
Figure 28A:
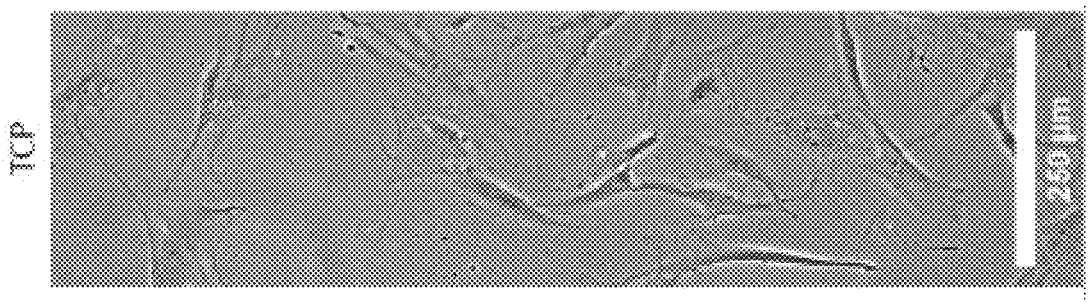
Figure 31A:
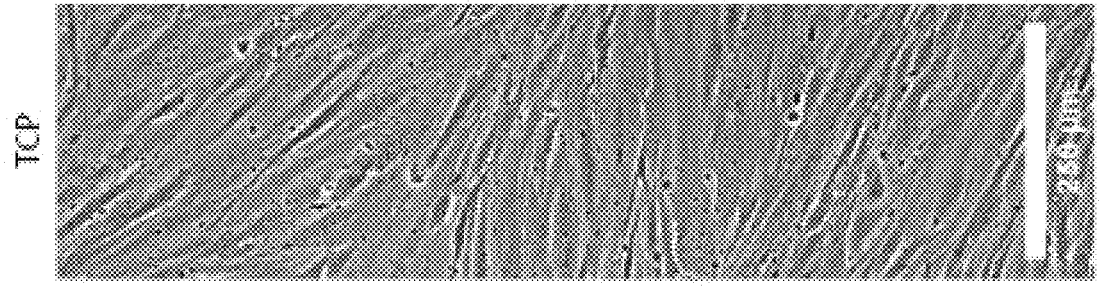
FIGS. 31A-31E are brightfield micrographs of surface-functionalized (with 20 µM sulfo-SANPAH) aptamers (TCP, R, G, G+, G− and collagen 10% volume fraction) 120 hr after plating.
Figure 31B:
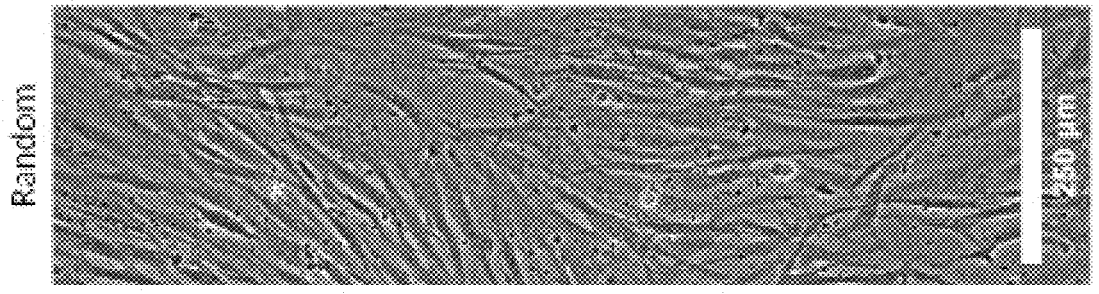
Figure 31C:
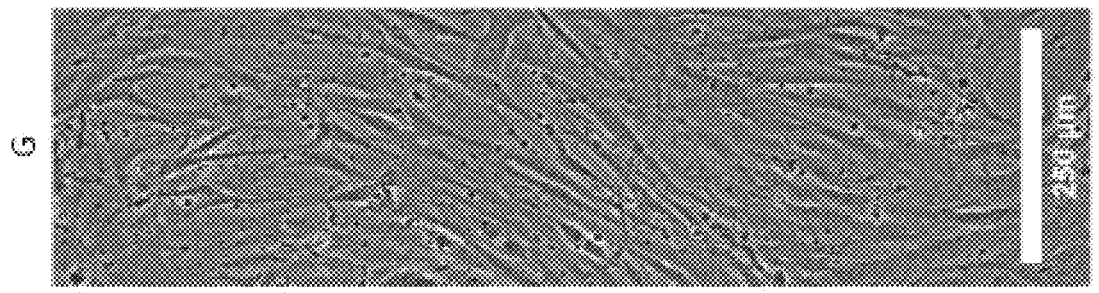
Figure 31D:
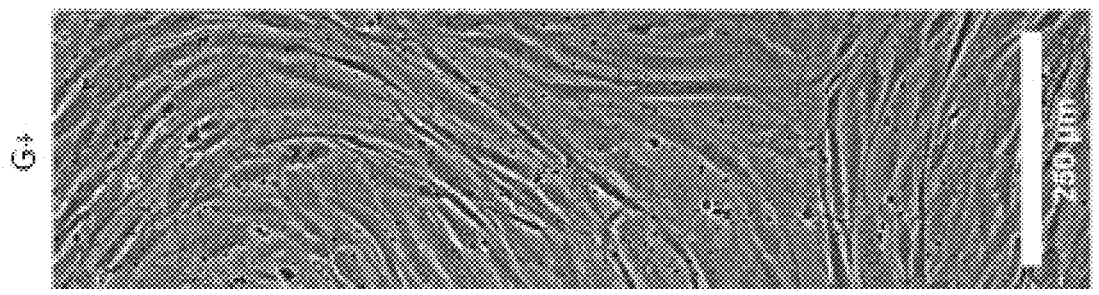
Figure 31E:
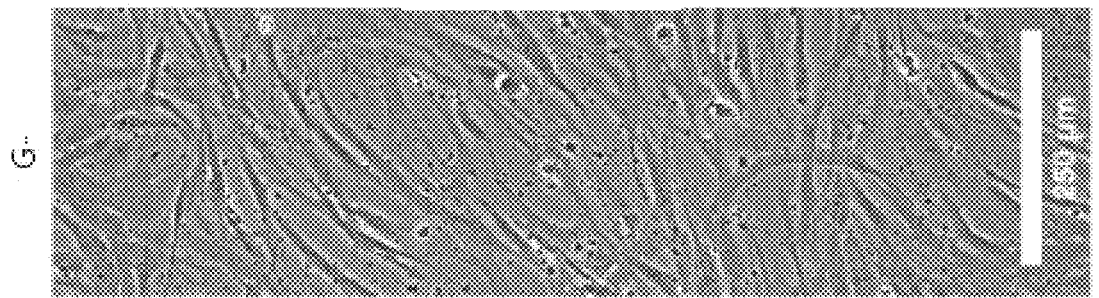
Figure 32A:
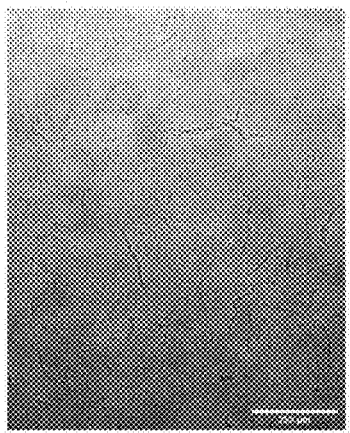
FIGS. 32A-32C show DNA-collagen fiber formation (FIG. 32A, Image of DNA aptamercollagen fibers; 45 bp; 30% vol collagen); fluorescent micrographs showing dependence of fiber formation on monomer length (FIG. 32B; 10% volume collagen); and the dependence of fiber formation on monomer sequence (FIG. 32C; 20% volume fraction).
Figure 32B:
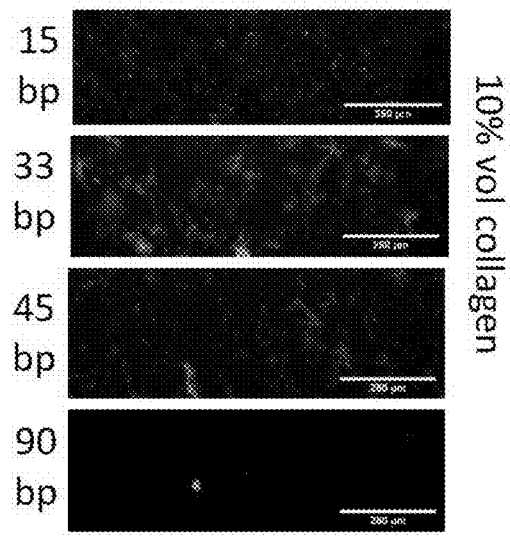
Figure 32C:
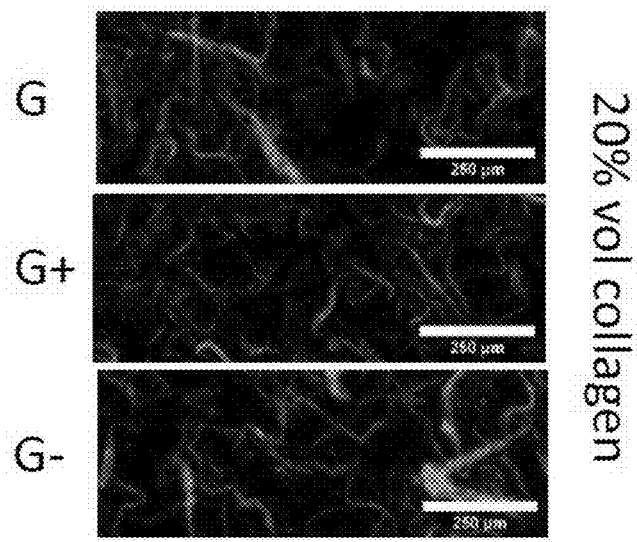

FIGS. 17A-17C: FIG. 17A is a plot quantifying Alizarin Red-stained R, G, G+, and G− fibers with 10 and 20% volume fraction of collagen. FIGS. 17 and 17C.

These results showed that the amount of mineral bound to the dna-collagen fibers can be dependent on the sequence. Later experiments have shown that the surface coverage for fibers is the same for different dna sequences of the same length. These results are refering to FIGS. 17A-17C Example 11

Experimental Conditions
Mineralizing aptamer sequences from Example 9 above.
Diluted to 1 µM in deionized water and mixed with 0.3 mg/mL rat tail type I collagen at a 10, 20% volume fraction collagen
Surface functionalized using 20 µM sulfo-SANPAH
Seeded with 5,000 human osteoblast cells/cm$^2$ FIGS. 18A-18E are brightfield micrographs of surface-functionalized (with 20 µM sulfo-SANPAH) aptamers (TCP, R, G, G+, G− and collagen (20% volume fraction) 0 hr after plating.

FIGS. 19A-19E are brightfield micrographs of surface-functionalized (with 20 µM sulfo-SANPAH) aptamers (TCP, R, G, G+, G− and collagen (20% volume fraction) 2.5 hr after plating.

FIGS. 20A-20E are brightfield micrographs of surface-functionalized (with 20 µM sulfo-SANPAH) aptamers (TCP, R, G, G+, G− and collagen (20% volume fraction) 7 hr after plating.

FIGS. 21A-21E are brightfield micrographs of surface-functionalized (with 20 µM sulfo-SANPAH) aptamers (TCP, R, G, G+, G− and collagen (20% volume fraction) 21 hr after plating.

FIGS. 22A-22E are brightfield micrographs of surface-functionalized (with 20 µM sulfo-SANPAH) aptamers (TCP, R, G, G+, G− and collagen (20% volume fraction) 52 hr after plating.

FIGS. 23A-23E are brightfield micrographs of surface-functionalized (with 20 µM sulfo-SANPAH) aptamers (TCP, R, G, G+, G− and collagen (20% volume fraction) 70 hr after plating.

FIGS. 24A-24E are brightfield micrographs of surface-functionalized (with 20 µM sulfo-SANPAH) aptamers (TCP, R, G, G+, G− and collagen (20% volume fraction) 120 hr after plating.

FIGS. 25A-25E are brightfield micrographs of surface-functionalized (with 20 µM sulfo-SANPAH) aptamers (TCP, R, G, G+, G− and collagen 10% volume fraction) 0 hr after plating.

FIGS. 26A-26E are brightfield micrographs of surface-functionalized (with 20 µM sulfo-SANPAH) aptamers (TCP, R, G, G+, G− and collagen 10% volume fraction) 2.5 hr after plating.

FIGS. 27A-27E are brightfield micrographs of surface-functionalized (with 20 µM sulfo-SANPAH) aptamers (TCP, R, G, G+, G− and collagen 10% volume fraction) 7 hr after plating.

FIGS. 28A-28E are brightfield micrographs of surface-functionalized (with 20 µM sulfo-SANPAH) aptamers (TCP, R, G, G+, G− and collagen 10% volume fraction) 21 hr after plating.

FIGS. 29A-29E are brightfield micrographs of surface-functionalized (with 20 µM sulfo-SANPAH) aptamers (TCP, R, G, G+, G− and collagen 10% volume fraction) 52 hr after plating.

FIGS. 30A-30E are brightfield micrographs of surface-functionalized (with 20 µM sulfo-SANPAH) aptamers (TCP, R, G, G+, G− and collagen 10% volume fraction) 70 hr after plating.

FIGS. 31A-31E are brightfield micrographs of surface-functionalized (with 20 µM sulfo-SANPAH) aptamers (TCP, R, G, G+, G− and collagen 10% volume fraction) 120 hr after plating.

Example 12

Introduction
Many of the most structurally robust complexes in the body are composed of mineralized tissues such as tendon, cartilage, dentin, and bone. Mineralized tissues have been a sustained challenge in tissue engineering fields due to their enhanced structural properties at relatively low densities. Our group has recently discovered that DNA aptamers form fibral complexes with collagen type I. There has also been evidence found to support the formation of these fibers irrespective to DNA aptamer sequence. This discovery elevates the potential of DNA aptamers in tissue applications where the aptamer can create specific binding sites without affecting the integrity of the DNA collagen complex fibers. Though it has been found that fiber formation is independent on sequence and dependent on length, the study will determine how mineralization is affected by these factors.

Methods

Aspects of methods of the present disclosure are shown in FIGS. 33A-33C.

Results

Mineralization progression is shown in FIGS. 34A-34C. The images above (FIG. 15A) indicate similar mineralized area coverage for all aptamer sequences tested. Based on qualitative results, there does not appear to be significant evidence to support dependence of mineralization on aptamer sequence.

Quantification of mineralization presented in the graphical representation above (FIG. 17A), did not show statistically significant differences in the amount of mineralization for each of the DNA aptamers tested. This suggests the quantity of mineralization is independent of DNA sequence.

Example 13

Abstract

DNA is a highly polyanionic biomolecule that interacts with both collagen and hydroxyapatite. Harnessing these complexes, the combination of a hydroxyapatite templating DNA aptamer and type I collagen rapidly synthesizes mineralized self-assembled DNA aptamer-collagen complex fibers and 3D gels. These complexes are hierarchical, interwoven, curly nanofibrils resembling native extracellular matrix, which can mineralize an interpenetrating nanocrystalline hydroxyapatite phase. On demand mineralization is possible enabling temporal control of the process. Surprisingly, mineralization is independent of DNA sequence allowing for other DNA aptamers to be used in the synthesis of these mineralized complexes affording them even greater biofunctionality without loss of mineralization potential. In response to this promising biomaterial platform, primary human osteoblasts differentiate towards an osteocyte-like lineage important for biomaterial osseointegration. These fibers and gels have promise not only as osteoconductive coatings and scaffolds, but as coatings and scaffolds for any tissue using this new class of biofunctional materials.

1. Introduction

Paramount to the challenges facing bone tissue engineering is recapitulating the hierarchical structure of bone.1 Biomimetic approaches have been pioneered to achieve aligned, intrafibrillar hydroxyapatite mineralization of collagen gels utilizing polyanionic species, namely polyaspartate.2-5 This method relies on anionic species to form an amorphous calcium phosphate precursor phase, which can penetrate collagen fibril D-spacings by capillary action, termed the polymer-induced liquid-precursor (PILP) process.3

Interestingly, DNA is a highly polyanionic biomolecule that interacts with both collagen and hydroxyapatite. In the 1970s, DNA was shown to bind to type I, II, and IV collagens and later in the late 1990s shown to form self-assembled aggregates ranging from nanoparticles to micron sized fibers.6-9 DNA-collagen complexes have since been utilized for gene delivery applications focusing on nanoparticle sized aggregates for efficient cellular endocytosis as well as plasmid DNA eluting collagen scaffolds.10-12 In fact, this complex protects DNA from enzymatic attack and is a possible mechanism for preserving DNA in ancient bone.12,13 In the same vein, DNA and calcium phosphate non-specifically bind together, which has been utilized for gene delivery by the endocytosis of calcium phosphate nanoparticles coated with plasmid DNA.14-17 Few groups have combined these three components to improve gene delivery efficiency with some success; however, these complexes have not been applied as strategies for tissue engineering.18-20

These interactions are ubiquitous for nucleic acids and other structural forms of DNA, namely DNA aptamers—engineered sequences of single stranded DNA (ssDNA) designed to interact with a specific target.9,21-25 Recently, using precipitation systematic evolution of ligands by exponential enrichment a series of hydroxyapatite templating DNA aptamers (HAP aptamers) have been reported to facilitate mineral formation and to bind hydroxyapatite.26, 27 Likewise, our group has shown that ssDNA on the length scale of DNA aptamers binds and forms ssDNA-collagen complex fibers with promising utility for mediating healthy vascular cell behavior.28 Hierarchical, fibrous architectures endow biopolymers with their unique chemomechanical properties, which are necessary for regulating cellular phenotype.29 Thus, being able to recapitulate these biophysical cues is paramount to engineering extracellular matrix (ECM) mimetics. Herein, we report for the first time the combination of a hydroxyapatite templating DNA aptamer and collagen to form mineralized self-assembled DNA aptamer-collagen complex fibers and 3D gels.

These fibers and gels have promise not only as osteoconductive coatings and implants, in vitro 3D bone and calcified tissue models, but as coatings and scaffolds for any tissue using this simple, versatile biomaterial platform to engineer mimetic ECM.

2. Materials and Methods 2.1 Fiber and Gel Synthesis

Previously, we have shown that self-assembled ssDNA-collagen complex fibers are dependent on ssDNA sequence length and the ratio of ssDNA to collagen in solution.28 Likewise, because DNA has an affinity to non-specifically bind with HAP, for all studies we used a random sequence ssDNA of the same length as the HAP aptamer as a reference to determine the effect of the DNA aptamer as compared to the effect of purely ssDNA, respectively.15 DNA aptamer-collagen complex self-assemblies were synthesized by mixing different volume fractions (0-100%) of 0.3 to 3.0 mg/mL rat tail tendon type I collagen (Corning) diluted in sterile deionized water with either 1 to 10 μm random sequence ssDNA (5'-TAA AAC GCG CTT AAG CTG GTG TTA CTC GAG CGG TCT TCT A-3'; SEQ ID NO:12) or 1 to 10 μM HAP aptamer (5'-CAG GTG GGC GCG CTG TCG TGG GTG CTC GGG TGC GGT TGG G-3'; SEQ ID NO:13) (Integrated DNA Technologies) both diluted in sterile deionized water.27 DNA oligomer properties are presented in Table 1. Complexes spontaneously formed upon mixing and were incubated at room temperature overnight followed by storage in solution at 4° C. until needed.

TABLE 1

| DNA Oligomer Properties | | |
|---|---|---|
| Name | Molecular Weight (g mol$^{-1}$) | GC Content (%) |
| Random ssDNA | 12,302.0 | 47.5 |
| HAP Aptamer | 12,545.1 | 75.0 |

2.2 ssDNA-Collagen Binding Assay

The amount of ssDNA in the DNA aptamer-collagen complex self-assembled fibers for different volume fractions of type I collagen and ssDNA oligomer was assessed fluorometrically by measuring the intensity of a fluorescent DNA stain. Solutions of different volume fractions were diluted at a 1:2 volume ratio of fiber solution to SYBR Safe DNA stain (Invitrogen). The stain concentrate was diluted first at a 1:10,000 volume ratio in deionized water. Then the mixtures were incubated protected from light for 30 minutes at room-temperature. After incubation, the mixtures were centrifuged at 2000 g for five minutes. Supernatant was plated in duplicate into black walled 96 well microplates and fluorescence intensity was measured by exciting at 488 nm and detecting at 520 nm using a UV-Vis Synergy H1 plate reader (BioTek). ssDNA in the supernatant was quantified using a standard curve fit with a 4-parameter logistic regression to correlate fluorescent intensity to ssDNA concentration. Individual standard curves were prepared for each ssDNA to account for any differences in DNA stain interaction with the two ssDNA sequences due to their secondary structure. Bound ssDNA for the different volume fractions was calculated as the difference of the initial amount of ssDNA in the solution and the amount of ssDNA measured in the supernatant.

2.3 Surface Functionalization

Fibers were immobilized to untreated polystyrene well plates (Eppindorf) using sulfo-SANPAH (Proteochem) heterobifunctional crosslinker. Briefly, well plates were treated with 20 µM sulfo-SANPAH diluted in deionized water and irradiated with 365 nm UV light for 10 minutes to activate the nitrophenyl azide group of the crosslinker for bonding to the polystyrene surface. Then the wells were rinsed three times with sterile deionized water and incubated with the fiber solutions overnight at room temperature. During incubation, the sulfo-NHS ester from the sulfo-SANPAH is able to non-specifically react with primary amines present on the DNA aptamer-collagen complex self-assembled fibers. Following incubation, the wells were rinsed three times with sterile deionized water and stored in deionized water at 4° C. until needed.

2.4 Fiber Morphology

Fiber morphology for the different volume fractions of type I collagen and DNA aptamer was qualitatively assessed by phase contrast and fluorescence microscopy using immobilized fibers. For fluorescence microscopy, immobilized fibers were stained with SYBR Safe DNA stain (Invitrogen) diluted at a 1:10,000 volume ratio in deionized water. The fibers were incubated with the stain protected from light for at least 30 minutes and then imaged using an epifluorescence Nikon TE-2000U inverted microscope.

2.5 Mineralization of Immobilized Fibers

Immobilized fibers were mineralized by incubating overnight at room-temperature with 500 µL of mineralizing solution having a final concentration of 25 mM NaCl (Sigma Aldrich), 8 mM Na2HPO4 (Sigma Aldrich), 15 mM CaCl2 (Sigma Aldrich) added sequentially. Then the wells were rinsed with deionized water and stored at 4° C. in deionized water until needed.

2.6 Mineralization of Mobile (In Solution) Fibers and Gels
2.6.1 Synthesis and Mineralization in One-Step Mineralized fibers were formed in a one-step process by preparing two precursor solutions: 1) DNA aptamer and $CaCl_2$ and 2) collagen, NaCl, $Na_2HPO_4$ together. These two solutions were then mixed together to give an effective final concentration of 10 mM $CaCl_2$, 36.67 mM NaCl, 4 mM $Na_2HPO_4$, 0.1-0.9 µM aptamer, and 0.03-0.27 mg/mL collagen with a final volume of 250 µL. Mineralized gels were formed in a one-step process by preparing two precursor solutions: 1) DNA aptamer and $CaCl_2$ and 2) collagen, NaCl, $Na_2HPO_4$ together. These two solutions were then mixed together to give an effective final concentration of 10 mM CaCl2, 36.67 mM NaCl, 4 mM $Na_2HPO_4$, 1-9 µM aptamer, and 0.3-2.7 mg/mL with a final volume of 500 µL.

2.6.2 Synthesis and Mineralization in Two-Steps

Mineralized fibers and gels were formed in a two-step process by preparing fibers and gels as previously described in Section 2.1. Then the fibers and gels were incubated in 250 µL and 500 µL of mineralizing solution with a final concentration 10 mM $CaCl_2$, 36.67 mM NaCl, 4 mM $Na_2HPO_4$, respectively.

Mixtures were incubated at room-temperature and removed from the mineralization solution after 1, 3, and 6 days. This was done by centrifugation to pellet the assemblies, rinsing with deionized water, and then resuspending in 100% molecular biology grade ethanol (Fisher Scientific) thereafter for storage at room-temperature until analysis by either x-ray diffraction, transmission electron microscopy, or scanning electron microscopy. Resuspension in ethanol was done to facilitate sample preparation for those analysis techniques.

2.7 Alizarin Red Stain Assy

After mineralization, immobilized fibers were stained with 500 µL of 40 mM alizarin red stain (Sigma Aldrich) for 30 minutes at room temperature. Then washed with deionized water three times. Stained fibers were imaged by phase contrast microscopy. Then, 250 µL of 10% (w/v) cetylpyridinium chloride (Sigma Aldrich) was added to release the calcium-bound stain and agitated on an orbital shaker for 5 minutes. The solution was collected and centrifuged at 10,000g for 10 minutes. 100 µL aliquots of the supernatant were plated in duplicate and read at 550 nm using a Synergy H1 Spectrophotometer. Absorbance was converted to alizarin red stain concentration using a standard curve fit with a 4-parameter logistic regression model.

2.8 X-Ray Diffraction

The change in crystallinity of one- and two-step mineralized gels incubated for 1, 3, and 6 days in mineralization solution was assessed by X-ray diffraction (XRD) using a Panalytical Xpert-Pro system. Gels were placed on a zero-background holder and irradiated by monochromatized Cu Ka X-ray radiation from an Empyrean Cu LFF DK406691 fixed anode X-ray tube, operated at 45 kV and 40 mA, together with a diffractometer scan step size of $2\theta=0.0167°$, and a dwell time of 0.127 s step-1, over a $2\theta$ range of 10-60°. Diffraction patterns were processed at the same time in Spectragryph v1.2.10 to perform background removal and smoothing using a 2nd order scattering baseline followed by a 100 interval, rectangular moving average filter.

2.9 Transmission Electron Microscopy and Selected Area Electron Diffraction

DNA aptamer-collagen complex fiber ultrastructure was assessed by negative staining fibers with phosphotungstic acid. Fibers were synthesized by mixing 0.3 mg/mL rat tail tendon type I collagen (Corning) diluted in sterile deionized water (20% volume fraction of mixture) with either 1 µM random ssDNA or HAP aptamer diluted in sterile deionized water (80% volume fraction of mixture). Fibers were allowed to form for 1 hour at room-temperature and then centrifuged at 2000g for 5 minutes. The supernatant was removed and replaced with 1% phosphotungstic acid aqueous staining solution (Electron Microscopy Sciences) at pH 7.0. Fibers were incubated in the staining solution for 1 hour at room temperature and then pipetted onto lacey carbon copper grids (Electron Microscopy Sciences). The grids were then air-dried. Stained fibers were imaged by transmission electron microscopy (TEM). Fiber diameters were measured in Gwyddion 2.51 using line profiles defined perpendicular to the fiber longitudinal axis. Mean fiber diameters were compared using an unpaired t test with Welch's correction with an alpha-level of 0.05 in GraphPad Prism 8.3.0 (538).

Crystallites from one- and two-step mineralized fibers incubated for 1, 3, and 6 days in mineralization solution were imaged and assessed by TEM and selected area electron diffraction (SAED). Fiber solutions in ethanol were pipetted onto lacey carbon copper grids (Ted Pella) and the remaining ethanol was allowed to evaporate.

All imaging was performed using a FEI Tecnai F20 S/TEM operated between 80-200 keV in brightfield (BF) and SAED modes. Electron diffraction patterns were indexed in ImageJ (National Institute of Health).

2.10 Scanning Electron Microscopy and Energy Dispersive X-Ray Spectroscopy

Gel morphology of one- and two-step mineralized gels incubated for 6 days in mineralization solution was assessed by scanning electron microscopy (SEM). Gels were placed and air-dried on circular cover glass and the cover glass was then adhered to SEM stubs using double-sided tape. Gels were then sputter coated with Au/Pd (7 kV, 10 mA, 30 mTorr, 60 s). SEM micrographs were taken using a Tescan MIRA3 field emission SEM with an operating voltage between 0.2-30 keV. The presence of calcium and phosphate in the gel was confirmed by energy dispersive X-ray spectroscopy (EDS) using a mounted EDAX Octane Pro EDS system. EDS spectra were collected at three separate points across the sample.

2.11 Cell Culture

Human osteoblasts (HObs) (Cell Applications, Lot #3258, 52-year-old black female) were grown on tissue culture polystyrene in a humidified cell culture incubator kept at 37° C. and 5% CO2. Cells were used between passage number 4-6. HObs were cultured in fully supplemented Osteoblast Growth Medium (Cell Applications). Media was exchanged every 2-3 days.

2.12 Mineralized Fibers in Culture

20% volume fraction collagen solution fibers were formed for both the random ssDNA and HAP aptamer as previously described in Section 2.1. These fibers were immobilized to untreated polystyrene 24 well well-plates (Eppindorf) and mineralized in the same manner as previously described in Section 2.3, 2.5. HObs were seeded at 5,000 cells/cm in each well as well as a tissue-culture polystyrene control (Corning) in triplicate. HObs were cultured for 3 days without media renewal. Phase images were taken daily. After 3 days, cells were rinsed in phosphate-buffered saline and fixed in 4% formalin for 15 minutes. Then rinsed three times with 5 minutes of agitation on an orbital shaker between rinses and stored in phosphate-buffered saline at 4° C. until immunocytochemistry was performed.

2.13 Immunocytochemistry

Immunocytochemistry was performed to visualize HObs morphology and protein expression. Cells were permeabilized with 0.1% Triton-X 100 in phosphate-buffered saline (PBS) for 10 minutes, then rinsed 3 times with PBS, and blocked for 30 minutes with 1% bovine serum albumin (BSA) in PBST (0.1% Tween 20 in PBS). Cells were then incubated at 4° C. overnight with a primary antibody for osteopontin (abcam, ab69498) at a 1:200 dilution in 1% BSA in PBST. Then the cells were rinsed 3 times with 1% BSA in PBST and incubated for 1 hour at room-temperature in the dark with a secondary antibody (abcam, ab150080) at a 1:200 dilution in 1% BSA in PBST. Following incubation, the cells were rinsed 4 times with 1% BSA in PBST and mounted using ProLong Diamond with DAPI (Invitrogen). In a similar manner to stain for cytoskeletal F-actin, after the permeabilization step cells were incubated with Texas-Red phalloidin (Invitrogen) following the manufacturer's instructions and mounted using ProLong Diamond with DAPI (Invitrogen). Fluorescence microscopy was conducted using an epifluorescence Nikon TE-2000U inverted microscopy.

2.14 Mineralized Cells in Culture

Figure 43:
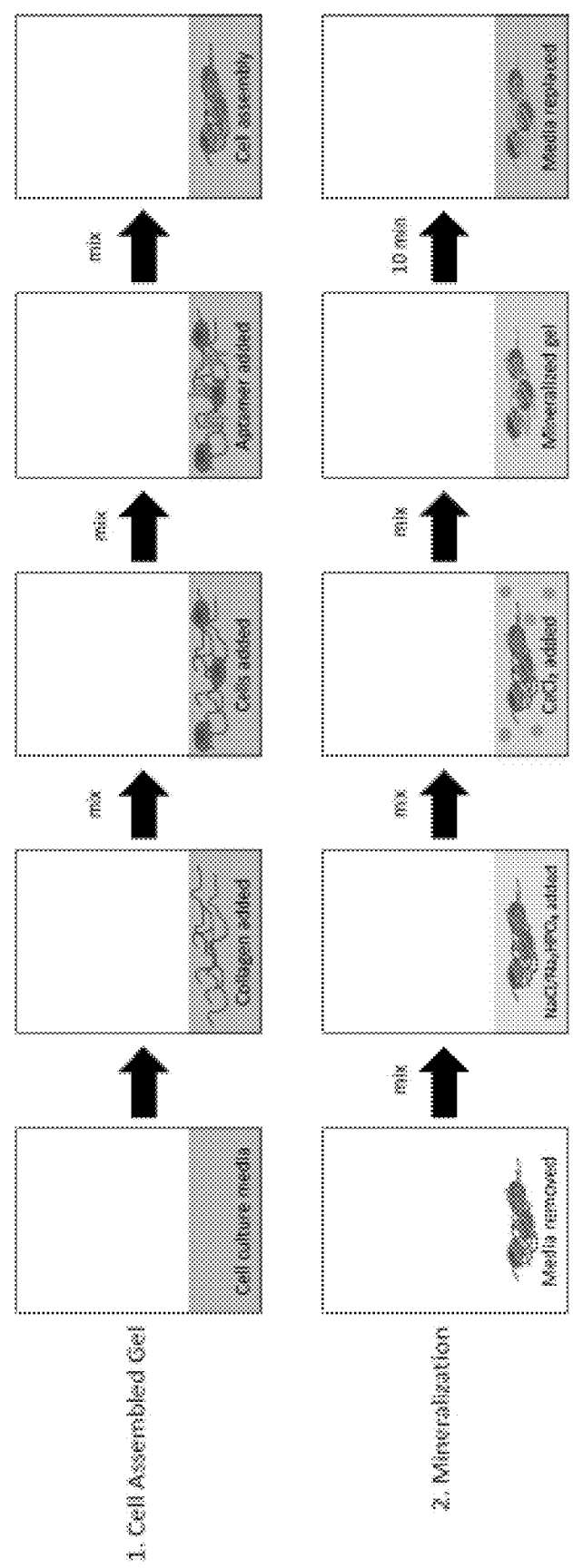
FIG. 43 is a schematic of gel synthesis (1) and two-step mineralization (2) with embedded cells.

Gels were prepared by mixing type I rat tail collagen to a final concentration of 0.6 mg/mL and either the random ssDNA or HAP aptamer to a final concentration of 8 µM in complete Osteoblast Growth Medium (Cell Applications) to a final volume of 500 µL. HObs were seeded at 62,500 cells at passage 6. Gels were prepared in individual wells of a 24 well ultra-low attachment plate (Corning). The gels with embedded cells were then incubated overnight to promote cell attachment before mineralization (FIG. 43). The gels were mineralized by adding in the following order sterile solutions to a final concentration of 25 mM NaCl, 8 mM Na2HPO4, and 15 mM $CaCl_2$ with a final volume of 500 µL. The solution was mixed in the well by pipetting up and down and swirling the well plate. The gel was incubated in this solution for ~10 minutes in a cell culture incubator. Then the solution was removed and replaced with 1 mL Osteoblast Growth Medium. After 3 days of culture, gels were fixed in 4% formalin for 15 minutes. Then rinsed three times with 5 minutes of agitation on an orbital shaker between rinses and stored in phosphate-buffered saline at 4° C. until needed. Gels were then stained with 40 mM alizarin red stain (Sigma Aldrich) for 30 minutes and rinsed several times to remove unbound stain. Subsequently, the fixed gels were incubated in Hoescht 33342 (Invitrogen) following the manufacturer's instructions. Phase contrast and fluorescence microscopy were conducted using an epifluorescence Nikon TE-2000U inverted microscope.

Figure 35B:
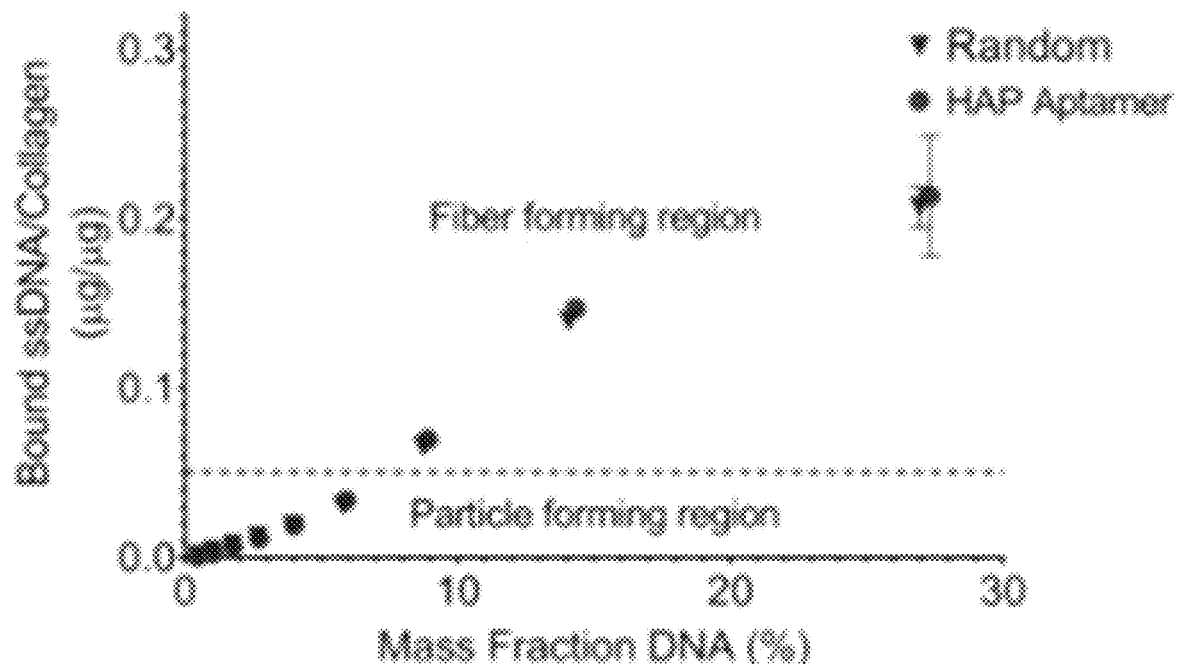
Figure 35C:
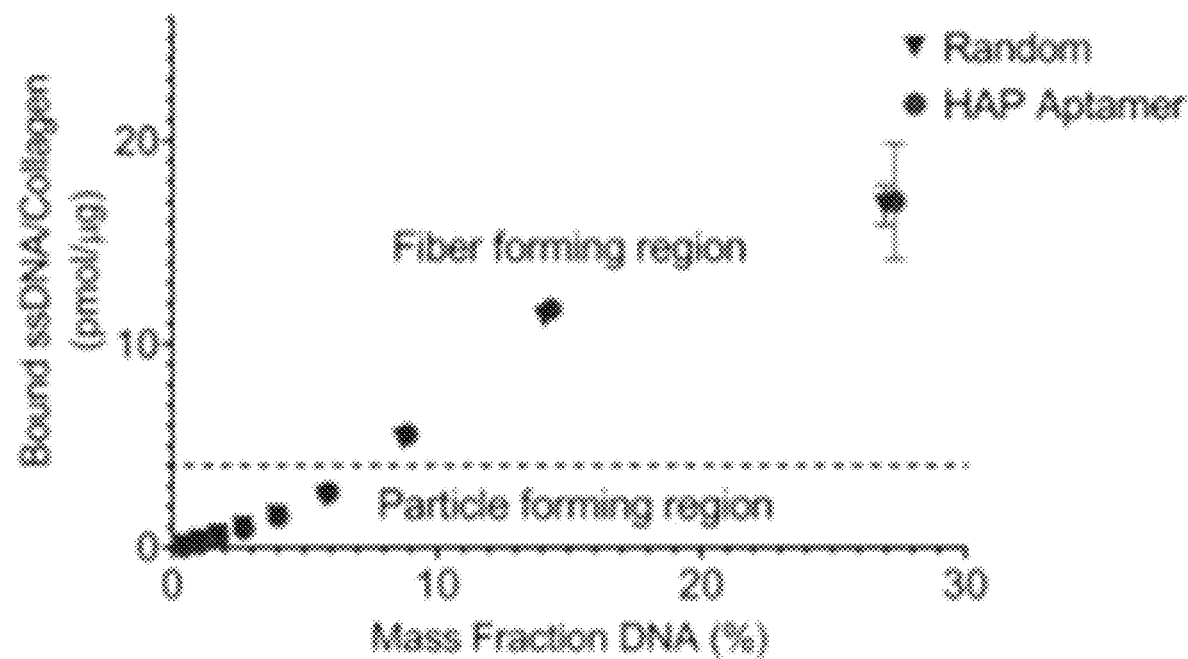

3. Results 3.1 Synthesis and Mineralization of DNA Aptamer-Collagen Fibers and Gels Upon mixing dilute solutions of the HAP aptamer and type I collagen, DNA aptamer-collagen complexes spontaneously and rapidly self-assembled in aqueous solution. Fibers formed (FIG. 35A) by mixing the HAP aptamer and type I collagen above a mass fraction of ~9% ssDNA in solution. Fibers formed for the same ssDNA to collagen ratios for both the random ssDNA and the HAP aptamer, which was attributed to their identical binding capacity with collagen on both a mass per mass (FIG. 35B) and mole per mass (FIG. 35C) basis. Trivial difference between their binding capacity was expected because of their identical length (40 nucleotides) and near identical molecular weight. For each ssDNA, self-assembled fibers formed when ssDNA-collagen binding was greater than ~0.05 µg ssDNA/ µg collagen (~5 µmol ssDNA/µg collagen) below which nanoparticle aggregates persisted.

Figure 35D:
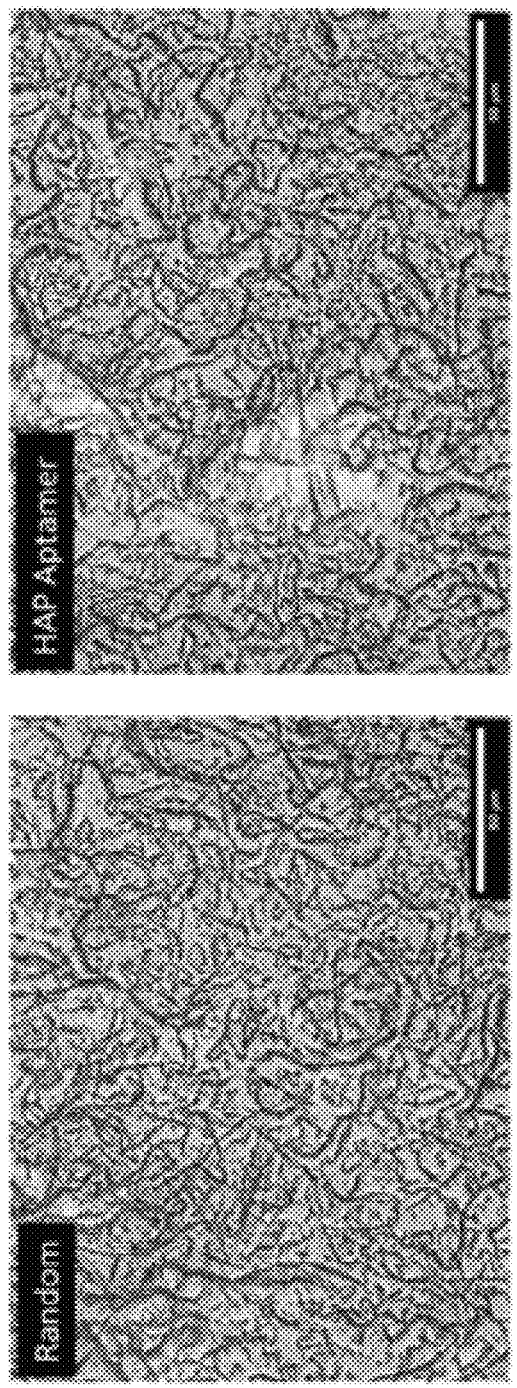
Figure 35E:
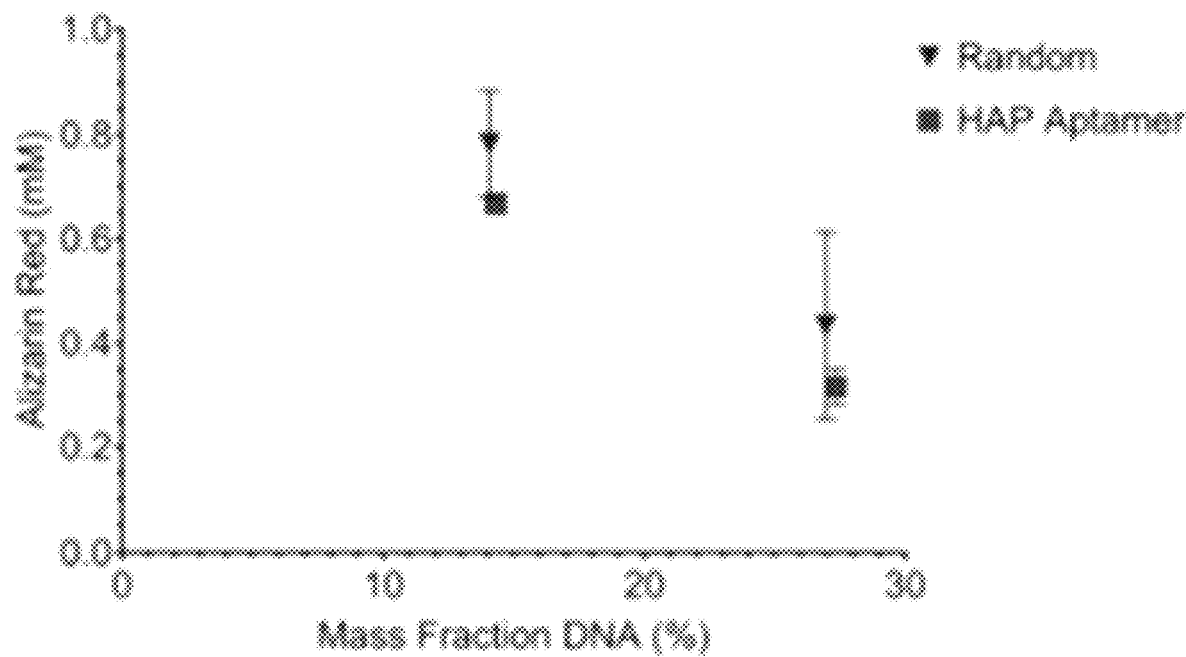
Figure 35F:
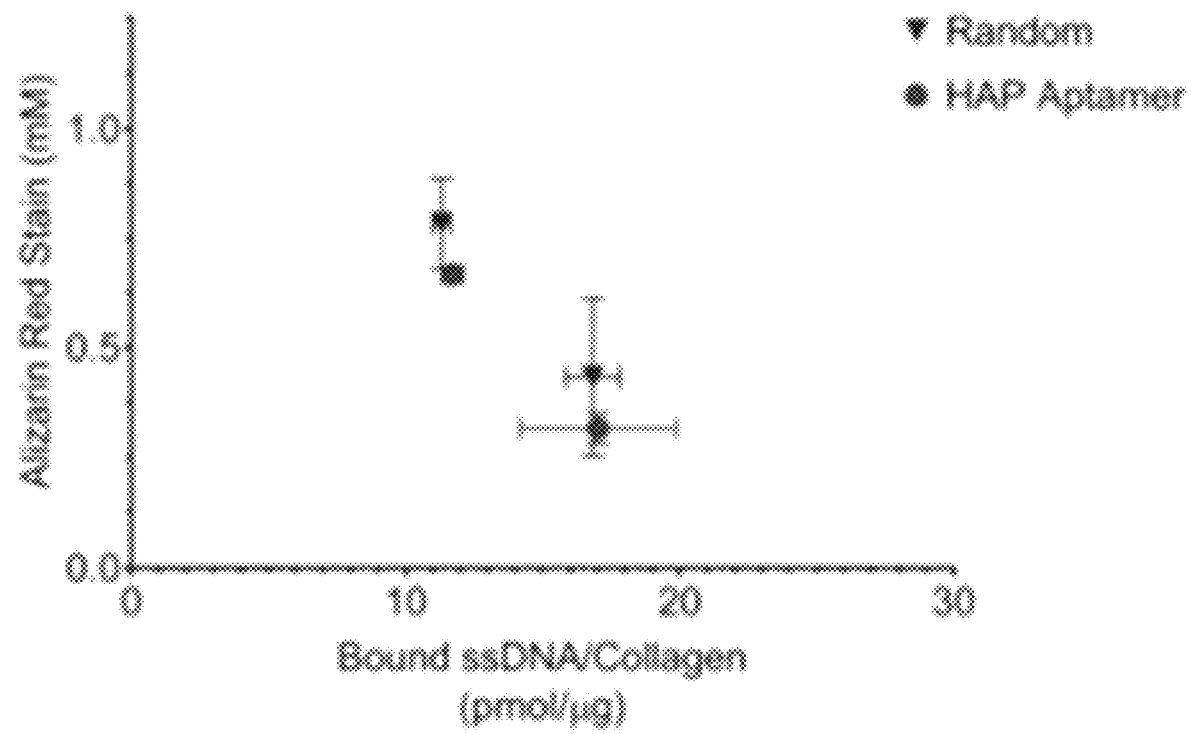

We next investigated whether these fibers could bind calcium phosphate mineral after forming. To do this, we immobilized the fibers to a polystyrene substrate using the heterobifunctional crosslinker sulfo-SANPAH. Fibers were immobilized to ease rinsing of the fibers during later processing and to remove any unincorporated ssDNA and collagen. We then incubated the fiber functionalized surface in a solution of NaCl and $Na_2HPO_4$ and initiated mineralization by the addition of $CaCl_2$. Within minutes, visible calcium phosphate precipitated. Both the random ssDNA and the HAP aptamer bound mineral to their fibers, which was visualized by staining for Ca using alizarin red stain (FIG. 35D). Interestingly, both sequences accumulated similar amounts of calcium phosphate (FIG. 35E). Even more so, the amount of bound calcium phosphate decreased with increasing ssDNA-collagen binding (FIG. 35F). DNA has an affinity for calcium phosphate through electrostatic interactions between the DNA phosphate backbone and the Ca exposed on the surface of calcium phosphate crystals.14 At the same time, DNA has an avidity for collagen, through the combining of their hydration shells promoted by interactions between DNA's phosphate backbone and CH2 groups on the collagen triple helix.14 Thus, there is a potential competition between the calcium phosphate, ssDNA, and collagen species.

Interested by this competition and the potential interference of calcium phosphate precipitate on fiber formation, we investigated whether the formation of fibers and their mineralization would occur in a one-step synthesis process by mixing a solution of HAP aptamer and $CaCl_2$ with a solution of collagen, NaCl, and $Na_2HPO_4$. As with the two-step synthesis (i.e. fibers formed and then mineralized), fiber formation readily occurred (<10 minutes) and these fibers displayed a bound mineral phase.

Figure 36A:
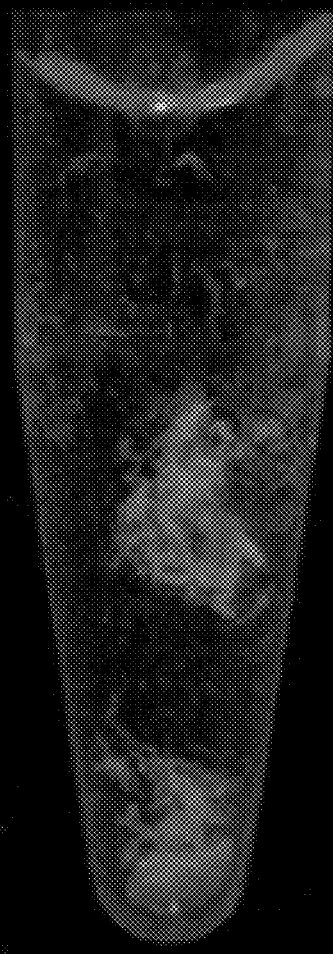
FIGS. 36A-36B show ssDNA fluorescently stained using SYBR Safe DNA stain (Invitrogen) to visualize the DNA aptamer-collagen complex gels after formation in 0.6 mL microcentrifuge tubes with random-sequence aptamer[s] (FIG. 36A) and HAP aptamer (FIG. 36B).
Figure 36B:

Not only DNA aptamer-collagen complex fibers, but also 3D gels were able to be produced. By increasing the ssDNA and collagen concentrations by 10 times, we achieved the spontaneous and rapid formation of DNA aptamer-collagen gels (FIGS. 36A-36B). The gels had a loose network structure when suspended in solution. To make a more compact structure, the gels were densified by centrifugation. The gels were confirmed as DNA aptamer-collagen complexes and not simply precipitated collagen by staining the gels with a green fluorescent DNA stain and visualized under blue light (FIGS. 36A-36B). As with the fibers, the gels were mineralizable by both the one- and two-step approach. Thus, DNA aptamer-collagen complexes are able to be prepared in both 2D and 3D formats and both are mineralizable. Owing to their ubiquity, these fibers and gels have promise for not only bone tissue engineering, but as coatings and scaffolds for any tissue using this versatile biomaterial platform by substituting for other tissue-specific collagens and bio-functional DNA aptamers.

Figure 37A:
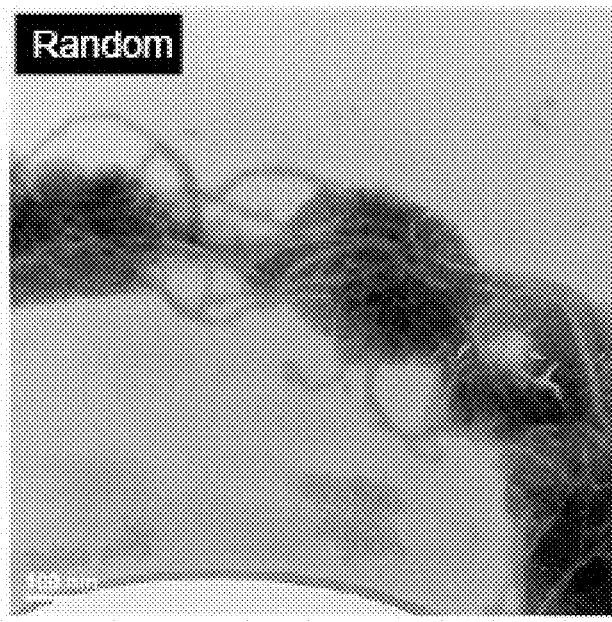
FIGS. 37A-37D are TEM micrographs of 1% phosphotungstic acid stained HAP aptamer and random ssDNA fibrils (FIGS. 37A-37B) and high resolution TEM micrographs of those fibrils with an inset representative line profile of an individual fibril (FIGS. 37C-37D).
Figure 37B:
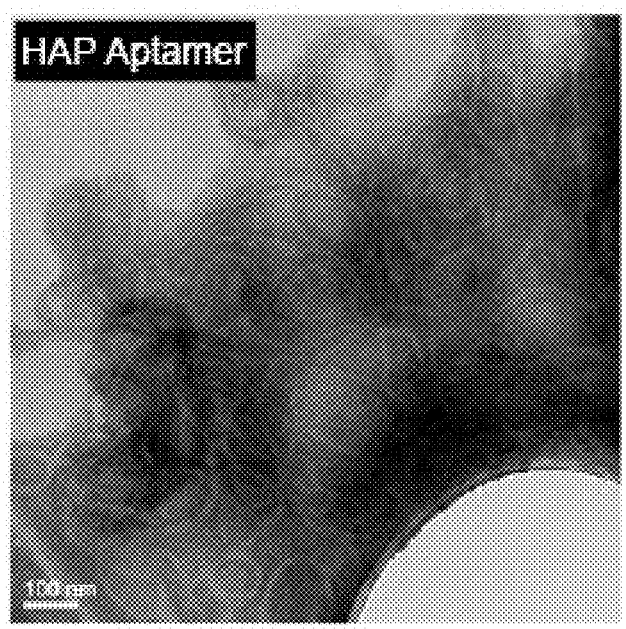
Figure 37C:
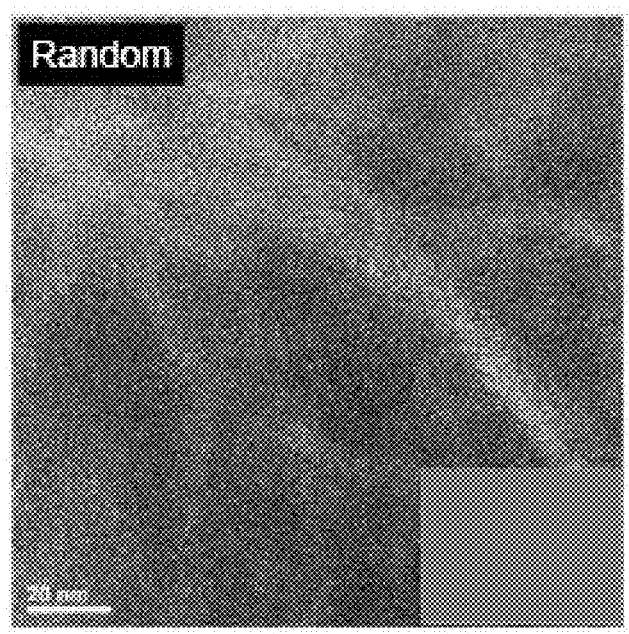
Figure 37D:
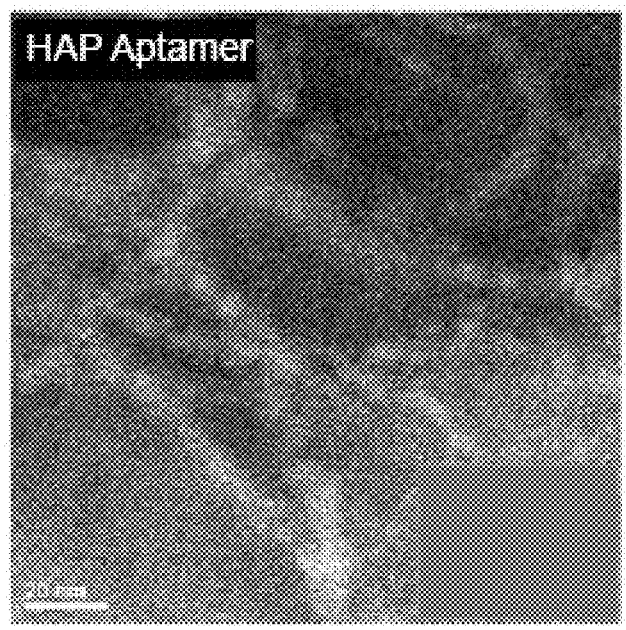

To visualize the fiber ultrastructure, unmineralized fibers were negatively stained using phosphotungstic acid and imaged by TEM. This stain is widely used for visualizing the D-spacing of aligned collagen fibrils.14 Unexpectedly, solid, compact fibrils were not observed. But rather we saw masses of very thin "spaghetti-like" fibrils consisting of highly intermixed, curved chains (FIGS. 37A-37B). Such structures were observed for both ssDNA with no apparent differences between fibrils for the two sequences. Furthermore, no crossbanding pattern was observed for either complex. Fibril diameters were measured from high resolution TEM micrographs using line profiles of pixel intensity drawn perpendicular to the fibril longitudinal axis (FIGS. 37C-37D, insets). The complex fibrils formed with the random ssDNA had a mean diameter of 7.38±1.27 nm (n=12) and with the HAP aptamer had a mean diameter of 6.90±0.76 nm (n=12). There was no statistical difference between the two means. Most intriguing the line profiles generally displayed three peaks across the complex diameter suggestive of the dsDNA-collagen complex structure.30 Because the DNA aptamer-collagen complex formed a divergent configuration from that of native collagen fibrils, it was even more necessary to characterize the mineralization process for these complexes.

3.2 Characterization of DNA Aptamer-Collagen Complex Mineralization

Figure 38A:
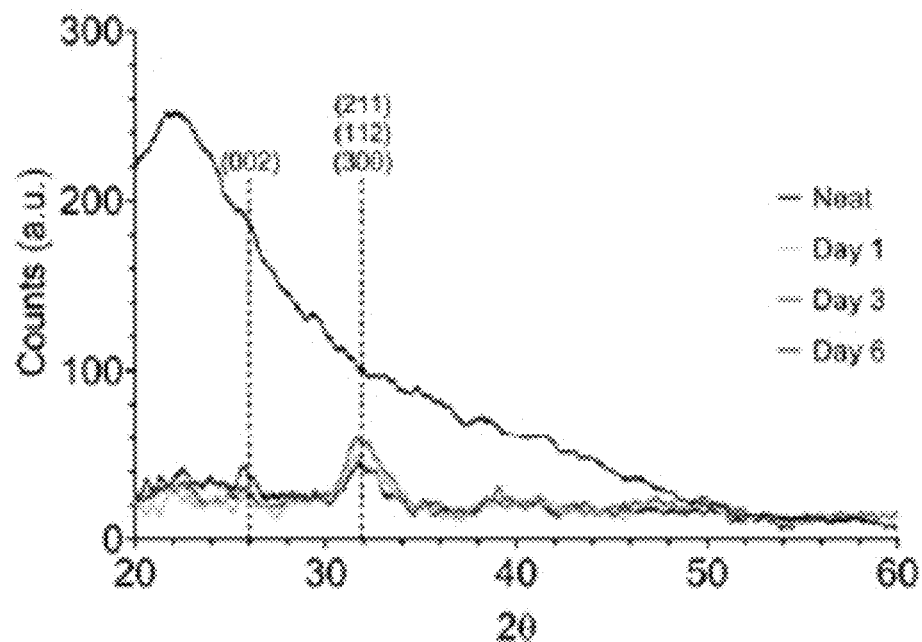
FIGS. 38A-38D: characterization of mineralized DNA aptamer-collagen complexes. XRD patterns for both random ssDNA (FIG. 38A). and HAP aptamer (FIG. 38B) two-step mineralized gels after 1, 3, and 6 days in mineralization solution. Representative TEM micrographs of both random ssDNA (FIG. 38C). and HAP aptamer (FIG. 38D) two-step mineralized fibers after 6 days in mineralization solution with representative SAED patterns for each (insets).
Figure 38B:
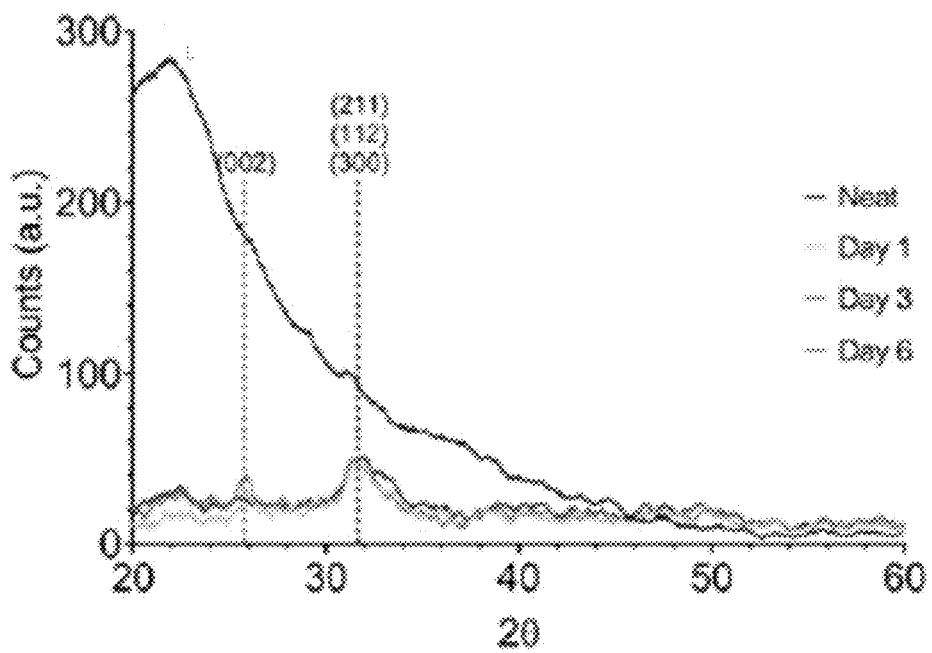
Figure 38C:
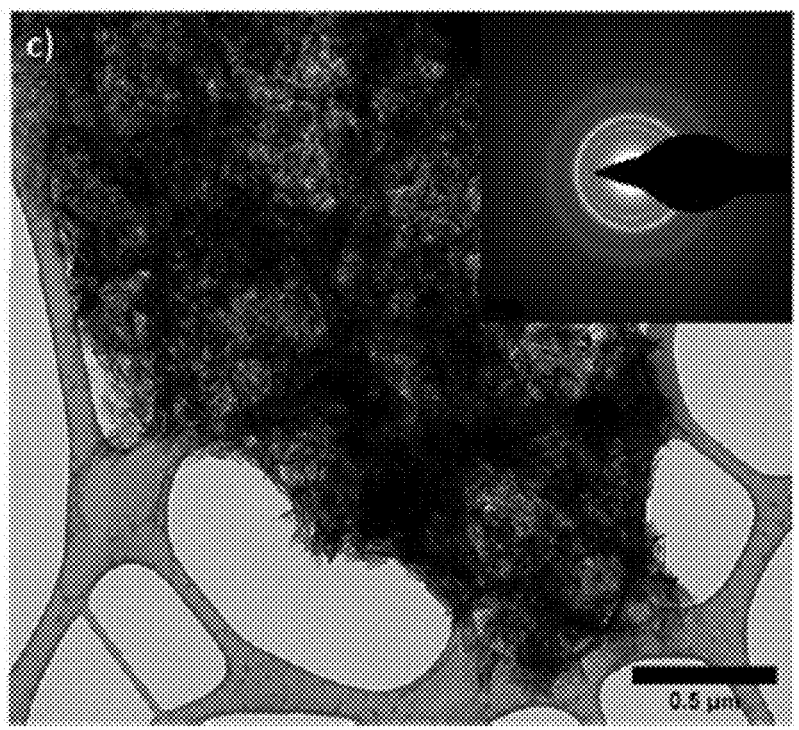
Figure 38D:
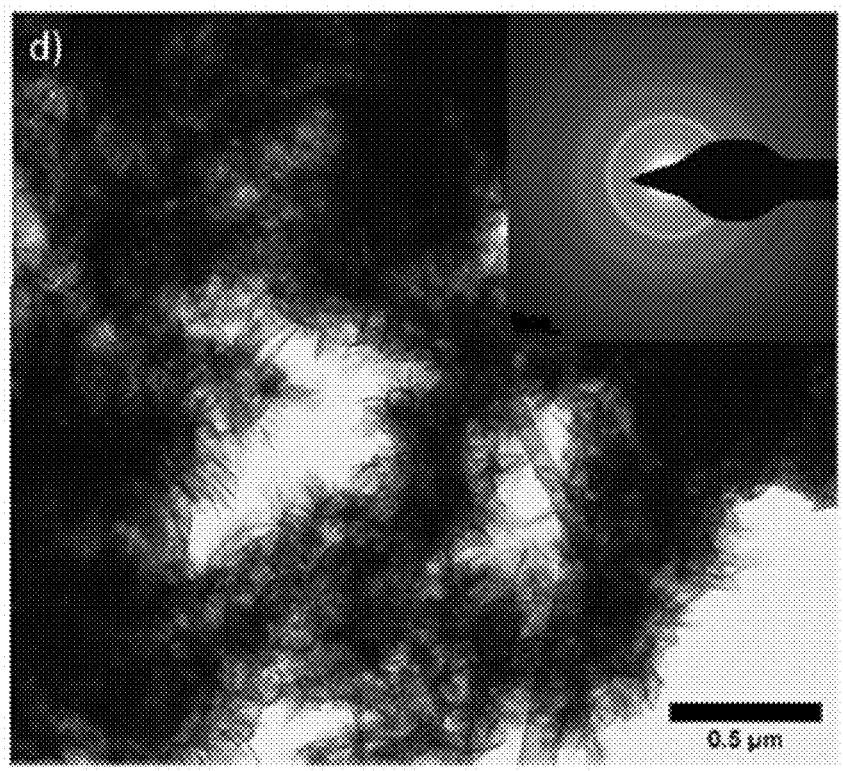

To characterize the mineralization of the fibers and gels in more detail, a combination of XRD, TEM, SAED, SEM, and EDS was performed. XRD patterns of two-step mineralized gels for both the random ssDNA (FIG. 38A) and HAP aptamer (FIG. 38B) displayed peaks indictive of the HAP (002) plane at ~26° and a large peak at ~32° assigned to the combination of the HAP (211), (112), and (300) planes.3 No other peaks were discernable, which was attributed to excessive peak broadening from nanocrystalline crystallites and a favorable "poorly crystalline" character.3,31 Such patterns are akin to early stage bone formation.3 In comparison, as expected unmineralized gels showed a large amorphous hump. There was no change in the diffraction patterns over 6 days of incubation in the mineralizing solution indicating that mineralization had ceased after 24 hours. Nanocrystalline calcium phosphate was confirmed by TEM-BF of mineralized fibers formed using both the random ssDNA (FIG. 38C) and the HAP aptamer (FIG. 38D). The crystallites from both ssDNA containing fibers were randomly oriented with plate-like morphology indicative of the HAP phase.3 XRD also was performed for one-step synthesized gels, which mimicked the patterns of the two-step mineralized gels. Only the random ssDNA gels incubated in mineralizing solution for 1 day showed a difference by the presence of a slight overlaid amorphous hump from 20-32° (FIG. 44A). TEM of random ssDNA one-step mineralized fibers after 1 day of incubation in mineralization solution demonstrated fibers with contrast indicative of mineral accumulation as compared to unmineralized fibers as well as SAED patterns for HAP (FIGS. 44B-44C). The fibers resembled those of early stage PILP mineralization of collagen using polyaspartate without a cross-banding pattern.3 Individual complex nanofibrils observed in the unmineralized condition (FIG. 37A) were unable to be identified suggesting the mineral phase was interpenetrating and acting to coalesce them into thicker bundles.

Figure 45A:
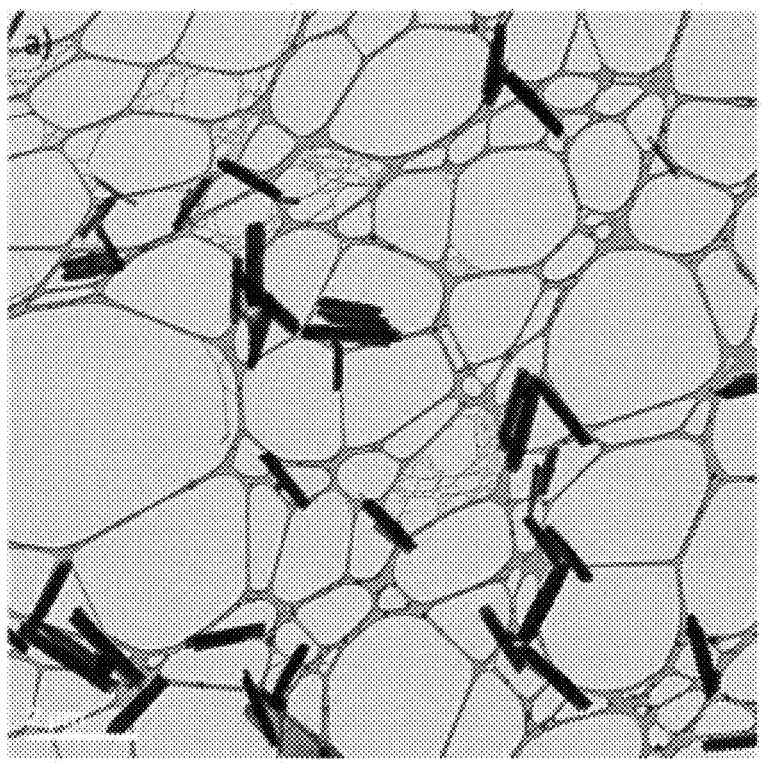
FIGS. 45A-45B are transmission electron micrographs of suspected octacalcium phosphate flakes at low (FIG. 45A) and high (FIG. 45B) magnification.
Figure 45B:
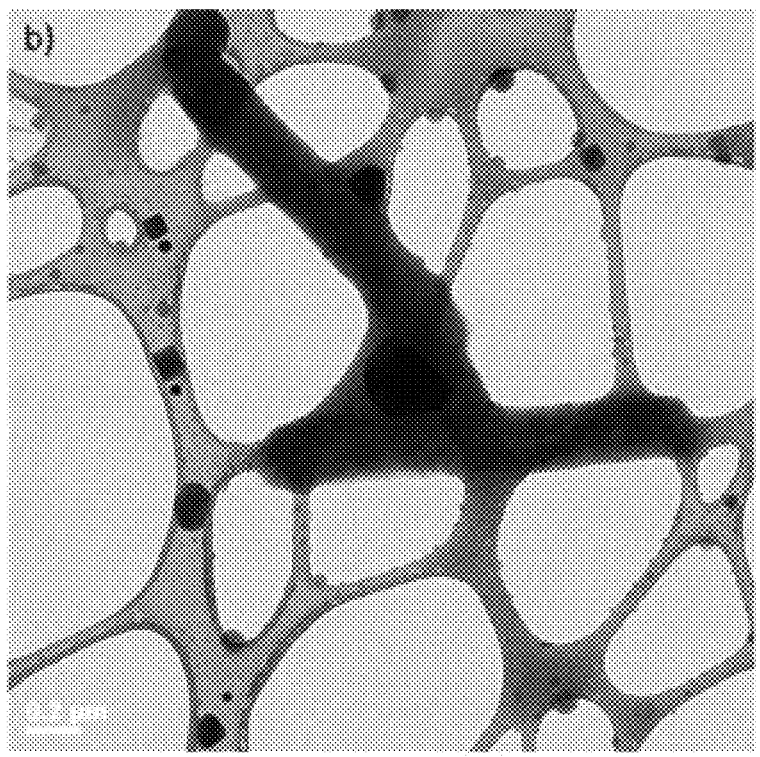

Hydroxyapatite and octacalcium phosphate (OCP) have extremely similar d-spacings making it difficult to determine crystalline phase exclusively from diffraction patterns for randomly oriented crystallites.3,32 SAED patterns for mineralized fibers formed using both the random ssDNA (FIG. 38C, inset) and the HAP aptamer (FIG. 38D, inset) were indexed and compared to reported d-spacings for native bone and calcium phosphate references (Table 2). The indices were comparable to those of native bone; though, no arcing was observed in the SAED patterns for either DNA containing fiber (FIGS. 38C-38D) as expected for randomly oriented mineralized fibers.33 Suspected OCP flakes were observed when imaging the mineralized fibers by TEM (FIGS. 45A-45B). These crystallites were thought to be OCP because they melted under the 200 keV beam. OCP has been shown to undergo a phase transition to HAP due to localized heating from the TEM electron beam.34 Meanwhile, the other crystallites (FIGS. 38C-38D) were stable under the 200 keV electron beam suggesting they are electron beam stable HAP. As our observation of such "meltable" crystallites was very infrequent during TEM and based upon their instability under the 200 keV beam, we believe the observed crystallites (FIGS. 38C-38D) and their SAED patterns belong to HAP for both the random ssDNA- and HAP aptamer-collagen complex fibers.

TABLE 2

Indexed d-spacings for random ssDNA and HAP aptamer mineralized fibers and their comparison to native bone, HAP, and OCP

| Random | HAP Aptamer | Bone[a] | HAP[a] | | OCP[a] | |
|---|---|---|---|---|---|---|
| d/Å | d/Å | d/Å | d/Å | hkl | d/Å | hkl |
| 3.44 | 3.46 | 3.44 | 3.44 | (002) | 3.43 | (002) |
| 3.14 |  | 3.10 | 3.08 | (210) | 3.05 | (312) |
|  |  | 2.81 | 2.80 | (211) | 2.83 | (710) |
| 2.78 | 2.79 | 2.77 | 2.78 | (112) | 2.77 | (322) |
|  |  | 2.71 | 2.72 | (300) | 2.69 | (700) |
| 2.28 | 2.28 | 2.26 | 2.26 | (310) | 2.26 | (620) |
| 1.95 | 1.95 | 1.92 | 1.94 | (222) | 1.95 | (822) |
| 1.84 | 1.84 | 1.84 | 1.84 | (213) | 1.84 | (642) |
| 1.72 | 1.71 | 1.72 | 1.72 | (004) | 1.72 | (004)| |

[a]Values reported by Olszta et al. for natural equine bone, HAP (JCPDS 9-432), and OCP (JCPDS 79-0423)[5]

Figure 39A:
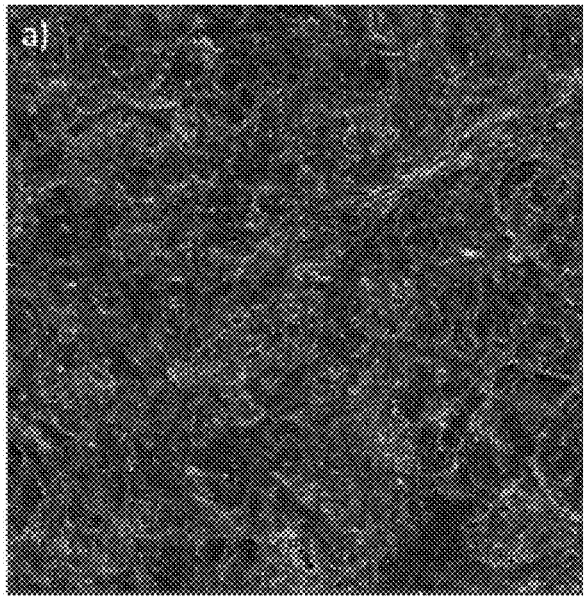
FIGS. 39A-39D are representative SEM micrographs of the surface of a random ssDNA two-step mineralized gel after 6 days in mineralization solution at two different locations (FIG. 39A, FIG. 39C) with higher magnification micrographs of central regions designated (FIG. 39B, FIG. 39D).
Figure 39B:
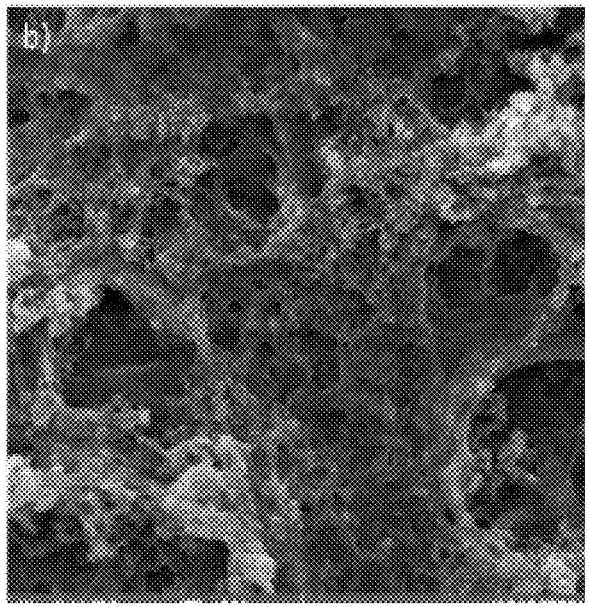
Figure 39C:
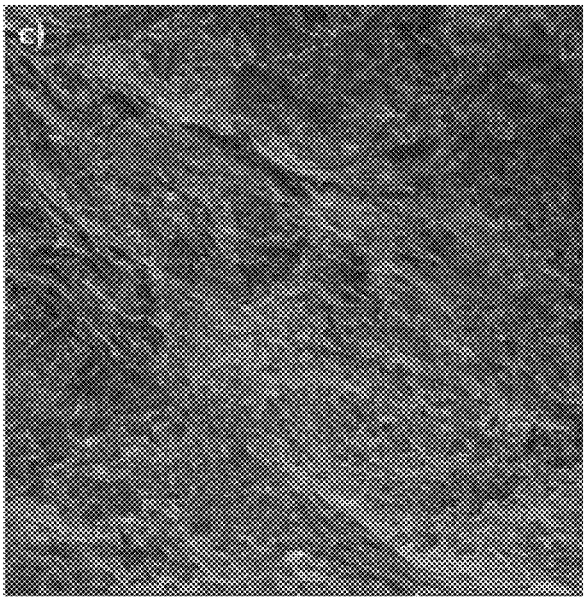
Figure 39D:
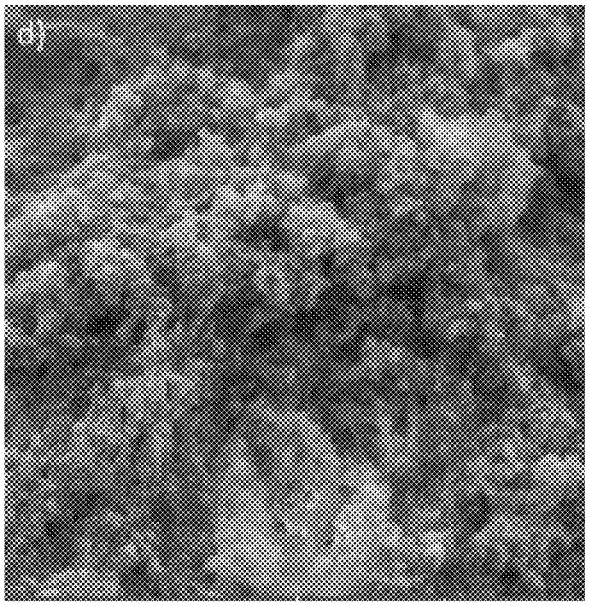
Figure 46:
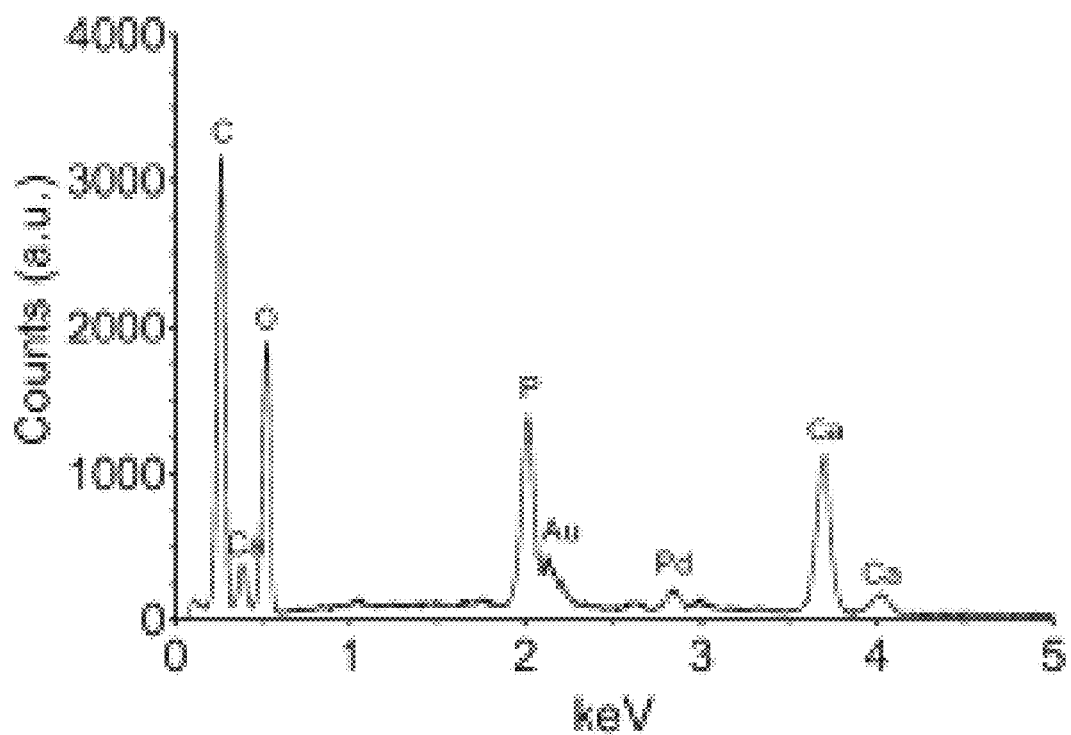
FIG. 46 is a representative energy dispersive X-ray spectrum of two-step mineralized random ssDNA-collagen complex gels indicating the presence of both calcium and phosphorus.

SEM of 6 day mineralized gels revealed a topographically rich surface akin to that of native extracellular matrix (ECM) with pits, pores, and striations (FIGS. 39A-39D).35,36 Individual fibers were less visible being more of an isotropic fibrous agglomerate (FIGS. 39A, 39C). The same nanometer sized HAP crystallites observed by TEM were present at the surface (FIGS. 39B, 39D). Energy dispersive X-ray spectroscopy (EDS) confirmed the presence of Ca and P incorporated in the gel (FIG. 46). Calcium phosphate phases have Ca to P ratios ranging anywhere from 0.5-2.5 with 1.67 for HAP, 1.5 to 1.67 for Ca-deficient deficient HAP, and 1.33 for OCP, respectively.(1) Integration of the EDS Ca and P peaks gave a range of 0.95 to 1.40 for the local Ca/P ratio across the sample. At first this suggested the potential mixture of several calcium phosphate phases present in the gel running counter to the XRD and SAED results. Though, we attributed the reduced Ca/P ratio to the ssDNA present in the DNA aptamer-collagen complex because the phosphate backbone of ssDNA would be able to elevate the P content in the EDS spectrum and thus artificially reduce the Ca/P ratio specific to the calcium phosphate mineral. Together, the combination of porosity, mineral, and nanotopography are suggestive of a favorable surface for bone tissue engineering. Collectively, this data indicates that the DNA aptamer sequence as well as the synthesis route had little effect on the mineralization of DNA aptamer-collagen complexes. The HAP aptamer was able to facilitate more rapid HAP formation compared to the random ssDNA only within the first day of mineralization. This suggests that DNA aptamer-collagen complexes template HAP. The incorporation of HAP into DNA aptamer-collagen fibers and gels and their structure suggests it to be a highly osteoconductive biomaterial platform requiring investigation of the biological response to its biophysical cues.

3.3 DNA Aptamer-Collagen Fibers Spur Osteoblast-To-Osteocyte Differentiation

Figure 47A:
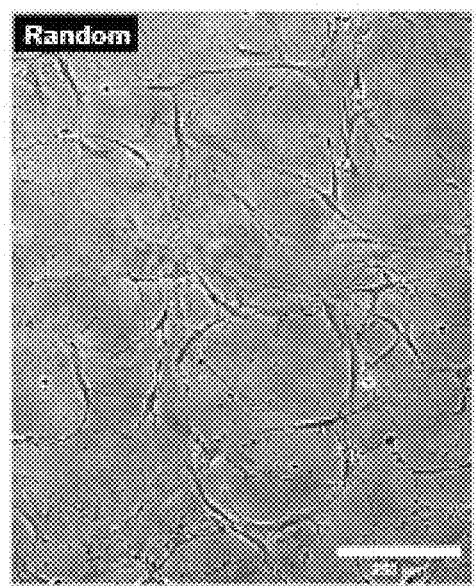
FIGS. 47A-47D are representative phase contrast microscope images of primary human osteoblasts taken after 3 days of culture on random ssDNA—(FIG. 47A), mineralized random ssDNA—(FIG. 47B), HAP aptamer—(FIG. 47C), and mineralized HAP aptamer—(FIG. 47D) collagen complex fibers.
Figure 47B:
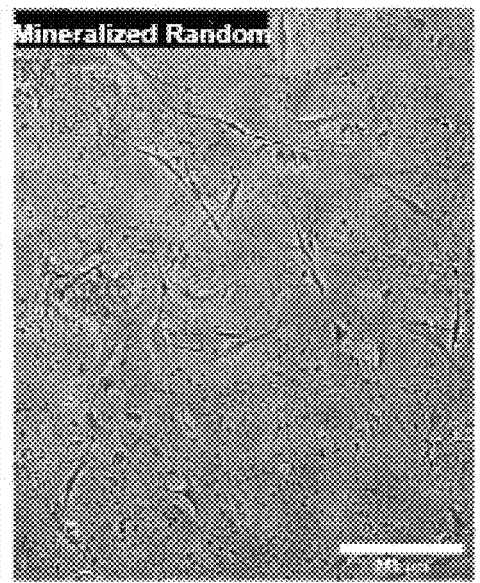
Figure 47C:
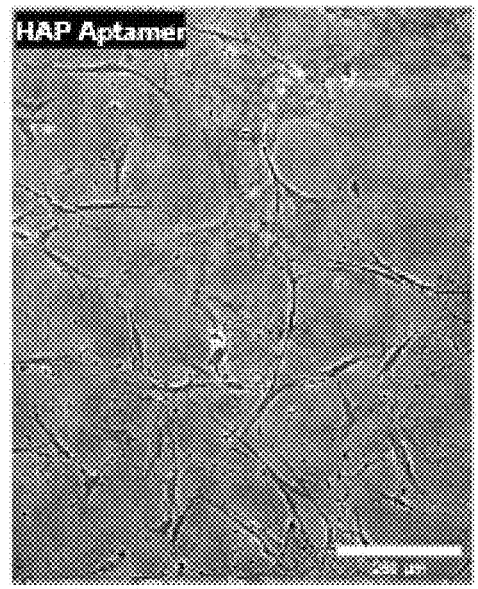
Figure 47D:
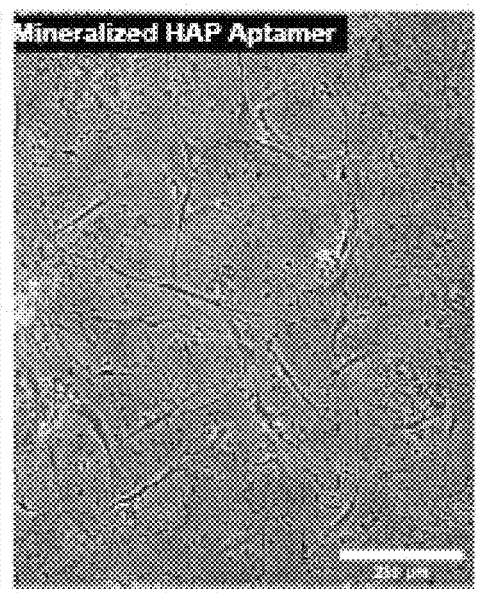

We cultured primary human osteoblasts (HObs) on immobilized DNA aptamer-collagen complex fibers in both the mineralized and unmineralized state for each ssDNA sequence to gauge their response to the fiber biophysical cues. Remarkably, the HObs readily attached and within 24 hours began differentiating to an osteocytic lineage indicated by their extensive dendritic processes (FIGS. 47A-47C)37. Formation of these extensions were the dominant behavior for all conditions. Process visualization was made clearer by staining for cytoskeletal F-actin (FIGS. 40A-40C). Many processes were thin and faint but terminated by larger red punctations. HObs were also immunostained for osteopontin to clarify cell mineralizing potential. Surprisingly, expression appeared constant across all conditions (FIGS. 40E-40H). These preliminary results are hopeful for DNA aptamer-collagen fibers as biomaterial coatings.

3.4 Osteoblasts Assemble Cell-Laden DNA Aptamer-Collagen Complex Gels

Figure 41A:
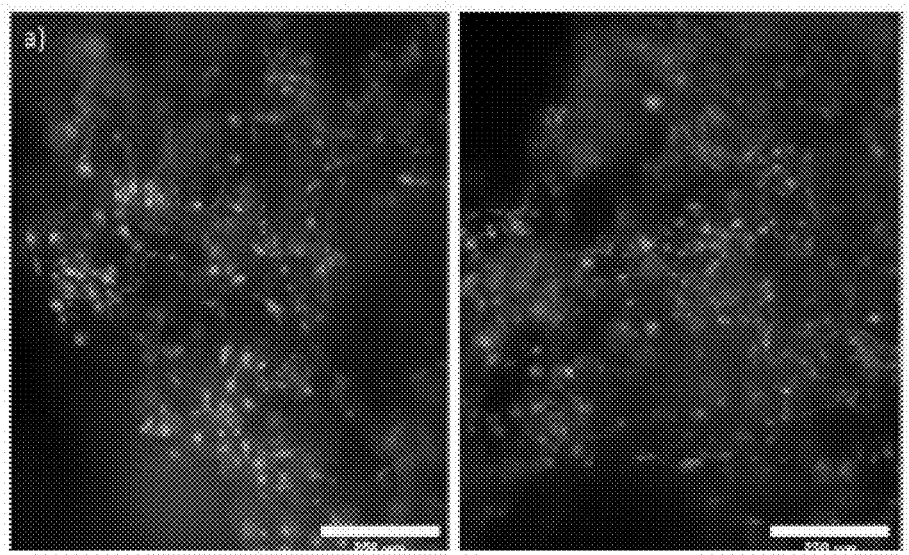
FIGS. 41A-41E Images of live HObs stained with calcein AM (Invitrogen) following the manufacturer's instructions after 24 hours of culture in the HAP aptamer gel (FIG. 41A). Microscopy images of the fixed unmineralized cell densified random ssDNA (FIG. 41B) and HAP aptamer (FIG. 41C) gels with associated composite images of the embedded cell nuclei stained with Hoescht 33342 (FIGS. 41D-41E). Scale bar in (FIGS. 41B-41C) is 3000 μm.
Figures 41B, 41C:
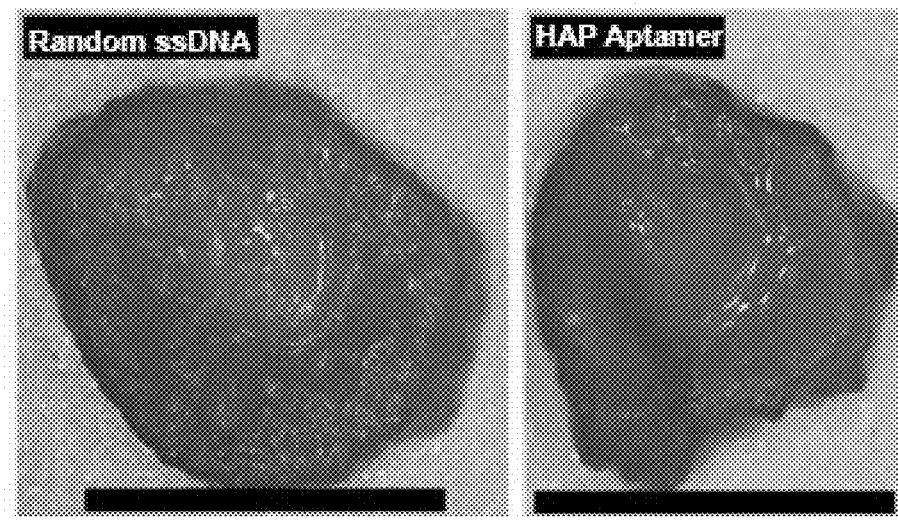
Figure 41D:
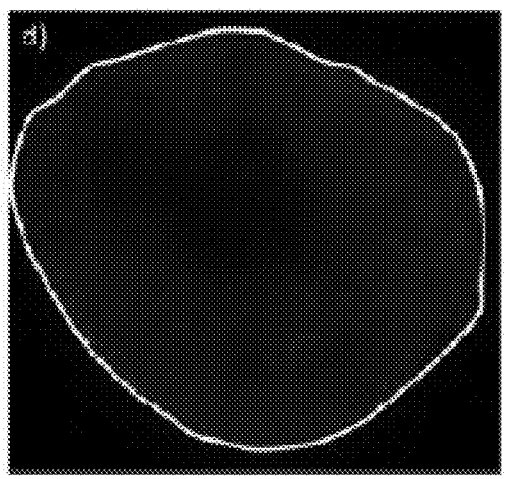
Figure 41E:
Figure 42A:
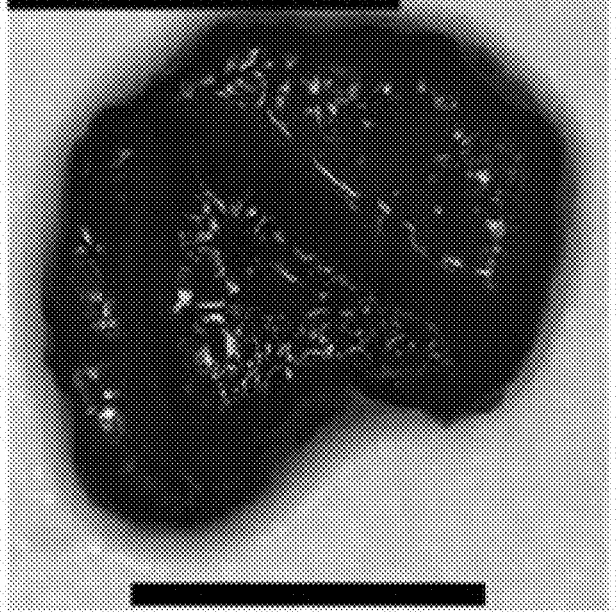
FIGS. 42A-42D Microscopy images of the fixed mineralized cell densified random ssDNA (FIG. 42A) and HAP aptamer (FIG. 42B) gels with associated composite images of the embedded cell nuclei stained with Hoescht 33342 (FIGS. 42C-42D). Scale bar in (FIGS. 42A-42B) is 3000 μm.
Figure 42B:
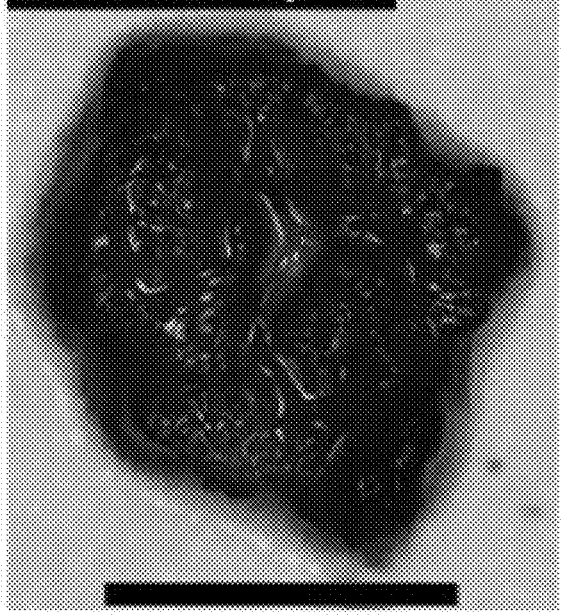
Figure 42C:
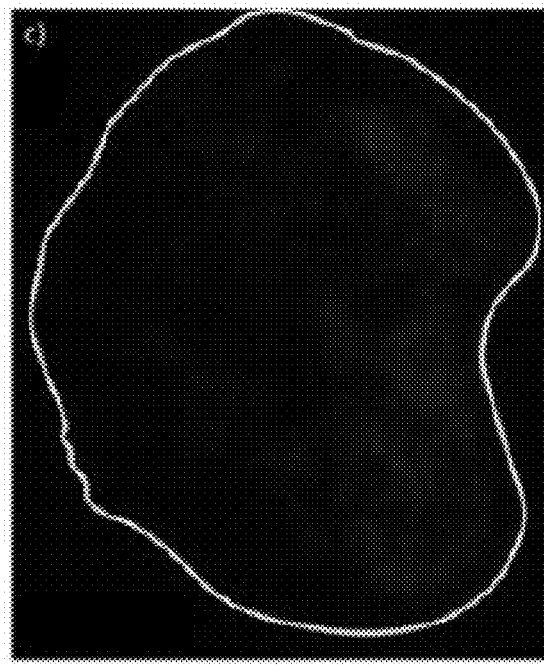
Figure 42D:
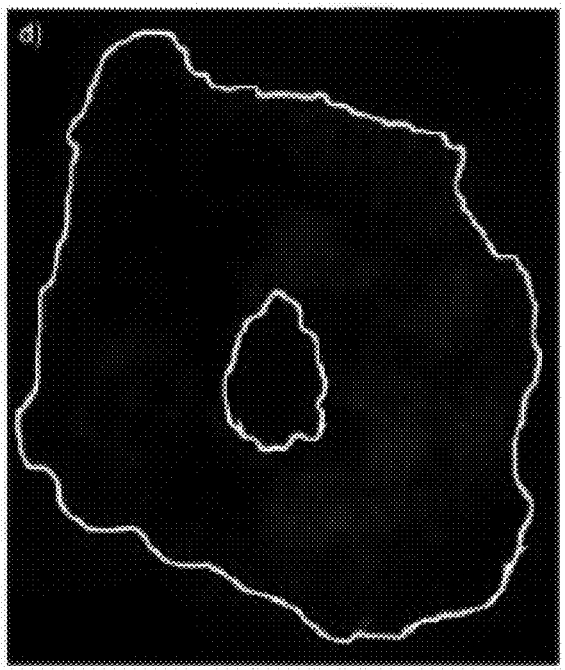

Going further, we were interested in HObs behavior in a 3D environment made using our DNA aptamer-collagen complex gels. Gels were synthesized by embedding the cells in the collagen solution followed by the addition of the random ssDNA or the HAP aptamer to initiate gelation. Cells took on the same dendritic morphology as for the 2D environment as well as forming an interconnected network throughout the gel (FIGS. 41A, 41B). Within 12 hours, the cells had aggregated and densified the gels into ring like structures, which after 3 days were solid tissue (FIGS. 41C, 41D). Moreover, following the 12 hour aggregation, we resuspended the gels in mineralization solution following our two-step mineralization procedure. From this we were able to produce a mineralized gel with embedded osteoblasts. In the same fashion as the unmineralized gels, after 3 days of culture, the mineralized gels also were densified to make solid tissue (FIGS. 42A-42D). Interestingly, the mineralized HAP aptamer gel provoked the formation of a complete ring. Each cell densified gel had a contractile appearance with "curls" and "ruffles" across their surface. The incorporated HAP in the gels was confirmed by staining with alizarin red stain, which dyed the mineralized gels a dark, blood red whereas the unmineralized gels retained only a faint pink at the time of imaging, which continued to leach into the surrounding solution afterwards. The cell distributions were visualized in the cell densified gels by staining for cell nuclei (FIGS. 41B-41C, FIGS. 42A-42B), which revealed a qualitative difference in cell number being higher for the unmineralized gels; though, this may be an artifact of the mineral obscuring fluorescent intensity for underlying cells through the gel thickness. These preliminary results are hopeful for DNA aptamer-collagen gels as a 3D biomaterial platform.

4. Discussion

We are the first to report the synthesis and utility of DNA aptamer-collagen complexes for their use in bone tissue engineering. It should be appreciated the simplicity and rapidity for synthesizing these ECM-mimetics. Simply put, they are made by mixing two solutions: a DNA aptamer solution with a collagen solution. The synthesis time is seconds to minutes. These complexes can be stored in a dry-state or aqueous-state in physiological buffer at room-temperature for extended periods of time.12 Moreover, these complexes are customizable being non-specific for DNA aptamer sequence such that DNA aptamers designed as agonists or antagonists could be used as well as being non-specific for other collagens such that atelocollagen, type II collagen, and type IV collagen could be used.6-9,24,38 These properties are paramount to achieving off-the-shelf, one-step, intra-operative tissue engineering solutions 39. Being multimodal (particles, fibers, gels) enables this biomaterial platform to support a breadth of applications from nucleic acid delivery (particles), coatings (fibers), and scaffolds (gels).

Importantly, is the promise of supplementing these architectures with other native biomolecules or additives to engineer more mimetic and functional ECM.40-42 We have started to do this by using a hydroxyapatite templating DNA aptamer to incorporate nanocrystalline hydroxyapatite into the complex for producing a biomimetic mineralized ECM. Nanocrystalline HAP mineralization occurred for short, monodisperse ssDNA irrespective of sequence. The mineralization also was extrafibrillar leading to fibers covered in randomly oriented HAP. Self-assembled peptide amphiphile nanofibers have been mineralized with the HAP c-axis aligned in the nanofiber longitudinal direction, such that our DNA aptamer-collagen complex fibrils may also be able to achieve such an arrangement by aligning the nanofibrils from their naturally curled state.43 In the context of bone tissue engineering this ubiquity for short, monodisperse ssDNA to mineralize as a DNA-collagen complex enables DNA aptamers for targeting other species to be used to form the complex without losing mineralizing potential as both the HAP aptamer and the random ssDNA complexes promoted HAP mineralization. Hence, future investigations are required to evaluate other DNA aptamer sequences for the maintenance of their secondary structures in mineralized DNA aptamer-collagen complexes.

TEM revealed our DNA aptamer-complexes to be hierarchical "spaghetti-like" fibrils (curled, intermixed nanofibrils at multiple length scales) with mean diameter of ~7 nm. This would suggest the nanofibrils are on the scale of individual complex structures based on the model for the dsDNA-collagen complex being a central dsDNA double helix surrounded by five collagen triple helices 30. However, the nanofibril curls were across 10s and not 1000s of nanometers, which is contrary to the rigidity of a collagen triple helix with a length of 300 nm.30 Though, collagen triple helices are unstable at body temperature and for rat tail tendon type I collagen the denaturation point is as low as 28° C.44 Paired with our TEM observations of fibril curvature and mean diameter, we believe our DNA aptamer-collagen nanofibrils are not exclusively formed with triple helix collagen but have type I collagen monomeric chains to support the observed extreme fibril curvature. More detailed modeling of short ssDNA-collagen complex interactions needs to be completed to resolve the arrangement of the species that form them.

Mineralization was achieved as easily as the fiber and gel synthesis by either a one-step or two-step process. One-step mineralization enables the complete production of the mimetic ECM at once whereas the two-step process enables temporal control of the mineralization process. This temporal control enables this platform for evaluating the effects of progressive tissue calcification, for instance in the context of heart valvular and blood vessel calcification. Mineralization completed within 24 hours indicated by both XRD patterns and TEM micrographs. Protein-based PILP mineralization requires appreciably more time to complete, suggesting that ssDNA-based mineralization works at an accelerated rate.3, 5,45 Our DNA aptamer-collagen complexes demonstrate ECM mimetic nanotopographic pits, pores, and "poorly crystalline" HAP crystallites critical to successful osseointegration of biomaterials.39

Especially exciting is that DNA aptamer-collagen complexes rapidly promoted osteoblast differentiation towards an osteocytic phenotype. Osteocytes regulate bone remodeling and thus inducing differentiation to this cell type is ideal for facilitating osseointegration of the scaffold.42 Differentiation is a multistep process in which osteoblasts migrate into mineralized matrix and produce an interconnected network of dendritic processes.37,46,47 Because this effect was advanced by immobilized DNA aptamer-collagen complex fibers, this modality could be a successful osteoconductive coating for both orthopedic and dental implants leading to a quicker recovery and favorable integration of the implant. Combined with the proven mineralized cell-assembled tissue structures, DNA aptamer-collagen complex gels could be used as cell-laden large defect fillers.

There is a significant need for in vitro models to aid in drug discovery. This platform could be used as an in vitro model for tissue calcification by utilizing other cell types such as vascular smooth muscle cells instead of osteoblasts to model vascular calcification. Only recently, has a biomimetic mineralized cell-laden model been developed focusing on mesenchymal stem cell differentiation.45 Future investigations of our system should be used to evaluate mesenchymal stem cell differentiation to compare the efficacy of our cell-assembled mineralized DNA aptamer-collagen complexes to this aim. Similarly, there is a need for addressing hard/soft interfaces paramount to effective connective tissue regeneration.48,49 Such interfaces could be formed by utilizing our two-step mineralization process with a concentration gradient.50 At the same time, the one-step synthesis and mineralization process affords DNA aptamer-collagen complexes injectability for point-of-site administration.51-53 Pertinent to tissue engineering, is potential for developing cell-assembled prevascularization by co-culture of endothelial and osteogenic cells.39 Osteoblasts exert an angiogenic microenvironment by their secretion of vascular endothelial growth factor.54 Likewise, osteoblasts produce nitric oxide, which supports a healthy, vasodilatory endothelial cell phenotype.55 Because of the demonstrated rapidly-formed cell-assembled tissue structures, we are hopeful this platform could quickly generate pre-vascularized mineralized bone tissue using peripheral blood derived endothelial progenitor cells as an autologous endothelial cell source and adipose-derived or bone marrow derived mesenchymal stem cells as an autologous osteogenic cell source.39 Nonetheless, further investigations are necessary to show the potential for DNA aptamer-collagen based-biomaterials to make these translational hopes a reality.

5. Conclusions

Here we show the rapid and facile synthesis of DNA aptamer-collagen nanofibril complexes as a new class of biofunctional materials for tissue engineering applications. Adding a mineralization solution before or after complex synthesis generates an interpenetrating hydroxyapatite phase affording the system temporal control of the mineralization process. These nanofibrous complexes remarkably resemble native extracallular matrix architecture with pits, pores, and striations. Moreover, formation and mineralization were independent of DNA aptamer sequence enabling a diversity of DNA aptamers to be used for targeting species of interest including cells, biomolecules, or ions without the loss of properties. Bone cells actively remodeled and matured supporting the mineralized variant of these complexes as a highly osteoconductive biomaterial. Although this work focuses on bone tissue engineering, DNA aptamer-collagen complexes should be viewed as a new class of biofunctional materials with broad applicability and potential to improve therapeutic outcomes in biomedical applications.

Example 14

DNA is a highly polyanionic biomolecule that interacts with both collagen and hydroxyapatite. Harnessing these complexes, the combination of a hydroxyapatite templating DNA aptamer and type I collagen rapidly synthesizes mineralized self-assembled DNA aptamer-collagen complex fibers and 3D gels. These complexes are hierarchical, interwoven, curly nanofibrils resembling native extracellular matrix, which can mineralize an interpenetrating nanocrystalline hydroxyapatite phase. On demand mineralization is possible enabling temporal control of the process. Surprisingly, mineralization is independent of DNA sequence allowing for other DNA aptamers to be used in the synthesis of these mineralized complexes affording them even greater biofunctionality without loss of mineralization potential. In response to this promising biomaterial platform, primary human osteoblasts differentiate towards an osteocyte-like lineage important for biomaterial osseointegration. These fibers and gels have promise not only as osteoconductive coatings and scaffolds, but as coatings and scaffolds for any tissue using this new class of biofunctional materials.

Example 15

Abstract

Vascularization of engineered tissue is one of the hallmark challenges of tissue engineering. Leveraging our newly developed self-assembled DNA aptamer-collagen complex-based biomaterial platform, we used a VEGF-R2 targeting aptamer and its receptor agonist divalent assembly as the DNA component to form complex fibers. Human umbilical vein endothelial cells (HUVECs) quickly remodeled these fibers into tubulogenic structures over 72 hours. Moreover, DNA-collagen complexes composed of the divalent assembly promoted enhanced expression of von Willebrand factor (vWF), angiopoietin-2 (ANGPT-2), and matrix metalloproteinase-2 (MMP-2) by HUVECs as measured by either immunocytochemistry or ELISA. Endothelial cell phenotype was thought to be directed by both biochemical cues afforded by the agonist behavior of the divalent aptamer assembly as well as by the biophysical cues afforded by the complex fiber nanotopography. Collectively, these results support the development of an angiogenic endothelial cell phenotype stimulated by the DNA aptamer-collagen fibers. Thus, the combination of engineered DNA aptamer nanotechnology and DNA-collagen complexation phenomena is a promising biofunctional natural scaffold material system for tissue engineering and regenerative medicine applications.

Introduction

Nucleic acids and proteins interact to change each other's function. One such interaction is the complexation of DNA and collagen.1-12 Fifty years ago, it was discovered that both single-stranded DNA (ssDNA) and double-stranded DNA (dsDNA) readily bind to the cellular basement membrane.1,2,5 Specifically, DNA binds to type I, II, and IV collagens and not to fibronectin.1,2,5 DNA physical properties were major contributors to this complexation event. DNA length mediated the process favoring shorter DNA while being independent of DNA strandedness.9,12 These early investigations; though, were conducted using enzyme-linked immunosorbent assays (ELISA) and thus overlooked the possibility for observing any self-assembled structures resulting from the interaction of these two biomacromolecules.1,2,5,9,12 Not until about 30 years later were DNA-collagen complexes observed to self-assemble into fibrils.13 Thus, began a renewed interest in the DNA-collagen complexation. Especially at the time for delivering cyclic plasmid DNA for gene transfection. For this application, nano-sized DNA-collagen particles rather than fibers were more efficient and thus the fibrous assemblies were not heavily investigated thereafter.14-16 The types of structures could be tuned from nanoparticles to fibers by varying the relative amounts of DNA to collagen.14-18 From these earlier works it was found that dsDNA structure (linear or cyclic), molecular weight distribution, and purity all influenced fibril formation.19 All of these studies focused exclusively on large (>1,000 base pairs), random, dsDNA sequences; despite, the past ELISA data showing that collagen has an avidity for short (<200 base pairs).9,12

Already, DNA-collagen complexes have been used for delivery of plasmids and antisense oligonucleotides, for wound dressings, and for antimicrobial coatings.16,20,21 Though, these applications have not made use of recent advances in DNA nanotechnology. DNA has moved from being purely a genetic encoder to being a highly versatile, engineered biomolecule of tremendous utility.22,23 One such form of DNA is as short ssDNA aptamers, which are increasingly being used for their high affinity, stability, and versatility.24 In fact, engineering DNA aptamers as assemblies has enabled their ability to act as both receptor agonists and antagonists.25,26 Thus, there are many opportunities for fabricating highly biofunctional composite materials by incorporating DNA aptamers in the assembly of DNA-collagen complexes.

Only recently though have these assemblies been proposed as a versatile platform for tissue engineering and regenerative medicine.27 Within an aqueous environment, monodisperse ssDNA rapidly and spontaneously complexed with collagen forming stable fibers that mimic the architecture of the extracellular matrix.27 In fact, endothelial cells in direct contact with these complex fibers demonstrated enhanced expression of angiogenic markers.27 Given the challenge of vascularizing engineered tissue, this natural material system shows promise as an emerging scaffold biomaterial.28,29

Vascular endothelial growth factor (VEGF) is a highly potent growth factor principally responsible for stimulating angiogenesis by activating endothelial cells.30,31 We have shown that a vascular endothelial growth factor receptor 2 (VEGF-R2) targeting DNA aptamer sequence when assembled as two oligomers tethered together is able to activate the receptor leading to angiogenic behavior by endothelial cells.25 By taking advantage of engineered DNA aptamer nanotechnology and DNA-collagen complexation phenomena, we show that a VEGF-R2 agonist DNA aptamer divalent assembly interacts with collagen to form complex nanofibers for stimulating an angiogenic endothelial cell phenotype.

Experimental

Fiber Synthesis

A VEGF-R2 targeting aptamer sequence was used in both a monovalent (single sequence) and divalent form (two single sequences tethered by a (PEG)6 linker). For all studies, we used a random sequence ssDNA of the same length and GC content as a control to determine the effect of the targeting and functionality of the DNA aptamer as compared to the effect of purely ssDNA, respectively.32 The VEGF-R2 targeting aptamer monovalent sequence is: '5-GAT GTG AGT GTG TGA CGA GCT ACG ACG TCT GGT GTA ATT TAT AAA GAC ACT GTG TAT ATC AAC AAC AGA ACA AGG AAA GG-3' (SEQ ID NO:14).The random ssDNA oligomer monovalent sequence is: '5-TAA TGA GAA GTA TGT GTA GAG TCA ATG AGA TAC GCA ATT GGG AAG ACA AGA GTA TTG ACT CGG ACT GAG TAC AAT CGT CC-3' (SEQ ID NO:15). The VEGF-R2 targeting aptamer divalent assembly sequence is: '5-GAT GTG AGT GTG TGA CGA GCT ACG ACG TCT GGT GTA ATT TAT AAA GAC ACT GTG TAT ATC AAC AAC AGA ACA AGG AAA GG 3'-(PEG)$_6$-3' GG AAA GGA ACA AGA CAA CAA CTA TAT GTG TCA CAG AAA TAT TTA ATG TGG TCT GCA GCA TCG AGC AGT GTG TGA GTG TAG-5' (two SEQ ID NO:14 linked with a PEG$_6$ linker). The random ssDNA oligomer divalent assembly sequence is: '5-TAA TGA GAA GTA TGT GTA GAG TCA ATG AGA TAC GCATT GGG AAG ACA AGA GTA TTG ACT CGG ACT GAG TAC AAT CGT CC-(PEG)$_6$-TAA TGA GAA GTA TGT GTA GAG TCA ATG AGA TAC GCA ATT GGG AAG ACA AGA GTA TTG ACT CGG ACT GAG TAC AAT CGT CC-3' (two SEQ ID NO:15 linked with a PEG$_6$ linker). DNA oligomer properties are presented in Table 3. ssDNA-collagen self-assembled fibers were synthesized by mixing different volume fractions (0-100%) of 0.3 mg/mL rat tail tendon type I collagen (Corning) with 1 µM of each ssDNA oligomer (Integrated DNA Technologies) both diluted in sterile deionized water. Fibers spontaneously formed upon mixing and were incubated at room temperature overnight.

TABLE 3

DNA oligomer properties

| Name | Molecular Weight (g/mol) | GC Content (%) |
| --- | --- | --- |
| Random ssDNA oligomer monovalent | 24,911.2 | 41.3 |
| VEGF-R2 aptamer monovalent | 24,911.2 | 41.3 |
| Random ssDNA oligomer divalent assembly | 50,228.7 | 41.3 |
| VEGF-R2 aptamer divalent assembly | 50,228.7 | 41.3 |

Surface Functionalization

Fibers were immobilized to untreated polystyrene well plates (Eppindorf) using sulfo-SANPAH (Proteochem) heterobifunctional crosslinker. Briefly, well plates were treated with 20 µM sulfo-SANPAH diluted in deionized water and irradiated with 365 nm UV light for 10 minutes to activate the nitrophenyl azide group of the crosslinker for bonding to the polystyrene surface. Then the wells were rinsed three times with sterile deionized water and incubated with the fiber solutions overnight at room-temperature. During incubation, the sulfo-NHS ester from the sulfo-SANPAH is able to non-specifically react with primary amines present on the DNA aptamer-collagen self-assembled fibers. Following incubation, the wells were rinsed three times with sterile deionized water and stored in deionized water at 4° C. until needed.

Fiber Morphology and Surface Coverage

Fiber morphology for the different volume fractions of type I collagen and DNA aptamer was qualitatively assessed by phase and fluorescence microscopy using immobilized fibers. For fluorescence microscopy, immobilized fibers were stained with SYBR Safe DNA stain (Invitrogen) diluted at a 1:10,000 volume ratio in deionized water. The fibers were incubated with the stain protected from light for at least 30 minutes. To quantify surface coverage, full well images were taken with a Keyence BZ-X700 fluorescence microscope. Utilizing ImageJ software, the fibers were then identified using the threshold tool and the area coverage for each image was determined using the measure tool.

Cell Culture

Green fluorescent protein expressing human umbilical vein endothelial cells (GFP-HUVECs) (Angio-Proteomie) and non-transfected human umbilical vein endothelial cells (HUVECs)(LifeLine Cell Technologies) were grown on tissue culture polystyrene at 37° C. and 5% CO2. Cells were used between passage number 5-8. GFP-HUVECs were cultured in proprietary fully supplemented Endothelial Growth Medium (Angio-Proteomie) and non-transfected HUVECs were cultured in fully supplemented VascuLife® VEGF Endothelial Medium (LifeLine Cell Technologies), containing recombinant human (rh) fibroblast growth factor, ascorbic acid, hydrocortisone hemisuccinate, fetal bovine serum, L-glutamine, rh insulin-like growth factor, rh epidermal growth factor, rh VEGF, heparin sulfate, gentamicin, and amphotericin B. Media was exchanged every 2-3 days.

Immunocytochemistry

Downstream angiogenic markers were evaluated using immunocytochemistry. Fibers formed from volume fractions of 0-100% type I collagen and DNA aptamer were conjugated to untreated polystyrene 24-well well plates or untreated 6 well plates as previously described using sulfo-SANPAH. GFP-HUVECs were seeded at 7,500 cells/cm2 in fully supplemented Endothelial Growth Medium. HUVECs were seeded at 3,000 cells/cm2 in VascuLife® VEGF Endothelial Medium without VEGF supplement. After 3 days of culture without media refresh, the cells were formalin fixed for 15 minutes. Cells were permeabilized with 0.1% Triton X-100 in phosphate-buffered saline (PBS). Then wells were blocked with 1% bovine serum albumen (BSA) in 0.1% Tween 20 in PBS (PBST). Following blocking, cells were incubated overnight at 4° C. with primary antibody for von Willebrand factor (vWF) (abcam, ab6994). The primary antibody was diluted in PBST at a ratio of 1:200. Afterwards, cells were incubated for 1 hour at room temperature with an AlexaFluor 594 secondary antibody (abcam, ab150080) and mounted with VECTASHIELD® Antifade Mounting Medium with DAPI (Vector Laboratories) or ProLong Diamond Antifade Mountant with DAPI (Invitrogen). Images were taken with a Nikon TE-2000U epi-fluorescence microscope using identical exposure settings across treatments. Well plate and secondary antibody controls did not show any non-specific fluorescence.

Angiogenic Factor Secretion

Secretion of angiogenic markers by HUVECs was measured by enzyme linked immunosorbent assay (ELISA). HUVECs were seeded onto DNA-collagen fibers immobilized within tissue culture polystyrene wells at a density of 3,000 cells/cm2 in VascuLife® Endothelial Medium (Lifeline Cell Technologies) without VEGF supplement. Media was collected after 3 days of culture and stored at −80° C. until assayed. Cell culture media was centrifuged at 10,000g and the media supernatant was collected and assayed. Quantification of the HUVECs secretion of vWF, angiopoietin-2 (ANGT-2), and matrix metalloproteinase-2 (MMP-2) was quantified using RayBio® Human vWF ELISA kit (RayBiotech), RayBio® Human Angiopoietin-2 ELISA kit (RayBiotech), RayBio® Human Matrix Metalloproteinase-2 ELISA kit (RayBiotech) following the manufacturer's instructions.

Statistical Analysis

Statistical analyses were conducted using GraphPad Prism 8.3.0 (538). Comparisons between treatments were evaluated by unpaired t test with an alpha level of 0.05 denoting statistical significance.

Results and Discussion

Figure 48B:
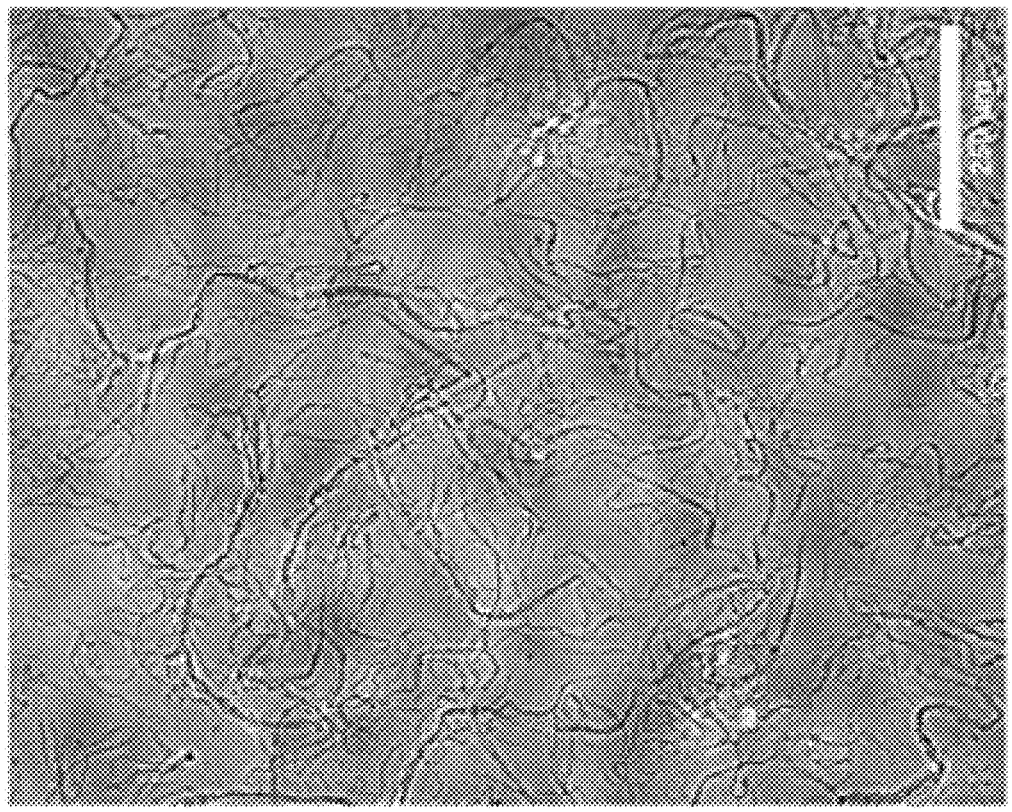
FIGS. 48A-48B: Representative phase contrast images of DNA aptamer-collagen complex fibers formed using a random ssDNA sequence (FIG. 48A) or VEGF-R2 targeting DNA aptamer (FIG. 48B) for a 30% volume fraction of collagen formulation. Scale bar is 250 μm.
Figure 48A:
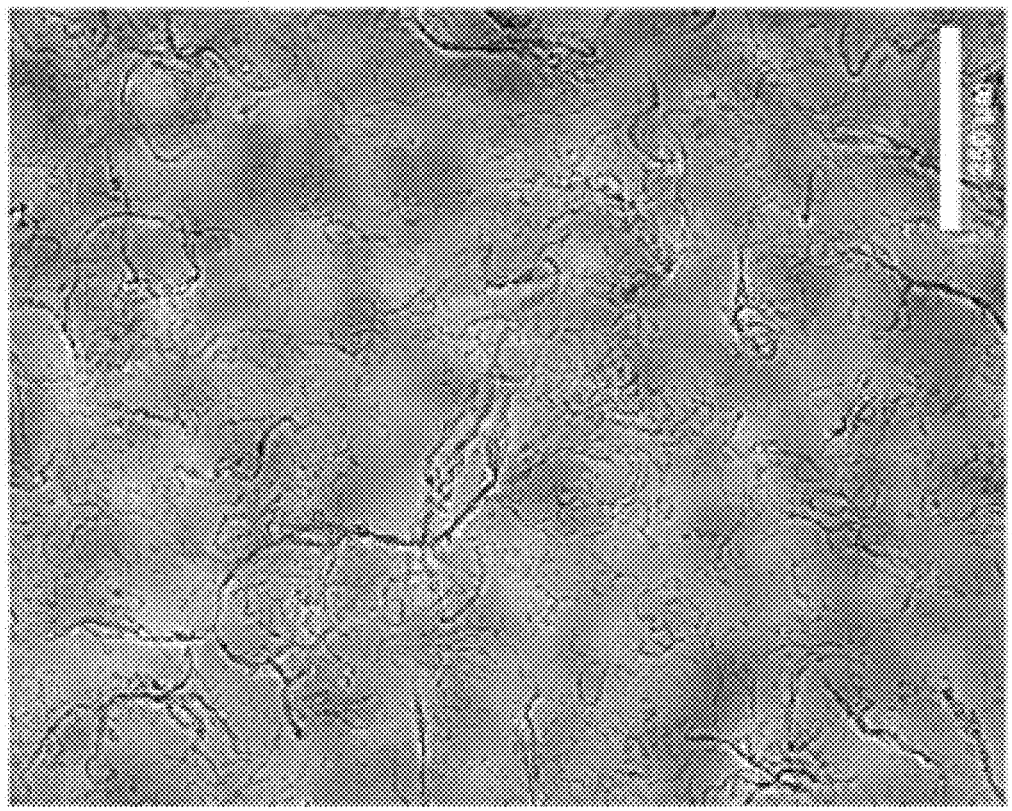

We first tested a VEGF-R2 targeting DNA aptamer and a random sequence ssDNA oligomer of the same length and GC content for complexation with type I collagen. Upon mixing dilute solutions of DNA aptamer and collagen, not only nanofibrils, but large self-assembled fibers (>10 µm) formed rapidly (<10 minutes) and spontaneously (FIGS. 48A-48B). Fibers formed for both the DNA aptamer and the random sequence oligomer.

Collagen fibers did not form in the absence of DNA, when each was replaced with an equivalent volume of deionized water in the mixtures. To better visualize the fibers, we immobilized them onto untreated tissue-culture polystyrene using sulfo-SANPAH and labeled them using a fluorescent DNA stain. As expected, fibers formed for the same volume fractions of collagen for both the DNA aptamer and random sequence oligomer. Interestingly, fibers were not fully immobilized to the surface such that fibers were observed extending several microns vertically from the surface, which swayed with the motion of the surrounding fluid much like a kelp forest in the ocean. Previously, we demonstrated fiber formation is dependent both on the relative amounts of ssDNA to collagen in solution as well as the length of the ssDNA.27 Native tissue basement membranes are diverse structures consisting of micron to submicron fibers, pits, and holes33,34. These structures act as biophysical cues to direct cellular function35,36. Fibers provide anisotropy to support contact guided cellular alignment as well as 3D geometries that lead to more physiological cell behvior.37,38 Likewise, nanoscale features are known to regulate cell shape, polarity, migration, proliferation, and differentiation.39 Being able to synthesize these types of features with relative ease out of natural ECM proteins is an important step towards developing functional engineered matrices. No fibers were observed for collagen volume fractions greater than 50%. Staining revealed a heterogenous fiber size distribution, which depended on collagen volume fraction(FIG. 49A). Qualitatively, the 30% collagen volume fraction yielded the largest and most abundant amount of fibers. No qualitative morphology differences were observed between fibers formed using the DNA aptamer and the random sequence. Surface coverage was evaluated for fibers formed using a 30% collagen volume fraction formulation. Qualitatively, both DNA sequences (random and VEGF-R2 binding) showed an even coating distribution throughout the well. There was no evidence of significant fiber clumping (FIGS. 49B-49C), and there was no statistical difference in coverage after quantification (FIG. 49D). This is important for establishing these fibers can be used to make reproducible surface coatings for biomaterials independent of DNA sequence. Collectively, DNA aptamer-collagen fibers offer a simple strategy for making textured, bioactive materials with hierarchical, nanotopographical features that are capable of directing cellular function.

Owing to their 3D nanotopography and biomacromolecular composition, we probed the functional utility of our DNA aptamer-collagen fiber self-assemblies for tissue engineering. To begin, we evaluated the remodeling behavior of green fluorescent protein expressing human umbilical vein endothelial cells (GFP-HUVECs) in response to VEGF-R2 targeting aptamer-collagen fibers. GFP-HUVECs readily attached and grew to surfaces with immobilized aptamer-collagen fibers. Morphologically, GFP-HUVECs looked the same for aptamer-collagen fibers formed using the VEGF-R2 targeting aptamer and the random sequence ssDNA oligomer. Over 72 hours, the cells remodeled, proliferated, and progressively engulfed the larger fibers (FIGS. 50A-50C). By 24 hours, smaller fibers observable in neat DNA aptamer-collagen fiber treated surfaces (FIG. 48A-48B) were no longer visible while individual larger fibers remained identifiable (FIG. 50A). Yet by 48 hours, even the larger fibers were remodeled (FIG. 50B). The GFP-HUVECs over the 72 hour period, worked to bridge, connect, and agglomerate the large fibers into a contiguous 3D structure that displayed tubulogenic features (FIG. 50C). In fact, across the ~3 cm$^2$ circular area the cells remodeled the immobilized fibers into an apparent single connected 3D structure. ECM remodeling is a characteristic process of homeostasis and angiogenesis.40 The endothelial niche is a dynamic environment changing in composition and structure to regulate cellular function from migration to proliferation.41,42 Remodeling is achieved by the secretion of matrix metalloproteinases (MMP) that enzymatically degrade matrix proteins, which also reveals specific binding sights that only become active upon degradation.43,44 A requisite for angiogenesis is matrix remodeling as it is the reorganization of surrounding tissue and synthesis of new tissue into blood vessels.40 At the same time, one of the tenants of tissue engineering is to provide a scaffold system for cells to alter into their preferable organization yielding a functional tissue.45 Being able to supply cells with the proper cues to do so has been an area of continued focus with a move towards hybrid scaffolds made of a mixture of synthetic and natural components.46 An example of this has been polyethylene glycol-based hydrogels, which have incorporated RGD adhesion peptides and MMP-sensitive linkers to provide a matrix that supports both cell adhesion and degradation.47-49 These materials are effective, but adhesion peptides lack the full biological activity their complete protein counterparts.50 Conversely, DNA aptamer-collagen complexes are wholly native materials, suggesting they can more completely recapitulate the suite of ECM-derived signals conferred to cells. In conjunction with their intrinsic 3D nanotopographic architectures and ability to be readily remodeled by cells, DNA aptamer-collagen complexes show promise as an effective tissue engineering biomaterial platform.

Previously, we demonstrated receptor agonist behavior using a divalent form of this VEGFR2 targeting aptamer.25 In this form, two separate aptamer sequences are physically tethered together, and it was suggested that this enabled the dimerization of the VEGF-R2 receptor leading to its activation. In the context of DNA-collagen complexes, their structure could act as a mediator to bring individual aptamer oligomers within close enough proximity to elicit receptor activation in an analogous manner as proposed for the divalent assembly. To gauge this possibility, we looked at phenotypic differences for endothelial cells in contact with the DNA aptamer-collagen fibers and between fiber formulation by immunostaining for the endothelial cell marker, von Willebrand factor (vWF). In culture, endothelial cells have been shown to demonstrate elevated vWF expression upon stimulation by VEGF.51,52 Endothelial cells growing on the fibrillar DNAcollagen complexes (10%, 30% vol. fraction collagen) displayed greater expression of vWF compared to those cells adjacent to the fibers for both fibers formed using the VEGF-R2 targeting aptamer and the random sequence ssDNA oligomer as indicated by differences in fluorescent intensity (FIGS. 51A-51F). The topography of the complex fibers could explain the minimal differences observed between endothelial cells in contact with the fibers formed with the random sequence and the VEGF-R2 targeting aptamer. Topographic features from micron-sized gratings have been shown to enhance vWF expression in an endothelial cell line.53 In the absence of large fibers (50% vol. fraction collagen), HUVECs morphologically looked as though they were cultured on a 2D surface. However, HUVECs expressed greater vWF when cultured on surfaces that had been functionalized with DNA-collagen complexes containing VEGF-R2 binding aptamer, relative to the random sequence. This response suggests a synergistic behavior between complex fiber size and aptamer for mediating cellular response. The heightened vWF expression for the aptamer condition indicates that it may have been able to influence the receptor while in the monovalent form. Conversely, in the conditions that facilitated large fiber complexes, the fibrous topography could be an overly dominating factor drowning out an observable effect of the DNA sequence.

Spurred by these results for the monovalent form of the aptamer, we turned to the divalent form to investigate its action on endothelial cells when presented as part of the fibrillar DNA-collagen complex. Unlike with the monovalent form, upon mixing the divalent assembly with collagen not only fibers, but large macroscopic aggregates formed that were visible in solution by the naked eye (FIG. 52).

Figure 53C:
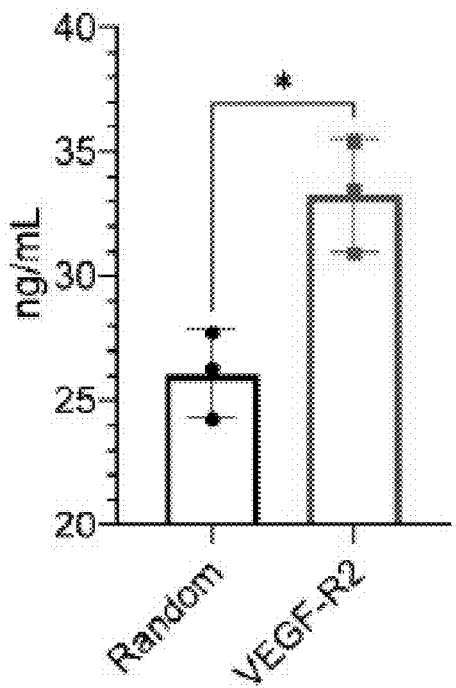

This greater degree of agglomeration was thought to be due to the (PEG)6 linker physically tethering the two ssDNA oligomer sequences such that the divalent assembly acted as a type of crosslinker between individual complex fibers. As we had done previously, we immobilized these newly formed fibers to tissue culture polystyrene and cultured HUVECs on these functionalized surfaces. Additionally, we did this in the absence of soluble, exogenous VEGF to mitigate any competing effects with the divalent aptamer for receptor activation. Immunostaining of HUVECs cultured on fibers formed using the VEGF-R2 targeting aptamer in a divalent assembly displayed enhanced vWF expression compared to HUVECs cultured on fibers formed using the random sequence also assembled into a divalent assembly (FIGS. 53A-53C).

Figure 54:
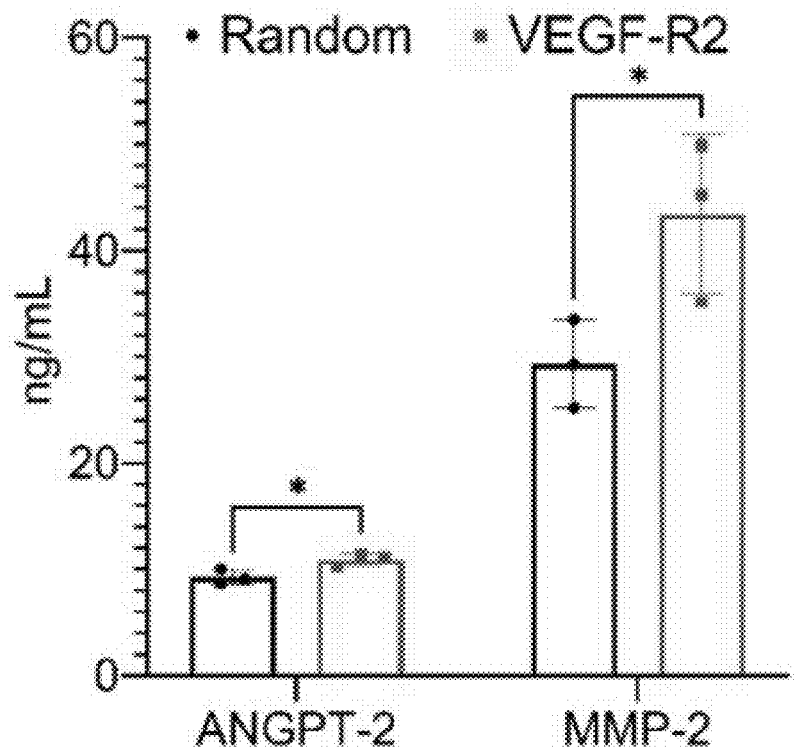
FIG. 54: Secretion of angiogenic markers, angiopoietin-2 (ANGPT-2) and matrix metalloprotease-2 (MMP-2) for HUVECs cultured on fibers formed using the random sequence divalent assembly and the VEGF-R2 targeting aptamer divalent assembly. * denotes statistical difference with p<0.05 as determined by an unpaired t test. Data are mean±SD n=3.
Figure 55A:
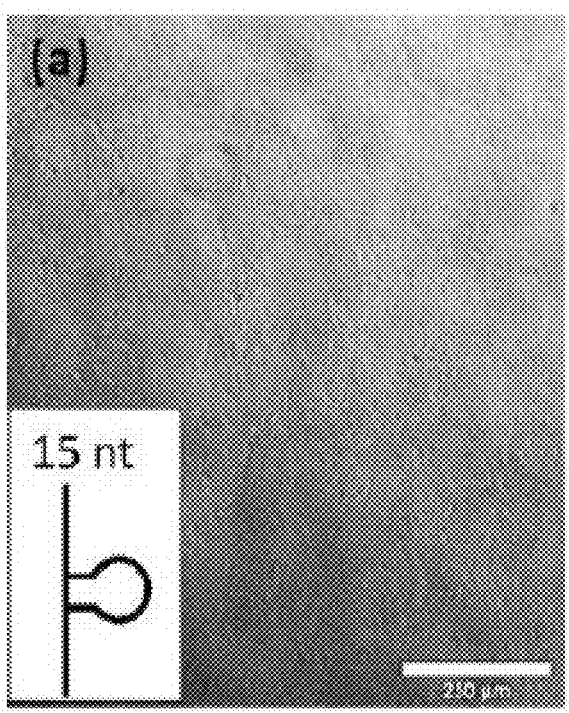
FIGS. 55A-55D: Phase contrast images of ssDNA-collagen complex fibers formed using 15, 33, 45, and 90 nucleotide (nt) ssDNA oligomers (SEQ ID NO:2-5). Predicted secondary structures of the 15, 33, 45, and 90 nt ssDNA oligomers are presented as an inset. Lowest energy predicted secondary structures were calculated using the mFold web server at 25° C., oligomer corrected, and 165.2 mM [Na+] equivalent to phosphate-buffered saline (Corning, Cat#21-040CV), all other conditions were default settings.30 Scale bar is 250 μm.
Figure 55B:
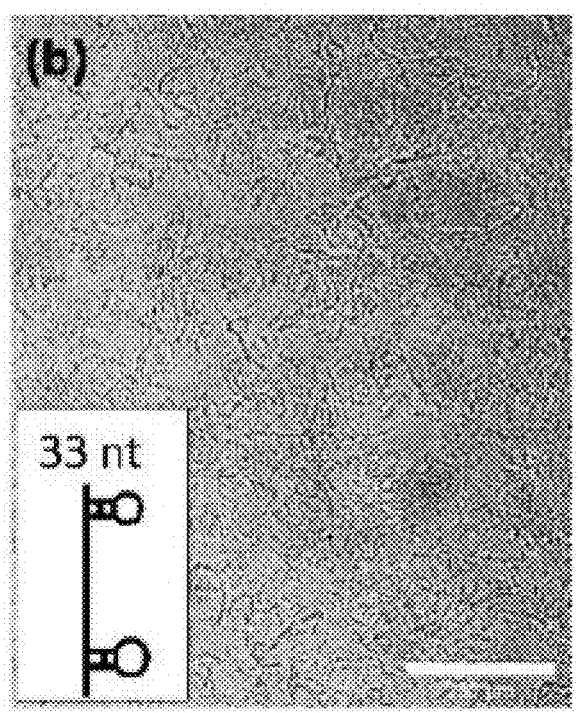
Figure 55C:
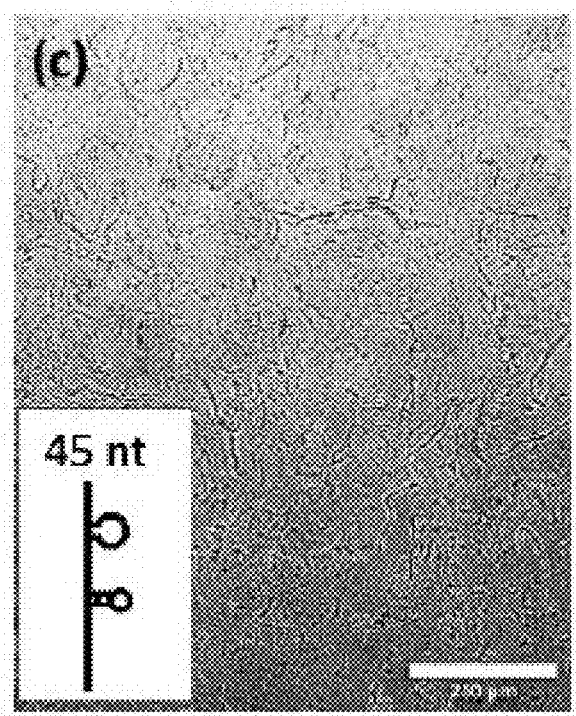
Figure 55D:
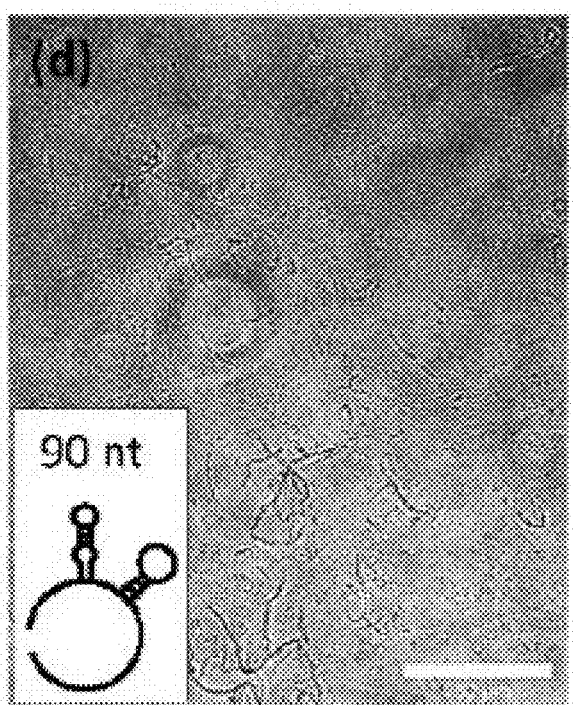

Von Willebrand factor has been linked to angiogenic processes in endothelial cells by inhibiting VEGF-R2 signaling through $\alpha_v\beta_2$ integrin binding, though VEGF-R2 activation does facilitate vWF exocytosis.52,54 However, the role of vWF in angiogenesis has been found to be tissue- and stimulus- specific with it being depending on the situation either stimulating of angiogenesis in its absence or its presence being a requisite for angiogenesis.55 vWF is also a major glycoprotein used for maintaining hemostasis.56 It is found extracellularly in both the plasma and surrounding ECM.56,57 Its increased expression and the observed angiogenic remodeling behavior could in part be that the endothelial cells are modifying these fibers into more of their specific niche. Equally, vWF controls angiopoietin-2 (ANGPT-2) levels in endothelial cells by promoting ANGPT-2 storage in Weibel-Palade bodies and inhibiting ANGPT-2 synthesis.58 Decreased intracellular vWF leads to the release of ANGPT-2, which upon endothelial cell activation synergizes with VEGF-R2 signaling to destabilize blood vessels and promote angiogenesis.58 Given this association, we measured HUVEC ANGPT-2 secretion, and found that the inclusion of the divalent aptamer assembly in the DNA-collagen fibers promoted an increase in the secretion of ANGPT-2. (FIG. 54). It should be noted that the magnitude of the difference was minute, and it remains unclear if this small difference manifests as a functional effect. The signaling interactions of vWF, ANGPT-2, and VEGF-R2 are complex and further investigations of their crosstalk in response to a DNA-collagen fiber stimulus are necessary. Lastly, measured secreted matrix metalloproteinase-2 (MMP-2), also known as gelatinase A and found that similar to ANGPT-2, there was a significant increase in secreted MMP-2 by endothelial cells cultured on the fibers that contained the VEGF-R2 binding aptamer assembly (FIG. 54). Matrix metalloproteinase-2 is stimulated by exposure of endothelial cells to type I collagen.59 It plays a role in the degradation of the type IV collagen within the endothelial cell basement membrane—a necessary step in angiogenesis.44 Both 3D collagen environments and VEGF signaling have been implicated in increased MMP-2 secretion by endothelial cells.60,61 Therefore the elevated expression of MMP-2 by HUVECs is supported by the synergistic fibrillar substrate of the DNA-collagen as well as the signaling provided by the VEGFR2 divalent agonist aptamer. The increased expression of MMP-2 is consistent with the enhanced remodeling activity and angiogenic behavior that is seen for HUVECs grown on fibers containing the agonist aptamer assembly. Together, these results suggest that the agonist function of the divalent aptamer, which has previously been characterized in soluble form, is maintained when complexed with collagen, and provides support for the continued utility of our divalent VEGF-R2 agonist aptamer.

Conclusions

Here we showed the rapid and facile synthesis of DNA aptamer-collagen complex fibers as a new class of biofunctional materials for tissue engineering and regenerative medicine applications. Previous work by our group has demonstrated the utility of ssDNA-collagen as a biofunctional material platform. This report expands on that work by demonstrating that in addition to random ssDNA, specific targeting sequences in the form of DNA aptamers or aptamer assemblies can also be used and their functionality or bioactivity can be maintained. Fibers formed using DNA aptamers and collagen show exciting potential to confer biophysical cues derived from their fibrous structure while also providing specific signaling by DNA aptamers to cells. Much like we showed using our receptor agonist variant of a VEGF-R2 targeting aptamer, other DNA aptamers could be used to synthesize complex, adaptive microenvironments to direct cell phenotype. The DNA aptamer-collagen complex offers the potential for greater depth for both DNA- and collagen-based biomaterials through the unique union of these two biomacromolecules.

Example 16

Vascularization of engineered tissue is one of the hallmark challenges of tissue engineering. Leveraging our newly developed self-assembled DNA aptamer-collagen complex based biomaterial platform, we used a VEGF-R2 targeting aptamer and its receptor agonist divalent assembly as the DNA component to form complex fibers. Human umbilical vein endothelial cells (HUVECs) quickly remodeled these fibers into tubulogenic structures over 72 hours. Moreover, DNA-collagen complexes composed of the divalent assembly promoted enhanced expression of von Willebrand factor (vWF), angiopoietin-2 (ANGPT-2), and matrix metalloproteinase-2 (MMP-2) by HUVECs as measured by either immunocytochemistry or ELISA. Endothelial cell phenotype was thought to be directed by both biochemical cues afforded by the agonist behavior of the divalent aptamer assembly as well as by the biophysical cues afforded by the complex fiber nanotopography. Collectively, these results support the development of an angiogenic endothelial cell phenotype stimulated by the DNA aptamer-collagen fibers. Thus, the combination of engineered DNA aptamer nanotechnology and DNA-collagen complexation phenomena is a promising biofunctional natural scaffold material system for tissue engineering and regenerative medicine applications Example 17

We are the first to show that short DNA aptamers complex with type I collagen for the formation of self-assembled fibers and gels. We investigated the synthesis of these complexes and the biological response of vascular and osseous cells to them. Sequences (15-160 nucleotides) were random or engineered to bind to vascular endothelial growth factor receptor 2 (VEGF-R2) or hydroxyapatite and assembled as either monovalent or divalent. Fibers formed rapidly (<30 minutes) and spontaneously at 25° C. This fibrillogenesis supports the simple, expeditious manufacture of extracellular matrix-like suprastructure 3D gels and coatings. Fiber formation was independent of DNA sequence, but dependent on DNA length and the relative amount of DNA to collagen in solution. Transmission electron microscopy revealed fibers are physical entanglements of DNA aptamer-collagen nanofibrils with diameters<10 nm. Human osteoblasts remodeled fibers and gels showing favorable osteocytic morphological features. Human umbilical vein endothelial cells formed tubulogenic-like structures and remodeled fibers. Immunofluorescence revealed endothelial-specific marker expression (vWF, VE-cadherin) was enhanced locally for cells attached to the fibers containing the VEGF-R2 binding aptamer agonist assembly. Conceivably, these complexes could be used as a biomaterial in which the collagen provides a substrate for cellular adhesions, fibrous topography, and DNA in the form of a DNA aptamer for targeting a specific small molecule, protein, or cell. Especially exciting is the promise of forming advanced biomimetic extracellular matrices (ECM) containing intercalated bioactive DNA aptamers by combining these fibers with other ECM components. Ultimately, the ssDNA-collagen complex offers greater depth to DNA aptamer engineering.

Example 18

Abstract

Collagen and single stranded DNA (ssDNA) complex to self-assemble into fibers depending on the length of the ssDNA and the relative amounts of collagen and ssDNA in solution. When monodisperse, random sequences of ssDNA in the range of 15 to 90 nucleotides and type I collagen were mixed together at room-temperature, we report for the first-time fibers several tens of microns in length and as large as 10 μm in diameter. Fiber formation was rapid and spontaneous requiring no further treatment after mixing. Most notably, more ssDNA oligomers were incorporated into the fibers formed using shorter ssDNA oligomers. Endothelial cells formed angiogenic-like structures using the fibers with elevated expression of von Willebrand factor for cells in direct contact with the fibers. These fibers open the door to future applications in the administration and functionality of ssDNA.

Introduction

DNA and proteins interact with each other to modify their respective functions. One such interaction is the complexation of DNA and collagen, first discovered in 1976 while investigating the accumulation of DNA and anti-DNA antibody complexes in the tissue of patients with autoimmune diseases such as rheumatoid arthritis and systemic lupus erythematosus.[1-12] From these investigations, it was identified that both single-stranded DNA (ssDNA) and double-stranded DNA (dsDNA) readily bind to the collagenous component of the glomerular basement membrane.[1,2,5] Specifically, DNA binds to type I, II, and IV collagens and not to fibronectin or reference protein, bovine serum albumin.[1,2,5] In fact, complexes of DNA and anti-DNA antibodies require DNA first to bind to the basement membrane and then to interact with the anti-DNA antibody in order to accumulate at the basement membrane rather than as preformed DNA-anti-DNA complexes in solution.[1,9] Important to these findings was the effect of DNA structure on DNA-collagen complexation. DNA length mediated the process favoring shorter DNA while being independent of DNA strandedness.[9,12] These investigations; though, were all conducted using enzyme-linked immunosorbent assays.[1,2,5,9,12] Missing from these studies was demonstration of collagen's ability to undergo fibrillogenesis—collagen triple helix self-assembly into fibrils. No observation of fibrillogenesis or the structure of this interaction was made at the time. It was not until 1997 that Kitamura et al. observed self-assembled DNA-collagen fibrils using salmon milt dsDNA and salmon type I collagen.[13] The authors found these fibrils formed rapidly and spontaneously with distinct cross-banding patterns.[13] Thus, began a renewed interest in the DNA-collagen complex, especially as a vehicle for gene delivery applications using cyclic plasmid DNA. However, this application favors nanosized DNA-collagen particles rather than fibers.[14-16] Kaya et al. revealed that dsDNA structure, either linear or cyclic, modified fibril formation as did the DNA molecular weight distribution and purity.[17] Further characterization indicated that the relative amounts of dsDNA and collagen influenced fibril formation.[18,19] This complex has been utilized further as a component for wound dressings, antimicrobial coatings, and protein analysis devices.[20-22] Paralleling this work, Svintradze et al. developed a theoretical model for the dsDNA-collagen complex.[23] The interaction between dsDNA and collagen triple helices was defined by the joining of the hydration shells for each molecule to form aggregates of a central DNA double helix surrounded by five collagen triple helices.[23,24] These studies have focused exclusively on large (>1,000 base pairs), random, dsDNA sequences; despite, collagen's demonstrated avidity for short (<200 base pairs) DNA irrespective of strandedness.[9,12]

We found that short (<100 nucleotides), monodisperse ssDNA oligomers complex with type I collagen to form self-assembled fibers. Upon mixing dilute solutions of ssDNA and collagen, not only fibrils (<1 μm), but large self-assembled fibers (>10 μm) formed rapidly (<120 minutes) and spontaneously (FIGS. 55A-55D). These self-assembled fibers are insoluble, stable, and form in deionized water, phosphate-buffered saline, and cell culture media, and can be immobilized onto a substrate. Phase contrast microscopy revealed a heterogeneous fiber size distribution of many small fibrils intermixed with large, extensive fiber networks being similar to those formed by electrospinning techniques.[25] Because of their rapid and simplistic synthesis, these fibers can be used to form fibrous structures resembling extracellular matrix (ECM) without using harmful solvents (hexafluoroisopropanol) typically required for electrospinning collagen.[26-28] We did not observe fibers from each component (DNA or collagen) in solution alone or when either component was first immobilized to a substrate and subsequently exposed to the other. This latter fact is likely one of the reasons for previous studies investigating ssDNA-collagen complexation not reporting the presence of these self-assemblies.[2,5] Instead, we report that fiber formation requires that both the ssDNA and the collagen be mobile. It is envisioned that in a comparable manner to our study, these mobile fiber complexes can be used to functionalize a biomaterial surface to produce a more native surface topography.

Previously, fibrils have been observed for more concentrated mixtures of dsDNA and collagen, without mention of such aggregation into large fiber bundles.[13,17-19] Gene delivery applications favored nanoparticle-sized complexes and neglected further investigation of larger aggregates formed using plasmid DNA and atelocollagen.14 Likewise, decreased DNA-collagen fibril formation time has been observed using a salmon DNA solution of ~25% ssDNA and ~75% dsDNA as compared to 100% dsDNA, suggesting ssDNA more rapidly interacts with collagen.17 A coacervation effect has been observed and modeled for a dsDNA-gelatin A system with excess gelatin A and constant amount of DNA.29 Following charge neutralization of this complex, the addition of more gelatin A led to an overcharging effect and phase-separation of the complex from solution. A similar coacervation effect, may explain the formation of these large ssDNA-collagen fiber self-assemblies To further understand ssDNA-collagen fiber formation as a function of oligomer length, we combined several short, monodisperse, random sequence ssDNA oligomers (15, 33, 45, 90 nucleotides) with type I collagen. (FIGS. 55A-55D). The random sequences were used to include diverse secondary structures, including single stranded segments and hairpin stem/loops, and to interrogate the effect of the different lengths of ssDNA on this complex. Further details on these specific DNA oligomers, including the nucleotide sequences are provided in the supporting information section.

Figure 56:
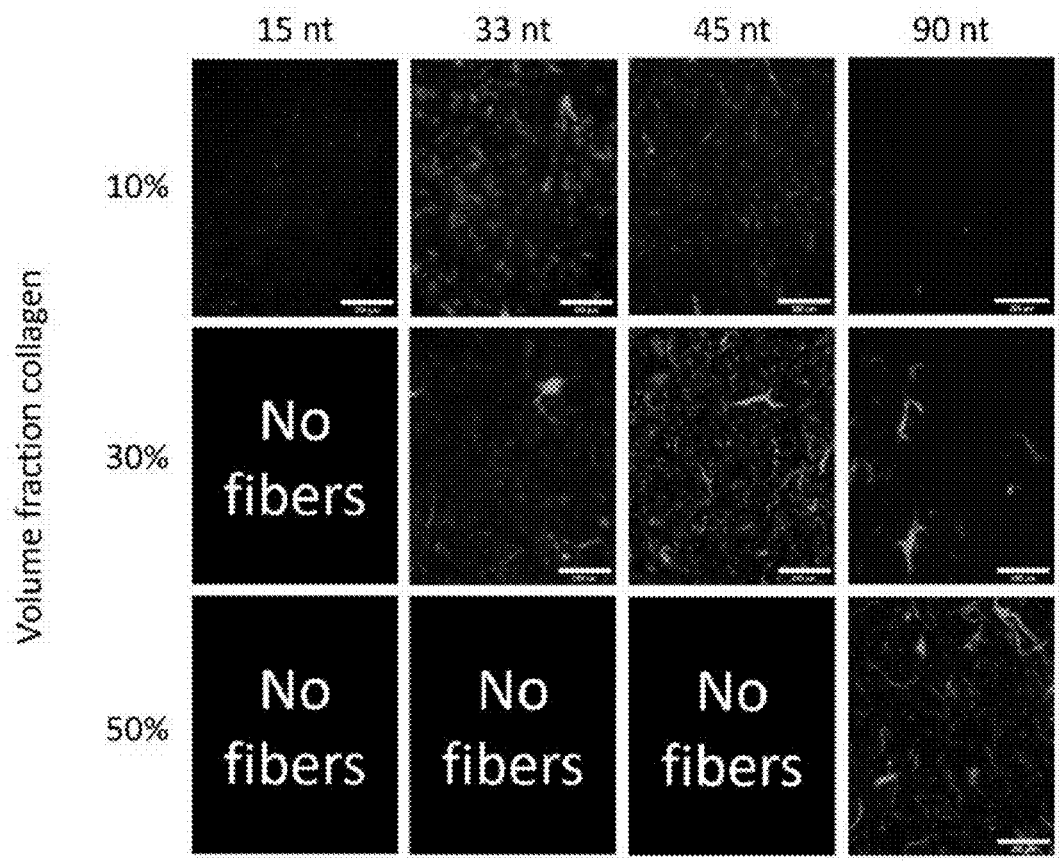
FIG. 56: Representative fluorescence microscopy images of ssDNA-collagen fibers formed using ssDNA with lengths of 15, 33, 45, and 90 nucleotides (nt) and varying volume fractions of collagen of 10%, 30%, and 50% from solutions diluted in deionized water. ssDNA in the fibers was fluorescently labeled using SYBR Safe DNA stain and is shown as green. Conditions in which no fibers were formed are indicated within the image panel. Scale bar is 250 μm.

We found fiber formation depends on the length of the ssDNA and on the relative amount of ssDNA in solution (FIG. 56). Fibers formed with varying density and size distribution for different volume fractions of collagen. The 15 nt oligomer promoted minimal fiber formation for the 10% volume fraction collagen mixture, and no apparent fibers at any other volume fraction tested. Whereas the 33 nt and 45 nt oligomer formed fibers for the 10% and 30% volume fraction collagen mixtures and not for the 50% mixture. Conversely, the 90 nt oligomer showed substantial fiber formation for the 50% volume fraction collagen mixture, less fibers for the 30% mixture, and nearly no fiber formation at the lower 10% volume fraction.

Figure 57A:
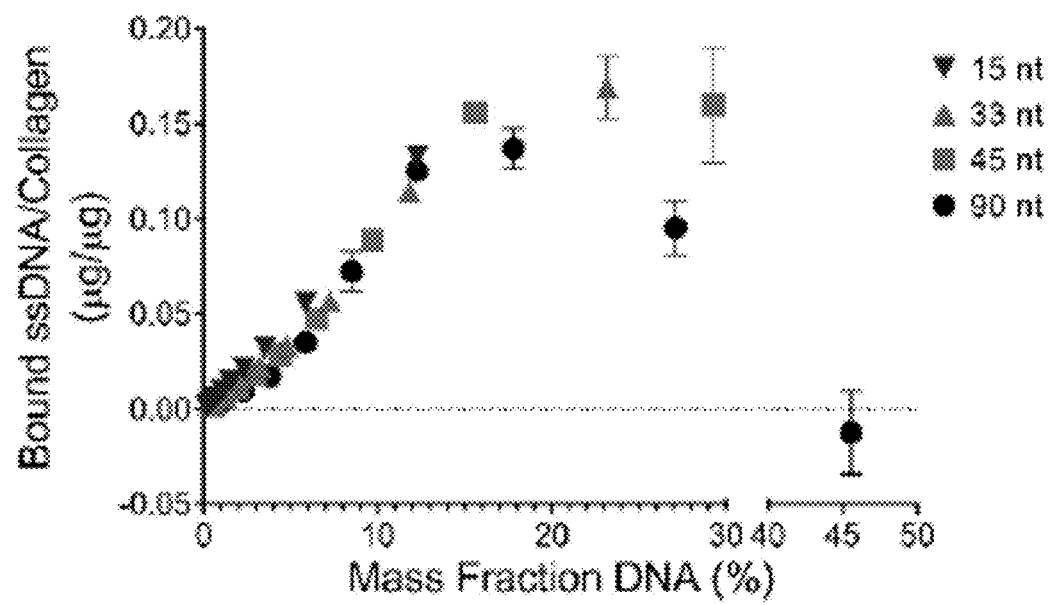
FIGS. 57A-57C: Random sequence ssDNA oligomers of 15, 33, 45, and 90 nucleotides (nt) and their binding to type I collagen from solutions diluted in deionized water. Horizontal bars in (FIG. 57B) represent the range of DNA mass fraction where fiber formation was observed. Binding was measured in triplicate. Data is presented as mean±standard deviation.

We believe the variation in fiber formation for the different mixtures of ssDNA and collagen is due to differences in ssDNA-collagen binding of the oligomers. Previous reports found in vivo DNA-collagen binding favored shorter DNA (160-200 nt); however, ssDNA on the scale of DNA aptamers (15-100 90 nucleotides) has not been previously investigated.12 To test in this specific range, we measured the binding of our short, monodisperse, random sequence ssDNA oligomers (15, 33, 45, 90 nt) with type I collagen using a fluorometric binding assay. We observed that ssDNA oligomer binding peaked at ~0.15 µg ssDNA/µg collagen regardless of the oligomer length, which occurred between 12-30% mass fraction of DNA in solution. (FIG. 57A). Upon reaching this maximum binding for all the oligomers tested, we observed two interesting trends with the shortest and longest oligomers. Our samples having the shortest oligomer, 15 nt, displayed fibers at the largest mass fraction of DNA in solution tested (~12%), which corresponded to binding of ~0.15 µg ssDNA/µg collagen. In comparison, the larger (33, 45, and 90 nt) oligomers displayed fibers with lower binding ~0.05 µg ssDNA/µg collagen beginning at a slightly reduced mass fraction of DNA in solution, ~8%. In addition, we showed that the 90 nt ssDNA oligomer displayed reduced binding as the mass fraction of DNA in solution increased beyond its maximum binding of ~18%. This trend proceeded to such an extent that for a ~45% mass fraction of DNA in solution (50% volume fraction collagen), no fibers were observed; instead, a few faint ssDNA rich aggregates were present potentially the result of ssDNA self-aggregation and/or a lack of sufficient collagen in solution. With this boundary determined, our data suggests any ssDNA oligomer sequence can form these ssDNA-collagen fibers so long as the relative amount of ssDNA to collagen in solution is within the appropriate range.

Figure 57B:
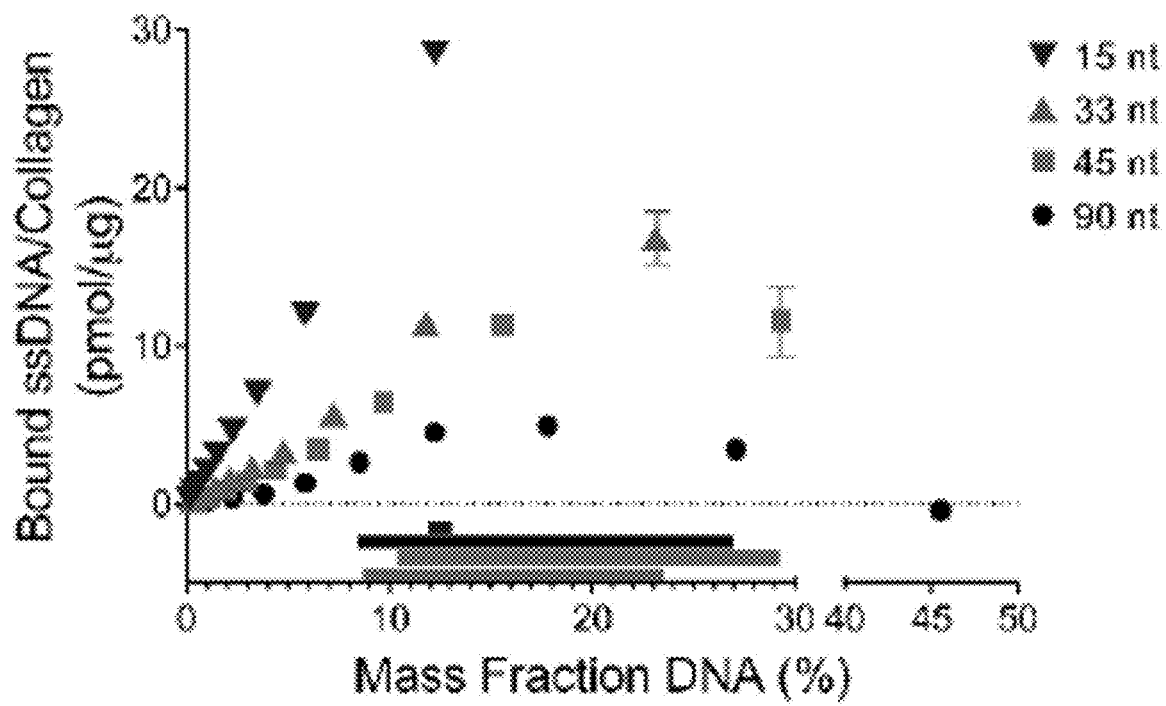
Figure 57C:
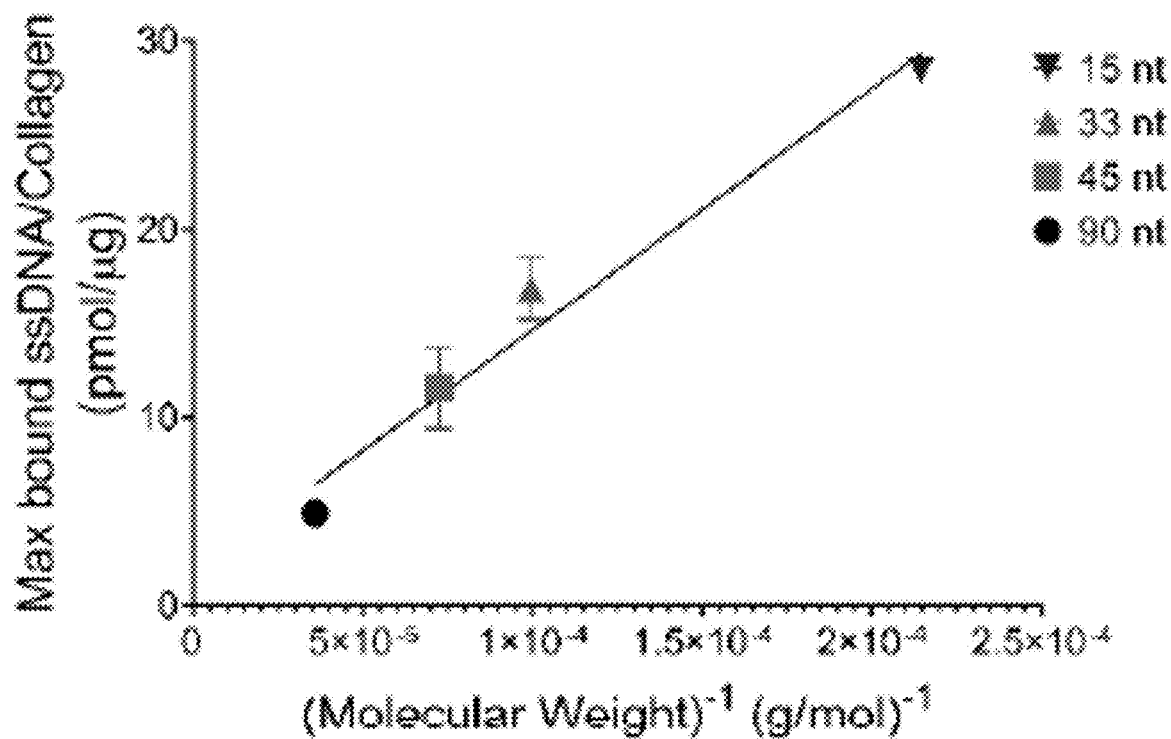
Figures 59A, 59B, 59C, 59D:
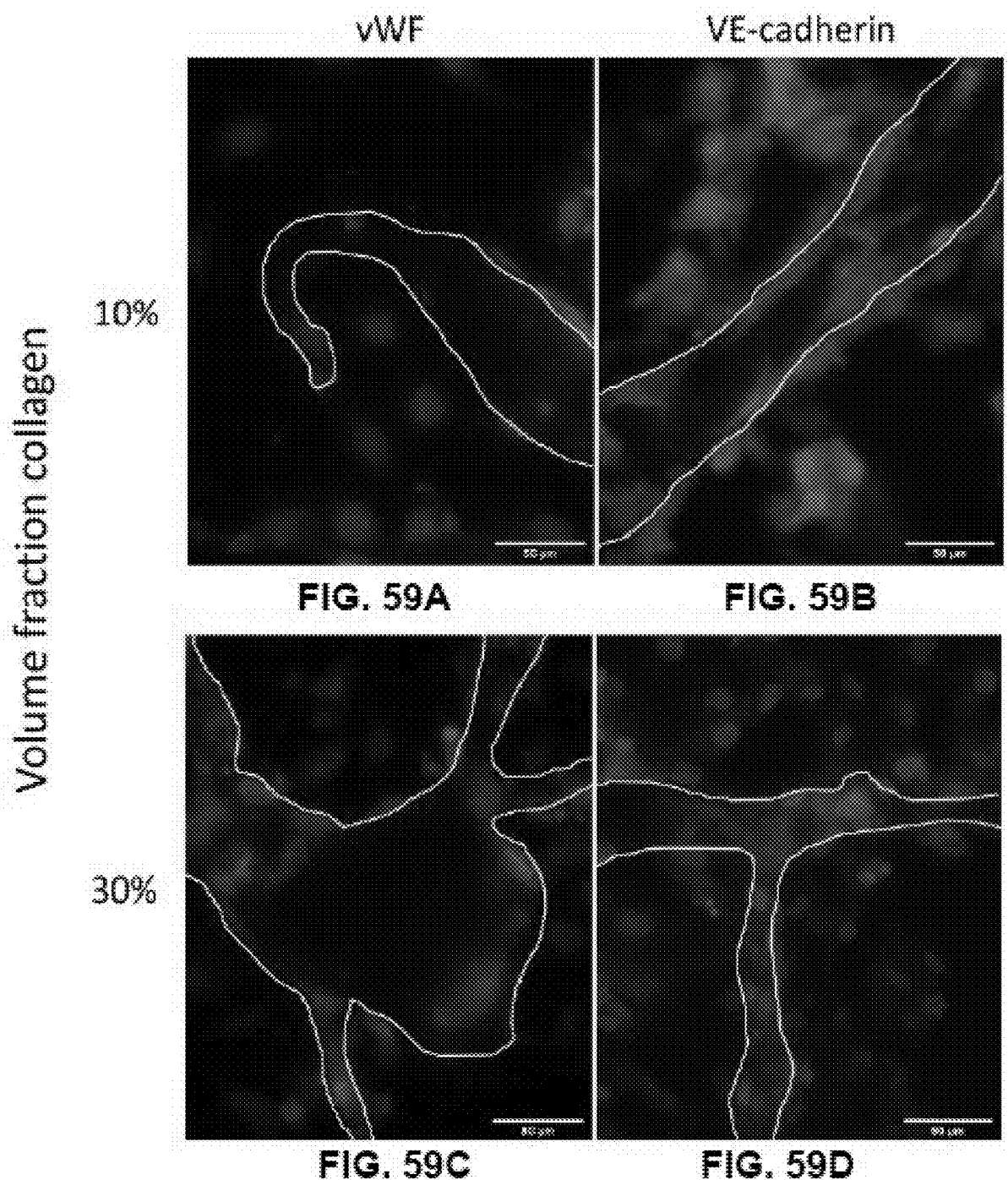
FIGS. 59A-59D: Immunofluorescence microscopy of GFP-HUVECs cultured on ssDNA-collagen fibers (outlined in white) for three days. Cell nucleus in blue and either von Willebrand factor (vWF) or vascular endothelial cadherin (VE-cadherin) in red. vWF intensity is observed to be greater for cells on ssDNA-collagen fibers as compared to the flat culture surface. VE-cadherin staining reveals the cells beginning to encircle the fibers in a continuous monolayer. Fibers were formed originally using a random 80 nt ssDNA oligomer using fiber forming solutions diluted in deionized water.

To better reveal the effect of ssDNA oligomer length on the observed fibrillogenesis, we then calculated the amount of bound ssDNA per available collagen on a mole per mass basis (FIG. 57B) The results show that the shorter the ssDNA oligomer, the more oligomers of ssDNA would complex with a given mass of collagen. This implies that more individual oligomers of ssDNA are present in fibers made using shorter sequence ssDNA. Therefore, ssDNA content bound to the basement membrane, loaded into a collagen-based scaffold, or included in these fibers is tunable simply by varying the length of the oligomer. The 15 nt ssDNA oligomer had a maximum binding of 28.5±0.2 pmol bound ssDNA/µg collagen for a 12.27% mass fraction of ssDNA in solution, the 33 nt ssDNA oligomer had a maximum binding of 16.8±1.6 µmol bound ssDNA/µg collagen for a 23.16% mass fraction of ssDNA in solution, the 45 nt ssDNA oligomer had a maximum binding of 11.5±2.2 µmol bound ssDNA/µg collagen for a 29.32% mass fraction of ssDNA in solution, and the 90 nt ssDNA oligomer had a maximum binding of 4.9±0.4 pmol bound ssDNA/µg collagen for a 17.83% mass fraction of ssDNA in solution. When the value for maximum binding from (FIG. 57C) of each oligomer was plotted against the inverse of the oligomer molecular weight, the data followed a linear relationship with $R^2 > 0.95$ which reinforces that shorter ssDNA has an avidity for binding with collagen.

As a preliminary study, we cultured green fluorescent protein expressing human umbilical vein endothelial cells (GFP-HUVECs) on immobilized fibers formed using an 80 nucleotide random ssDNA sequence. Because endothelial cells express contact guided behavior for engineered topographies and electrospun fibers, we were interested in how they would respond to the biophysical cues conferred by our ssDNA-collagen fibers.31 The cells readily attached and interacted with the fibers for all fiber forming conditions. Of note, the cells appeared to consolidate the fibers into larger structures with branches and tubules after three days of culture (FIGS. 58A-58B). Immunohistochemistry revealed positive expression of endothelial cell markers, von Willebrand factor (vWF) and vascular endothelial cadherin (VE-cadherin), with expression levels being higher for cells in direct contact with the fibers (FIGS. 59A-59D). vWF production is important notably to maintaining endothelial hemostasis.32 Interestingly, reduced vWF production or lack thereof of this glycoprotein is associated with increased angiogenesis, which runs counter to the observed elevated vWF expression and angiogenic-like structures the endothelial cells formed with the ssDNA-collagen fibers.33,34 This discrepancy warrants further investigation of these ssDNA-collagen fibers and their role to regulate vascular cell phenotypes as well as their potential utility with other cell types. In addition, the VE-cadherin staining suggests the endothelial cells were assembling into a continuous monolayer capable of wrapping around the ssDNA-collagen fiber structures (FIGS. 59A-59D). VE-cadherin expression at endothelial cell-cell junctions is important for maintaining vascular permeability and as such these fibers are hopeful in promoting a functional endothelial cell.35 These preliminary findings suggest these ssDNA-collagen fibers support a beneficial vascular cell phenotype and merit future investigations to fully understand the utility of this promising biomaterial platform.

The work we present herein is an early report on the dynamics of ssDNA-collagen interaction that yields self-assembled nano- and micro-fibers, as well as fiber bundles that appear when cells are present on the fibers. This work is a departure from other work in that we report the dependence of ssDNA size on fiber formation. These self-assembled fibers show great promise as a strategy to fabricate advanced biomimetic extracellular matrices (ECM) containing intercalated bioactive DNA aptamers by combining these fibers with other ECM components. Another potential application for the use of these ssDNA-collagen fibers is in biomaterial functionalization. There is a great interest in recent years to functionalize biomaterial surfaces with origami-based DNA nanotechnology, for applications such as drug delivery. This material platform would also enhance cell adhesion through the incorporated collagen and the fibrous structure in which the collagen would provide additional physical stimuli. Lastly, in this work we demonstrate the formation of fibers utilizing random ssDNA sequences on the order of size similar to ssDNA aptamers. Given that the fiber formation appears to be sequence independent, there exists the possibility of using functional DNA aptamers in this fiber matrix. DNA aptamers are characterized for their high affinity and specificity to targets such as ions, molecules, and proteins, their smaller size and low immunogenicity.36-38 These advantages have led DNA aptamers to being used as antagonists, agonists, delivery agents, and sensors.36-39 Fibers formed using a biofunctional DNA aptamer and collagen shows great potential to confer biophysical cues derived from the fibrous structure while also delivering a DNA aptamer to cells with site-specificity. While the maintenance of aptamer structure is paramount for their overall function, this aspect requires thorough characterization in the context of DNA aptamer-collagen fibers, which is our current focus. Ultimately, the ssDNA-collagen complex offers the potential for greater depth to DNA aptamer engineering.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

What is claimed is:

1. A composition consisting essentially of collagen fibers crosslinked with a plurality of DNA aptamers, wherein the plurality of DNA aptamers are selected from SEQ ID: NO 14 or two SEQ ID NO 14 linked with a $PEG_6$ linker.

2. The composition of claim 1, wherein the plurality of DNA aptamers comprise from 1 to 5 stem loops.

3. The composition of claim 1, wherein the collagen fibers are selected from type I collagen, type II collagen, type III collagen, type V collagen, type XI collagen, or any combination thereof.

4. A method for crosslinking collagen, comprising mixing collagen monomers with a plurality of DNA aptamers under conditions suitable for a crosslinking reaction, wherein the plurality of DNA aptamers are selected from SEQ ID NO: 14 or two SEQ ID NO: 14 linked with a $PEG_6$ linker.

5. The method of claim 4, wherein the collagen monomers and DNA aptamers are mixed at a ratio of from about 8% to about 30%.

6. The method of claim 4, wherein the DNA aptamers comprise from 1 to 5 stem loops.

7. The method of claim 4, wherein the collagen comprises type I collagen, type II collagen, type III collagen, type V collagen, type XI collagen, or any combination thereof.

8. A kit for crosslinking collagen, comprising collagen monomers and a plurality of DNA aptamers, wherein the plurality of DNA aptamers are selected from SEQ ID NO: 14 or two SEQ ID NO: 14 linked with a $PEG_6$ linker.

9. The kit of claim 8, wherein the DNA aptamers comprise from 1 to 5 stem loops.

10. The kit of claim 8, wherein the collagen comprises type I collagen, type II collagen, type III collagen, type V collagen, type XI collagen, or any combination thereof.

* * * * *